(12) United States Patent
Bernardi

(10) Patent No.: US 12,003,660 B2
(45) Date of Patent: *Jun. 4, 2024

(54) METHOD AND SYSTEM TO IMPLEMENT SECURE REAL TIME COMMUNICATIONS (SRTC) BETWEEN WebRTC AND THE INTERNET OF THINGS (IoT)

(71) Applicant: AVILA TECHNOLOGY, LLC, Tysons, VA (US)

(72) Inventor: Robert Bernardi, McLean, VA (US)

(73) Assignee: AVILA TECHNOLOGY, LLC, Tysons, VA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/646,710

(22) Filed: Dec. 31, 2021

(65) Prior Publication Data

US 2023/0216947 A1 Jul. 6, 2023

(51) Int. Cl.
*H04M 1/72445* (2021.01)
*H04L 9/40* (2022.01)
*H04L 67/125* (2022.01)

(52) U.S. Cl.
CPC .... *H04M 1/72445* (2021.01); *H04L 63/0428* (2013.01); *H04L 63/10* (2013.01); *H04L 67/125* (2013.01)

(58) Field of Classification Search
CPC .......................... H04M 1/72445; H04L 67/125
USPC ........................................................ 713/150
See application file for complete search history.

(56) References Cited

U.S. PATENT DOCUMENTS

| | | | |
|---|---|---|---|
| 9,560,198 B2 | 1/2017 | Farrand et al. | |
| 9,667,635 B2 | 5/2017 | Byers et al. | |
| 9,833,097 B2 | 12/2017 | Byers et al. | |
| 9,838,458 B2 | 12/2017 | Boudville | |
| 9,887,995 B2 | 2/2018 | Rotter et al. | |
| 9,922,649 B1 | 3/2018 | LoRe et al. | |
| 10,038,783 B2 | 7/2018 | Wilcox et al. | |
| 10,085,064 B2 | 9/2018 | Danker et al. | |
| 10,116,456 B2 | 10/2018 | Jeong et al. | |
| 10,154,138 B2 | 12/2018 | te Booij et al. | |
| 10,158,757 B2 | 12/2018 | te Booij et al. | |
| 10,193,702 B2 | 1/2019 | Baek et al. | |
| 10,321,092 B2 | 6/2019 | Danker et al. | |
| 10,440,091 B2 | 10/2019 | Ban et al. | |
| 10,455,150 B2 | 10/2019 | Chase et al. | |
| 10,455,552 B2 | 10/2019 | Jang et al. | |
| 10,462,678 B2 | 10/2019 | Ashrafi | |
| 10,547,937 B2 | 1/2020 | Abrams et al. | |
| 10,581,690 B2 | 3/2020 | Salgueiro et al. | |
| 10,581,839 B2 | 3/2020 | Lapidous et al. | |
| 10,587,978 B2 | 3/2020 | McGibney | |
| 10,594,796 B2 * | 3/2020 | Verma ................... | G06F 3/0482 |

(Continued)

FOREIGN PATENT DOCUMENTS

| CN | 112783064 A | 5/2021 |
|---|---|---|
| CN | 108173863 B | 8/2021 |

(Continued)

*Primary Examiner* — Amare F Tabor
(74) *Attorney, Agent, or Firm* — JUNEAU & MITCHELL; Todd L. Juneau

(57) ABSTRACT

The invention relates to processes and systems for using Web Real-Time Communications (RTC) to connect and communicate with devices used in an Internet of Things (IoT) framework, and devices made for the same.

22 Claims, 89 Drawing Sheets

(56) References Cited

U.S. PATENT DOCUMENTS

| | | | |
|---|---|---|---|
| 10,643,604 B2 | 5/2020 | Tapuhi et al. | |
| 10,652,737 B2 | 5/2020 | Baek et al. | |
| 10,848,567 B1* | 11/2020 | Von Muenster | H04L 65/1073 |
| 10,917,445 B2 | 2/2021 | Andon et al. | |
| 10,929,189 B2* | 2/2021 | Palermo | H04L 69/12 |
| 10,992,966 B2 | 4/2021 | Bennett | |
| 11,080,245 B2 | 8/2021 | Deshmukh et al. | |
| 11,132,352 B1* | 9/2021 | Silverstein | H04L 67/10 |
| 11,330,100 B2 | 5/2022 | White et al. | |
| 11,483,897 B2* | 10/2022 | Cho | H04W 4/12 |
| 11,610,585 B2 | 3/2023 | Sindhwani | |
| 11,704,984 B1 | 7/2023 | ElHattab et al. | |
| 2014/0348044 A1 | 11/2014 | Narayanan et al. | |
| 2016/0149836 A1 | 5/2016 | Narayanan et al. | |
| 2017/0063940 A1 | 3/2017 | Lapidous et al. | |
| 2017/0190423 A1 | 7/2017 | Salgueiro et al. | |
| 2017/0242478 A1 | 8/2017 | Ma | |
| 2017/0263147 A1 | 9/2017 | King et al. | |
| 2017/0347390 A1* | 11/2017 | Cho | H04W 80/10 |
| 2017/0359791 A1 | 12/2017 | Onggosanusi et al. | |
| 2018/0027033 A1 | 1/2018 | Kamstrup | |
| 2018/0036591 A1 | 2/2018 | King et al. | |
| 2018/0102965 A1 | 4/2018 | Hari et al. | |
| 2018/0262388 A1 | 9/2018 | Johnson et al. | |
| 2018/0322197 A1 | 11/2018 | Hesterman | |
| 2019/0310761 A1 | 10/2019 | Agarawala et al. | |
| 2019/0313059 A1 | 10/2019 | Agarawala et al. | |
| 2019/0387021 A1 | 12/2019 | Wyatt et al. | |
| 2020/0059776 A1 | 2/2020 | Martin et al. | |
| 2020/0236325 A1 | 7/2020 | Shibaev et al. | |
| 2020/0344498 A1* | 10/2020 | Lazar | H04N 21/234 |
| 2020/0394752 A1 | 12/2020 | Liu et al. | |
| 2021/0014236 A1 | 1/2021 | Turgeman et al. | |
| 2021/0044642 A1 | 2/2021 | Long et al. | |
| 2021/0109520 A1 | 4/2021 | Cao et al. | |
| 2021/0152555 A1 | 5/2021 | Djosic et al. | |
| 2021/0298557 A1* | 9/2021 | Budampati | G01M 3/26 |
| 2023/0205850 A9 | 6/2023 | Bernardi | |
| 2023/0216947 A1 | 7/2023 | Bernardi | |

FOREIGN PATENT DOCUMENTS

| | | |
|---|---|---|
| CN | 112261096 B | 4/2023 |
| EP | 3 091 721 B1 | 4/2016 |
| EP | 3 202 220 B1 | 5/2021 |
| EP | 3 389 230 B1 | 6/2021 |
| JP | 7118089 B2 | 8/2022 |
| JP | 7191827 B2 | 12/2022 |

* cited by examiner

Secure real-time Communications (SRTC) Platform
- WebRTC and IoT Applications -

| Platforms & Gateways | Function | Description |
|---|---|---|
| 1. IoT Wireless Gateways | WiFi, Blutetooth, 5G, LoRa, Zigbee, RFID | Sensors, Switches, IP Cameras, telemedicine, Smarthome, Electric grid |
| 2. MQTT Broker | Iot Protocol Conversion | HTTP, CoAP, AMQP, XMPP protocol comparison |
| 3. IoT Software Platforms | Data Collection/Analytics | Zetta, Thingspeak, Thingsboard, etc., Amazon, Cisco, MS, Google, Cloudhands, VDOO, MAANA |
| 4. AI Software | Data Processing Real-time Analysis | AI modeling and results Analysis Graphs, videostreaming, Data, Google, Amazon, MS |
| 5. Janus Gateway Gstreamer IoT SDK's | Streamed Video VoIP Voice Data Transfer | P2P videostreaming enhancements, remote IP surveillance cameras, video conferencing, data rooms |
| 6. Ubuntu Linux WebRTC Browsers | WebRTC hosting for IoT Edge Computing | Ubuntu core servers, Linux software, Browsers - Chrome, Safari, Firefox |
| 7. WebRTC Discovery, Signaling | IP Address, DNS Servers, DHCP Servers for IoT | DHCP Servers, Assign private IP address, DNS, Public-private IP exchange |

FIG. 5

| | | |
|---|---|---|
| 8. WebRTC Client APP | Android/iOS Smartphones, Tablet/PC and IoT devices, Ubuntu application clients & browsers for IoT | Facilitates P2P real-time communication between IoT devices and WebRTC - video streams, audio (VoIP) and real-time data transfer |
| 9. WebRTC Open Source Platform | Decryption of WebRTC Protocols, Network Servers, Architecture | Session Management, peer connection, video/audio, codecs, data transfer, JavaScript, API's Stun and STUN Servers, NAT Traversal |
| 10. Blockchain | DLT, Distributed Hash Server-Client IP Address names Group Node Coupling | Node IP Addresses, Immutable transaction record |
| 11. Self Sovereign Identity for IoT | Decentralized ID (DID) SSI-Blockchain Digital Wallet-Client (Encryption Keys) QR Codes | Identity Management security using DID's, Blockchain and Digital wallet on client APPs |
| 12. Cryptography for P2P Transport | HSM in Cloud/Edge Computing Video-Streaming - 256 GCM, ECDH, Data Transfer - 256 AES Symmetrical | E2EE security at rest, in motion, in-use |
| 13. Distributed Storage | IPFS - Content Storage in encrypted file system with content addressing/discovery | Data- Graphs, results analysis, modeling, Video - P2P streamed sessions |
| 14. Digital Rights (DRM) | Permission - based security | Video recording, IoT devices, sensor data graphs, analysis, etc. |

FIG. 6

HTTP Client Server Request - Response

HTTP - Synchronous Protocols

Character - Oriented Protocols - the frame or packet is interpreted as a series of characters
Bit - Oriented Protocols - the frame or packet is interpreted as a series of of bits

• <u>AMQP Broker</u> - Asynchronous Protocol used in High Performance IoT Applications XMPP Protocol Configuration IoT Open - Source Software Platforms IoT System Architecture Independent Open Source IoT Platforms - Comparison Table

| IoT SW Platform | Device Management | Integration | Security | Data Collection Protocols | Analytics | Visualization Support |
|---|---|---|---|---|---|---|
| ThingSpeak | No | Rest API, MQTT | Basic Authentication | HTTP | MATLAB | No |
| Zetta | No | Rest API | Basic Authentication | HTTP | Splunk | No |
| Thingsboard | Yes | Rest API | Basic Authentication | MQTT, CoAP HTTP | RT Apache | Yes |
| kaa IoT | Yes | Rest API | SSL, AES256 | MQTT, CoAP HTTP, TCP | RT Analytics | Yes |
| SiteWhere | Yes | Rest API | SSL | MQTT, WebSocket | RT Analytics | No |
| Device Hive | Yes | Rest API, MQTT | Basic Authentication | MQTT, WebSocket | RT Analytics | Yes |

FIG. 16

Artificial Intelligence (AI) Platforms for IoT

AI and IoT Blended achieving the following agile solutions:

- Manage, analyze, and obtain meaningful insights from data and real-time video communication
- Ensure fast and accurate analysis
- Balance requirements for localized and centralized intelligence
- Balance personalization with confidentiality and data privacy
- Maintain security against cyber attack AI & IoT Functional View

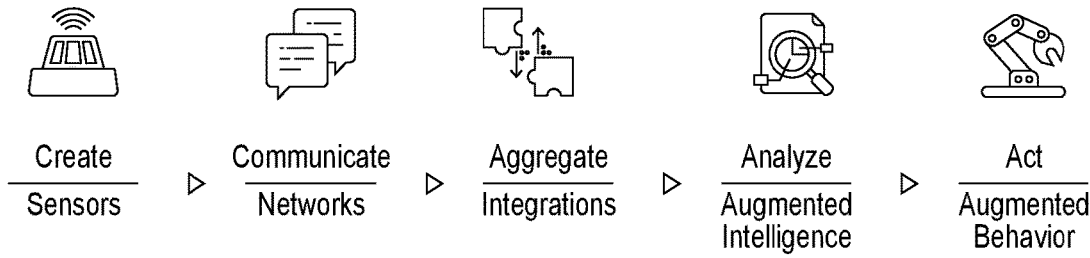

| Create | ▷ | Communicate | ▷ | Aggregate | ▷ | Analyze | ▷ | Act |
|---|---|---|---|---|---|---|---|---|
| Sensors | | Networks | | Integrations | | Augmented Intelligence | | Augmented Behavior |

FIG. 17

AI in real - Time Video Processing for IoT
(Refer to Description of GStreamer Section)

- How to Implement a Pipeline Approach

The pipeline was composed of decoding, face detection, face blurring and encoding stages.

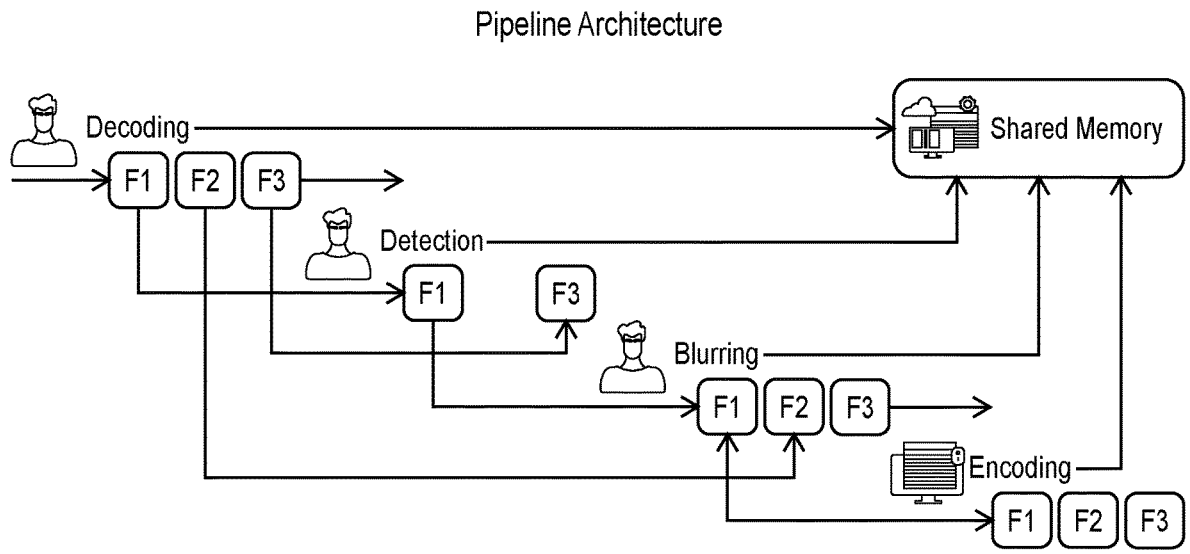

an AI-Based Live Video Processing System the process of implementation consists of several stages:

• Adjusting a pre-trained neural network (or traine) to be able to perform the tasks needed
• Setting a cloud infrastructure to enable processing of the video and to be scalable
  to a certain point
• Building a software layer to pack the process and implement user scenariOS
  (mobile applications, web and admin panels, etc.)

FIG. 20

WebRTC Network Servers; STUN, TURN and Signaling

Janus Extensible Architecture and API

SkyWay IoT SDK WebRTC Gateway

- Use SkyWay to connect WebRTC smartphones over signaling server and turn servers
- Insert data to the WebRTC Gateway
  - Send RTP audio and video to the SkyWay WebRTC Gateway so the remote party can seamlessly receive media stream data.
  - Send UDP streams directly to the WebRTC data channel Control the Low Performance IoT Devices Utilization Existing SIP/RTP Equipment such as IoT Machines and Systems for manufacturing.

Case II. Running a Media Server between Devices the Janus streaming plugin would pick up the RTSP stream and stream it using WebRTC to a person using a smartphone or PC.

Case III. Running the Janus Server directly on the IP camera as a client download, using Axis or Ubiquiti cameras.

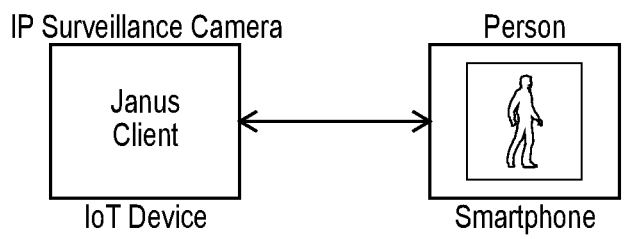

FIG. 40

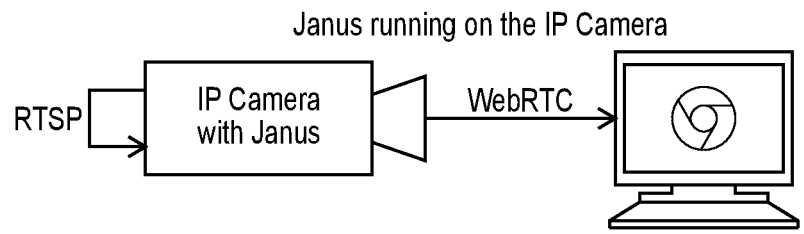

Table Compiled features of Janus

| | |
|---|---|
| plugin.streaming | ✓ |
| plugin.echotest | |
| plugin.videocall | |
| plugin.videoroom | |
| plugin.sip | |
| plugin.nosip | |
| plugin.textroom | |
| plugin.voicemail | |
| plugin.audiobridge | |
| plugin.duktape | |
| transport.http | ✓ |
| transport.rabbitmq | |
| transport.websockets | |
| transport.unixsockets | |

FIG. 41

Deployment of DHCP Servers with Firewall

Firewall with a Virtual Wire and an external DHCP Server (b) Establishing WebRTC Connections with JSEP, Signaling and Discover using ICE-Stun and Turn

- JSEP - JavaScript Establishment Protocol d) After Signaling: Use ICE to Cope with NATs and Firewalls A World without NATs and Firewalls This diagram shows TURN in action. Pure STUN didn't succeed, so each peer resorts to using a TURN server.

Step Two: Discovery (STUN and TURN)

Step Three: Establishing the Connection

Signaling server decrypts DTLS/SRTP data and video messages to exchange private/public IP addresses.

ICE Servers: STUN/TURN Servers - Expose Video Streams

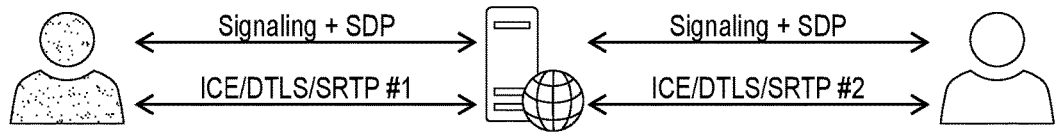

STUN and TURN Servers decrypt DTLS/SRTP and expose unencrypted video/audio streams.

FIG. 66

Selective Forwarding Unit (SFU): Multiparty conferences, simulcast and multicast videos - Little to no security

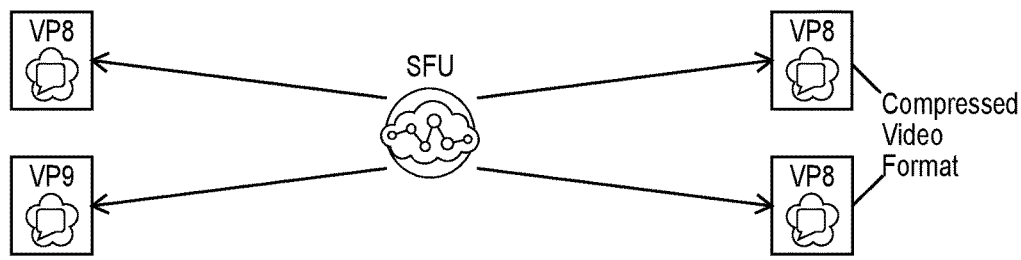

DTLS Peer Encryption designed for a P2P Connection between two users. With SFU, DTLS peer encryption fails to encrypt multiple video streams.

FIG. 67

Hardware Security Module (HSM): is a physical computing device that safeguards and manages digital keys, performs encryption and decryption functions for digital signatures, strong authentication and other cryptographic functions.

(3) Public-Key Cyrptography
An important feature of the SRTCS system is the implementation of public-key cryptography with blockchain.

An example Merkle tree of 4 transactions in a blockchain is shown below (in this diagram, Tx_Root is the Merkle root):

II. Decentralized Identifiers (DIDs), Verifiable Credentials, Blockchain and Cryptographic Operatives SSI Stack and Building Blocks of SSI in a Layered Diagram An example of DID-SSI:

• Overview of SSI Stack

Relationship between Owners, DIDs and VCs (2) Deploying DIDs on IoT Devices

Depicts the OAuth2 Delegation for Constrained Device

Blockchain Framework for IPFS Storage Based on Secret Sharing Key Encryption, IPFS, Smart Contracts and Blockchain Step Two: Upload the encrypted streamed video to the storage and sharing platform in the user's account.

Step Three: Distributed Storage -

Step Four: CDN - A content delivery network (CDN)

Step Five: Server Side Video Rendering -

| | | | | |
|---|---|---|---|---|
| 1 | Know your ARCHITECTURE | 6 | | Focus MONITORING on devices |
| 2 | Create a single strong USER ID | 7 | | Set POLICIES according to value |
| 3 | Create a strong DEVICE ID | 8 | | Control ACCESS to your device |
| 4 | AUTHENTICATE everywhere | 9 | | Don't trust your NETWORK |
| 5 | Know the HEALTH of devices | 10 | | Choose ZERO TRUST services |

Zero Trust Network Comparison with RTC ZTNA Approach

| | Traditional | Advanced | RTC ZTNA |
|---|---|---|---|
| Identities | | Cloud identity federates with on premises system<br><br>Conditional access polices gate access and provide remediation actions<br><br>Analytics improve visibility | Passwordless authentications enabled<br><br>User device location & behavior is analyzed in real-time to determine risk & delays ongoing protection |
| Devices | | Devices are registered with cloud identity provider<br><br>Access only granted to cloud managed & complaint devices<br><br>DLP policies are enforced for BYO & corporate devices | Endpoint threat detection is used to monitor device risk<br><br>Access control is gated on device risk for both corporate and BYO devices |
| APPs | | On premises apps are internet facing and cloud apps are configured with SSO<br><br>Cloud Shadow IT rak is addressed, critical apps are monitored & controlled | |
| Infrastructure | | Workloads are monitored & alerted for abnormal behavior<br><br>Every workload is assigned app identity<br><br>Human access to resources requires lost in time | |
| Network | | Many ingree/egress cloud mincroperimeters with some microsegmentation<br><br>Cloud native filtering & protection for known threats<br><br>User to app internal traffic is encrypted | |
| Data | | Data is classified & labeled via regex/keyboard methods<br><br>Access decisions are governed by encryption | |

FIG. 114

METHOD AND SYSTEM TO IMPLEMENT SECURE REAL TIME COMMUNICATIONS (SRTC) BETWEEN WebRTC AND THE INTERNET OF THINGS (IoT)

BACKGROUND OF THE INVENTION

Field of the Invention

The invention relates generally to communications systems, and in particular to processes and systems providing a secure real-time communications service (SRTCS) for audio and video streaming communications and content sharing that securely connects to and communicates with remote internet-of-things (IoT) wireless devices using Web Real-Time Communications (Web-RTC) Gateways and Cloud Servers to establish peer-to-peer connection between user devices and their IoT devices.

Description of the Related Art

Multiple video and audio messaging systems have been developed recently. However, many systems require proprietary hardware and software systems, and are complicated to set up for an average user. Systems that are easy to set up and use often provide low quality video and audio. Commercial grade systems provide high quality video and audio, but these systems are expensive to install and require specialized technical support to operate and maintain. Further, remote IoT devices, such as sensors, cameras, utility meters, and so forth, often do not have network connectivity, or have limited connectivity based on proprietary and outdated software. Remote IoT devices are also limited in that they cannot be securely accessed by modern communication devices and computers, cannot transmit and receive encrypted, rights-managed files and messages, and are not connected to cloud-based secure storage facilities.

WebRTC (web real-time communications) is a very exciting, powerful, and highly disruptive cutting-edge technology and standard that has been developed over the last decade. As opposed to specialized applications and hardware, WebRTC leverages a set of plugin-free APIs used in both desktop and mobile browsers to provide high-quality functional video and audio streaming services. Previously, external plugins were required in order to achieve similar functionality to that provided by WebRTC.

WebRTC uses multiple standards and protocols, including data streams, STUN/TURN servers, signaling, JSEP, ICE, SIP, SDP, NAT, UDP/TCP, and network sockets.

However, there continues to be a need for security, encryption, DRM protection, and the advantages provided by incorporating blockchain technology, for connecting IoT devices to user devices, and for transmission and storage and sharing of data, programming, streamed video, streamed audio, real-time messages, and DRM-protected files.

SUMMARY OF THE INVENTION

In one preferred embodiment, the invention provides a process and a system for using a secure real-time communications service (SRTCS) for data-capture, device programming, audio streaming, video streaming communications and content sharing that securely connects to and communicates with remote internet-of-things (IoT) wireless devices using Web Real-Time Communications (Web-RTC) Gateways and Cloud Servers to establish peer-to-peer connection between user devices and the IoT devices.

The invention provides a user-friendly method and system to deploy and implement a Secure Real-Time communications (SRTC) platform to seamlessly provide real time data, programming, video, audio, and data communications between IoT devices and WebRTC as described herein. The invention includes the overall network design, system architecture and feature/functions of the interconnected IoT based platforms and gateways, WebRTC and advanced security platforms and technologies.

The SRTC platform integrates WebRTC with interconnected IoT gateways and platforms to provide device-to-person real time communications, consisting of: (1) IoT wireless gateways with Edge computing, (2) IoT MQTT broker gateway, a publish-subscribe network protocol that transports messages between IoT devices, (3) IoT software and AI platforms, (4) Janus WebRTC server to establish media communications with a browser, and (5) GStreamer pipeline-based multimedia framework used to create media applications. In addition, several security platforms are integrated with the SRTC: (1) the Self-Sovereign Identity (SSI), a platform for digital identity for IoT devices and persons, (2) Private Blockchain with DHT and (3) advanced video streaming and data encryption technology.

WebRTC (Web Real-Time Communication) is a free open-source platform providing web browsers and mobile applications with real-time communication via simple application programming interfaces (APIs) using JavaScript. It facilitates direct peer-to-peer (P2P) communication of streamed video, audio (VoIP), and data between WebRTC clients and servers, eliminating the need to install browser plugins or download native apps. WebRTC is integrated with most browsers on smartphones and PCs, including Chrome, Firefox, Safari and MS Edge.

Since IoT devices do not natively support WebRTC, the SRTC platform assigns and integrates IoT video and data streams with native Chrome WebRTC browsers hosted in a cloud-based Ubuntu server farm and assigns IP addresses and domain names to IoT devices to facilitate WebRTC real-time, peer-to-peer, media exchange between IoT devices and a smartphone/PC creating a device-to person WebRTC communications service. The native WebRTC browsers are uniquely designed and hosted on Ubuntu-Linux servers. Virtually all IoT devices can be integrated with native WebRTC browsers including sensors, meters, remote medical devices, home surveillance systems, IP surveillance cameras, ATM bank cameras, aerial drones and satellites the electric grid and environmental monitoring systems.

The SRTC platform also provides enhanced IoT media applications through the seamless integration with Janus media gateway and the GStreamer multimedia framework, including video format conversion (H.264, VP8NP9), video streaming from IP cameras with or without an intermediary server gateway, video conferencing, video playback and video editing. Both Janus and GStreamer are hosted on Linux based Raspberry Pi computers.

The SRTC platform is integrated with Private Blockchain with distributed hash encryption and with the Self Sovereign Identity (SSI) platform that provides secure digital identification of both persons and IoT devices both using digital identifiers (DID), verifiable credentials, and asymmetric public-private key encryption on Blockchain. Advanced video and data cryptography includes AES 256 GCM, Diffie Hellman Elliptical Curve (ECDH) and shared secret key encryption to provide security at rest and in transit.

WebRTC client apps are installed on Android and iOS smartphones and on native WebRTC browsers to control, deliver, and view real time videos and data. Client apps also contain a Digital Wallet that stores the user's private encryption key to implement SSI identity management and verify user credentials through asymmetric public-private key encryption on Blockchain.

A secure distributed video and data storage platform has been designed to store and share streamed videos and data in a distributed P2P file system which is secured using Directed Acyclic Graphs (DAG) and based on the Interplanetary File System (IPFS).

The SRTC platform has implemented the security recommendations in the Zero Trust Architecture (ATA) for IoT recently published by NIST.

BRIEF DESCRIPTION OF THE FIGURES

FIG. 5 is a flowchart illustrating a non-limiting preferred embodiment of the IoT Gateways to WebRTC Discovery front-end of the Secure Real-Time Communications (SRTC) Platform combining WebRTC and IoT Applications.

FIG. 6 is a flowchart illustrating a non-limiting preferred embodiment of the WebRTC Client App to DRM back-end of the Secure Real-Time Communications (SRTC) Platform combining WebRTC and IoT Applications.

FIG. 16 is a flowchart illustrating a non-limiting preferred embodiment of the Independent Open Source IoT Platforms Comparisons Table.

FIG. 17 is a flowchart illustrating a non-limiting preferred embodiment of the Artificial Intelligence (AI) Platforms for IoT.

FIG. 20 is a flowchart illustrating a non-limiting preferred embodiment of the Pipeline Architecture for AI-based Live Video Processing for IoT.

FIG. 40 is a flowchart illustrating a non-limiting preferred embodiment of the Case of Running the Janus Server Directly on the IP Camera as a client download using Axis or Ubiquiti cameras.

FIG. 41 is a flowchart illustrating a non-limiting preferred embodiment of Janus running on the IP Camera.

FIG. 66 is a flowchart illustrating a non-limiting preferred embodiment of the ICE Servers exposing unencrypted video/audio/data streams.

FIG. 67 is a flowchart illustrating a non-limiting preferred embodiment of the Selective Forwarding Unit for Multiparty conferences, simulcast, and multicast videos.

FIG. 114 is a flowchart illustrating a non-limiting preferred embodiment of the Zero Trust Network Comparison with Real-Time Communications (RTC) Zero Trust Network Architecture (ZTNA) Approach.

DETAILED DESCRIPTION

Figure 1:
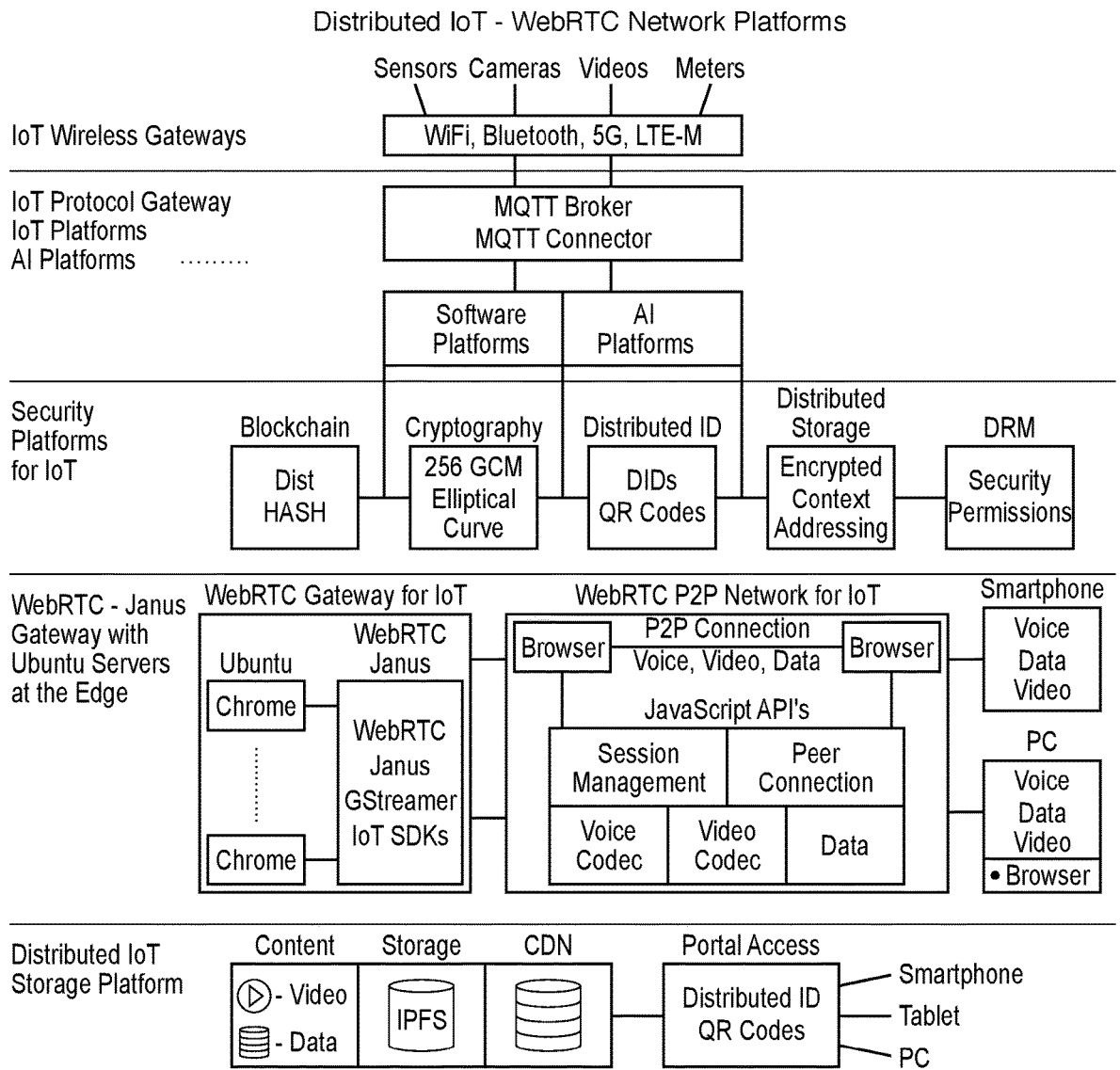
FIG. 1 is a flowchart illustrating a non-limiting preferred embodiment of the Distributed IoT WebRTC Network Platform.

Disclosed herein are embodiments directed to a process and a system to securely connect IoT devices with user devices using Web Real-Time Communications (Web-RTC) Gateways and Cloud Servers to establish peer-to-peer connection and using a secure real-time communications service (SRTCS) for data-capture, device programming, audio streaming, video streaming communications and content sharing.

The invention provides a user-friendly, e.g. "One-Click" or "Push-Button", method and system to deploy and implement a Secure Real-Time communications (SRTC) platform to seamlessly provide real time data, programming, video, audio, and data communications between IoT devices and WebRTC as described herein. The invention includes the overall network design, system architecture and feature/functions of the interconnected IoT based platforms and gateways, WebRTC and advanced security platforms and technologies.

The SRTC platform integrates WebRTC with interconnected IoT gateways and platforms to provide device-to-person real time communications, consisting of: (1) IoT wireless gateways with Edge computing, (2) IoT MQTT broker gateway, a publish-subscribe network protocol that transports messages between IoT devices, (3) IoT software and AI platforms, (4) Janus WebRTC server to establish media communications with a browser, and (5) GStreamer pipeline-based multimedia framework used to create media applications. In addition, several security platforms are integrated with the SRTC: (1) the Self-Sovereign Identity (SSI), a platform for digital identity for IoT devices and persons, (2) Private Blockchain with DHT and (3) advanced video streaming and data encryption technology.

The platform provides connectivity between users and IoT devices using WebRTC technology with a cloud service to discover and establish peer-to-peer connection between users and IoT devices having a proprietary mobile or desktop application. Using the inventive app, a sender (user or IoT device) may select one or more receivers (second user or IoT device), that also has the inventive app, to transmit and/or receive video, audio, and data, or commence file sharing. Selecting the receiver(s) to send an invite initiates a complex group of processes, programming, and protocols, including generating a specific discovery communication file, sending the discovery communication file in a series of specially encrypted communications to a networked cloud platform that includes a WebRTC Gateway Server, a Signaling Server, a Cloud Storage Server, and a Private Blockchain. The WebRTC Gateway Server forwarding the discovery communication to the receiver using subscriber information managed in a private blockchain and stored in distributed cloud storage with all lookup and delivery communications and all stored data specially encrypted. The receiver app generates a specific response/acceptance file, sent encrypted back to the WebRTC Gateway Server, and the WebRTC Gateway Server working with the Signaling Server to generate a peer to peer connection using the private and public IP addresses of the sender and receiver. The sender may apply DRM permissions to the streamed video, audio, or data content in the peer to peer connection and the app uses an encryption key that is integrated into and required for the playback CODEC to process the content and where a DRM violation results in revocation of the encryption key. Multi-party video and audio conferences or data sharing may be broadcast using insertable streams for insertion of user defined processing steps for encoding/decoding of WebRTC media stream tracks and for end-to-end encryption of the encoded data.

Methods

In a preferred non-limiting embodiment of the present invention, there is provided a method, comprising:

- Sending, in a WebRTC application on a user communication device, a private IP address of the user communication device and a JSON invite message, to a WebRTC-Gateway Server, the JSON invite message includes a private IP address to a wireless IoT device and a message to join a communication session, the WebRTC-Gateway Server sends the JSON invite message to the wireless IoT device,
- Sending, in a WebRTC application on the wireless IoT device, a JSON message reply containing an answer (accept/decline) to the invite to the WebRTC-Gateway Server,
- Establishing a communication between the WebRTC-Gateway Server and a Signaling Server, said Signaling server used to provide communication discovery and media format negotiation between the first communication device and the wireless IoT device by a first communication device connection offer and a wireless IoT device acceptance reply based on connecting a public-private IP address of the first communication device to a public-private IP address of the wireless IoT device,
- Establishing an encrypted WebRTC peer-to-peer video, audio and/or data connection between the WebRTC application of the first communication device and the WebRTC application of the wireless IoT device, and deploying an advanced security technology module to provide user-based permission control when communicating and sharing rich media content including AES 256 Galois/Counter mode (GCM), Elliptical-curve Diffie Hellman encryption, and a asymmetrical key management system,
- Providing a Private Blockchain module connected to the WebRTC-Gateway Server to provide a permission-based access control layer to govern network access by the first communication device and the wireless IoT device and to generate an immutable record of all WebRTC transactions between the first communication device and the wireless IoT device,
- Providing a Distributed Ledger Technology (DLT) module connected to the WebRTC-Gateway Server for recording WebRTC transactions including video, audio, and data and storing the WebRTC transactions with user personally identifiable information (PII) in distributed blocks stored and recorded in multiple locations,
- Providing a Group Node Coupling module connected to the WebRTC-Gateway Server for searching and connecting the first communication device with the wireless IoT device from a Distributed Directory of Connected Devices and to access distributed blocks when the first communication device initiates the communication session,
- Providing a DRM module to apply user permissions relating to video/audio/telemetry streaming on a P2P connection, said user permissions including blocking video recording, playback, screenshot disablement, expiration, revocation, and watermarking, and
- Providing a secret video chat module using DRM control and ECDH encryption to prevent video recording/playback using an encrypted key with expiration and revocation controls.

Any of the methods provided herein may include an embodiment comprising the step of saving a IoT communication session comprising the video, audio, and data, in an encrypted communication between the first communication device and a Cloud Storage Server connected to the first communication device, wherein the video chat and voice chat are stored by the Cloud Storage Server.

Any of the methods provided herein may include an embodiment wherein the Cloud Storage Server uses a Distributed Hash Table, and wherein the telephone number of the first communication device is a key mapped to a second value that is the IoT communication session.

Any of the methods provided herein may include an embodiment comprising: assigning, in a menu of the WebRTC chat application on the first communication device, a DRM permission to the IoT communication session saved to the Cloud Storage Server, wherein the DRM permission is selected from the group consisting of: record, not record, store, screen share, revoke, expire, offline view, blacklist, copy, forward, screen capture, rights violation, and cancel/disappear.

Any of the methods provided herein may include an embodiment comprising: rendering, in a rendering module of the Cloud Storage Server, an HTML file of the saved IoT communication session, the HTML file stored in the Cloud Storage Server and having a URL link associated therewith.

Any of the methods provided herein may include an embodiment comprising: enforcing the DRM permission of the IoT communication session, said Cloud Storage Server in encrypted communication with the second communication device, said second communication device having the WebRTC chat application operatively connected to the WebRTC browser of the second communication device to access, using the URL link, the HTML file of the saved IoT communication session saved in the Cloud Storage Server, wherein the saved IoT communication session is rendered on the Cloud Storage Server, and said WebRTC-IoT application enforces the DRM permission of the saved IoT communication session using a DRM enforcement module in the WebRTC-IoT application, and said DRM enforcement module configured to send an enforcement command when a DRM permission violation is detected to revoke an encryption key that encrypts an electronic signal between the WebRTC-IoT application and the WebRTC browser, wherein the electronic signal is between a CODEC in the WebRTC browser and a playback component or module for a speaker or display of the second communication device.

Any of the methods provided herein may include an embodiment wherein the WebRTC-IoT application comprises a Private Blockchain module in communication with the Cloud Storage Server to provide user identity, authentication, a digital hash, node coupling, personally-identifiable information (PII) security, content linking, content searching, and content addressing.

Any of the methods provided herein may include an embodiment wherein the WebRTC-IoT application comprises a hardware security module in communication with the Cloud Storage Server to provide AES 256 GCU encryption, and ECDH Diffie-Hellman encryption for audio and video streams.

Any of the methods provided herein may include an embodiment wherein the IoT-WebRTC application comprises a key management module in communication with the WebRTC-Gateway Server and the Signaling Server to provide homomorphic encryption of a communication between the WebRTC-Gateway Server and the Signaling Server, said homomorphic encryption allowing the Signaling Server to extract the private IP address without decrypting the JSON SMS message.

Any of the methods provided herein may include an embodiment wherein the WebRTC-IoT application has an insertable streams module to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption.

Any of the methods provided herein may include an embodiment wherein the first communication device is selected from a mobile communication device, a desktop computer communication device, and a tablet communication device.

Systems & Platforms

In another preferred embodiment of the invention, there is provided a communication system and sharing platform, comprising:

a WebRTC application of a first communication device having program instructions saved to memory and executable on a processor to establish an encrypted peer-to-peer chat communication with a wireless IoT device having said WebRTC application, said WebRTC application having a discovery module with program instructions to send a discovery request to obtain an IP address of the wireless IoT device, wherein the WebRTC application is installed on the wireless IoT device, said WebRTC application having a blockchain module to connect the first communication device as a first node to the wireless IoT device as a second node in a Private Blockchain network, the WebRTC application having an invite module to send an invite message to a communication session from the first communication device to the IP address of the wireless IoT device through a WebRTC browser extension to a WebRTC signaling server operatively connected to the Private Blockchain network; and the WebRTC application having an accept-connection module to establish encrypted WebRTC peer-to-peer connection between the WebRTC browser of the first communication device and a second WebRTC browser of the wireless IoT device in response to an acceptance by the wireless IoT device of the invite sent by the first communication device, and the WebRTC application having a video module, an audio module, and telemetry module.

Any of the systems and platforms provided herein may include an embodiment comprising a Saving Module in the WebRTC application to transmit the communication session, in an encrypted communication between the first communication device and a Cloud Storage Server, using a distributed hash table, wherein the IP address of the first communication device is a key mapped to a second value that is a saved communication session.

Any of the systems and platforms provided herein may include an embodiment comprising a DRM Module in the WebRTC application to assign, using a menu of the WebRTC application on the first communication device, a DRM permission to the communication session saved to the Cloud Storage Server network, wherein the DRM permission is selected from the group consisting of: record, not record, store, screen share, revoke, expire, offline view, blacklist, copy, forward, screen capture, rights violation, and cancel/disappear.

Any of the systems and platforms provided herein may include an embodiment comprising a Rendering Module in the WebRTC application to render in the Cloud Storage Server, an HTML file of the saved communication session, the HTML file stored in the Cloud Storage Server and having a URL link associated therewith.

Any of the systems and platforms provided herein may include an embodiment comprising a DRM Enforcement Module in the WebRTC application to enforce the DRM permission of the communication session, and having programming instructions wherein said Cloud Storage Server is in encrypted communication with the wireless IoT device, said wireless IoT device having the WebRTC application operatively connected to the WebRTC browser of the wireless IoT device to access, using the URL link, the HTML file of the saved communication session and rendering the saved communication session on the Cloud Storage Server, and said WebRTC application enforces the DRM permission of the saved communication session using the DRM enforcement module in the WebRTC application, and said DRM enforcement module configured to send an enforcement command when a DRM permission violation is detected to revoke an encryption key that encrypts an electronic signal between the WebRTC application and the WebRTC browser, wherein the electronic signal is between a CODEC in the WebRTC browser and a playback component or module for a speaker or display of the wireless IoT device.

Any of the systems and platforms provided herein may include an embodiment comprising a Private Blockchain Module in the WebRTC application to communicate with the Cloud Storage Server and provide user identity, authentication, a digital hash, Group Node Coupling, personally-identifiable information (PII) security, content linking, content searching, and content addressing.

Any of the systems and platforms provided herein may include an embodiment comprising a Hardware Security Module in the WebRTC application to communicate with the Cloud Storage Server to provide AES 256 GCU encryption, and ECDH Diffie-Hellman encryption for audio and video streams.

Any of the systems and platforms provided herein may include an embodiment comprising a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message.

Any of the systems and platforms provided herein may include an embodiment wherein the first communication device is selected from a mobile communication device, a desktop computer communication device, and a tablet communication device.

In another preferred embodiment of the invention, there is provided a communication system and sharing platform, comprising:

a WebRTC application of a first communication device having program instructions saved to memory and executable on a processor to establish an encrypted peer-to-peer communication with a wireless IoT device having said WebRTC application, a WebRTC-Gateway Server having program instructions saved to memory and executable on a processor to provide communication discovery and media format negotiation between the first communication device and the wireless IoT device, a Signaling Server connected to the WebRTC-Server, said Signaling Server having program instructions saved to memory and executable on a processor to provide a public-private IP address to the first communication device in response to a JSON invite to join a video/audio/telemetry communication session and to provide a public-private IP address of the wireless IoT device in response to an acceptance reply, said WebRTC application having program instructions to:

Send, in the WebRTC application on the first communication device, a private device IP address of the first communication device, and a JSON message invite for the wireless IoT device, the JSON message containing an invite to join the video/audio/telemetry communication session, to the WebRTC-Gateway Server to mediate media communications and exchange JSON messages and RTP/RTCP messages with the wireless IoT device, Send, in the WebRTC application on the wireless IoT device, a JSON message reply containing an answer (accept/decline) to the invite and a private IP address of the wireless IoT device to the WebRTC-Gateway Server, said WebRTC-Gateway Server and a Signaling Server having program instructions to provide communication discovery and media format negotiation between the first communication device and the wireless IoT device by a first communication device connection offer and a wireless IoT device acceptance reply based on connecting the public-private IP address of the first communication device to the public-private IP address of the wireless IoT device, and establish an encrypted WebRTC peer-to-peer video and/or audio connection between the WebRTC application of the first communication device and the WebRTC application of the wireless IoT device, and deploy an advanced security technology module to provide user-based permission control when communicating and sharing rich media content including AES 256 Galois/Counter mode (GCM), Elliptical-curve Diffie Hellman encryption, and a asymmetrical key management system, a Private Blockchain module connected to the WebRTC-Gateway Server to provide a permission-based access control layer to govern network access by the first communication device and the wireless IoT device and to generate an immutable record of all WebRTC transactions between the first communication device and the wireless IoT device, a Distributed Ledger Technology (DLT) module connected to the WebRTC-Gateway Server for recording WebRTC transactions including video, audio, and data and storing the WebRTC transactions with user personally identifiable information (PII) in distributed blocks stored and recorded in multiple locations, a Group Node Coupling module connected to the WebRTC-Gateway Server for searching and connecting the first communication device with the wireless IoT device from a Distributed Directory of Connected Devices and to access distributed blocks when the first communication device initiates the communication session, a DRM module to apply user permissions relating to video/audio/telemetry streaming on a P2P connection, said user permissions including blocking video recording, playback, screenshot disablement, expiration, revocation, and watermarking, and a secret video chat module using DRM control and ECDH encryption to prevent video recording/playback using an encrypted key with expiration and revocation controls;

wherein the WebRTC application comprises a video module, an audio module, and a telemetry module, each module providing recording, streaming, playback, encryption, and storage, wherein a communication session comprising the video/audio/telemetry, is saved in an encrypted communication between the first communication device and a Cloud Storage Server connected to the first communication device, wherein the video/audio/telemetry are stored by the Cloud Storage Server, wherein the Cloud Storage Server uses a Distributed Hash Table, and wherein the IP address of the first communication device is a key mapped to a second value that is the communication session, and in a menu of the WebRTC application, a selection option to assign a DRM permission to the communication session saved to the Cloud Storage Server, wherein the DRM permission is selected from the group consisting of: record, not record, store, screen share, revoke, expire, offline view, blacklist, copy, forward, screen capture, rights violation, and cancel/disappear, a rendering module on the Cloud Storage Server, to render an HTML file of the saved communication session, the HTML file stored in the Cloud Storage Server and having a URL link associated therewith, a DRM enforcement module on the Cloud Storage Server, to enforce the DRM permission of the communication session using said Cloud Storage Server in encrypted communication with the wireless IoT device, said wireless IoT device having the WebRTC application operatively connected to the WebRTC browser of the wireless IoT device to access, using the URL link, the HTML file of the saved communication session saved in the Cloud Storage Server, and, wherein said WebRTC application enforces the DRM permission of the saved communication session using the DRM enforcement module in the WebRTC application, and said DRM enforcement module configured to send an enforcement command when a DRM permission violation is detected to revoke an encryption key that encrypts an electronic signal between the WebRTC application and the WebRTC browser, wherein the electronic signal is between a CODEC in the WebRTC browser and a playback component or module for a speaker or display of the wireless IoT device, a Private Blockchain module in the WebRTC application in communication with the Cloud Storage Server to provide user identity, authentication, a digital hash, Group Node Coupling, personally-identifiable information (PII) security, content linking, content searching, and content addressing, a hardware security module in the WebRTC application in communication with the Cloud Storage Server to provide AES 256 GCU encryption, and ECDH Diffie-Hellman encryption for audio and video streams, a key management module in the WebRTC application in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON message, an insertable streams module in the WebRTC application to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption, and wherein the first communication device is selected from a mobile communication device, a desktop computer communication device, and a tablet communication device.

Scope of Terminology

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

The embodiments herein, and/or the various features or advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. Like numbers refer to like elements throughout.

The examples and/or embodiments described herein are intended merely to facilitate an understanding of structures, functions, and/or aspects of the embodiments, ways in which the embodiments may be practiced, and/or to further enable those skilled in the art to practice the embodiments herein. Similarly, methods and/or ways of using the embodiments described herein are provided by way of example only and not limitation. Specific uses described herein are not provided to the exclusion of other uses unless the context expressly states otherwise.

Definitions

Description of WebRTC

The term "WebRTC" as used herein refers to a free, open source platform which facilitates browser-based P2P communications (voice and video) on Android, IOS and PC platforms. WebRTC is supported by most browser technologies including: Chrome, Firefox, Safari, Opera and MSEdge. WebRTC supports video, voice and generic data to be sent between (and among) peers allowing developers to build voice and video-communications solutions and services. The technologies behind WebRTC are implemented as an open web standard and available as regular JavaScript API's in all major browsers. For native clients, like Android and IOS applications, a library is available that provides the same functionality.

JavaScript API's

WebRTC consists of three main JavaScript objects: the RTC Peer Connection Object, the Mainstream API, and the RTC Data Channel API.

The term "RTC Peer Connection Object" as used herein refers to an object that is the main entry point to the WebRTC API. It helps connect to peers, initialize connections and attach media streams, as shown in the attached diagram. The RTC Peer Connection API is the core of the peer-to-peer connection between each of the communicating browsers.

The term "Mainstream API" as used herein refers to an object designed to provide easy access to media streams (video and audio) from cameras, microphones and audio and video codecs on mobile devices and PC's.

The term "RTC Data Channel API" as used herein refers to an object designed to transfer arbitrary data including data messages in addition to audio and video streams The term "WebRTC Protocols" refers to three main protocols for WebRTC: DTLS, SRTP, and SIP.

The term "Datagram Transport Layer Security (DTLS)" as used herein refers to a WebRTC protocol that adds encryption and message authentication. DTLS is a communications protocol that provides security for datagram-based applications, specifically voice and video by allowing them to communicate based on a stream oriented transport layer security (TLS) protocol, and is intended to provide similar security guarantees. DTLS uses User Datagram Protocol (UDP) streaming protocol to establish low latency and loss toleration communications between applications on the Internet, such as WebRTC based P2P connection.

The term "Secure Real-Time Transport Protocol (SRTP)" as used herein refers to a WebRTC protocol that is a profile for Real-Time Transport Protocol (RTP) intended to provide encryption, message authentication and replay attack protection to the RTP data in both unicast and multicast video applications.

The term "Session Initiation Protocol (SIP)" as used herein refers to a WebRTC protocol that is a signaling protocol used for initiating, maintaining and terminating real-time voice, video and messaging sessions. SIP is widely used for signaling and controlling multimedia communications sessions over Internet telephone for voice and video calls, in private IP telephone systems and in instant messaging over IP.

The term "Session Description Protocol (SDP)" refers to a format for describing multimedia communications sessions for the purpose of session announcement and session invitation to support streaming media applications such as voice (VoIP) and video conferencing.

The term "WebRTC Network servers" refers to remote servers that facilitate the WebRTC connection.

The term "Signaling Server" refers to a WebRTC server used to establish a web socket connection between peer-to-peer users using public and private IP address translation.

The term "Interactive Connectivity Establishment (ICE)" refers to a WebRTC server used to discover which IP addresses can connect to each other and the method used to make that connection through typical Network Address Translation (NAT) servers called STUN servers and TURN servers.

The term "STUN server" refers to a WebRTC server used as a primary connection set up server.

The term "TURN server" refers to a WebRTC server that is a secondary connection set-up server when the STUN server is unreachable.

The term "Selective Forward Units (SFU's)" refers to a type of video routing device used for receiving multiple media streams and then forwarding these media streams to multiple users in a video conferencing session.

The term "module" refers to a separate unit of hardware or software or both that has a specific task or function within a larger hardware, software, or electronic system. The term "component" may be synonymous within context. The term module may also include programmable electronics that include both hardware and software or firmware programming.

The term "software module" refers to a separate unit of software programming code that has a specific task or function within a larger software system. A software module may handle one step in a process or may handle a series of related steps required for completing a task or function.

The term "hardware module" refers to a separate unit of hardware that has a specific task or function within a larger electronic system and is usually programmed or programmable by software or firmware or by a user establishing specific settings to achieve a specific task or function.

The term "IoT device" or "internet of things device" refers to pieces of hardware, such as sensors, actuators, gadgets, appliances, or machines, that are programmed for certain applications and can transmit data over the internet or other networks. They can be embedded into other mobile devices, industrial equipment, environmental sensors, medical devices, and more.

The term "MQTT" is a self-referential name and is not an acronym that stands for anything. MQTT refers to a protocol that provides publish-and-subscribe messaging. The name was historically derived from a "Message Queue Telemetry Transport", but since the MQTT protocol does not involve queueing, it is inaccurate to describe the name with the historical acronym.

The term "MQTT protocol" refers to two types of network entities: an MQTT message broker and a number of MQTT subscriber clients. An "MQTT broker" is a server that receives all messages from the subscriber clients and then routes the messages to the appropriate destination clients. An MQTT client is any device, from a micro controller up to a fully-fledged server, that runs an MQTT library and connects to an MQTT broker over a network. In the present invention, an MQTT Broker and MQTT Connector refers to the gateway and platform that receives data and video from the IoT devices, and then forwards to the Cloud Processing Server containing the Software Platforms and Artificial Intelligence (A.I.) Platforms.

In an "MQTT library" the information is organized in a hierarchy of topics. When a publisher has a new item of data to distribute, it sends a control message with the data to the connected broker. The broker then distributes the information to any clients that have subscribed to that topic. The publisher does not need to have any data on the number or locations of subscribers, and subscribers, in turn, do not have to be configured with any data about the publishers.

The term "browser farm" refers to a cloud based browser farm where a plurality of virtual machines, each has a browser loaded thereon and includes browser infrastructure.

WebRTC Security Issues

There are a number of ways that a browser based P2P communications application such as WebRTC may impose serious security risks, especially the interception of unencrypted data or media streams during transmission or when decrypted at middlebox server points in a P2P configuration including signaling server, ICE servers (Stun server and Turn servers) and with Selective Forwarding Units (SFU's). The main security issue is with a man-in-the-middle (MITM) cyber attack and theft of private IP addresses and unencrypted data and streamed video sessions while traversing middlebox network servers. This can occur between browser-to-browser or browser-to-server communications with eavesdropping third parties able to see all sent data including IP addresses, voice conversations, and video streams. TLS is the de-facto standard for Web encryption using HTTPS. But as discussed earlier, WebRTC uses DTLS with less than reliable Datagram transport such as UDP and with the implementation of DTLS to generate encryption keys for SRTP media sessions, where normal protections from TLS encryption are not available.

Signaling Server

WebRTC uses a signaling server network to establish a websocket connection between peer-to-peer users. A form of discovery and media format negotiation must take place in order for the two devices (i.e. 2 Android or IOS devices) on different networks to locate one another. This process is called signaling and involves both devices connecting to the mutually agreed-upon signaling server. A signaling servers function is to serve as an intermediary to allow the two peers to find and establish a connection while minimizing exposure of potentially private information. However, in order to complete a secure connection between 2 peers, the signaling server decrypts the senders private IP address and exchanges it with a public IP address to route the audio or video call to the receiver. As a result, both the sender and receivers private IP address is exposed (unencrypted) and is subject to a man-in-the-middle (MITM) attack whereby the private IP information and other PII information of both users is now compromised.

Peer Connections Using ICE—Protocol—Stun & Turn Servers

ICE (Interactive Connectivity Establishment) is used to discover which IP addresses can connect to each other and the method used to make that connection through a typical NAT (Network Address Translation) which is a method of remapping an IP address space into another by modifying network address information in the IP header of packets while they are in transit across a traffic routing device. ICE uses both Stun and Turn servers to resolve the public IP address of a device running behind a NAT and to solve problems such as one-way audio during a phone call or streamed video between 2 or more peers. Stun messages are usually sent in User Datagram Protocol (UDP) packets. Since UDP does not provide reliable transport guarantees, reliability is achieved by application-controlled retransmissions of the Stun request. Since WebRTC uses DTLS versus TLS, the connection with a Stun server may or may not be always encrypted. Once a session between peer A and peer B, for P2P communications, Session Initiation Protocol (SIP) and Session Description Protocol (SDP) are used. Since the Stun isn't always encrypted, it is easy for a MITM attack to be executed thus obtaining the users private IP addresses and the personal identifiable info. The sessions between both peers will be end-to-end encrypted regardless of your secured/unsecured connection with Stun. This P2P ICE/STUN/TURN—Audio and streamed audio connection process is widely used and accepted as a major security risk with WebRTC browser based P2P communications.

Selective Forwarding Unit (SFU)

WebRTC has settled on the SFU as the preferred method of extending WebRTC to multiparty conferencing including simulcast and multicast. SFU's enable the deployment of P2P streamed video in efficient and scalable hub and spoke technologies with low latency and high quality videos. In the SFU architecture, every participant (peer) sends their media stream to a centralized server (SFU) and receives streams for all other participants via the SFU. The SFU does not need to decode and re-encode received streams, but simply acts as a forwarder of streams between call participants. The main advantage of the SFU architecture is the ability to work with asymmetric bandwidth or (higher downlink bandwidth than uplink bandwidth), which makes it suitable for mobile communications. The problem with SFU is that they do not support E2E media encryption, as the media server terminates the encryption once it receives the media stream and has direct access to it. This represents a serious blocker for the usage of off-the-shelf SFU's for WebRTC applications.

Man-In-the-Middle (MITM) Middlebox Security Concerns

WebRTC is encrypted by design, using DTLS to exchange encryption keys (and encrypt data channel messages) and SRTP to exchange real-time audio and video streams. As such, each peer connection established between two peers is secure (the P2P one-to-one scenario). The moment you add a server to the mix, including a signaling server, ICE servers (Stun and Turn servers) and a Selective Forwarding Unit (SFU), media is not peer-to-peer anymore; you are sending media to a server, and the server sends the media on to other peers. So it's the peers in the media conversation that change—that is if a server is handling the media, WebRTC requires that peer connections connect directly to the server, not the other peer. This means that, in the simple 1-1 peer to peer video/audio call case, two separate and independent peer connections are established: Connection between the caller and server; and Connection between the sender/caller and receiver/callee.

As such, both connections are secure, but only up to or from the server since the server terminates the DTLS connectivity and as a result the server has access to the unencrypted media and any other PII information, including private IP addresses.

Distributed Trust Platform

For video streaming, video conferencing and audio communication over a browser based (WebRTC) P2P network, it is imperative to augment certain deficiencies with Datagram Transport Layer Security (DTLS) and Real-Time Transport Protocol (Secure RTP) to provide strong end-to-end security guarantees. This section defines and explains a Distributed Trust Platform that consists of: AES 256 Galois/Counter Mode (GCM) encryption, Elliptic-Curve Diffie-Hellman (ECDH) encryption, Homomorphic encryption, Insertable Media Streams, Key Management System for Encryption, Hardware Security Module (HSM), Blockchain-Distributed Hash (DHT), and Digital Signatures/Authentication.

AES 256 GCM

AES with Galois/Counter Mode (AES-GCM)—(is a mode of operation for symmetric key cryptography block ciphers) provides both authenticated encryption and the ability to check the integrity and authentication of additional authenticated data (AAD) that is sent in the clear. These are four inputs for authenticated encryption: the secret key, initialization vector (called nonce), the plaintext and optional additional authentication data (AAD). The nonce and AAD are passed in the clear. These are two outputs; the ciphertext, which is exactly the same length as the plaintext, and an authentication tag (the "tag"). The tag is sometimes called the Message Authentication Code (MAC) or integrity check value (ICV).

ECDH

Elliptic-curve Diffie-Hellman (ECDH) is a key agreement protocol that allows two parties, each having an elliptic-curve public-private key pair, to establish a shared secret over an insecure channel. This shared secret may be directly used as a key, or to derive another key. The key or the derived key, can then be used to encrypt subsequent communications using a symmetric-key cipher. It is a variant of the standard Diffie-Hellman protocol using elliptic-curve cryptography (ECC). ECC is a public-key cryptography based on the algebraic structure of elliptical curves over finite fields. Elliptical curves can be used for encryption by combining the key agreement (key exchange system) with a symmetric encryption scheme.

Homomorphic Encryption

Homomorphic encryption solves a vulnerability inherent in all other approaches to doctor protection. Homomorphic encryption (HE) is a form of encryption allowing one to perform calculations on encrypted data without decrypting it first. The result of the computation is in an encrypted form, when decrypted the output is the same as if the operations had been performed on the unencrypted data. In a nutshell, homomorphic encryption is a method of encryption that allows any data to remain encrypted while it is being processed and manipulated. It enables a third party (such as a video streaming service) to apply functions on encrypted data without needing to reveal the values of the data. A homomorphic cryptosystem is like other forms of public encryption in that it uses a public key to encrypt data and allows only the individual with the matching private key to access its unencrypted data (though there are also examples of symmetric key homomorphic encryption as well). However, what sets it apart from other forms of encryption is that it uses an algebraic system to allow you or others to perform a variety of computations (or operations) on the encrypted data.

Homomorphic encryption is a form of encryption with an additional evaluation capability for computing over encrypted data without access to the secret key to decrypt the encrypted data. The result of such a computation remains encrypted. Applying HE to WebRTC signaling which requires both the caller and callee to upload their private IP address to the signaling server so that a media session (video streaming) can be routed and traversed over the public IP network using a public IP address. In this way both the caller's and callee's private IP addresses are never decrypted or exposed to MITM attack. There are two main types of homomorphic encryption. The primary difference between them boils down to the types and frequency of mathematical operations that can be performed on their ciphertext. Types of homomorphic encryption include: Partially Homomorphic Encryption and Fully Homomorphic Encryption. Partially homomorphic encryption (PHE) helps sensitive data remain confidential by only allowing select mathematical functions to be performed on encrypted values. This means that one operation can be performed an unlimited number of times on the ciphertext. Partial homomorphic encryption (with regard to multiplicative operations) is the foundation for RSA encryption, which is commonly used in establishing secure connections through SSL/TLS." A partial HE scheme can also support limited operations such as addition and multiplication up to a certain complexity because most complex functions typically require significant computing capability and computation time.

Insertable Media Streams

WebRTC mandates encryption using DTLS-SRTP works by using a DTLS handshake to derive keys for encrypting the media payload of the RTP packets. It is authenticated by comparing fingerprints in the SDP (session description Protocol) that are exchanged via the signaling server with the fingerprints of the self-signed certificates used in the handshake. This is often called E2E encryption since the negotiated keys do not leave the local device (signaling server) and the browser does not have access to them. However, without authentication it is still vulnerable to MITM attacks focusing on private IP address theft.

Another unsecure media server are the SFU's. FSU's are packet routers that forward a single or small set of media streams from one user to many users (typically up to 50 users). In terms of encryption, DTLS-SRTP negotiation happens between each peer endpoint and the SFU. This means that the SFU has access to the unencrypted payload and can listen in. This is necessary for features like server-side recording. On the security side, it means you need to trust the entity running the SFU and/or the client code (vodeo app) to keep the stream private. Zero trust is always the best policy.

Unlike a VoIP Multipoint Control Unit (MCU) which decodes and mixes media, a SFU only routes packets. It ignores the media content (except header information and whether a frame is a keyframe). So a SFU is not required to decode and decrypt the media stream data.

So what is required and proposed here is to implement a "frame encryption" approach built on a JavaScript API to solve this problem—which is referred to here as Insertable Media Streams. This approach works as follows: (i) Opens two connections, (ii) Applies the encryption on both connections based on a simple XOR cipher, an additive cipher (an encryption algorithm) that operates as follows:

$$A \oplus O = A$$

$$A \oplus A = A$$

$$(A \oplus B) \oplus C = A \oplus (B \oplus C)$$

$$(B \oplus A) \oplus A = B \oplus O = B$$

where $\oplus$ denotes the exclusive disjunction (XOR) operation and is applied to the content which contains the encryption key.

(iii) Only decryption on one of them.

The transform function is then called for every video frame. This includes an encoded frame object and a controller object. The controller object provides a way to pass the modified frame to the next step. The frame header is not required to be encrypted. The insertable media stream API operates between the encoder/decoder and the packetizer that splits the frames into RTP packets. In summary, this is a sophisticated APO for inserting frame encryption which in the case of insertable streams needs to be asynchronous.

Key Management System (KMS)

Encryption key management is administering the full lifecycle of cryptographic keys. This includes: generating, using, storing, archiving, and deleting of keys. Protection of the encryption keys includes limiting access to the keys physically, logically, and through user/role access. There is an entire physical and digital cryptosystem that must be accounted for as well as each key's full lifecycle. Therefore, a robust encryption key management system and policies includes: Key lifecycle: key generation, pre-activation, activation, expiration, post-activation, escrow, and destruction. Physical access to the key server(s), Logical access to the key server(s), and User/Role access to the encryption keys are important.

Asymmetric Keys: Data-in-Motion.

Asymmetric keys are a pair of keys for the encryption and decryption of the data. Both keys are related to each other and created at the same time. They are referred to as a public and a private key. Public Key: this key is primarily used to encrypt the data and can be freely given as it will be used to encrypt data, not decrypt it. Private Key: this key is used to decrypt the data that it's counterpart, the public key, has encrypted. This key must be safeguarded as it is the only key that can decrypt the encrypted data. Asymmetric keys are primarily used to secure data-in-motion. An example might be a streamed video where an AES symmetric session key is used to encrypt the data and a public key is used to encrypt the session key. Once the encrypted data is received, the private key is used to decrypt the session key so that it can be used to decrypt the data.

Asymmetric Key System Flow Process

The Sender and Recipient verify each other's certificates. The sender sends a certificate to the recipient for verification. The recipient then checks the certificate against their Certificate Authority (CA) or an external Validation Authority (VA) for authentication. Once the sender's certificate has been verified, the recipient then sends their certificate to the sender for authentication and acceptance. Once the sender and recipient have mutual acceptance. The sender requests the recipient's public key. The recipient sends their public key to the sender. The sender creates an ephemeral symmetric key and encrypts the file to be sent. (an ephemeral symmetric key is a symmetric encryption key used only for one session.) The sender encrypts the symmetric key with the public key. The sender then sends the encrypted data with the encrypted symmetric key. The recipient receives the packet and decrypts the symmetric key with the private key. The recipient decrypts the data with the symmetric key.

Hardware security module (HSM) is a physical computing device that safeguards and manages digital keys, performs encryption and decryption functions for digital signatures, strong authentication and other cryptographic functions. These modules traditionally come in the form of a plug-in card or an external device that attaches directly to a computer or network server. A hardware security module contains one or more secure cryptoprocessor chips.

Digital signature is a mathematical scheme for verifying the authenticity of digital messages or documents. A valid digital signature, where the prerequisites are satisfied, gives a recipient very strong reason to believe that the message was created by a known sender (authentication), and that the message was not altered in transit (integrity).

Elliptical Curve Digital Signature Algorithm (ECDSA) offers a variant of the Digital Signature Algorithm (DSA) which uses elliptic curve cryptography.

Cryptographic splitting, also known as cryptographic bit splitting or cryptographic data splitting, is a technique for securing data over a computer network. The technique involves encrypting data, splitting the encrypted data into smaller data units, distributing those smaller units to different storage locations, and then further encrypting the data at its new location.

Encrypted Media Extensions (EME)

EME is a W3C specification for providing a communication channel between web browsers and a Content Decryption Module (CDM) software which implements Digital Rights Management (DRM). This allows the use of HTML5 video to play back DRM-wrapped content such as streaming video without the use of 3rd party media plugins to the browser including Adobe Flash or MS Silverlight. The use of a third party encryption key management system is recommended. EME is based on the HTML5 Media Source Extensions (MSE) specification which enables adaptive but rate streaming in HTML5 using MPEG-DASH protected content. (Dash-Dynamic Adaptive Streaming over HTTP). The transport protocol that MPEG-DASH uses is TCP. As of 2016, EME has been implemented in Google Chrome, IE, Safari, Firefox and MSEdge browsers.

Content Decryption Module

The invention includes a stack implementation of using the APO for the Content Decryption Module. The CDM is the client component that provides decryption for one or more encryption key systems including the key management systems proposed in the SRTCS Distributed Trust Platform which supports AES 256 GCM encryption, Elliptic Curve Diffie-Hellman (ECDH) encryption and Homomorphic encryption.

Encrypted Media Extension (EME)

The invention provides an EME for providing a communication channel between web browsers and a Content Decryption Module (CDM).

Private Blockchain

The invention provides a Private Blockchain with Distributed Hash Tables, Group Node coupling, Distributed (encrypted) Identity and Digital Rights (DRM). As used herein, the Private Blockchain is an invitation-only network governed and controlled by a single (or group) entity. Entrants to the blockchain network require permission to join, read, write and participate in the blockchain. There are different levels of access, and the information is encrypted to protect the commercial services confidentiality. The SRTCS system (Vodeo) described in the invention has implemented a permission-based blockchain (Private Blockchain) that deploys an access control layer to govern who has access to the network and users (subscribers) on the Private Blockchain network are vetted and controlled by the network rules.

The SRTCS blockchain contains a growing list of records (transactions) referred to as blocks that are linked using cryptography (encryption). Each block contains a cryptographic hash of the previous blocks (a timestamp) and transaction data (metadata), represented as a Merkle tree.

Distributed Ledger Technology (DLT)

The SRTC invention deploys Distributed Ledger Technology (DLT) for recording "transactions" or video and audio chats in which the transactions and their details are recorded in multiple places (multiple nodes) at the same time. Distributed ledgers have no central data store or administrative functionality which is contrasted with widely used cloud databases such as SQL server. Ledgers are essentially a permanent record of transactions and data. Blockchain, which bundles transactions into blocks that are chained together ("connected"). DLT also has the potential to speed transactions since they remove the need for a central authority. Blockchain technology makes use of cryptography for transactions, security and privacy-preserving protocols. Blockchain cryptography includes public-key cryptography, distributed hashing and Merkle trees.

SRTCS Private Blockchain architecture

This invention also describes a new method and implementation of a Private Blockchain which includes: Blockchain Group Node Coupling, Distributed Hash Tables, Distributed Identity and Directories (searching), Public Key Cryptography, Cryptographic Hashing, and Merkle Trees. Each of the above mentioned technologies are discussed below in greater detail.

Blockchain with Distributed ID Directory & Hash Tables with Group Node Coupling

The invention provides Group Node Coupling, Distributed Identities (DII) and Directories. SRTCS deploys blockchain to provide a record of each user's PII (personal identifiable information) including a private IP address and to provide directory searching capability to find and connect 2 or more users to a video/audio/telemetry communication session. This process also includes node addressing, node discovery and group node coupling. A profile of each subscriber is created in the blockchain that contains all PII and historical metadata of video/audio chats made with other subscribers (called "Buds") in SRTCS. A node coupling profile of "Buds" is created which streamlines the blockchain discovery (searching) algorithms to quickly identify and retrieve addressing linking information to achieve rapid connection between subscribers in the system. WebRTC signaling server is used to connect 2 or more subscribers over the P2P network. As discussed earlier, the signaling server translates each users private IP address to a public IP address to effectuate a connection over the ICE (Stun, Turn) server network. An encrypted Websocket Connection is made between the users WebRTC based browser and the signaling server in an encrypted (hop-to-hop) scenario. SRTCS uniquely deploys homomorphic encryption to extract the private IP addresses of each subscriber without decrypting the private IP address payload in the signaling server. This protects the users from any potential MITM private IP address impersonation and theft and also provides a true end-to-end encryption implementation without the need to decrypt the users private IP address at the signaling server.

Private Blockchain with Distributed Hash Tables & Group Node Coupling

The invention provides Public-Key Cryptography. An important feature of the SRTCS system is the implementation of public key cryptography with Blockchain. Public-key cryptography (also called asymmetric cryptography) is a cryptographic system that uses a pair of keys—a public key and a private key. The public key may be widely distributed, but the private key is meant to be known only by its owner. Keys are always created in a pair—every public key must have a corresponding private key.

Public-key cryptography is most often used for encrypting messages between two people or two computers in a secure way. Anyone can use someone's public key to encrypt a message, but once encrypted, the only way to decrypt that message is by using the corresponding private key.

IoT—WebRTC Network Platforms & Gateways for IoT Devices

The Internet of Things (IoT) comprises multiple layers, one of which is IoT gateways. These gateways maintain device connectivity, translate protocols and manage data transmissions. IoT Gateways are devices that are designed to provide a bridge between different communication technologies. They are used to connect IoT sensors, equipment, devices, systems, and the internet or the cloud. For example, if we take a smart meter sensor, a gateway used in such a system would aggregate all the data generated and collected by the sensor, translate the sensor's protocols, and pre-process the data before delivering it to the next stop or node on the network. By connecting the internet or the cloud with devices deployed in the field, IoT gateways provide networks with local processing and storage solutions. They also make it possible to autonomously control field devices using data generated by the sensors, thanks to the processing power of the attached gateways. IoT devices typically connect to their gateways via short-range wireless transmission protocols such as Zigbee, Z-wave, Bluetooth, or via long-range technologies such as 5G, LTE-M, and Wi-Fi. Gateways can then connect to the internet via fiber optic WAN or ethernet LAN. The key functions of IoT gateways are summarized as: Bridge communications and establish machine-to-machine connections; Use as a data cache and as a streaming and buffer device; Offer offline services and allow for real-time control of connected devices; Aggregate data collected from the field for processing; Clean, pre-process and filter information before forwarding it to a terminal endpoint; Provide additional intelligence and analysis services in some IoT systems; and Provide deployment with added security redundancies.

IoT Devices

As used in the present invention, there are many IoT gateway devices that individuals and organizations use within their IoT networks. As used herein, the devices described below can serve as a gateway to an IoT system.

Smartphones and Tablets

Mobile phones and tablets can act as gateways that allow IoT devices to connect to the cloud. Bluetooth-enabled mobile devices in a phone-as-a-gateway (PaaG) setup enable users to connect to the cloud. Used as a gateway, these phones and tablets can reduce the cost of acquiring external IoT gateways. In many cases, Bluetooth devices use IP protocols to connect to the internet, making it possible to connect virtually any device in your home or office to an IoT network.

Routers

Routers are perhaps the most widely used of all IoT gateways. They transmit IP packets in and out of a local network and to and from IoT devices, making it possible for your smart sensors or other devices to connect to the internet and share the data they generate. Using a router as an IoT gateway provides numerous benefits to enterprises and individuals. For instance, they can seamlessly connect and integrate with your system at little upfront cost. Also, they offer supervisory control and aggregation of data if needed. Finally, some routers come with edge computing resources for low bandwidth analysis and faster insights.

Hotspots

Hotspots have become widely popular in the IoT world. They use a wireless standard that allows people to directly create a connection between two or more devices, eliminating the need for a wireless router. For example, using a Wi-Fi hotspot, you can connect your computer or smartphone to your TV to stream movies. The connection between the two devices is created using a protocol called Wi-Fi Protected Setup (WPS). Hotspots such as Wi-Fi Direct come with several additional protocols such as Zero Configuration networking, Universal Plug and Play to make them easier to use.

Functionality

As used in the present invention, the IoT gateway (device) must perform (at least) these following functions: Connect the disparate "things" in the IoT networks; Translate different communication protocols; Provide robust security and authentication for devices and users; Aggregate and intelligently filter all the data collected by the various devices; and Provide on-board intelligence to handle local decision making and monitoring of the network.

This required functionality naturally leads to the idea of a "smart IoT gateway", which has the advanced capabilities needed to intelligently manage the large amounts of data generated by potentially thousands of IoT devices. In fact, these smart IoT gateways are already transforming the IoT landscape by introducing (and re-defining) the concepts of "edge computing" (computing that takes place at the nearest "edge" of your LAN network), or "fog computing" (computing that has been moved from the "cloud" down to your edge device).

Protocol translation is a critical part of the IoT ecosystem, and requires the IoT industry to standardize both transport (hardware) and communication/data (software) protocols. In this context, transport protocol refers to the lower-level, physical requirements and specifications and requires some sort of hardware solution at the IoT edge. Some of the most common of these IoT transport protocols include BLE (low-energy Bluetooth), LoRaWAN, ZigBee, Z-Wave, SigFox.

Communication or data protocols, specify higher level, application layer requirements. Again, there are hundreds of these standards currently in the field, but some of the most common are CoAP, MQTT, XMPP, AMQP, and HTTP. Typically, the underlying transport for these protocols will be TCP/IP and WebSockets.

5G and IoT Applications 5G is the fifth generation technology for broadband cellular networks. The main advantage of 5G networks is that they will have greater bandwidth, higher download speeds (up to 10 GB per second). To deliver ultra-high speeds with the lowest latencies, 5G networks use two radio frequency groups: FR1—Sub-6 GHZ range, and FR2—Between 24-52 GHZ.

As used for the present invention, there are three different flavors of 5G, each meeting different wireless technology needs. mMTC—massive Machine Type Communications or energy-efficient 5G. mMTC currently adopts the existing LTE-LPWAN (Low Power Wide Area Network Technology). Its main focus is on efficiently transmitting low data volumes intermittently to and from devices that require wide area coverage and long battery life. It is preferred for devices like smart meters and for track and trace apps that are not dependent on speed and latency but on optimal power efficiency. NZB-IoT and LTE-M technologies are part of the mMTC category of 5G. Ultra-Reliable Low Latency Communication, or mission-critical 5G, focuses on the highest possible reliability while enabling latency as low as 1 ms. 5G adds system additions that enable new levels of low latency and ultra-reliability. It is preferred for applications like first responders, emergency services, and autonomous vehicles including drones and industrial IoT, and robotics. eMBB, or enhanced Mobile Broadband, or high speed 5G, is predominantly high data throughput that leverages new, greater bandwidth 5G spectrum. It delivers super-fast speeds, high system capacity, and better spectral efficiency for applications in the consumer space like smartphones augmented and virtual reality and industrial routers and gateways requiring best-in-class connectivity. Both narrowband IoT (NB-IoT) and LTE-M are considered 5G technology.

NB-IoT

As used for the present invention, NB-IoT fits into the mMTC flavor of 5G technology. It is a fast-growing 3GPP cellular technology standard that addresses the LPWAN (Low Power Wide Area Network) requirements of the IoT. It was standardized and classified as a 5G technology in 2016, and it will continue evolving with the 5G specification. It is a leading LPWAN technology to power a wide range of industrial IoT devices, including smart parking, utilities, wearables, and industrial solutions.

LTE-M

LTE-M is an LPWAN technology embraced by 5G; and like NB-IoT, it fits into the mMTC 5G category. The 3GPP agreed that both NB-IoT and LTE-M technologies would continue evolving as part of the 5G specifications, meaning that these technologies can be used today and continue for a decade or more as part of the 5G evolution. NB-IoT and LTE-M coexist with other 5G standards, and may be considered the LPWAN of the 5G spectrum.

5G Speed and Bandwidth 5G delivers up to 10 gigabytes per second (Gbps) supporting instant access to services and applications. 5G networks provide low latency of 1-10 milliseconds compared to 50 milliseconds delivered by 4G. As a reference point, it takes 10 ms for an image to be recognizable by the human eye. Low latency is vital to IoT applications like self-driving vehicles, AI-assisted smart medical devices and manufacturing robots where milliseconds can eliminate disaster.

IoT Use Cases with 5G

As used in the present invention, there are many ways that this combination of 5G and edge computing enables new applications including near real-time video analysis from remote IP surveillance cameras and real-time data analytics. Here is a list of IoT use cases using 5G and edge computing: Remote maintenance and equipment inspection; Visual inspection using cameras and videos; Artificial Intelligence (AI); Augmented Reality (AR); Connected Vehicles; Agriculture; Building Management.

Figure 2:
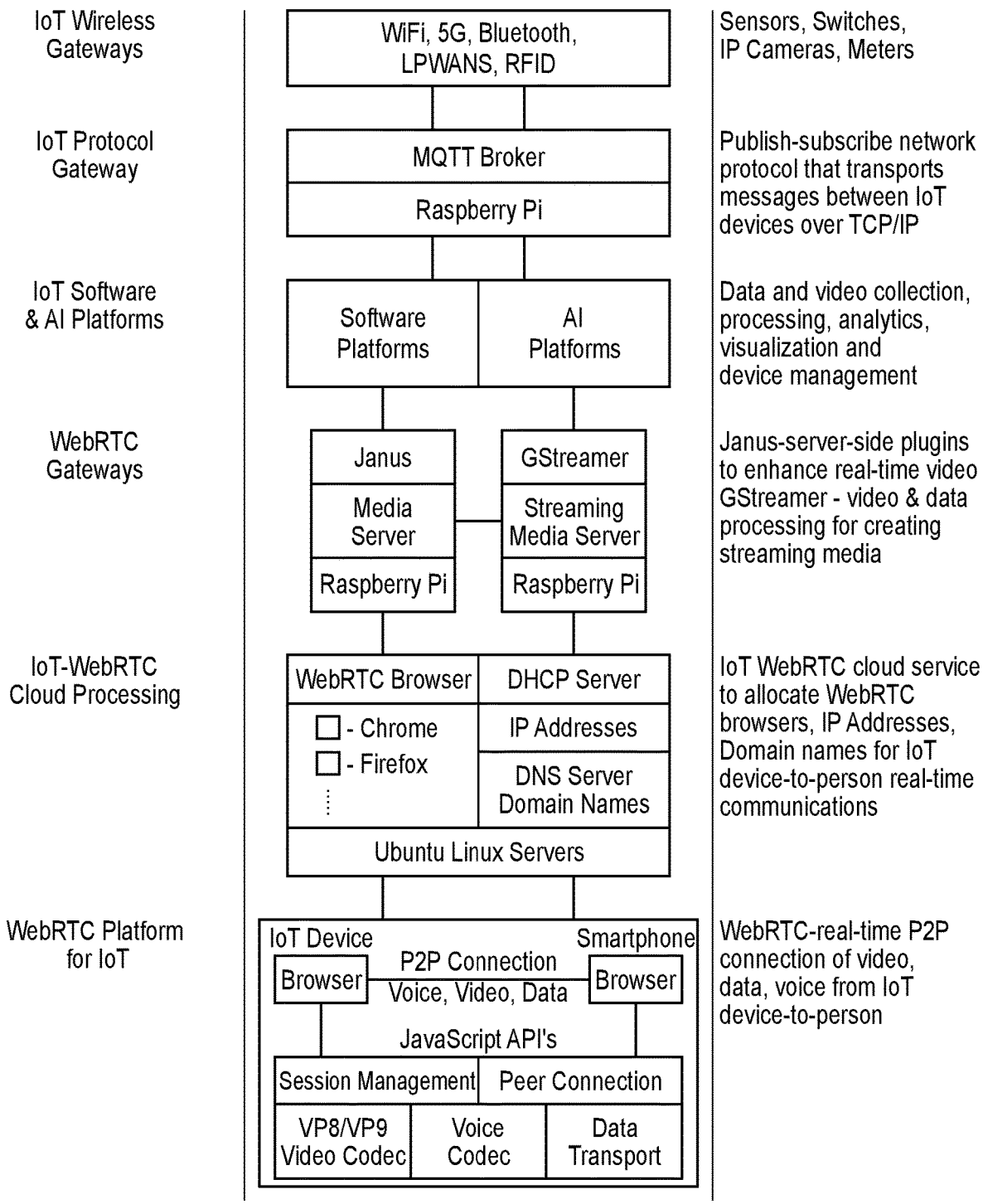
FIG. 2 is a flowchart illustrating a non-limiting preferred embodiment of the IoT to P2P front-end of the Secure Real-Time Communications (SRTC) Platform Network Architecture.
Figure 3:
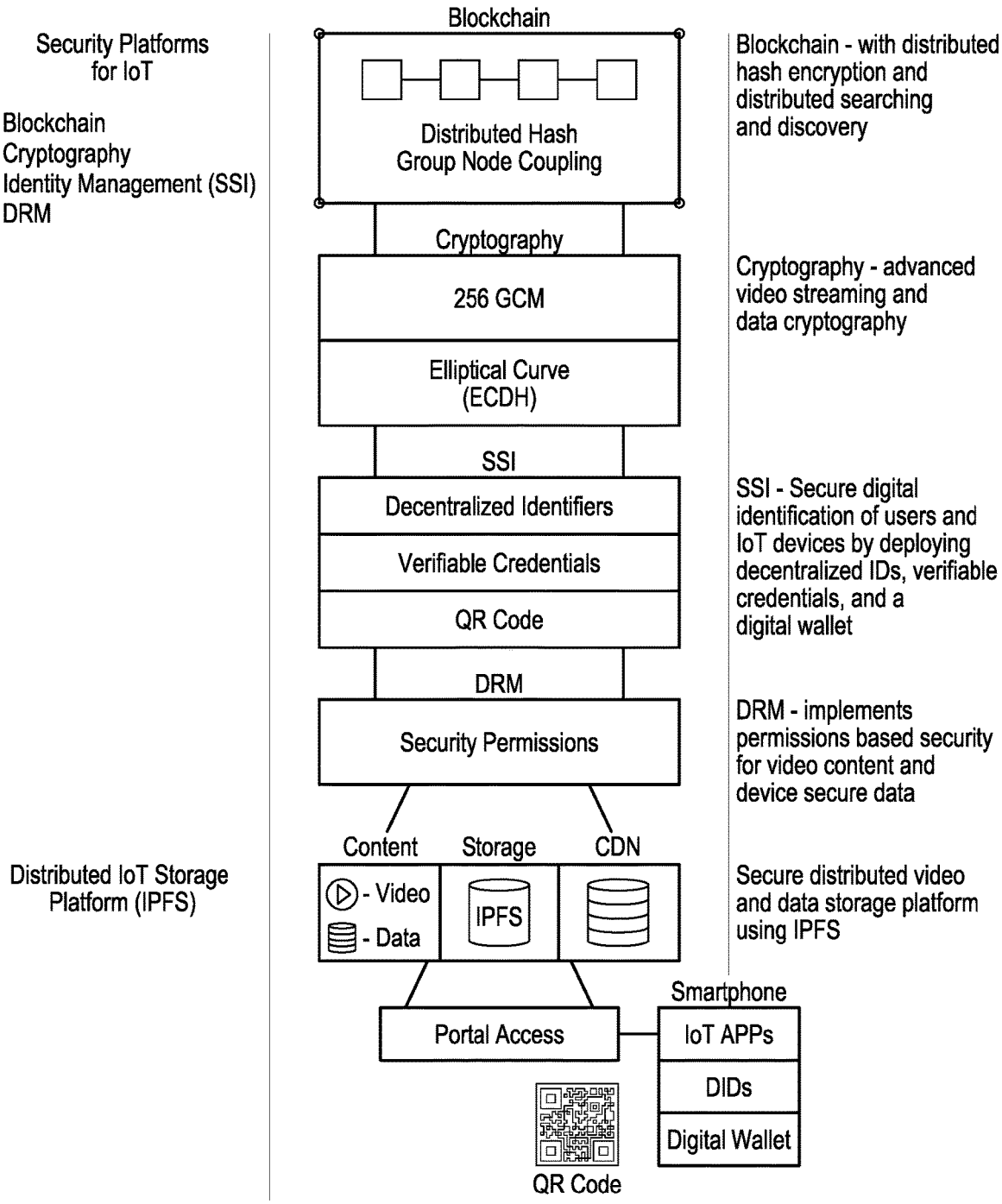
FIG. 3 is a flowchart illustrating a non-limiting preferred embodiment of the Blockchain to IPFS back-end of the Secure Real-Time Communications (SRTC) Platform Network Architecture.

Referring now to Figures, FIGS. 1-3 summarize the overall network design, system architecture and feature/functions of the interconnected IoT based platforms and gateways, WebRTC and advanced security platforms and technologies. FIG. 1 is a flowchart illustrating a non-limiting preferred embodiment of the Distributed IoT WebRTC Network Platform. FIG. 2 is a flowchart illustrating a non-limiting preferred embodiment of the IoT to P2P front-end of the Secure Real-Time Communications (SRTC) Platform Network Architecture. FIG. 3 is a flowchart illustrating a non-limiting preferred embodiment of the Blockchain to IPFS back-end of the Secure Real-Time Communications (SRTC) Platform Network Architecture.

In operation, FIG. 1 shows Distributed IoT WebRTC Network Platforms having IoT Wireless Gateways such as sensors, Cameras, Videos, and Meters connected by WiFi, Bluetooth, 5G, LTE-M. FIG. 1 shows how IoT Protocol Gateway, IoT Platforms, AI Platforms use MQTT Broker and MQTT Connector with Software Platforms and AI Platforms to connect to Security Platforms for IoT. The security platforms for IoT comprise: Blockchain—Dist HASH, Cryptography—256 GCM Elliptical curve, Distributed ID—DIDs QR Codes, Distributed Storage—Encrypted Content Addressing, and DRM—Security Permissions. The next platform is the WebRTC—Janus Gateway with Ubuntu Servers at the Edge. These are comprised of: (i) WebRTC Gateway for IoT having Ubuntu—Chrome, WebRTC Janus with WebRTC, Janus, GStreamer, and IoT SDKs; (ii) WebRTC P2P Network for IoT having Browser—P2P Connection (voice, video, data)—Browser, Session Mgt/Peer Connection, and Video Codec/Voice Codec/Data; and (iii) Smartphone having Voice Data Video, or a PC having Voice Data Video and a Browser.

As shown in FIG. 1, the WebRTC platforms are connected to the Distributed IoT Storage Platform. The Distributed IoT Storage Platform comprises: Content—Video Data, Storage—IPFS, and CDN, connected to Portal Access having Distributed ID and QR Codes, and that connect to a Smartphone, Tablet, or PC.

FIG. 2 provides a non-limiting example of the Secure Real Time Communications (SRTC) Platform Network Architecture. In operation, this Figure shows IoT Wireless Gateways module using WiFi, 5G, Bluetooth, LP wans, RFID to connect to sensors, switches, IP cameras, and meters. Then, the IoT Protocol Gateway module uses MQTT Broker/Raspberry Pπ to Publish—subscribe network protocol that transports messages between IoT devices over TCP/IP.

Then, FIG. 2 shows the IoT Software & AI Platforms module using Software Platforms/AI Platforms for Data and video collection, processing, analytics, visualization & device management.

FIG. 2 shows the WebRTC Gateways module using Janus/Media Server/Raspberry Pπ, and using GStreamer/Streaming Media server/Raspberry Pπ, with the Janus-server-side plug-ins to enhance real-time video GStreamer-video & data processing for creating streaming media.

Then, the IoT-WebRTC Cloud Processing module uses WebRTC Browsers such as Chrome and Firefox, along with a DHCP Server for IP Addresses, DNS server, and Domain Names, align with UBUNTU—Linux—Servers to provide the IoT WebRTC cloud service to allocate WebRTC browsers, IP Addresses, Domain names for IoT device-to-person real-time communications.

FIG. 2 then shows the WebRTC Platform for IoT module using the IoT Device+Browser that has the—P2P Connection—to a Smartphone+Browser, which uses Javascript APIs for Session Mgt/Peer Connection, and for VP8/VP9 Video Codec/voice codec/data transport, to provide the WebRTC—real time P2P connection of video, data, voice from IoT device-to-person.

FIG. 3 shows Security Platforms for IoT including Blockchain, Cryptography, Identity Management (SSI), and DRM. FIG. 3 shows that the Blockchain module uses Distributed Hash and Group Node Coupling to provide distributed hash encryption and distributed searching and discovery. FIG. 3 shows the Cryptography module using 256 GCM and Elliptical Curve (ECDH) to provide advanced video streaming and data cryptography. FIG. 3 then shows the Identity Management (SSI) module that uses Decentralized Identifiers, Verifiable Credentials, and QR code to provide SSI, the secure digital identification of users and IoT devices by deploying decentralized IDs, verifiable credentials, and a digital wallet. FIG. 3 then shows the DRM module using Security Permissions to provide Digital Rights Management (DRM) to implement permissions based security for video content and device sensor data.

FIG. 3 then shows the Distributed IoT Storage Platform module using the Interplanetary File System (IPFS) and Servers for Content (Video/Data/Audio), Storage (IPFS), and a Content Delivery/Distribution Network (CDN), connected to a Portal Access component to connect to a Smartphone having the IoT App, DIDs, Digital Wallet, and QR Code functionality to provide secure distributed video and data storage platform using IPFS.

Figure 4:
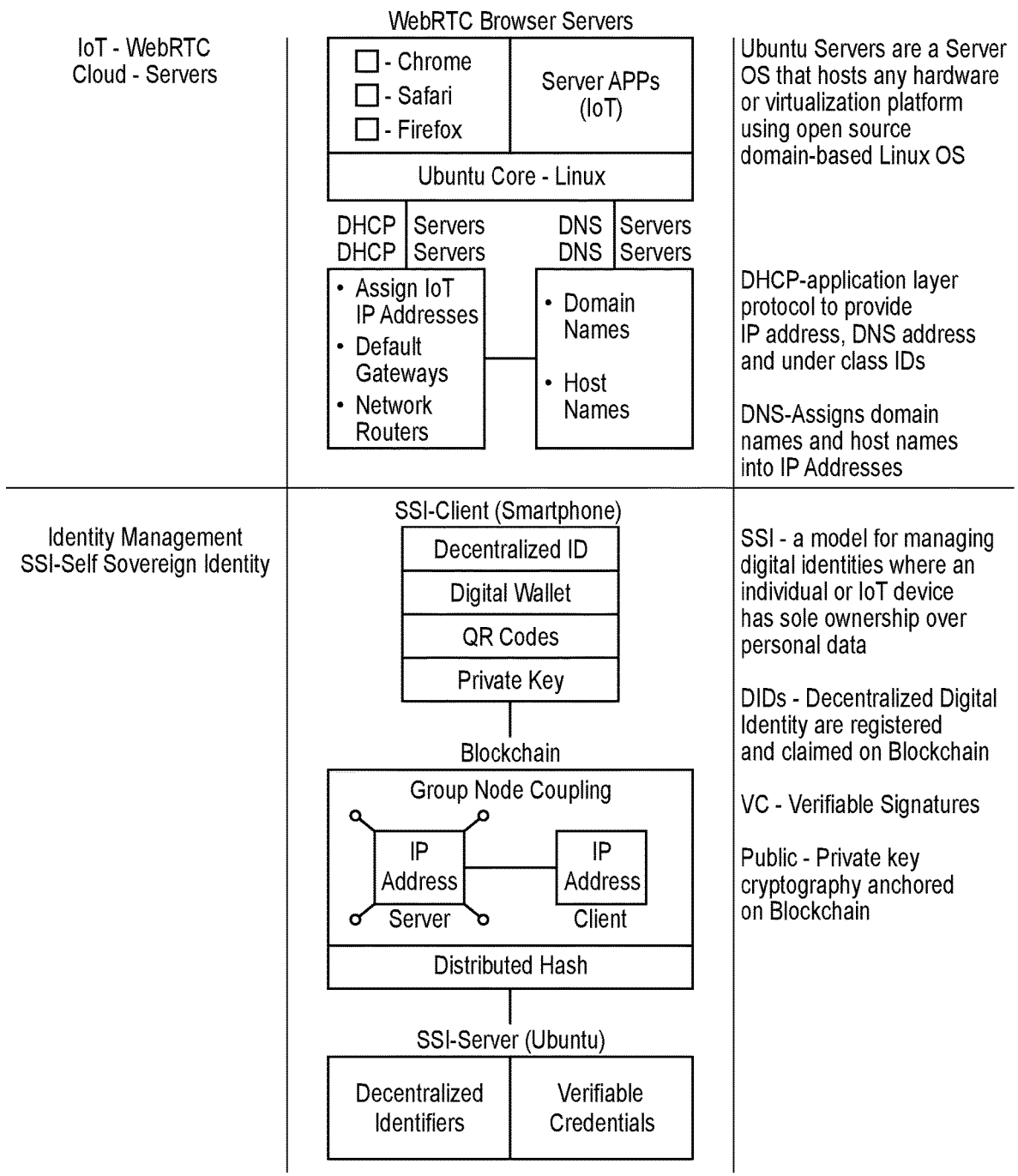
FIG. 4 is a flowchart illustrating a non-limiting preferred embodiment of the WebRTC Platform—Network Server Architecture.

FIG. 4 WebRTC Platform—Network Server Architecture shows the IoT—WebRTC Cloud Servers using WebRTC Browser Servers such as Chrome, Safari, Firefox and Server Apps (IoT) on the Ubuntu Core-Linux to provide Ubuntu Servers as a server OS that hosts any hardware or virtualization platform using open source Debian-based LinuxOS. This is connected via DHCP Servers to Assign IoT IP Addresses, establish Default Gateways, and provide Network Routers. The DHCP-Application layer protocol provides IP address, router address, DNS address and vendor class IDs. The Ubuntu Core is also connected to the DNS Servers to provide Domain Names and Host names, and where the DNS-Assigns domain names and host names into IP Addresses.

FIG. 4 also shows the Identity Management SSI-Self Sovereign Identity module which uses an SSI—Client, Blockchain, and an SSI Server. The SSI-Client (smartphone) for a Decentralized ID, Digital wallet, QR Codes, and Private Key to provide SSI for managing digital identities where an individual or IoT device has sole ownership over personal data, DIDs—Decentralized Digital Identity are registered and claimed on Blockchain, and VC—Verifiable signatures. The Blockchain uses Group Node Coupling including IP Address (server), IP Address (client) and Distributed Hash to connect to the SSI—Server (Ubuntu) which provides Decentralized identifiers/Verifiable credentials. This provides the Public-Private Key cryptography anchored on Blockchain.

FIG. 5 is a flowchart illustrating a non-limiting preferred embodiment of the IoT Gateways to WebRTC Discovery front-end of the Secure Real-Time Communications (SRTC) Platform combining WebRTC and IoT Applications.

FIG. 6 is a flowchart illustrating a non-limiting preferred embodiment of the WebRTC Client App to DRM back-end of the Secure Real-Time Communications (SRTC) Platform combining WebRTC and IoT Applications.

In operation, these Figures show Platforms & Gateways with specific functions. Specific platforms and gateways include the hardware, the programming instructions for their functions and the programming instructions for their interfaces and transactions. Specific platforms and gateways include: 1. IoT Wireless Gateways, 2. MQTT Broker, 3. IoT Software Platforms, 4. AI Software, 5. Janus Gateway—Gstreamer, IoT SDTC's, 6. Ubuntu Linux, WebRTC Browsers, 7. WebRTC Discovery, Signaling, 8. WebRTC Client App, 9. WebRTC Open Source Platform, 10. Blockchain, 11. Self Sovereign Identity for IoT, 12, Cryptography for P2P Transport, 13. Distributed Storage, and 14. Digital Rights Management (DRM).

These platforms and gateways 1-14 provide, respectively, the following functions: 1. WiFi, Bluetooth, 5G, LORA, Zigbee, RFID; 2. IoT Protocol Conversion; 3. Data Collection/Analytics; 4. Data Processing, Real-time Analysis; 5. Streamed Video, VoIP Voice Data Transfer; 6. WebRTC Hosting for IoT Edge Computing; 7. IP Address, DNS Servers, DHCP Servers for IoT; 8. Android/iOS Smartphones, Tablet/PC and IoT devices, Ubuntu Application clients & Browsers for IoT; 9. Decryption of WebRTC Protocols, network servers, architecture; 10. DLT, Distributed Hash, Server-client IP address names, Group Node Coupling; 11. Decentralized ID (DID), SSI—Blockchain, Digital Wallet—client (Encryption keys), QR codes; 12. HSM in cloud/Edge computing, Video-streaming—256 GCM, ECDH, Data Transfer—256 AES Symmetrical; 13. IPFS—Content Storage in encrypted file system with content addressing/discovery; and 14. Permission-based security.

Description

These platforms and gateways 1-14 provide, respectively, the following functions: 1. Sensors, Switches, IP Cameras, Telemedicine, Smarthome, Electric grid; 2. HTTP, CoAP, AMQP, XMPP Protocols Comparison; 3. Zetta, ThingSpeak, Thingsboard, etc., Amazon, Cusco, MS, Google, CloudMinds, VDOO, MAANA; 4. AI modeling and results analysis graphs, videostreaming, Data, Google, Amazon, Microsoft; 5. P2P video streaming enhancements, Remote IP Surveillance cameras, video conferencing, data rooms; 6. Ubuntu Core Servers, Linux software, Browsers-Chrome, Safari, Firefox; 7. DHCP Servers, assign private IP address, DNS, public-private IP exchange; 8. Facilitates P2P real time communication between IoT devices and WebRTC—video streams, audio (VoIP) and real time data transfer; 9. Session Mgt Peer connection, video/audio codecs, data transfer, Javascript API's STUN and TURN servers, NAT Traversal; 10. Node IP Addresses, Immutable transaction record; 11. Identity management security using DID's, Blockchain and Digital Wallet on client apps; 12. E2EE security at rest, in motion & in-use; 13. Data-Graphs, Results Analysis, modeling video—P2P streamed sessions; and 14. Video recording, IoT devices, sensor data graphs, analyses, etc.

MQTT Broker Gateway with Raspberry Pπ.

The MQTT Broker gateway is an ethernet gateway with modified software that makes it act as a MQTT client. MQTT (Message Queuing Telemetry Transport) is an open network protocol that transports messages between IoT devices. The protocol runs over TCP/IP but can easily support any network protocol that provides ordered, lossless connections. It is designed for connection with remote locations where network bandwidth is limited. The MQTT protocol defines two types of network entities: a message broker and several clients. An MQTT broker is a server that receives all messages from the clients and then routes the messages to the appropriate destination clients. An MQTT client is any device (from a micro controller up to a fully-fledged server) that runs an MQTT library and connects to an MQTT broker over a network. Information is organized in a hierarchy of topics. When a publisher has a new item of data to distribute, it sends a control message with the data to the connected broker. The broker then distributes the information to any clients that have subscribed to that topic. The publisher does not need to have any data on the number or locations of subscribers, and subscribers, in turn, do not have to be configured with any data about the publishers. MQTT Broker is software running on a computer (running on-premises or in the cloud) and could be self-built or hosted by a third party. It is available in both open source and proprietary implementations. The broker acts as a post office, MQTT does not use the address of the intended recipient but uses the subject line called "topic", and anyone who wants a copy of that message will subscribe to that topic. Multiple clients can receive the message from a single broker (one to many capability). Similarly, multiple publishers can publish topics to a single subscriber (many to one). Each client can both produce and receive data by both publishing and subscribing, i.e., the device can publish sensor data and still be able to receive the configuration information or control commands (MQTT is a bi-directional communication protocol). This helps in both sharing data, managing, and controlling devices. With MQTT broker architecture, the devices and application become decoupled and more secure. MQTT uses Transport Layer Security (TLS) encryption with user name, password protected connections, and optional certifications that requires clients to provide a certificate file that matches with the server's. The clients are unaware of each other's IP address. The main advantages of MQTT broker are: Eliminates vulnerable and insecure client connections; Can easily scale from a single device to thousands; Manages and tracks all client connection states, including security credentials and certificates; Reduced network strain without compromising the security (cellular or satellite network).

IoT Sensor/Device Auto-Discovery

MQTT Gateway acts as an intermediate agent between the sensors and the MQTT broker/Server. It has built-in functionality to detect all available sensors on the network running around the gateway. The detected sensor and device can communicate with each other and be managed from the central IoT Platform. It also advertises itself, and hence the MQTT clients will be able to find the gateway.

MQTT Gateway Security

Secure the sensor/device in your facility behind the Gateway. Connect your sensor/IoT edge device inside your facility with a Gateway to any IoT Platform/Cloud platform. Aggregate and send sensor data to the central IoT Platform. It also supports TLS/SSL encryption for all data sent from an IoT sensor/device. You can enable secure communication between devices by creating your own certificates.

Connect to MQTT Gateway Via Wireless and Bluetooth

The communication between the sensor/device can be either via Wireless or Bluetooth. These mediums support MQTT-SN based sensors. You can easily connect your Sensor/Device to the Gateway via Bluetooth. For MQTT and Websocket, Communication is either wired or long-range wireless. By default, MQTT Broker listens on port 1883 for MQTT client connections when the gateway is connected. On the other hand, The MQTT broker will connect the MQTT Client on 8883 port if TLS is enabled.

MQTT Gateway as a Bridge

The MQTT gateway acts as a bridge for the IoT/MQTT sensors and devices. When the MQTT devices you manage are distributed across different locations, we need data on a shared server for analysis. You can deploy it at each place and consolidate the data in a central location.

Figure 7:
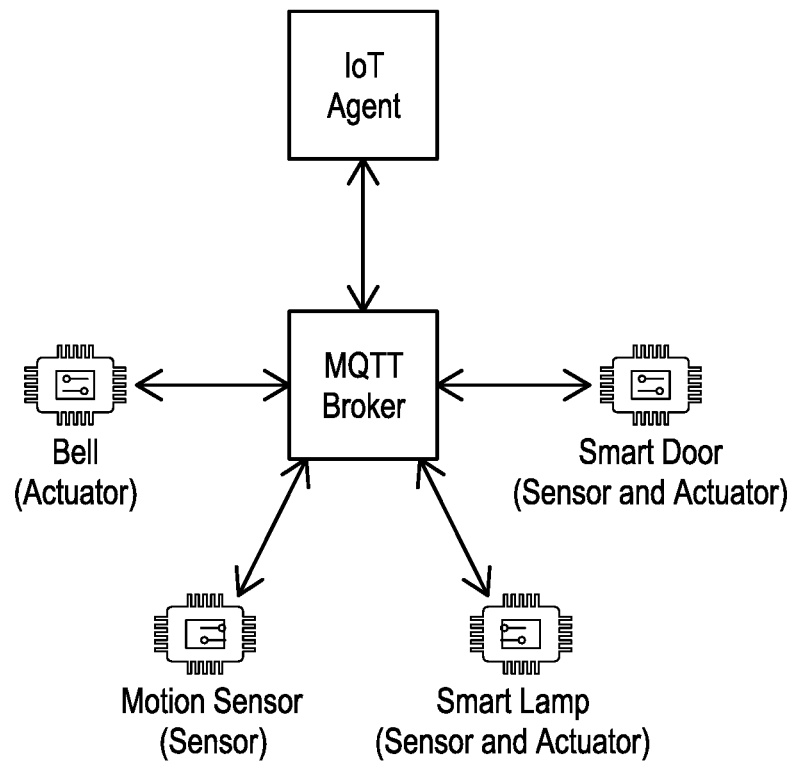
FIG. 7 is a flowchart illustrating a non-limiting preferred embodiment of the IoT over MQTT Broker.
Figure 8:
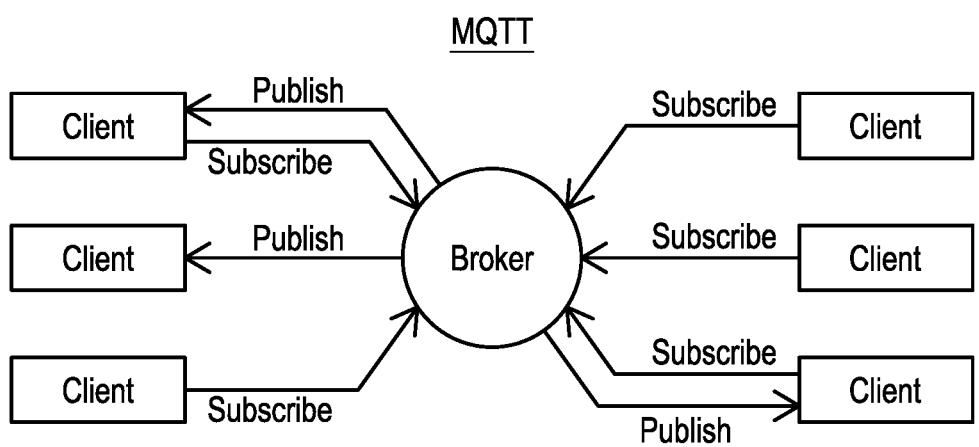
FIG. 8 is a flowchart illustrating a non-limiting preferred embodiment of the MQTT Broker.

FIG. 7 is a flowchart illustrating a non-limiting preferred embodiment of the IoT over MQTT Broker, and FIG. 8 is a flowchart illustrating a non-limiting preferred embodiment of the MQTT Broker. In operation, FIG. 7 shows an MQTT Broker connected to an IoT Agent, a Bell (Actuator), aMotion Sensor (Sensor), a Smart Lamp (Sensor and Actuator), and a Smart Door (Sensor and Actuator).

In operation, FIG. 8 shows MQTT connecting Clients and Brokers in a duplex transaction publishing and subscribing, a Broker publishing to a Client, and a Client subscribing to a Broker.

Comparison: MQTT versus AMQP, CoAP, XMPP and HTTP IoT Protocols

The most popular and widely used protocol for IoT is HTTP. Most developers are familiar with HTTP. It would be much easier to use HTTP since IoT programmers don't have to worry about interoperability. The problem with HTTP for IoT lies in the request—response between client-server communications. HTTP is a synchronous protocol which means that the client waits for the server to respond. As IoT involves a large number of devices, usually connected to unreliable networks, synchronous communication protocols such as HTTP are not ideal. Moreover, MQTT allows the persistent connection that can secure significant resources of HTTP. This is most relevant if the IoT system is using encryption over a persistent connection since you don't have to reset authentication keys again and again. On top of the security issues, MQTT offers a very simple way to implement encryption, authentication and access control due to the presence of the MQTT Broker implementation. Furthermore, HTTP doesn't offer any quality of service (QoS) levels while MQTT offers 3 levels of QoS ensuring that data is reliably sent over the network. It is especially useful when MQTT is used in situations where the connection is intermittent or unreliable. The real advantage of MQTT over HTTP is the ability of MQTT to reuse a single connection to send multiple messages and the client decoupling nature of the MQTT network.

Figure 9:
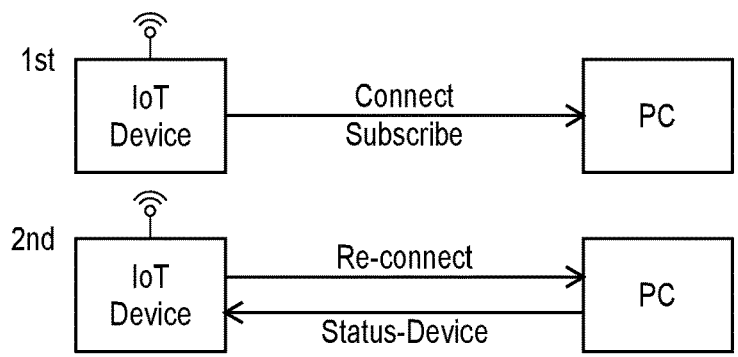
FIG. 9 is a flowchart illustrating a non-limiting preferred embodiment of the MQTT—Broker Reuse of Single Connection to Send Multiple Messages.
Figure 10:
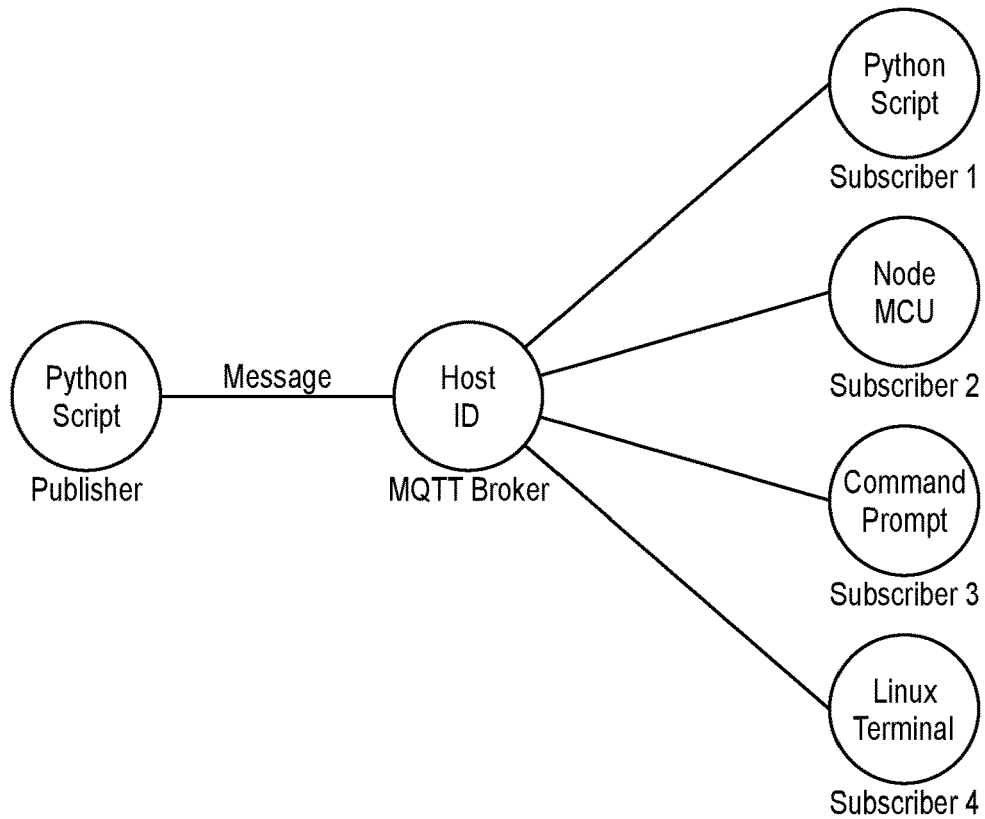
FIG. 10 is a flowchart illustrating a non-limiting preferred embodiment of the MQTT—Client Decoupling Nature of MQTT Broker.
Figure 11:
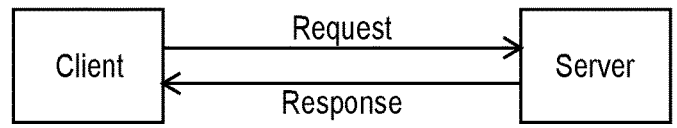
FIG. 11 is a flowchart illustrating a non-limiting preferred embodiment of the HTTP Client Server Request—Response.
Figure 12:
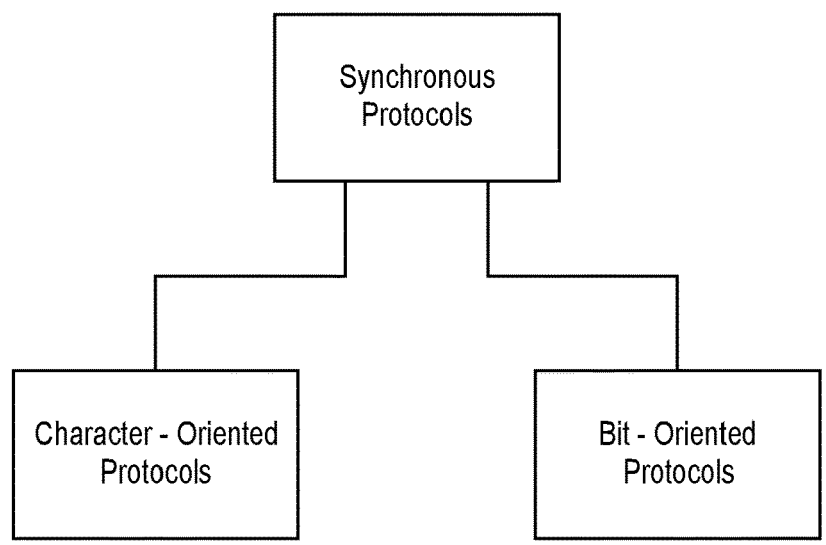
FIG. 12 is a flowchart illustrating a non-limiting preferred embodiment of the HTTP Synchronous Protocols.

Referring now to FIGS. #9, #10, #11, #12, FIG. 9 is a flowchart illustrating a non-limiting preferred embodiment of the MQTT—Broker Reuse of Single Connection to Send Multiple Messages. FIG. 10 is a flowchart illustrating a non-limiting preferred embodiment of the MQTT—Client Decoupling Nature of MQTT Broker. FIG. 11 is a flowchart illustrating a non-limiting preferred embodiment of the HTTP Client Server Request—Response. FIG. 12 is a flowchart illustrating a non-limiting preferred embodiment of the HTTP Synchronous Protocols.

In operation, FIG. 9 shows a 1st IoT Device sending Connect/Subscribe signals to a PC, and a 2nd IoT Device sending re-connect/Status—Device signals to a PC.

In operation, FIG. 10 shows a Python Script Publisher sending a Message to a Host IP MQTT Broker, which is connected to a Python Script—Subscriber 1, Node MCV—Subscriber 2, Command Prompt—Subscriber 3, and Linux Terminal—Subscriber 4.

In operation, FIG. 11 shows a Client sending an HTTP Request to a Server and receiving a Response from the Server.

In operation, FIG. 12 shows Character-Oriented Protocols, where the frame or packet is interpreted as a series of characters, and using Bit-Oriented Protocols where the frame or packet is interpreted as a series of bits.

Constrained Application Protocol (CoAP) is a specialized Internet application Protocol for constrained devices. It enables those constrained devices called "nodes" to communicate with the wider Internet using similar protocols. CoAP is designed for use between devices and general nodes on the Internet, and between devices on different constrained networks both joined by an internet. CoAP is also being used via other mechanisms, such as SMS on mobile communication networks. CoAP is a service layer protocol that is intended for use in resource-constrained internet devices, such as wireless sensor network nodes. CoAP is designed to easily translate to HTtp for simplified integration with the web, while also meeting specialized requirements such as multicast support, very low overhead, and simplicity. Multicast, low overhead, and simplicity are extremely important for Internet of Things (IoT) and Machine-to-Machine (M2M0 devices, which tend to be deeply embedded and have much less memory and power supply than traditional internet devices have. Therefore, efficiency is very important. CoAP can run on most devices that support UDP or a UDP analogue.

CoApp is already used in many IoT applications. It is a client-server protocol that, unlike MQTT, is not yet standardized. With CoApp a client node can contact another server node by sending a CoApp packet. The CoApp server will interpret it, then extract the payload and finally decide what to do depending on its logic. The server does not have to acknowledge the request. Unlike MQTT which has been adapted to IoT needs from a decade old protocol, CoApp was built from the ground up to support IoT with its lightweight messaging for constrained devices operating in a constrained environment. CoApp is designed to interoperate with HTTP thru simple proxies making it natively compatible with HTTP. This interoperability is one of the most important features of CoApp, but it has many disadvantages compared to MQTT.

For example, CoApp runs over user Datagram protocol (UDP) which is inherently less reliable than TCP. It depends on rapid messaging for reliability instead of consistent connections. CoApp was built on UDP to enable faster wakeup and transmit cycles as CoApp was meant for IoT devices that sleep for longer periods of time to cancel or request retransmission. Thus, CoApp has been designed for specific applications rather than large scale general IoT implementations. Moreover, MQTT being a more metric scalable standard, it is easier for developers to get an MQTT network up and running quickly rather than a similar network using CoApp.

TABLE—MQTT, CoAP

TABLE

| | MQTT | CoAP |
| --- | --- | --- |
| Communication | Many-to-many protocol2 for passing information between multiple clients through a central broker Publisher/Subscriber. MQTT Provides no support for labelling messages with types or other metadata to help clients understand it. MQTT messages can be used for any purpose, but all must know the message formats up-front to allow communication. | One-to-one protocol for transferring state info between client and server (1-to-1 or multi-cast). Provides inbuilt support for content negotiation and discovery allowing devices to probe each other to find ways of exchanging data. |
| Transport | Best suited to an event model based. Runs on TCP2 (can be covered by NAT: is the virtualization of IP addresses and helps improve security and decrease number of IP addresses) which is more reliable but slower than UDP: the connection to a broker explains that. | Best suited to a state transfer model (sleepy state for longer periods and conserving battery power). Runs on UDP2 which is faster but less reliable than TCP. |
| Protocols | MQTT is a messaging protocol for use on the top of the TCP/IP protocol. Both IPv4/6 fit on it2. | Built on top of UDP/IP Protocol, IPv6 allows multi-cast addressing for devices2 |
| Security | MQTT brokers require username and password authentication from clients to connect. To ensure privacy, TCP connection is encrypted with SSL/TLS | Uses DTLS (security protocol for datagrams protocols communications) on top of its UDP transport protocol: so SSL/TSL are not available to provide security. DTLS provides same assurances as TLS but for UDP transfers of data. UDP (like TCP) is unencrypted but can be, and augmented with DTLS |

Figure 13:
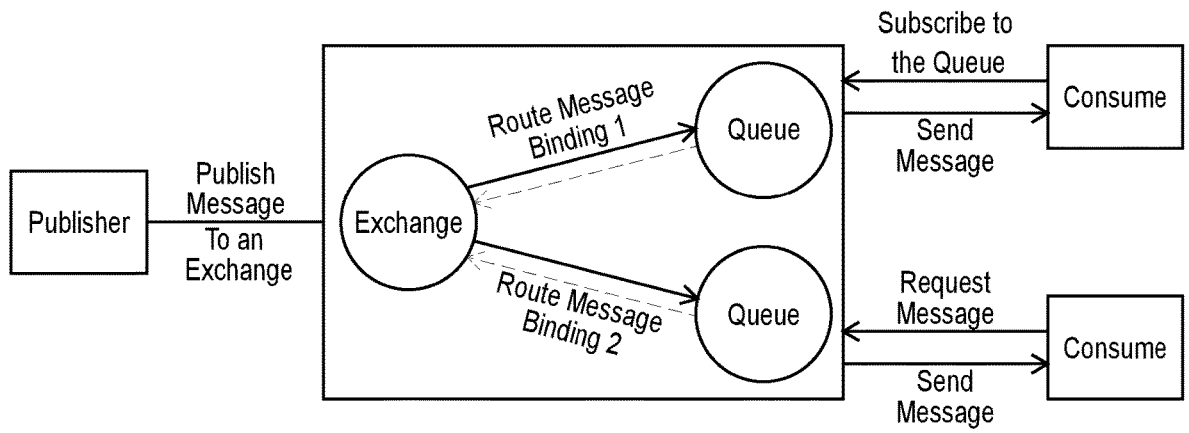
FIG. 13 is a flowchart illustrating a non-limiting preferred embodiment of the AMQP Broker Asynchronous Protocol use in high performance IoT Applications.

FIG. 13 is a flowchart illustrating a non-limiting preferred embodiment of the AMQP Broker Asynchronous Protocol use in high performance IoT Applications.

In operation, this Figure shows another candidate to MQTT that is an asynchronous protocol called AMQP Broker. This is mostly used in a high performance computation with the reliability and interoperability required in the source application. It is a rich fratore set but is not suitable for resource constrained IoT applications. FIG. 13 shows Publisher—Publish message to an exchange. The Exchange sending Route message binding 1 to a Queue, and sending Route message binding 2 to another Queue. Consumers that subscribe to the queues and send messages.

Figure 14:
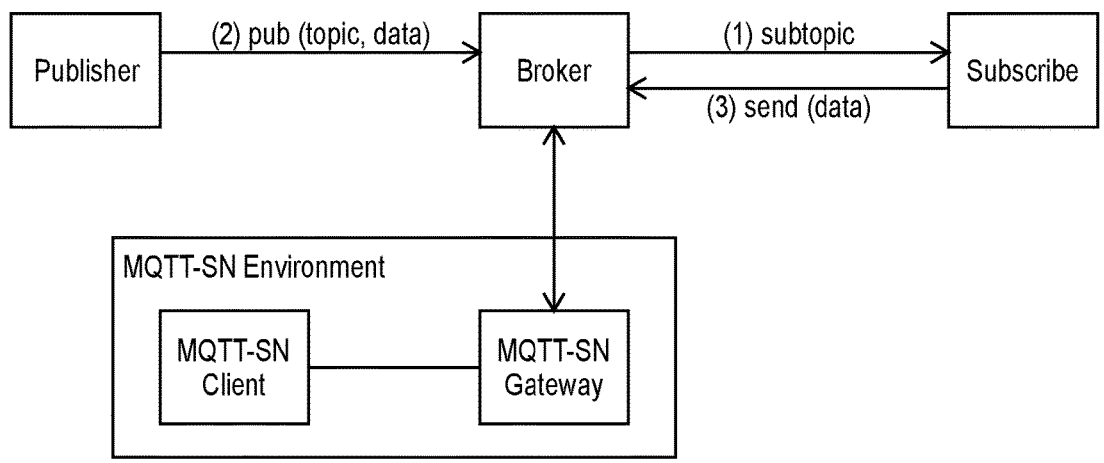
FIG. 14 is a flowchart illustrating a non-limiting preferred embodiment of the XMPP instant message P2P protocol.

FIG. 14 is a flowchart illustrating a non-limiting preferred embodiment of the XMPP instant message P2P protocol. XMPP is an instant message P2P protocol that supports instant messaging use cases such as media attachment and messages. Compared with MQTT, it requires much more resources both on devices and the network. That's the main advantage of SMPP due to the publish-subscribe model.

In operation, FIG. 14 shows a Publisher sending a (2) Pub(topic, data, to a Broker. The Broker then forwards (1) Subtopic to a subscriber who (3) Sends (data) back to the Broker. The Broker is connected to an MQTT-SN Environment having an MQTT-SN Client and an MQTT-SN Gateway.

Figure 15:
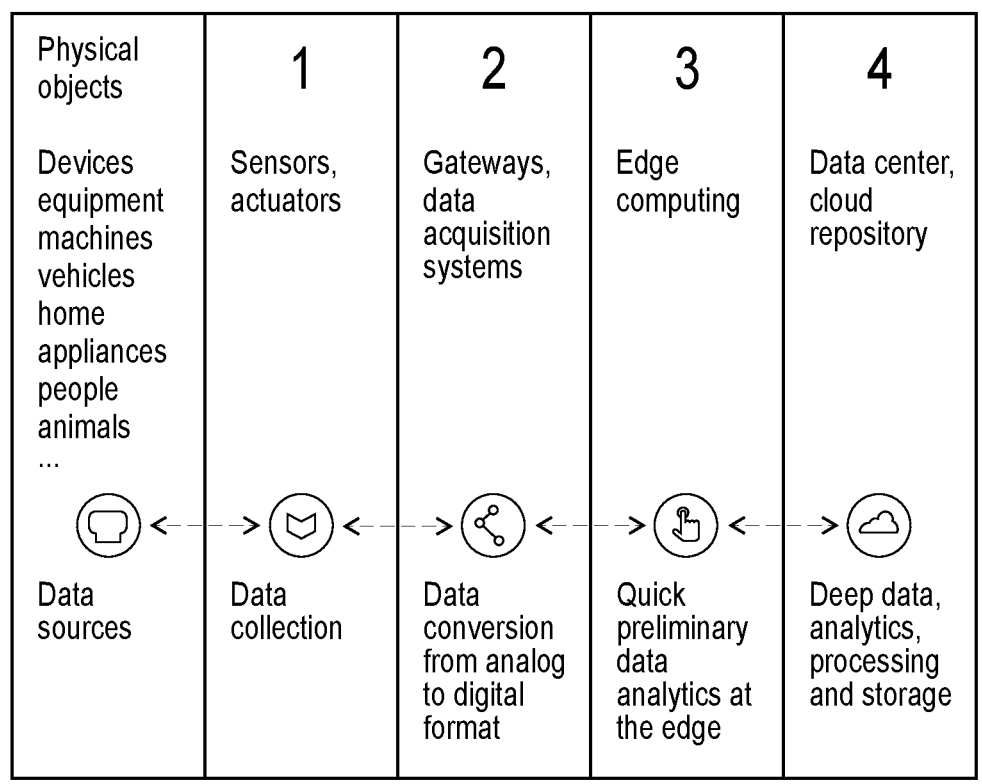
FIG. 15 is a flowchart illustrating a non-limiting preferred embodiment of the IoT Open Source Software Platforms.

FIG. 15 is a flowchart illustrating a non-limiting preferred embodiment of the IoT Open Source Software Platforms.

FIG. 15 provides a) Description of IoT Software Platforms. An IoT platform is the middleware and the infrastructure that enables end-users to interact with smart objects. They function as the software bridge between the hardware and application layers. The IoT Platform orchestrates the movement of data between IoT devices and IoT applications, providing application-level capabilities for humans to interact with the IoT system. IoT platforms bind together all other IoT layers to streamline infrastructure management and support security. They reduce the complexities in the deployment and implementation of IoT systems. IoT platforms are used to connect to, secure, and manage IoT devices, support data analysis, or enable developers to create code and applications that interact with the IoT system and integrate with larger enterprise systems. IoT platforms offer connectivity, integrality, and interoperability. They facilitate communication, an uninterrupted data flow, device management, as well as system and service customization.

FIG. 15 also provides b) IoT System Architecture. The IoT System Architecture includes Physical objects, e.g. Devices, equipment, machines, vehicles, home appliances, people, animals, equipped with 1) Sensors, actuators, 2) Gateways, data acquisition systems, 3) Edge computing, and 4) Data center, cloud repository. These are connected as Data sources for 1) Data collection, 2) Data conversion from analog to digital format, 3) Quick preliminary data analytics at the edge, and 4) Deep data, analytics, processing and storage.

IoT system architecture consists of four layers: (i) Sensors and actuators collect data directly from physical objects (devices, equipment, machines, vehicles, home appliances, people, animals, etc.); (ii) Gateways and data acquisition systems convert gathered data from the analog to the digital format; (iii) Edge computing ensures there's immediate preliminary data analytics right on devices; and (iv) Data centers or cloud services provide deep data analysis, processing and storage.

Examples of IoT systems include: Smart home systems (security devices, intelligent lighting, conditioning, heating, connected home appliances); Wearable health devices both for self-tracking of health conditions (pulse oximeters, glucometers) and for vital sign monitoring in clinics; Logistics tracking systems (GPS trackers, fuel level sensors, alert systems to monitor driver behavior; Autonomous vehicles (farming equipment, warehouse autonomous robots, passenger buses); Smart factory equipment (robotics, predictive maintenance solutions)

Types of IoT Platforms

IoT products consist of numerous components: Hardware, Software, Communication technologies, Central repository (cloud or local), and End-user applications. There are several types of IoT platforms. Hardware development platforms provide physical development boards for creating IoT devices, including microcontrollers, microprocessors, on Chip (SoC), Systems on Module (SoM). App development platforms serve as an integrated development environment (IDE) with tools and features for coding applications. Connectivity platforms provide communication technologies to connect physical objects with the data center (on-premise or cloud) and transfer information between them. Among popular connectivity protocols and standards for the Internet of Things are MQTT, DDS, AMQP, Bluetooth, Zigbee, WiFi, Cellular, LoRaWAN and more. Analytics platforms use intelligent algorithms to analyze collected information and transform it into actionable insights for customers. End-to-end IoT platforms cover all aspects of IoT products, from development and connectivity to data management and visualization.

Requirements for the RealTime Communications Platform (RTC)

RTC platform may consist of preferred requirements, including: an App Development module, a Device Management module, a Connectivity Management module, a Data Acquisition & Analysis module, a Video streaming and video conferencing module, a Video conversion & connectivity module with remote IP surveillance cameras, a Data analysis & visualization module, and a Data and video storage platform module.

Examples of IoT Platforms

Examples of existing IoT platforms include Google Cloud IoT, Cisco IoT Cloud Connect, Salesforce IoT Cloud, IRI Voractity, Particle, IBM IoT, Thing Worx, Amazon AWS IoT, Microsoft Azure IoT, and Oracle IoT.

List of Independent Open Source IoT Platforms

Examples of Open Source IoT platforms include Thinkspeak, Zetta, Thingsboard, Kaa IoT, Site Where, and Device Hive. A comparison of the features of the above independent open source IoT platforms is illustrated in FIG. 16.

Independent Open Source IoT Platforms—Comparison Table

| Iot SW Platform | Device Mgmt | Integration | Security | Data Collection Protocols | Analytics | Visualization Support |
|---|---|---|---|---|---|---|
| ThingSpeak | No | Rest API, MQTT | Basic Authentication | HTTP | MATLAB | No |
| Zetta | No | Rest API | Basic Authentication | HTTP | Splunk | No |
| Thingsboard | Yes | Rest API | SSL, AES256 | MQTT, CoAp, HTTP | RT Apache | Yes |
| Kaa IoT | Yes | Rest API | SSL | MQTT, CoAp, HTTP, TCP | RT Analytics | Yes |
| SiteWhere | Yes | Rest API | | MQTT, WebSocket | RT Analytics | No |

Independent Open Source IoT Platforms - Comparison Table

| Iot SW Platform | Device Mgmt | Integration | Security | Data Collection Protocols | Analytics | Visualization Support |
|---|---|---|---|---|---|---|
| Device Hive | Yes | Rest API, MQTT | Basic Authentication | MQTT, WebSocket | RT Analytics | Yes |

Artificial Intelligence (AI) Platforms for IoT—AI and IoT Blended

IoT, in one preferred embodiment, is about sensors implanted into machines. This offers streams of data and videos through internet connectivity. All IoT related services follow five basic steps called create, communicate, aggregate, analyze, and act. Since, the "Act" step depends on the analysis, the value of IoT is determined at its analysis step. And, as used in the present invention, this is where the AI technology portrays a crucial role. While IoT provides data, artificial intelligence provides responses, and context to drive smart actions. Data from a sensor can be analyzed with AI, and this allows informed decisions. The artificial intelligence IoT succeeds in achieving the following: Manage, analyze, and obtain meaningful insights from data and real-time video communication; Ensure fast and accurate analysis; Balance requirements for localized and centralized intelligence; Balance personalization with confidentiality and data privacy; and Maintain security against cyber attack.

Figure 18:
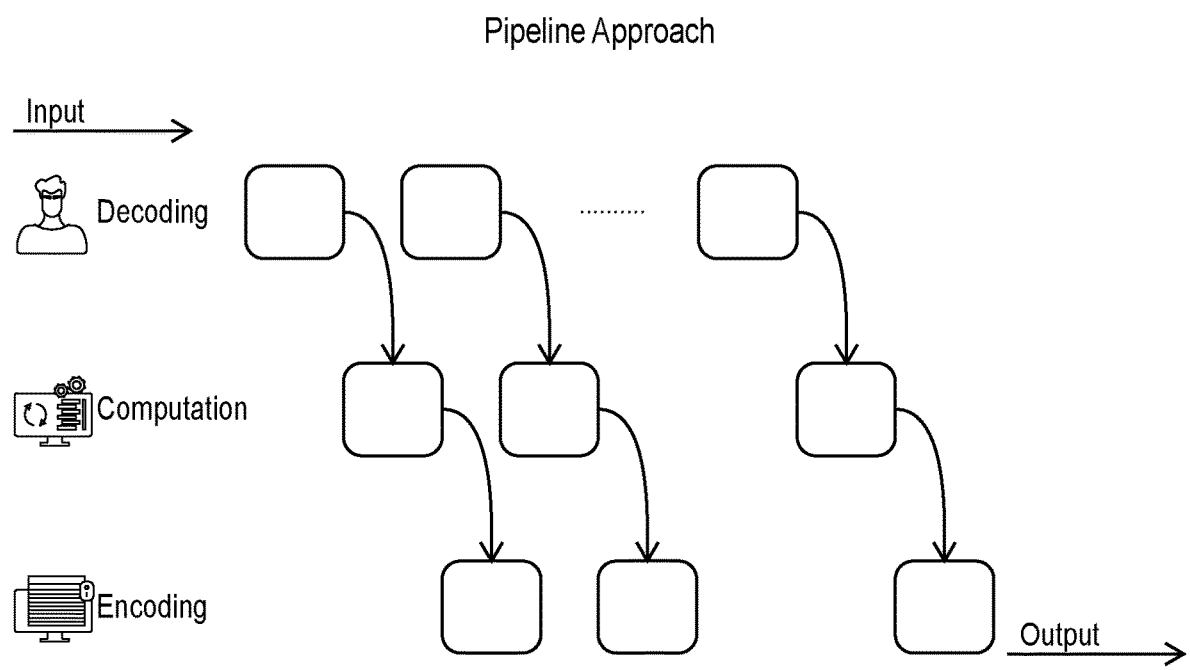
FIG. 18 is a flowchart illustrating a non-limiting preferred embodiment of the AI in Real-Time Video Processing for IoT.
Figure 19:
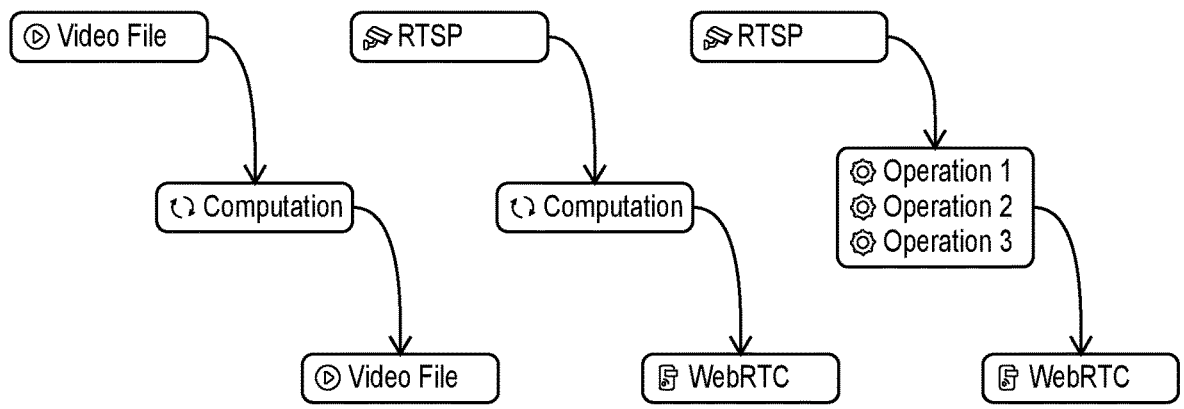
FIG. 19 is a flowchart illustrating a non-limiting preferred embodiment of the Pipeline Approach to Process Video in Real-Time using AI Algorithms for IoT.

FIGS. 17-20 illustrates aspects of AI in IoT for the present invention. FIG. 17 is a flowchart illustrating a non-limiting preferred embodiment of the Artificial Intelligence (AI) Platforms for IoT. FIG. 18 is a flowchart illustrating a non-limiting preferred embodiment of the AI in Real-Time Video Processing for IoT. FIG. 19 is a flowchart illustrating a non-limiting preferred embodiment of the Pipeline Approach to Process Video in Real-Time using AI Algorithms for IoT. FIG. 20 is a flowchart illustrating a non-limiting preferred embodiment of the Pipeline Architecture for AI-based Live Video Processing for IoT.

FIG. 17 shows an AI & IOT Functional View, including steps for: Creating Using Sensors, Communicating using Networks, Aggregating using Integrations, Analyzing using Augmented Intelligence, and Acting using Augmented Behavior.

AI in Real-Time Video Processing for IoT

The challenge for processing of real-time video streams is handling data pipelines. Engineers aim to ensure accuracy and minimize latency of video processing. And AI solutions can help to achieve this goal. To implement an AI-based approach in real-time video processing requires a pretrained neural network model, a cloud infrastructure, and a software layer for applying user scenarios. Processing speed is crucial for real-time streaming, so all these components should be tightly integrated. For faster processing, one can parallelize processes or improve algorithms. Basically, there are two approaches for ways to parallel the processes: file splitting and pipeline architecture. The first approach to parallel the processes, file splitting, is to make the algorithms run in parallel so it might be possible to keep using slower, yet accurate models. It is implemented when video is split into parts and processed in parallels. In such a manner, splitting is a kind of virtual file generation, not a real sub-file generation. However, this process is not very suitable for real time processing, because it may be difficult to pause, resume or even move the processing at a different position in timespin.

FIG. 18 shows a Pipeline Approach, including the steps of Input using Decoding, Computation, and Encoding to obtain an Output.

The second approach to parallel the processes, pipeline architecture, is to make a certain effort to accelerate the algorithms themselves, or their parts with no significant loss of the accuracy. Instead of splitting the video, the pipeline approach is aimed to split and parallelize the operations, which are performed during the processing. Because of this process, the pipeline approach is more flexible. Why is the pipeline approach more flexible? One of the benefits of the pipeline is the ease of manipulation of the components due to requirements. Decoding can work using a video file to encode frames into another file. Alternatively, input can be an RTSP stream from an IP camera. Output can be a WebRTC connection in the browser or mobile application. There is a unified architecture, which is based on a video stream for all combinations of input and output formats. The computation process is not necessarily a monolith operation.

FIG. 19 shows the Flexibility of the Pipeline Approach, including how a Video File directs to a Computation that leads to another Video File, and how RTSP directs to a Computation that leads to WebRTC, and how an RTSP directs to a series of operations 1-2-3 that also leads to WebRTC.

How to Implement a Pipeline Approach

In one aspect of the invention, the video is processed in real time using AI algorithms. The pipeline is composed of decoding, face detection, face blurring and encoding stages. The flexibility of the system is essential because it is essential to process not only video files, but also different formats of video live-stream. It shows a good FPS in range 20-60 depending on the configuration.

Interpolation with Tracking

A tracking algorithm based on centroids is used, because it is easier to apply. However, when there is a need—other algorithms like Deep SORT can be used. To address the problem of the impact on speed if there are too many faces on the video, interpolation is preferred. The quality of interpolated frames is obtained by calculating an F1 metric and removing false positives and false negatives because of interpolation. An F1 value around 0.95 is achieved for most of the video examples.

Sharing Memory

Sending data through the queue can be slow, so this is accomplished between the processes in Python. The PyTorch version of multiprocessing has the ability to pass a tensor handle through the queue so that another process can just get a pointer to the existing GPU memory. Another approach may be used: a system level inter-process communication (IPC) mechanism for shared memory based on POSIX API. The speed of interprocess communication is improved with the help of Python libraries, providing an interface for using this memory.

Multiple Workers or Multiprocessing

Finally, there is a need to add several workers for a pipeline component to reduce the time that is needed for processing. This can be applied in the face detection stage, and may also be done for every heavy operation which doesn't need an ordered input. This depends on the operations which are done inside the pipeline. If there is comparatively fast face detection, and FPS may be lowered after adding more detection workers. The time which is required for managing one more process can be larger than time gained from adding it. Neural networks, which are used in the multiple workers, will calculate tensors in a serial CUDA stream unless a separate stream is created for each network, which may be tricky to implement. Multiple workers, due to their concurrent nature, can't guarantee that the order will be the same with input sequence. Therefore, it may require additional effort to fix the order in the pipeline stages while encoding. Detection time may be reduced by having multiple workers running a model.

FIG. 20 shows an exemplary Pipeline Architecture, including Decoding F1-F2-F3 resulting in Shared Memory, with Detection, Blurring, and Encoding steps.

Developing an AI-Based Live Video Processing System

The process of implementation consists of several stages: Adjusting a pre-trained neural network (or trained) to be able to perform the tasks needed; Setting a cloud infrastructure to enable processing of the video and to be scalable to a certain point; Building a software layer to pack the process and implement user scenarios (mobile applications, web and admin panels, etc.); To create a product like this, using a pre-trained NN and some simple application layers, takes 3-4 months for building an MVP. However, the details are crucial and each product is unique in terms of the scope and timeline.

WebRTC—Platform Description and Security Issues

WebRTC is a free, open source platform which facilitates browser-based P2P communications (voice and video) on Android, iOS and PC platforms. WebRTC is supported by most browser technologies including: Chrome, Firefox, Safari, Opera and MS Edge. WebRTC supports video, voice and generic data to be sent between (and among) peers allowing developers to build voice and video—communications solutions and services. The technologies behind WebRTC are implemented as an open Web standard and available as regular JavaScript API's in all major browsers. For native clients, like Android and iOS applications, a library is available that provides the same functionality.

JavaScript API's

WebRTC consists of three main JavaScript objects: RTC Peer Connection object—This object is the main entry point to the WebRTC API. It helps connect to peers, initialize connections and attach media streams, as shown in the attached diagram. The RTC Peer Connection API is the core of the peer-to-peer connection between each of the communicating browsers; Mainstream API—designed to provide easy access to media streams (video and audio) from cameras, microphones and audio and video codes on mobile devices and PC's; RTC Data Channel API—designed to transfer arbitrary data including data messages in addition to audio and video streams.

WebRTC Protocols

There are three main protocols for WebRTC are as follows. Datagram Transport Layer security (DTLS)—WebRTC uses Datagram Transport Layer Security (DTLS) to add encryption and message authentication. DTLS is a communications protocol that provides security for datagram-based applications, specifically voice and video by allowing them to communicate based on a stream oriented Transport Layer Security (TLS) protocol. And is intended to provide similar security guarantees. DTLS uses User Datagram Protocol (UDP) streaming protocol to establish low latency and less toleration communications between applications on the Internet, such as a WebRTC based P2P connection. Secure Real Time Transport Protocol (SRTP)—Secure Real Time Transport Protocol (SRTP) is a profile for Real Time Transport Protocol (RTP) intended to provide encryption, message authentication and replay attack protection to the RTP data in both unicast and multicast video applications. Session Initiation Protocol (SIP)—SIP is a signaling protocol used for initiating, maintaining and terminating real-time voice, video and messaging sessions. SIP is widely used for signaling and controlling multimedia communications sessions over Internet telephone for voice and video calls, in private IP telephone systems and in instant messaging over IP. Session Description Protocol (SDP)—SDP is a format for describing multimedia communications sessions for the purpose of session announcement and session invitation to support streaming media applications such as voice (VoIP) and video conferencing.

WebRTC Network Servers

The WebRTC Network Servers may include a Signaling Server—used to establish a web socket connection between peer-to-peer users using public and private IP address translation. Interactive Connectivity Establishment (ICE)—used to discover which IP addresses can connect to each other and the method used to make that connection through typical NAT (Network Address Translation) servers called STUN servers and TURN servers. Selective Forward Units (SFU's)—describes a type of video routing device used for receiving multiple media streams and then forwarding these media streams to multiple users in a video conferencing session.

Figure 21:
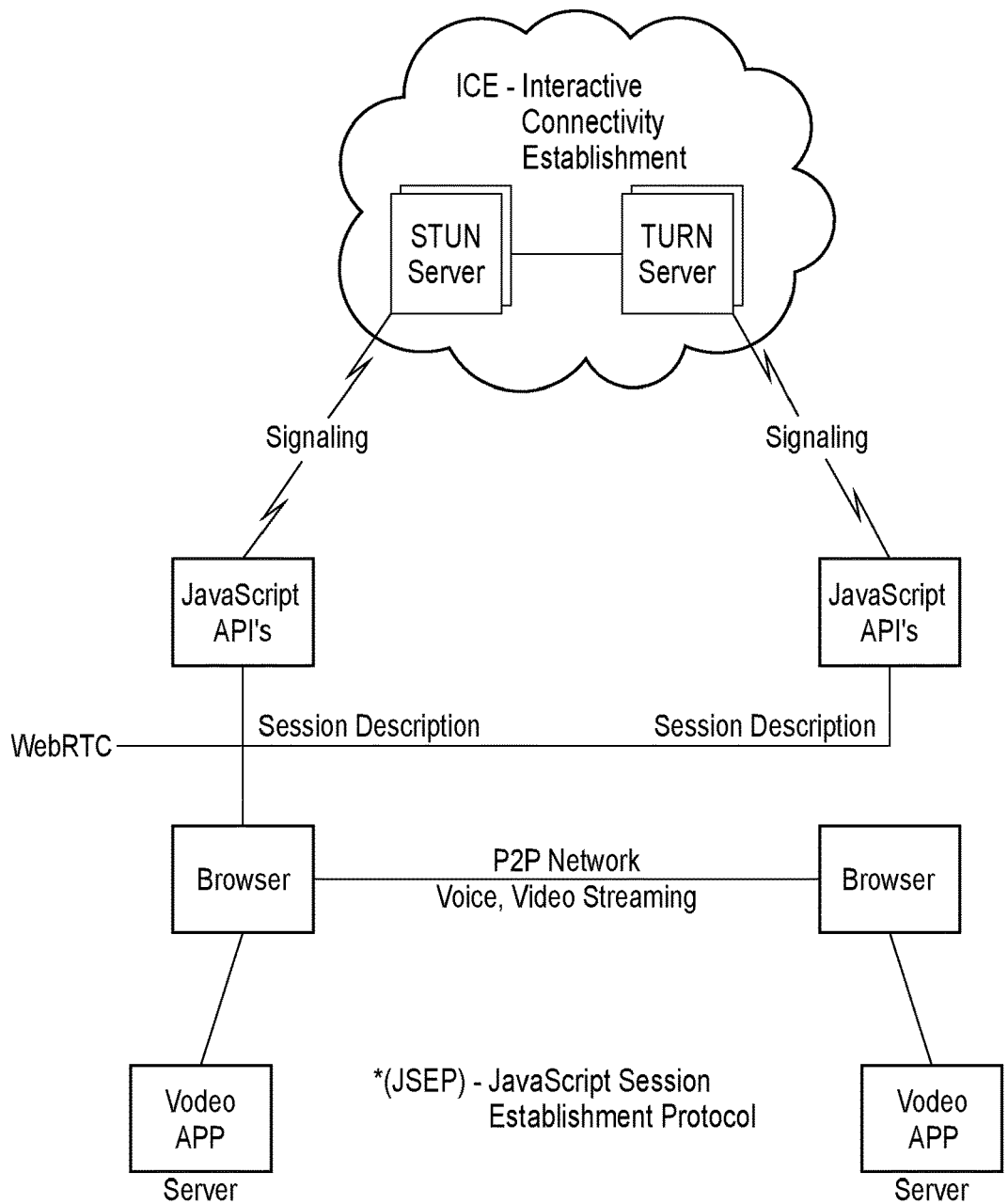
FIG. 21 is a flowchart illustrating a non-limiting preferred embodiment of the WebRTC Signaling—JSEP for IoT.

FIG. 21 is a flowchart illustrating a non-limiting preferred embodiment of the WebRTC Signaling—JSEP for IoT. FIG. 21 shows WebRTC Signaling—JSEP (JavaScript Session Establishment Protocol) having ICE—Interactive Connectivity establishment, with a STUN Server and a TURN server. The STUN server Signaling into JavaScript API's that connect through WebRTC to a Browser, used to establish the P2P Network (voice, video streaming), managed by the Vodeo App. The TURN server Signaling into JavaScript API's that are part of a second browser of a second "Vodeo" app.

Figure 22:
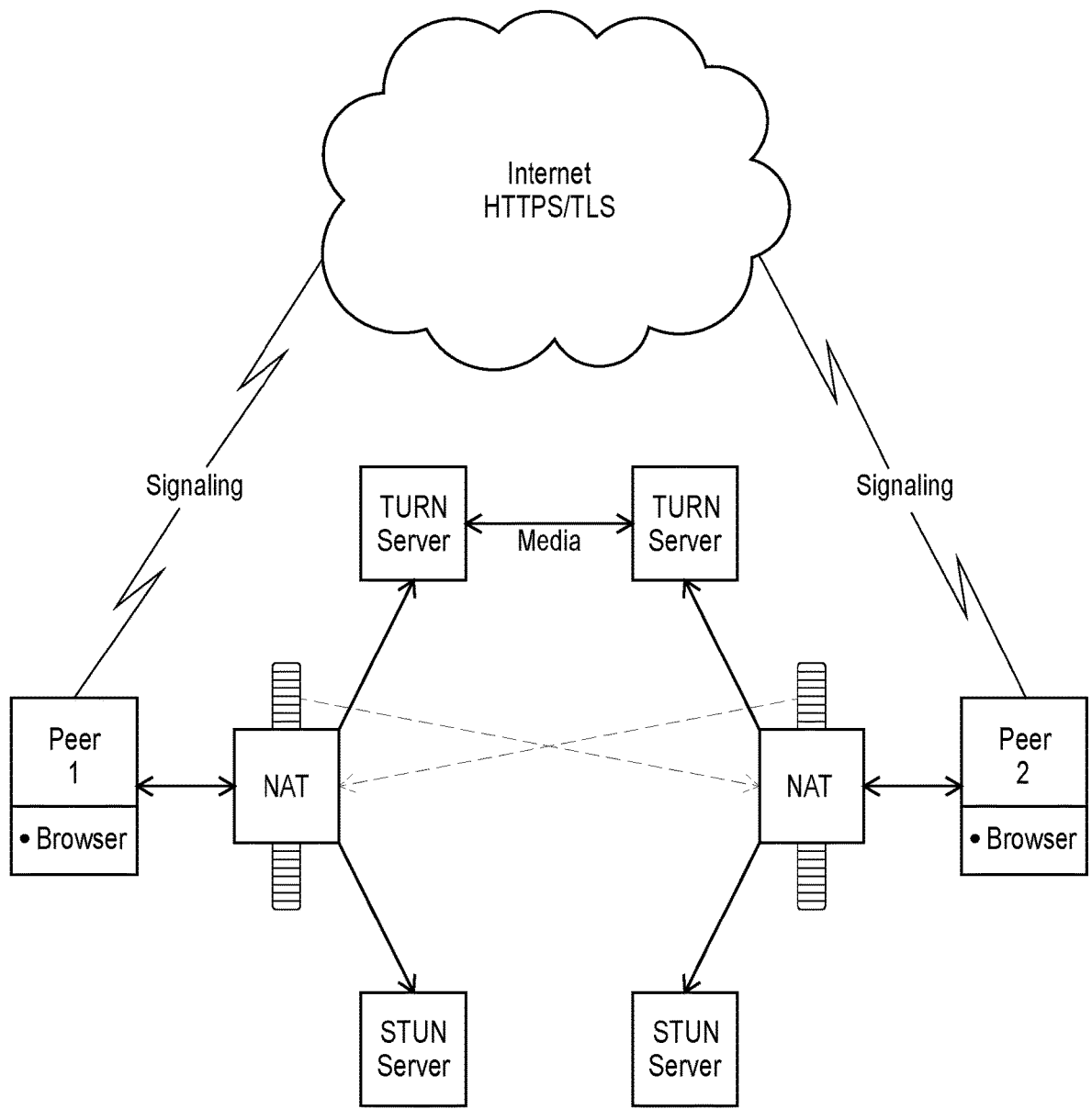
FIG. 22 is a flowchart illustrating a non-limiting preferred embodiment of the WebRTC Network Servers for IoT.
Figure 23:
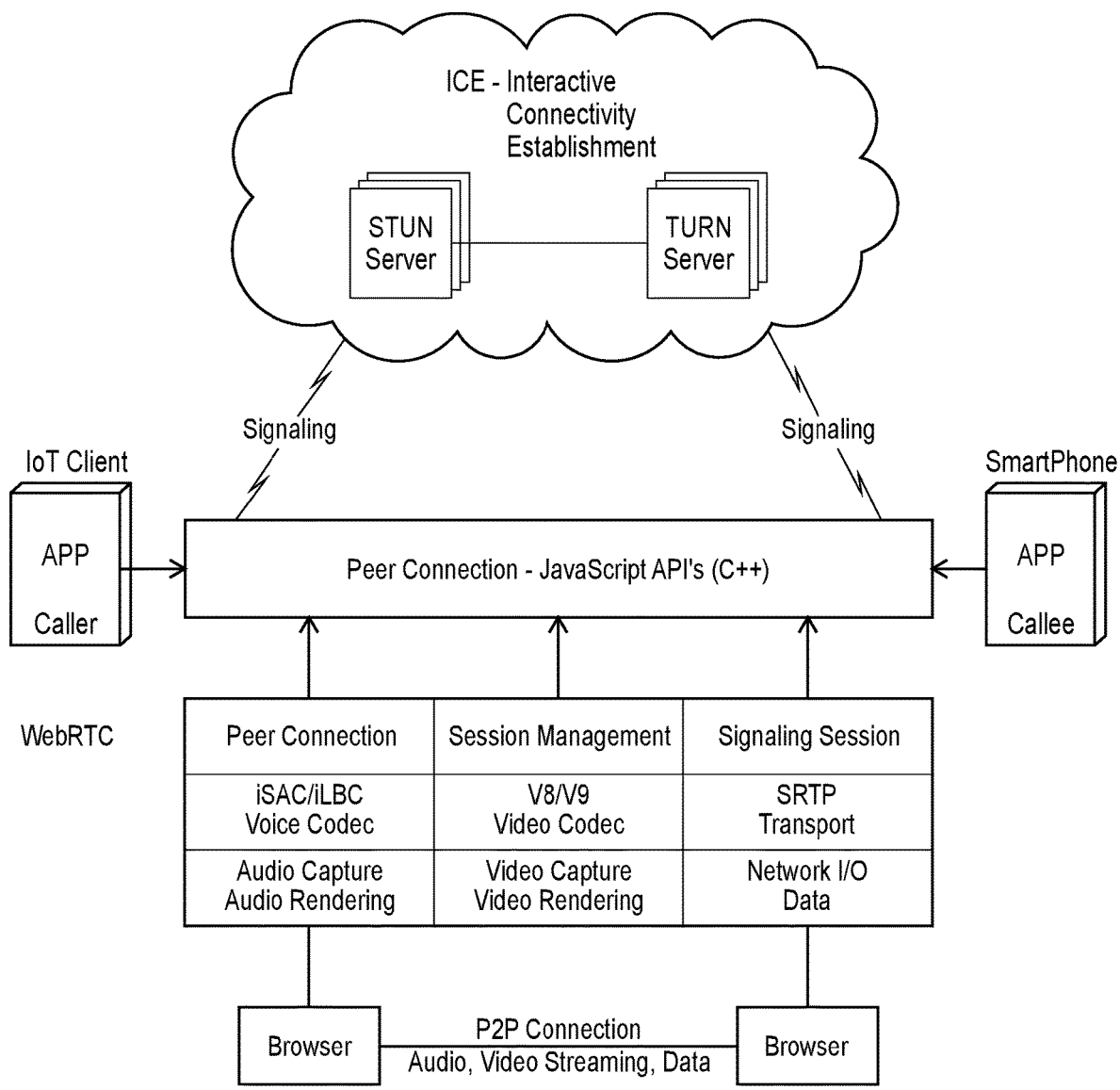
FIG. 23 is a flowchart illustrating a non-limiting preferred embodiment of the WebRTC Platform Network Diagram for IoT.

FIG. 22 is a flowchart illustrating a non-limiting preferred embodiment of the WebRTC Network Servers for IoT. FIG. 22 shows WebRTC Network Servers: STUN, TURN and Signaling by having Cloud Server(s) in the Internet HTTPS/TLS connect with Signaling to a Peer 1/Browser and a Peer 2 with Browser. After discovery, Peer 1 is connected to Peer 2 through a Network having Peer 1 NAT communications with a TURN Server for Media and a backup STUN Server. These are connected to Peer 2 NAT communications with a TURN Server and a backup STUN Server.WebRTC Platform—Network Diagram FIG. 23 is a flowchart illustrating a non-limiting preferred embodiment of the WebRTC Platform Network Diagram for IoT. FIG. 23 shows Interactive Connectivity Establishment connecting an IoT Client having an App to a SmartPhone having an App, using STUN Servers with Signaling, and TURN Servers with Signaling, to setup a Peer Connection with JavaScript API's (C++). Once connected, the WebRTC provides: PeerConnection with LSAC/iLBC, Voice Codec, and Audio Capture and Audio Rendering; Session Management with V8N9, Video Codec, Video Capture, and Video Rendering; and a Signaling Session with SRTP, Transport, Network I/O, and Data. The WebRTC uses the IoT browser and the SmartPhone browser to establish the P2P Connection to permit Audio, Video Streaming, and Data transmission.

Figure 24:
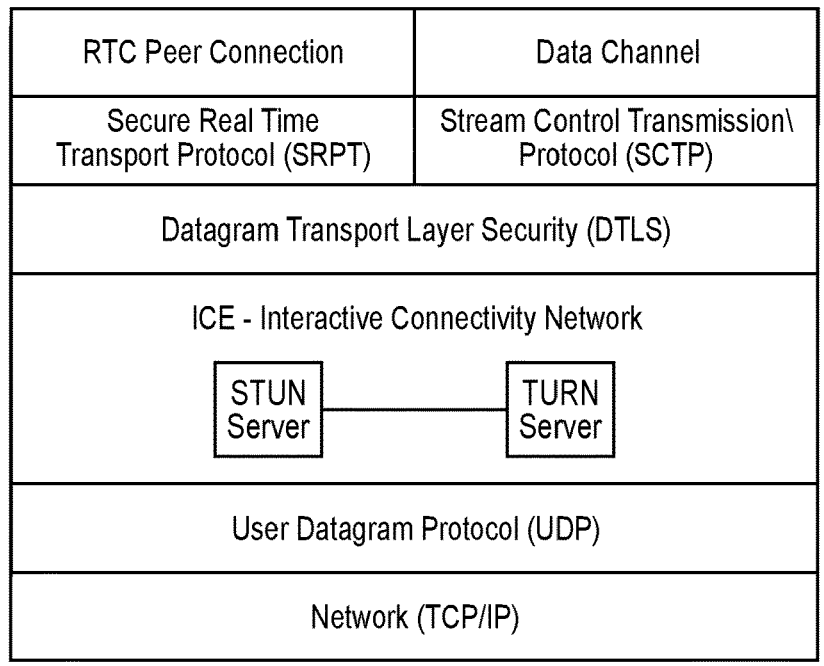
FIG. 24 is a flowchart illustrating a non-limiting preferred embodiment of the WebRTC Protocol Stack for IoT.

FIG. 24 is a flowchart illustrating a non-limiting preferred embodiment of the WebRTC Protocol Stack for IoT. FIG. 24 shows the WebRTC Protocol Stack having a RTC PeerConnection, Secure Real Time Transport Protocol (SRPT), a Data Channel, a Stream Control Transmission Protocol (SCTP), a Datagram Transport Layer Security (DTLS). These connect to the ICE—Interactive Connectivity Network having the STUN Server and TURN Server, which then uses the User Datagram Protocol (UDP) to connect to the Network (TCP/IP).

Figure 25:
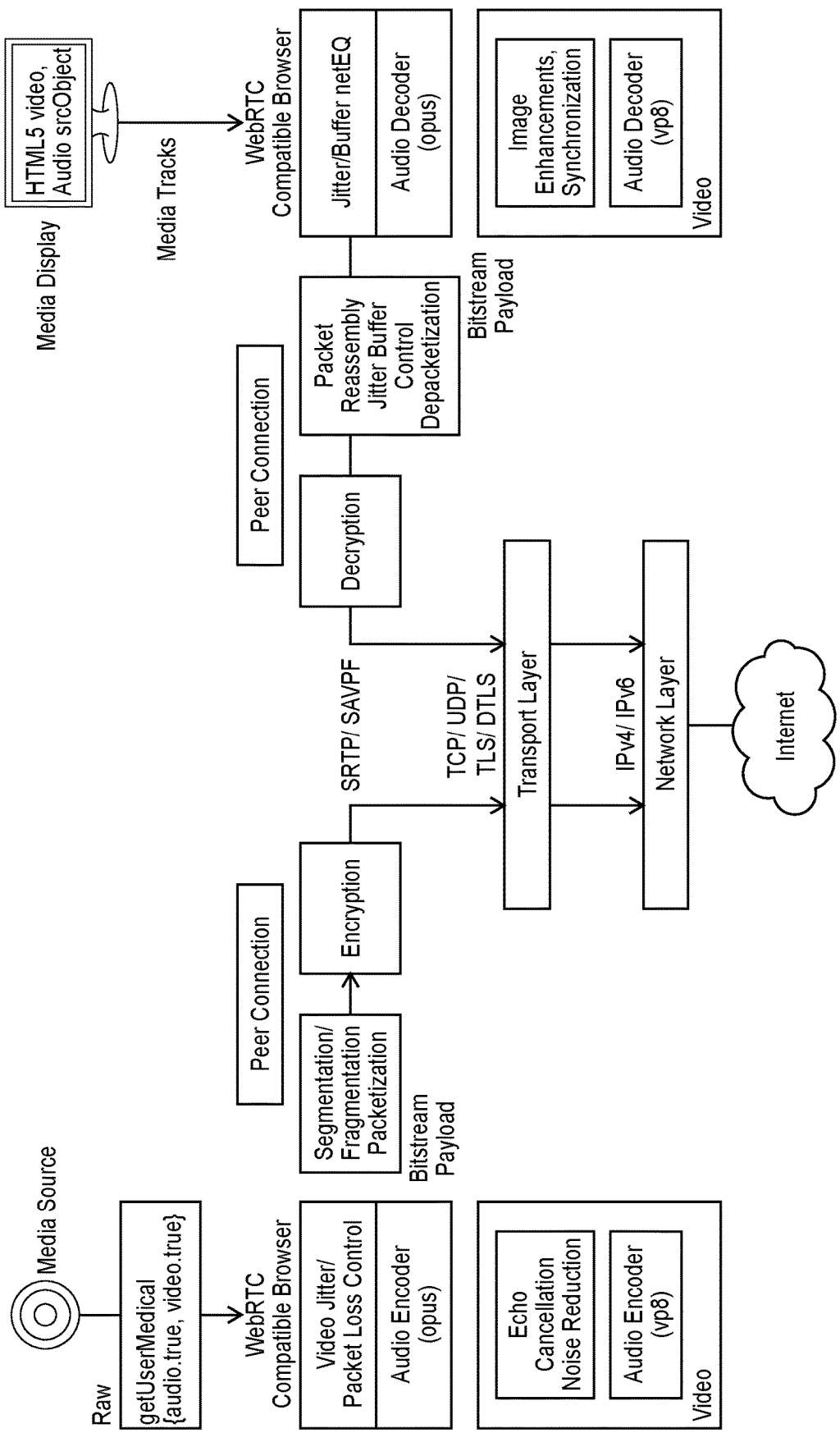
FIG. 25 is a flowchart illustrating a non-limiting preferred embodiment of the Media Flow Path in P2P with WebRTC Communication.

FIG. 25 is a flowchart illustrating a non-limiting preferred embodiment of the Media Flow Path in P2P with WebRTC Communication. FIG. 25 shows the Media Flow Path in P2P with WebRTC Communication, starting with a Media Source, Raw connecting using getUserMedia([audiotrue, video true]) to connect to the WebRTC Compatible Browser. This provides Video jitter/packet loss control, and Audio Encoder (opus), Echo cancellation, and Noise Reduction, and Video Encoder (Vp8). This creates in the PeerConnection the Bitstream Payload with Segmentation/Fragmentation Packetization, and Encryption. This leads to SRTP/SAVPF connected to the transport layer with TCP/UDP/TLS/DTLS and the network layer IPv4/IPv6 to access the Internet. The flow then leads to the content consumer PeerConnection, with Decryption, Packet Reassembly, Jitter Buffer Control, Depacketization, leading the Bitstream Payload to the Media Display. The media display may have, for example HTML5 video, Audio srcObject with Media Tracks, WebRTC Compatible Browser, Jitter/Buffer netEQ, Audio Decoder (opus) for Audio, Image Enhancements, synchronization, Video Decoder (vp8), for Video.

Janus WebRTC Gateway and GStreamer and Skyway IoT SDKs

There are several open source WebRTC media servers that provide enhanced IoT media applications including video format conversion, video conferencing and video playback and editing. The preferred open source WebRTC media servers are: Janus WebRTC server—implements the means to set up a WebRTC media communications with a browser and exchanges JSON messages with it, and relays RTP/RTCP messages between browsers and numerous Janus server-side applications; Jitsi—open source (Apache) WebRTC JavaScript application that uses a video bridge to provide high quality, secure and sealable video conferences; Antmedia—is a software server that can stream live and VOD streams. It supports scalable, ultra low latency (0.5 sec) adaptive streaming and records live videos in several video formats including HLS, MP4, and WebRTC; Kurento—open source software platform to create modular applications with advanced real-time communications capabilities including group communications, transcoding, recording, mixing, broadcasting and routing of audiovisual media flows; MediaSoup—is a Node.js module that can be integrated into a larger application with client side libraries and API's. Use cases include: group video chats, one-to-many broadcasting applications in real-time and RTP streaming.

After careful review and prototyping all of the above WebRTC media servers that provide enhanced IoT media application, Janus WebRTC coupled with GStreamer and Skyway IoT SDRS was selected as the enhanced IoT-WebRTC media server of choice (a preferred embodiment). A detailed discussion of Janus, GStreamer and Skyway SDRS is presented below.

Janus WebRTC Server

The Janus WebRTC Server has been conceived as a general purpose server. As such, it doesn't provide any functionality per se other than implementing the means to set up a WebRTC media communication with a browser, exchanging JSON messages with it, and relaying RTP/RTCP and messages between browsers and the server-side application logic they're attached to. Any specific feature/application needs to be implemented in server side plugins, that browsers can then contact via the Janus core to take advantage of the functionality they provide. Examples of such plugins can be implementations of applications like echo tests, conference bridges, media recorders, SIP gateways and enhanced video streaming.

Janus was designed with a case handling the high-level communication with users (sessions, management, WebRTC protocols) and server-side plugins to provide specific functionality that is transparent to WebRTC and independent from the application. An overview of the architecture and related interactions is depicted. The core is mostly responsible for three things. Managing application sessions with users through a REST-ful API. Implementing the WebRTC communication with the same users, by taking care of the whole WebRTC lifecycle (negotiation, establishment, and management of PeerConnections). Attaching users to plugins, in order to allow them to exchange messages (based on a per-plugin ad-hoc protocol) and more importantly media (relaying plain RTP/RTCP). This allows plugins to easily communicate with WebRTC users, as most hassles associated with the WebRTC stack are masked by the gateway core. Janus plugins just need to implement the related plugin API to set up a specific session with users that want to take advantage of their features and get prepared to receive and/or send RTP packets and related RTCP messages, in case of need.

Additional functionality and features include: the core only implements the WebRTC stack; JSep/SDO, ICE, DTLS-SRTP, Data channels; Plug-ins Eypox Janus API owns different "Transports"; HTTQ/WebSockets/RabbitMQ/UnixSockets/MQTT; Application Logic implemented in plug-ins; Plugins route/Manipulate the Media/data; Plugins can be combined on the client side for video streaming; Video SFU, Audio MCU, SiP Gatewaying, broadcasting, remote IP surveillance cameras.

Figure 26:
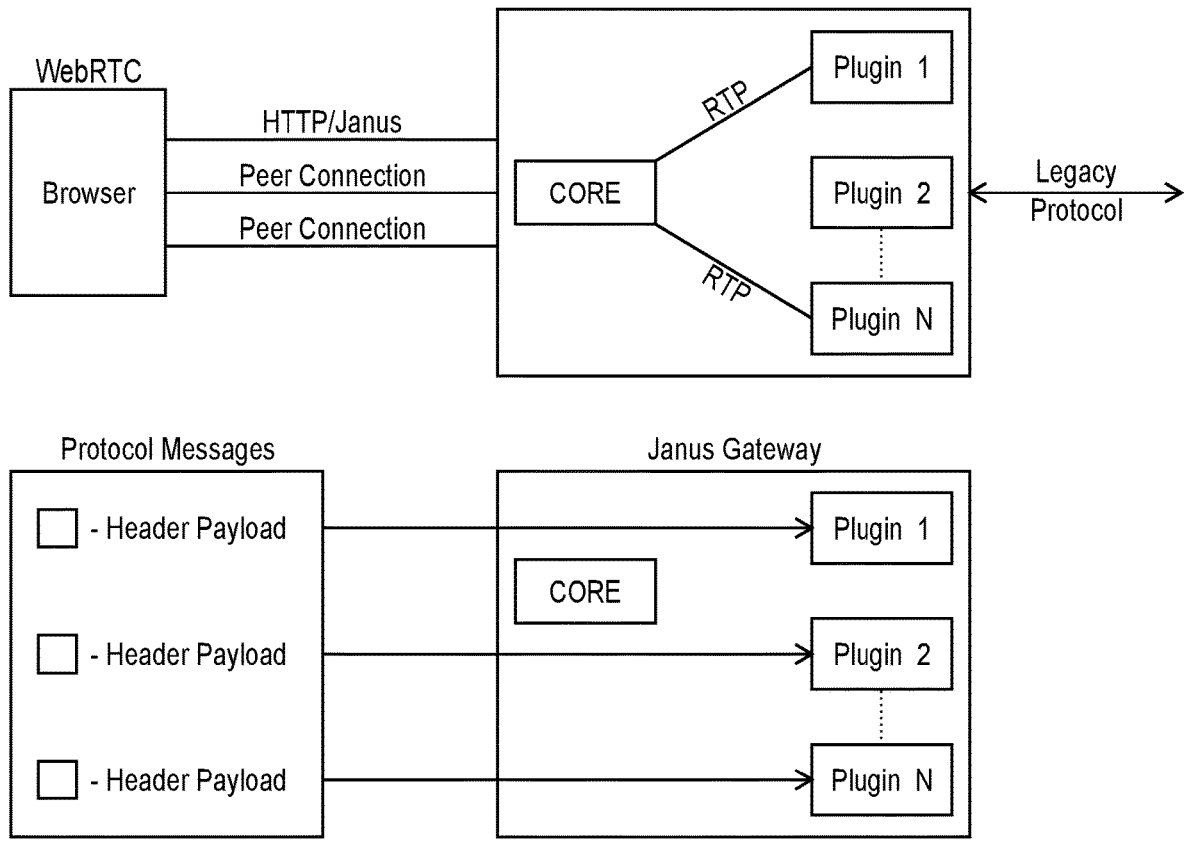
FIG. 26 is a flowchart illustrating a non-limiting preferred embodiment of the Janus WebRTC Gateway Implementation Extensible Architecture and API.

FIG. 26 is a flowchart illustrating a non-limiting preferred embodiment of the Janus WebRTC Gateway Implementation Extensible Architecture and API. FIG. 26 shows the Janus WebRTC Gateway Implementations having Extensible Architecture and API comprised of the WebRTC and Browser using HTTP/Jason, and Peer Connections to connect to the Janus Gateway. The Janus gateway comprised of a Core fed using RTP from multiple Plugins 1, 2, N. The can then be connected to Legacy devices using a Legacy Protocol.

The WebRTC Protocol Messages include the Header Payloads connecting through the Janus Gateway Core to their Plugins.

Figure 27:
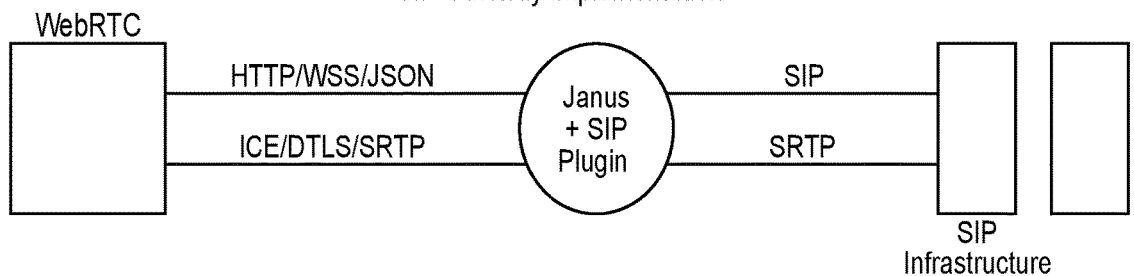
FIG. 27 is a flowchart illustrating a non-limiting preferred embodiment of the Scaling Server Side WebRTC Application with Janus SIP Gateway Implementation.

FIG. 27 is a flowchart illustrating a non-limiting preferred embodiment of the Scaling Server Side WebRTC Application with Janus SIP Gateway Implementation. FIG. 27 shows the SIP Gateway Implementation comprising the WebRTC uses connecting using HTTP/WWS/JSON and ICE/DTLS/SRTP to the Janus+SIP Plugin, which is then connected using SIP/SRTP to the SIP Infrastructure.

Figure 28:
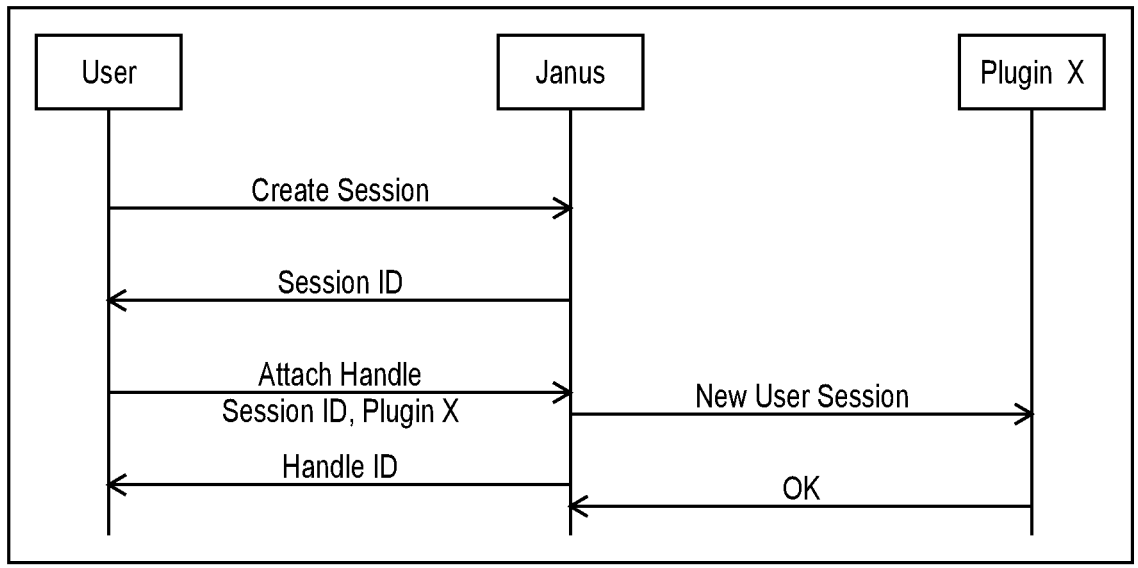
FIG. 28 is a flowchart illustrating a non-limiting preferred embodiment of the Janus Extensible Architecture and API for IoT.

FIG. 28 is a flowchart illustrating a non-limiting preferred embodiment of the Janus Extensible Architecture and API for IoT. FIG. 28 shows the Janus Extensible Architecture and API having the User—Janus—Plugin X connections. The User comprises a Create Session signal to the Janus Gateway, which provides a Session ID to the User. the User then transmits an Attach Handle signal (Session ID, Plugin X) to Janus, and a New User Session request is sent to the Plugin X, which returns an OK signal. The Janus then provides the Handle ID.

Figure 29:
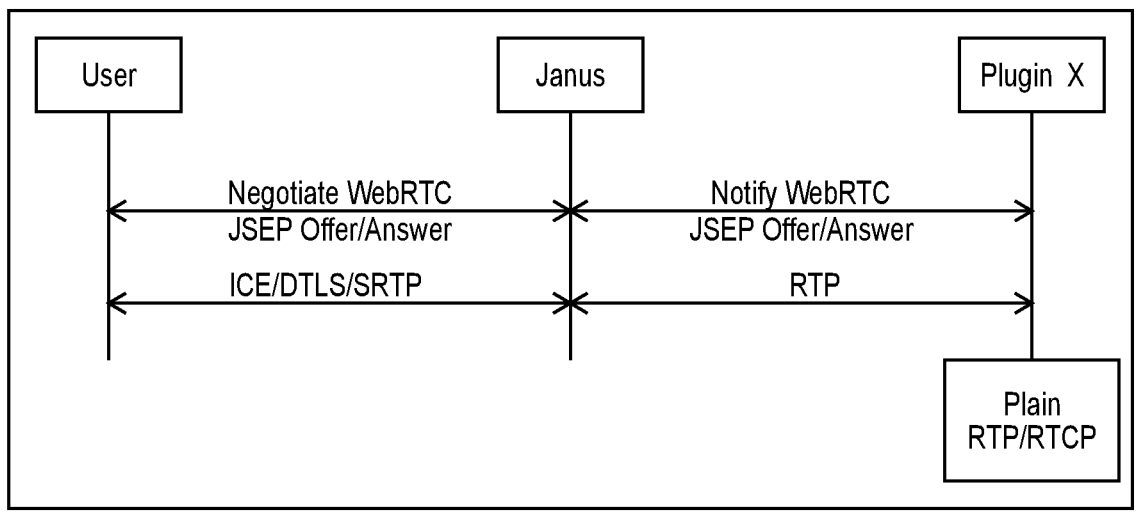
FIG. 29 is a flowchart illustrating a non-limiting preferred embodiment of the Plugins for the WebRTC connection to Janus and Users.

FIG. 29 is a flowchart illustrating a non-limiting preferred embodiment of the Plugins for the WebRTC connection to Janus and Users. FIG. 29 shows the connections between the User—Janus—Plugin X, whereby the User and Janus Negotiate WebRTC using (JSEP offer/answer). Then Janus and the Plugin X exchange the Notify WebRTC (JSEP offer/answer). Then, the User and Janus transmit ICE/DTLS/SRTP, and Janus and the Plugin X transmit RTP, and/or Plain RTP/RTCP.

FIG. 29 shows that each Plugin is a feature, e.g.: Webinar, Video Communications in social networks, CSIP plugin (calls)+Echo test+voice mail messages, Social TV, and (Streaming+Video Room), as non-limiting examples.

Plugins are used as "bricks" to compose an application, including: Streaming+Video room=Social TV; Video Room+Audio Bridge*Text Room=Webinar. Janus is used for many implementations including IoT applications, including: Web Conferencing, Webinars, SIP Gateway, Surveillance systems including IP surveillance cameras (IoT), E-health (IoT), Home Automation (IoT), Internet of Things (IoT), Mobile devices, Raspberry PI's, and Wearables Drones etc. (IoT), as non-limiting examples.

Janus WebRTC Plugins—Video Call Plugin

This is a simple video call plugin for Janus, allowing two WebRTC peers to call each other through the Janus core. The idea is to provide a similar service as the well known AppRTC demo (https://apprtc.appspot.com (https://apprtc.appspot.com)), but with the media flowing through a server rather than being peer-to-peer. The plugin provides a simple fake registration mechanism. A peer attaching to the plugin needs to specify a username, which acts as a "phone number": if the username is free, it is associated with the peer, which means he/she can be "called" using that username by another peer. Peers can either "call" another peer, by specifying their username, or wait for a call. The approach used by this plugin is similar to the one employed by the echo test one: all frames (RTP/RTCP) coming from one peer are relayed to the other.

Janus WebRTC Plugins—Streaming Plugin (Video Streaming)

This is a streaming plugin for Janus, allowing WebRTC peers to watch/listen to pre-recorded files or media generated by another tool. Specifically, the plugin currently supports three different types of streams: 1. on-demand streaming of pre-recorded media files (different streaming context for each peer); 2. live streaming of pre-recorded media files (shared streaming context for all peers attached to the stream); 3. live streaming of media generated by another tool (shared streaming context for all peers attached to the stream).

Janus WebRTC Plugins—SIP Plugin

This is a simple SIP plugin for Janus allowing webRTC peers to register at a SIP server (e.g., Asterisk) and call SIP user agents through a Janus instance. Specifically, when attaching to the plugin peers are requested to provide their SIP server credentials, i.e., the address of the SIP server and their username/secret. This results in the plugin registering at the SIP server and acting as a SIP client on behalf of the web peer. Most of the SIP states and lifetime are masked by the plugin, and only the relevant events (e.g., INVITEs and BYEs) and functionality (call, hangup) are made available to the web peer: peers can call extensions at the SIP server or wait for incoming INVITEs, and during a call they can send DTMF tones. Calls can do plain RTP or SDES-SRTP. The concept behind this plugin is to allow different web pages associated to the same peer, and hence the same SIP user, to attach to the plugin at the same time and yet just do a SIP REGISTER once. The same should apply for calls: while an incoming call would be notified to all the web UIs associated to the peer, only one would be able to pick up and answer, in pretty much the same way as SIP forking works but without the need to fork in the same place.

Janus WebRTC Plugins—AudioBridge Plugin

This is a plugin implementing an audio conference bridge for Janus, specifically mixing Opus streams. This means that it replies by providing in the SDP only support for Opus, and disabling video. Opus encoding and decoding is implemented using libopus. The plugin provides an API to allow peers to join and leave conference rooms. Peers can then mute/unmute themselves by sending specific messages to the plugin: any way a peer mutes/unmutes, an event is triggered to the other participants, so that it can be rendered in the UI accordingly.

Janus WebRTC Plugins—VideoRoom Plugin

This is a plugin implementing a videoconferencing SFU (Selective Forwarding Unit) for Janus, that is an audio/video router. This means that the plugin implements a virtual conferencing room peers can join and leave at any time. This room is based on a Publish/Subscribe pattern. Each peer can publish his/her own live audio/video feeds: this feed becomes an available stream in the room the other participants can attach to. This means that this plugin allows the realization of several different scenarios, ranging from a simple webinar (one speaker, several watchers) to a fully meshed video conference (each peer sending and receiving to and from all the others).

Considering that this plugin allows for several different WebRTC PeerConnections to be on at the same time for the same peer (specifically, each peer potentially has 1 PeerConnection on for publishing and N on for subscriptions from other peers), each peer may need to attach several times to the same plugin for every stream: this means that each peer needs to have at least one handle active for managing its relation with the plugin (joining a room, leaving a room, muting/unmuting, publishing, receiving events), and needs to open a new one each time he/she wants to subscribe to a feed from another publisher participant. The handle used for a subscription, however, would be logically a "slave" to the master one used for managing the room: this means that it cannot be used, for instance, to unmute in the room, as its only purpose would be to provide a context in which creating the receive only PeerConnection for the subscription to an active publisher participant.

Janus WebRTC Plugins—Janus TextRoom

This is a plugin implementing a DataChannel only text room. As such, it does NOT support or negotiate audio or video, but only data channels, in order to provide text broadcasting features. The plugin allows users to join multiple text-only rooms via a single PeerConnection. Users can send messages either to a room in general (broadcasting), or to individual users (whispers). This plugin can be used within the context of any application that needs real-time text broadcasting (e.g., chatrooms, but not only). The only message that is typically sent to the plugin through the Janus API is a "setup" message, by which the user initializes the PeerConnection itself. Apart from that, all other messages can be exchanged directly via Data Channels. For room management purposes, though requests like "create", "edit", "destroy", "list", "listparticipants" and "exists" and "announcement" are available through the Janus API as well: notice that in this case you'll have to use "request" and not "textroom" as the name of the request. Each room can also be configured with an HTTP backend to contact for incoming messages. If configured, messages addressed to that room will also be forwarded, by means of an HTTP POST, to the specified address. Notice that this will only work if libcurl was available when configuring and installing Janus.

Janus WebRTC Plugins—Record & Play Plugin

This is a simple application that implements two different features: it allows a user to record a message sent with WebRTC in the format defined in recorded.c (MJR recording) and subsequently replay this recording (or other previously recorded) through WebRTC as well. This application aims at showing how easy recording frames sent by a peer is, and how this recording can be re-used directly, without necessarily involving a post-processing process. Notice that only audio and video can be recorded and replayed in this plugin. The configuration process is quite easy: just choose where the recordings should be saved. The same folder will also be used to list the available recordings that can be replayed.

Janus WebRTC Plugins—Voicemail Plugin

This is a plugin implementing a very simple VoiceMail service for Janus, specifically recording Opus streams. This means that it replies by providing in the SDP only support for Opus, and disabling video. When a peer contacts the plugin, the plugin starts recording the audio frames it receives and, after 10 seconds, it shuts the PeerConnection down and returns an URL to the recorded file. Since an URL is returned, the plugin allows you to configure where the recordings would be stored (e.g., a folder in your web server, writable by the plugin) and the base path to use when returning URLs. By default the plugin saves the recordings in the html folder of this project, meaning that it can work out of the box with the VoiceMail demo we provide in the same folder.

Figure 30:
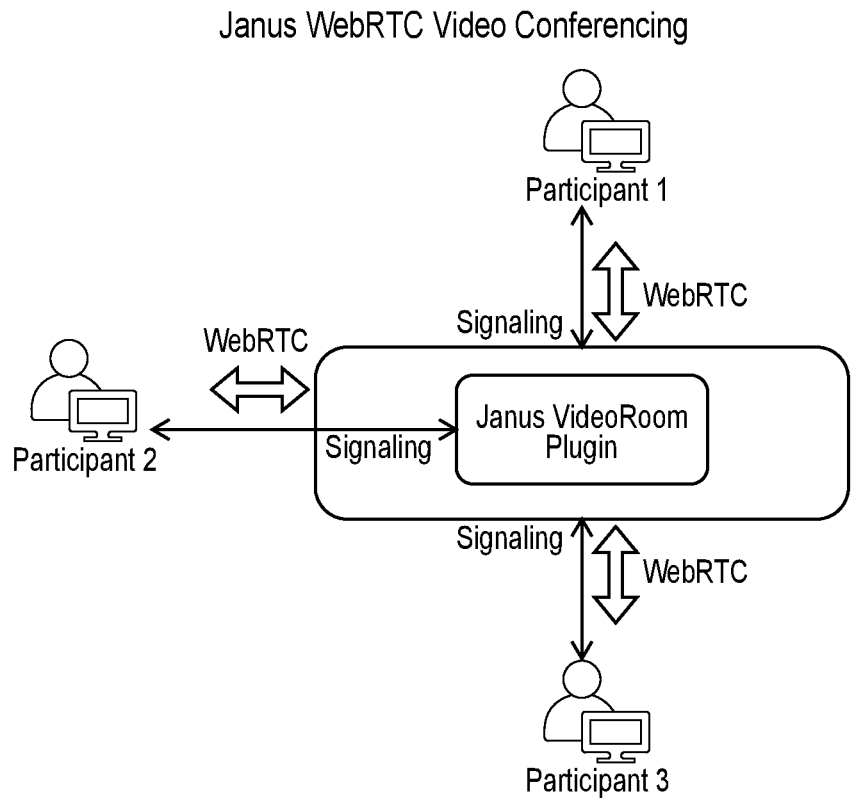
FIG. 30 is a flowchart illustrating a non-limiting preferred embodiment of the Janus WebRTC Video Conferencing.

FIG. 30 is a flowchart illustrating a non-limiting preferred embodiment of the Janus WebRTC Video Conferencing. FIG. 30 shows the Janus WebRTC Video Conferencing where Participant 1, Participant 2, and Participant 3 use WebRTC for Signaling to a Janus VideoRoom Plugin. FIG. 30 show a diagram of how 3 participants connect to the Janus VideoRoom plugin to start a video room and publish media and subscribe to the other participants' videos using WebRTC.

Figure 31:
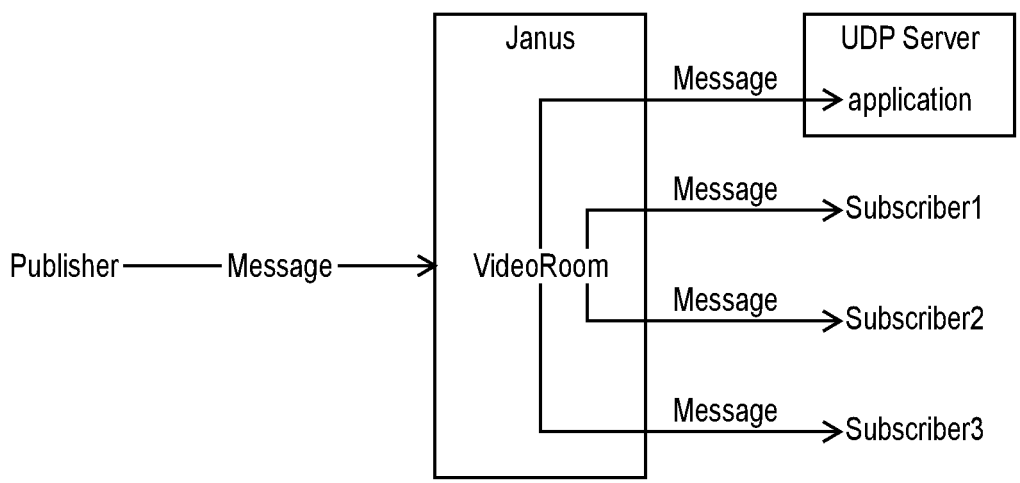
FIG. 31 is a flowchart illustrating a non-limiting preferred embodiment of the VideoRoom Broadcasting with Janus.

FIG. 31 is a flowchart illustrating a non-limiting preferred embodiment of the VideoRoom Broadcasting with Janus. FIG. 31 shows VideoRoom Broadcasting with Janus. In this example, a Publisher sends a message to a VideoRoom within a Janus Server where the Message is sent to a UDP server Application, and to Subscriber1, Subscriber2, and Subscriber3.

GStreamer and WebRTC

GStreamer is a pipeline-based multimedia framework that links together a wide variety of media processing systems to complete complex workflows. GStreamer is used to build a system that reads files in one format, processes them, and exports them in another. The formats and processes can be changed in a plug and play fashion. GStreamer supports a wide variety of media-handling components, including simple audio playback, audio and video playback, recording, streaming and editing. The pipeline design serves as a base to create many types of multimedia applications such as video editors, transcoders, streaming media broadcasters and media players. GStreamer provides a flexible way to implement any application that needs to play, record, or transform media-like data across a diverse scale of devices and products, including embedded IoT devices, desktop (video/music players), video recording, video conferencing, VoIP clients, WebRTC browsers servers (encode/transcode farms). GStreamer is free and open-source software. It was designed to work on a variety of operating systems, e.g. Linux kernel-based operating systems, and supports Android, macOS, iOS, and Windows. GStreamer WebRTC is a flexible solution to web-based media. The GStreamer's WebRTC implementation eliminates some of the shortcomings of using WebRTC in native apps, server applications, and IoT devices. One key application is to convert various audio (including WAV, MP3, and Media Audio) and video formats (including MPEG, MOV & AUI) to be compatible with WebRTC specified video codecs (V8/V9) and audio codecs (iSAC and iLBC) for VoIP. GStream can be integrated with Raspberry Pi4 and Ubuntu servers and many IoT device formats.

Figure 32:
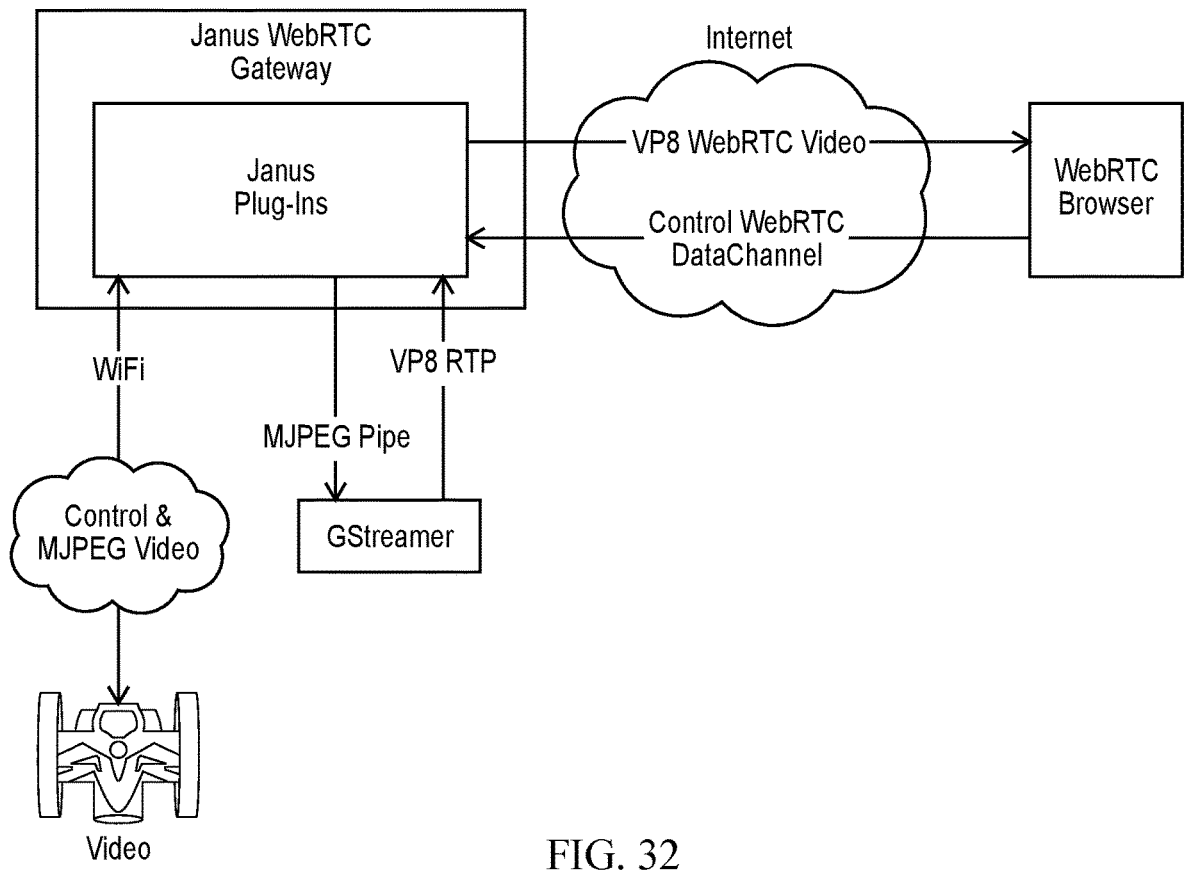
FIG. 32 is a flowchart illustrating a non-limiting preferred embodiment of the Janus-WebRTC Gateway with GStreamer for Video Streaming and Data Transport.

FIG. 32 is a flowchart illustrating a non-limiting preferred embodiment of the Janus-WebRTC Gateway with GStreamer for Video Streaming and Data Transport. FIG. 32 shows the Janus-WebRTC Gateway with GStreamer for video streaming and Data Transport, including the Janus WebRTC Gateway with Janus Plugins sending VP8 WebRTC video over the internet to a WebRTC browser, and receiving from the browser the Control WebRTC DataChannel. The Janus WebRTC Gateway also receives, and sends through WiFi, a control & mpeg video from a video device. The Janus WebRTC Gateway also communicates through an mpeg pipe and VP8 RTP to a GStreamer module.

Figure 33:
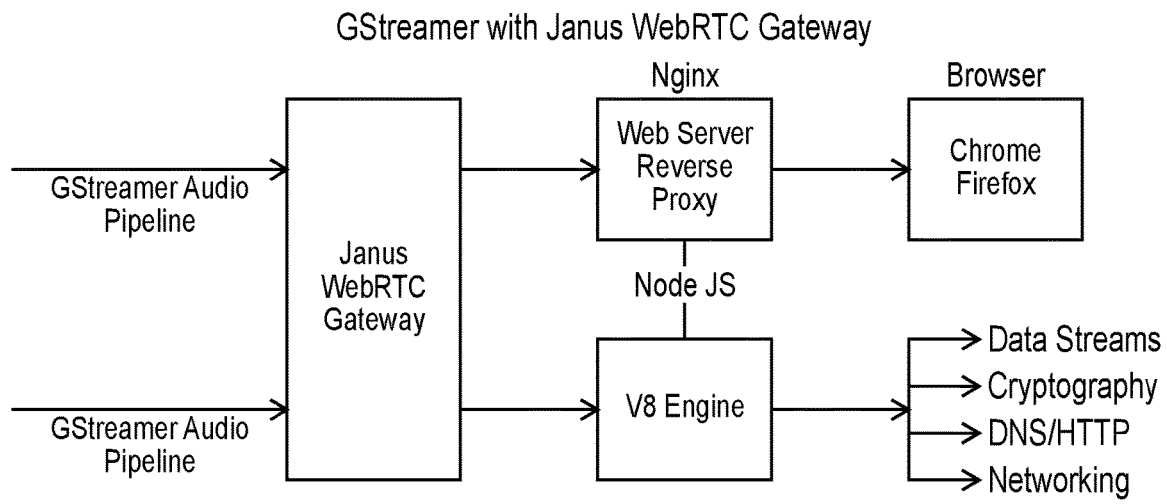
FIG. 33 is a flowchart illustrating a non-limiting preferred embodiment of the GStreamer with Janus WebRTC Gateway.

FIG. 33 is a flowchart illustrating a non-limiting preferred embodiment of the GStreamer with Janus WebRTC Gateway. FIG. 33 shows a non-limiting example of the GStreamer with Janus WebRTC Gateway receiving GStreamer Audio Pipeline into the Janus WebRTC Gateway. This is then sent using Nginx—Web Server Reverse Proxy and then to the Browser—Chrome Firefox. The Janus WebRTC Gateway also works with Node.JS—V8 Engine to provide Data Streams, Cryptography, DNS/HTTP, and Networking.

Janus Gateway with Skyway IoT SDK

Skyway IoT SDK is a WebRTC app development kit for Linux platforms. When integrated with the Janus Gateway it enables global access to WebRTC gateway services even under NAT traversal network requirements. The IoT SDK leverages WebRTC gateway to provide flexible and extensible IoT apps using a WebRTC browser on smartphones and PC's including: Transfer video from ONVIF security cameras; Add AI features such as facial recognition; Enable MQTT device operation externally without integration with an MQTT broker server. The IoT SDK is an SDK framework (rather than just libraries) that consist of several building blocks as illustrated.

Figure 34:
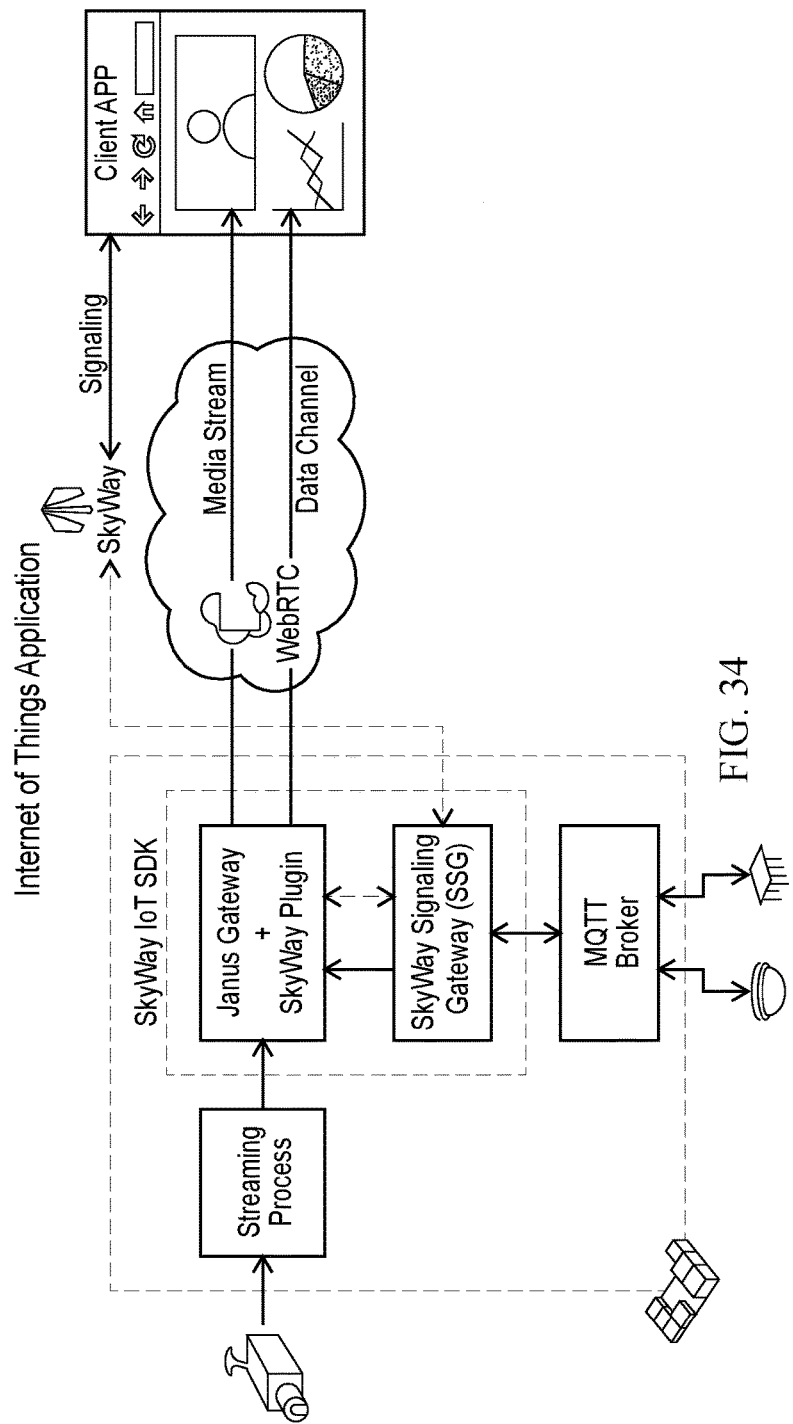
FIG. 34 is a flowchart illustrating a non-limiting preferred embodiment of the Janus Gateway with SkyWay IoT SDK.

FIG. 34 is a flowchart illustrating a non-limiting preferred embodiment of the Janus Gateway with SkyWay IoT SDK. FIG. 34 shows the Janus Gateway with SkyWay IoT SDK that comprises a Streaming Process feeding into the Janus Gateway+SkyWay plugin, with the SkyWay Signaling Gateway (SSG) and the MQTT broker sending to WebRTC Cloud-based Skyway with Signaling to the Client App with both a Media Stream and a Data Channel.

Janus Gateway+SkyWay Plugin

WebRTC gateway feature within the framework. Where Janus Gateway establishes WebRTC P2P connection between device and client, then relays pure RTP base media streaming data (provided by streaming process explained below) into WebRTC media streaming protocol (ICE+SRTP). By using SkyWay Plugin, developers can control Janus Gateway features from client api outside of Janus Signaling Protocol. Also, it gives a way to connect 3rd party apps and client apps leveraging DataChannel relayed by Janus Gateway.

SkyWay Signaling Gateway (SSG)

Signaling Protocol gateway between Janus REST API and SkyWay Signaling Server. Since it transor SkyWay's signaling protocol such as offer, answer and ice candidate into Janus REST API inside private network, to develop globally accessible WebRTC-IoT apps. Because of this building block, the system provides global accessibility and a method for developing integration and control of the Janus Gateway. Additionally, it relays DataChannel data between Janus Gateway and 3rd party apps.

Streaming Process

Streaming Process is used for generating stream data. It generates an rtp stream that will be received by Janus Gateway. This rtp data will be relayed to the client app by WebRTC P2P protocol. Typically, GStreamer can be used for this purpose. But in the case of generating streams from a file, this process is not needed. Just configuring the file path to Janus Gateway connects the data streams.

Client App

Arbitrary applications can be used on the client side. For instance, monitoring camera streaming, realtime metrics data and operating IoT devices would be a typical use-case. In most cases, by making use of the Client module it would be easy to implement your client side application.

Raspberry Pi

It is required to install the above building blocks on linux based IoT devices, using Raspberry PI.

Skyway IoT SDK—WebRTC Gateway

The Skyway-WebRTC Gateway can be deployed to provide access and feature integration between the browser and WebRTC for Androids and iOS smartphones, eliminating the need to write special JavaScript programs to connect WebRTC and remote edge IoT devices.

The Skyway WebRTC Gateway equips the WebRTC engine with the following integrated functions: Use Skyway to connect WebRTC smartphones over signaling server and TURN servers; Insert data to the WebRTC gateway; Send RTP audio and video to the Skyway WebRTC Gateway so the remote party can seamlessly receive media stream data; and Send UDP streams directly to the WebRTC data channel.

Figure 35:
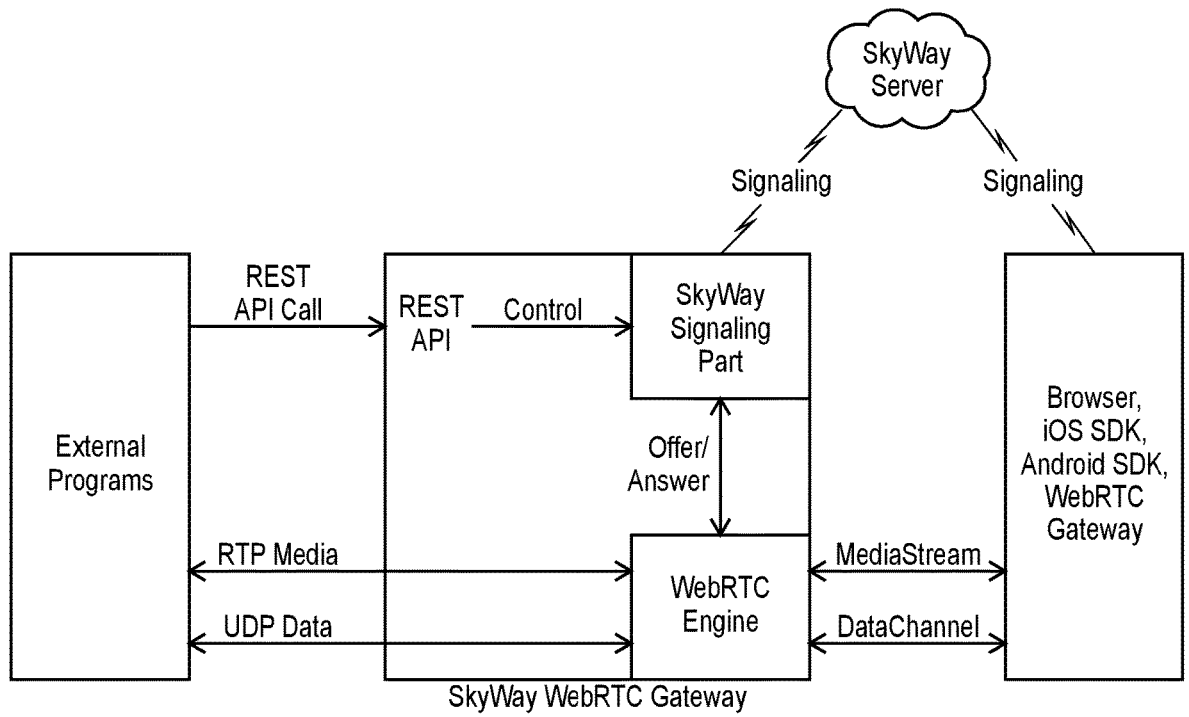
FIG. 35 is a flowchart illustrating a non-limiting preferred embodiment of the SkyWay IoT SDK WebRTC Gateway.

FIG. 35 is a flowchart illustrating a non-limiting preferred embodiment of the SkyWay IoT SDK WebRTC Gateway. FIG. 35 shows the Data Insertion Application using SkyWay WebRTC Gateway where the SkyWay Server with signaling to the Browser-iOS SDK, Android SDK, and WebRTC Gateway, and has signaling to the SkyWay WebRTC Gateway. External Programs provide a REST API Call, which is forwarded within the SkyWay WebRTC Gateway to a REST API for Control of the SkyWay Signaling Part. The SkyWay Signaling Part sends/receives the Offer/Answer with the WebRTC Engine. The WebRTC Engine transmits and receives the RTP Media and the UDP Data with the External Programs, and also sends/receives the MediaStream and the DataChannel with the Browser, iOS SDK, Android SDK, WebRTC Gateway.

Because Skyway WebRTC Gateway runs as a standalone application, low performance devices such as IoT devices such as sensors, meters, switches and cameras can use it.

Figure 36:
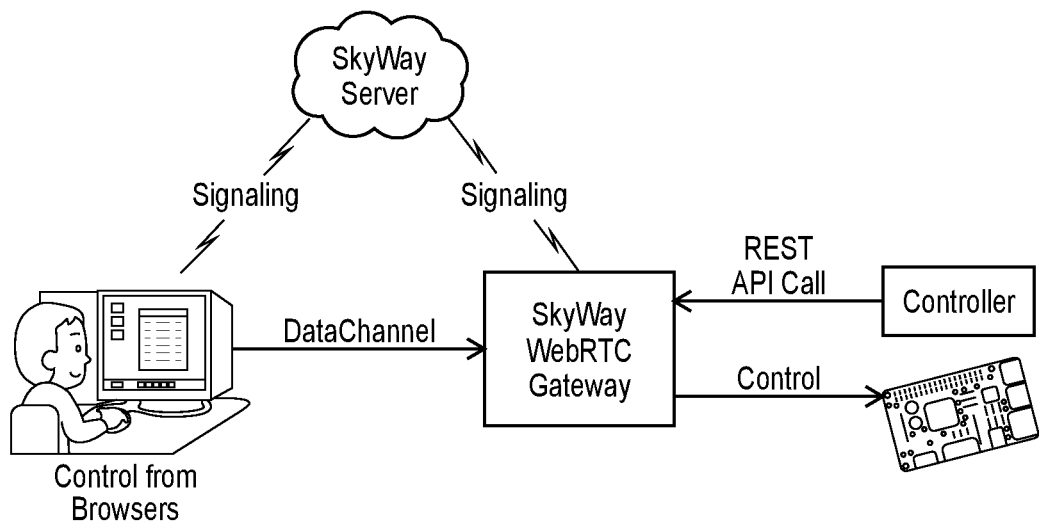
FIG. 36 is a flowchart illustrating a non-limiting preferred embodiment of the Control for Low Performance IoT Devices.

FIG. 36 is a flowchart illustrating a non-limiting preferred embodiment of the Control for Low Performance IoT Devices. FIG. 36 shows Control of the low performance IoT devices. FIG. 36 shows SkyWay Server having Signaling Control from Browsers, which feed the DataChannel into the SkyWay WebRTC Gateway. The Gateway can receive the REST API Call from a Controller, and Control instructions can be sent to the IoT device.

Figure 37:
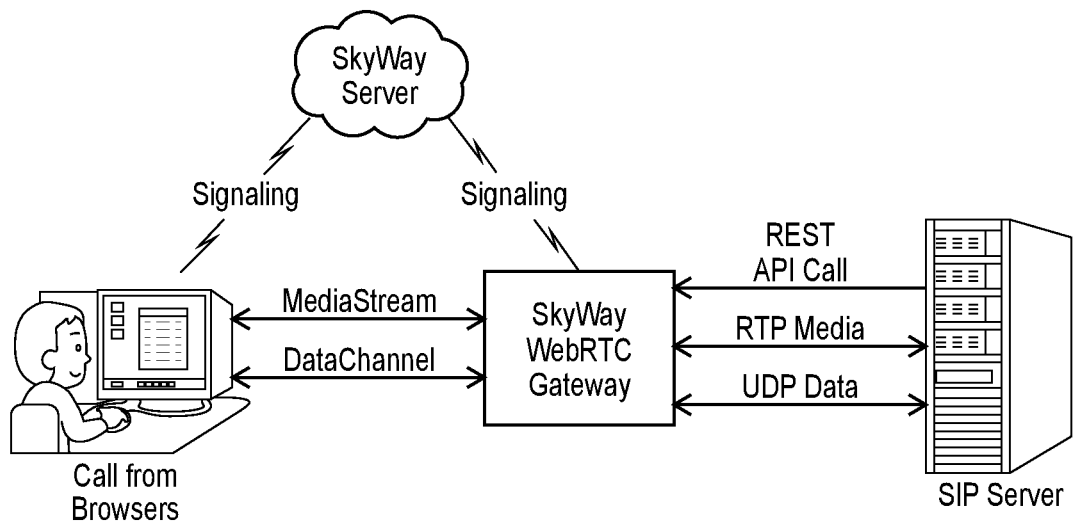
FIG. 37 is a flowchart illustrating a non-limiting preferred embodiment of the Utilization Existing SIP/RTP Equipment such as IoT Machines and Systems for Manufacturing.

FIG. 37 is a flowchart illustrating a non-limiting preferred embodiment of the Utilization Existing SIP/RTP Equipment such as IoT Machines and Systems for Manufacturing. FIG. 37 shows the SkyWay Server receiving Signaling during a Call from Browsers to initiate the MediaStream to, and the DataChannel from, the SkyWay WebRTC Gateway. The SkyWay WebRTC Gateway then receives the REST API Call from a SIP Server, and sends/receives RTP Media and UDP Data with the SIP Server.

Janus WebRTC Video Streaming Directly from a Surveillance IP-Camera without Intermediate Janus-WebRTC Cloud Servers Surveillance cameras have proven to be an effective technology to prevent crime and theft at banks, ATMs and most commercial buildings in major metropolitan areas. A common surveillance method is to have a central facility monitor many cameras placed in multiple locations, by communicating with the IP cameras over the internet. The video stream is often tunneled through a cloud service that hosts intermediate servers which is both expensive and complicated to set up for service providers. Even if streaming video through a cloud service works, there are many advantages if a method were implemented to stream the video directly from the IP surveillance camera to the viewer.

This section summarizes three (3) implementations, to integrate an IP surveillance camera video stream (any IoT device) with WebRTC: Case I—Interoperability between non-WebRTC devices (an IP surveillance camera) with WebRTC using Janus Media Server and GStreamer; Case II—An IP surveillance camera running a Janus Media Server (Janus Streaming Plug-in) between devices; Case III—Running the Janus Media Server directly on the IP camera as a client download, such as with Axis or Ubiquiti cameras to facilitate WebRTC video streamers from an embedded device. These three (3) implementations not only paves the way for additional innovative implementations for IP cameras (for video streaming integration with WebRTC) but for many other embedded IoT devices.

Figure 38:
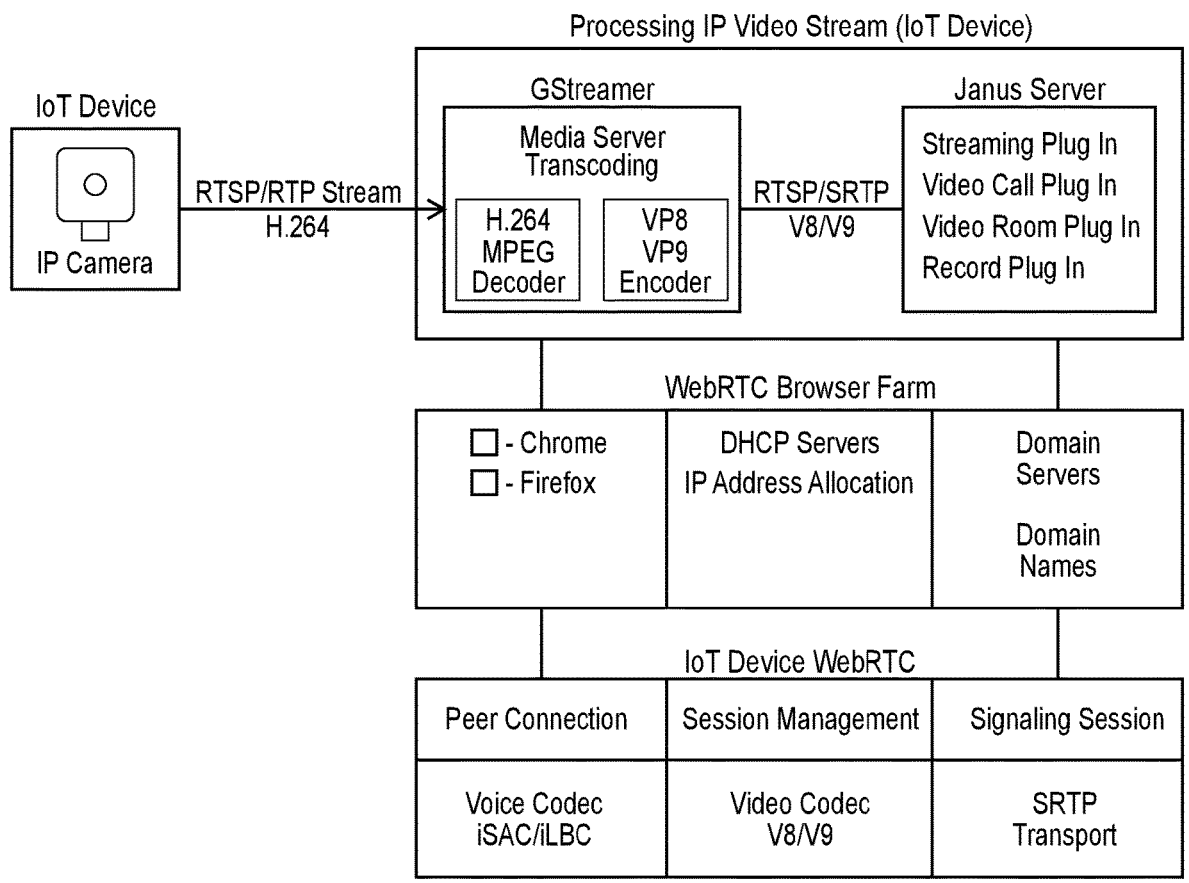
FIG. 38 is a flowchart illustrating a non-limiting preferred embodiment of the Interoperability between Non WebRTC IoT Devices (IP Camera) and WebRTC with Janus Server and GStreamer.

FIG. 38 is a flowchart illustrating a non-limiting preferred embodiment of the Interoperability between Non WebRTC IoT Devices (IP Camera) and WebRTC with Janus Server and GStreamer. FIG. 38 shows the Interoperability Between Non-WebRTC IoT Devices (IP Camera) and WebRTC with Janus Server and GStreamer starting with an IoT Device—IP Camera feeding a RTSP/RTP Streaming/H.264 into a Processing Module having GStreamer and a Janus Server. The GStreamer providing Media Server Transcoding with a H.264 MPEG Decoder and a VP8 VP9 Encoder. GStreamer connected to the Janus Server using RTSP/SRTP and V8/V9. The Janus Server providing Streaming Plug-in, Video call Plug-in, Video Room Plug-in, and Record/Play Plug-in. The Processing Module is connected to the WebRTC Browser Farm and has Chrome/Firefox functions, DHCP Servers, IP Address Allocation, Domain Servers, and Domain Names. The WebRTC Browser Farm connects to the IoT Device WebRTC having a Peer Connection module a Session Management Module, and a Signaling Session Module. The IoT Device WebRTC also providing the Voice Codec iSAC/iLBC, Video Codec using V8/V9, and SRTP, Transport.

Video Compression Standards Summary for WebRTC Compliance and Support

A video codec is software that can either encode (compress) video, decode (decompress) video, or both in different formats. This is a key process when streaming video, since reducing the used bandwidth by compressing the data is very important. By having a good video codec, lower bit rates can be achieved while not impacting performance nor picture quality too much. All the video codecs mentioned below are lossy, which means that quality is lost in the compression and decompression process, making restoration of the exact original source impossible. Lossless video codecs are used in film production and for scientific purposes, where every detail counts and data usage is not as important.

Most Recent WebRTC Smartphones/PC's Support VP8 and VP9 Video Codecs.

TABLE

Video Codec Support in WebRTC browsers using the HTML5 video player

| Browser | H.264 | VP8 | HEVC | VP9 |
|---|---|---|---|---|
| Chrome | X | X | | X |
| Firefox | X | X | | X |
| Safari | X | X | | |
| Opera | X | X | | X |
| Edge | X | X | X | X |
| Android | X | X | X | X |
| IOS | X | X | X | |

H.264

H.264 was developed by VCEG and released as proprietary software in its first standardised specification in 2003. H.264 is supported by most browsers and devices (Table _) The three most prominent profiles are High, Main and Baseline. These three have in turn extended, constrained and special versions for different bit depth supports. Many IP cameras support the three profiles and the user can choose whichever in the camera's settings.

WebRTC does currently only support the Baseline profile, which is the most simple of the three.

VP8

VP8 is a video codec owned by Google that is open source, which probably is a key contributing factor to its popularity. One of the major drawbacks of VP8 is that it is not as common as H.264 when it comes to video systems, leading to worse hardware acceleration support.

WebRTC did at first only support VP8, mostly because of it being an open codec. Later, after a long "war", H.264 grew to become the standard. This was mostly due to better hardware acceleration support by devices and support from other streaming standards such as HLS.

VP9 & HEVC

VP9 and HEVC (H.265) is the latest generation of the most popular video codecs. The main difference between the last generations of video codecs and this, is the reduced bit rate. This leads to several improvements such as improved latency and a reduction in bandwidth required [28]. Hardware acceleration support for the HEVC codec most IP-cameras was recently announced with a new chip.

Case I. Janus Media Server & GStreamer

Janus features and functions are discussed including the Janus-Extensible Architecture and API. The plugin that is of interest for video streaming is the streaming plugin where Janus is able to relay RTP and RTSP video/audio/telemetry streams in three different ways: (1) On demand streaming of a server side file where all viewers stream their own content; (2) Live streaming of server side file, where all viewers see the same stream; (3) Live streaming of media (RTP/RTSP), generated by an external tool like GStreamer or FFMPEG. When live streaming from an external tool, all viewers are watching the same stream. Media streams are added as "mountpoints" and a single Janus server can have multiple mountpoints attached at the same time which users can choose to stream from RTP streams are added by addressing a port and for RTSP streams, a URL is needed as well as username and password if set. Regarding video codec support, while relaying RTP streams Janus supports anything since the video stream itself is not modified. Instead the limitations are set by WebRTC and the browser. The streaming plugin also exposes an API which can be used to list available streams, get info about the mountpoints and edit/add/remove mountpoints. Janus also has an Admin API which can list active sessions, show statistics about connections and change server settings. This Admin API is very useful when debugging connection and plugin problems while developing software interacting with Janus.

Case II. Running a Media Server Between Devices

In this case, an IP camera video stream is used without video transcoding on the server using GStreamer or using the GStreamer pipeline to redirect the RTSP stream. Instead, the solution can deploy the streaming plug-in in Janus to pick up the RTSP stream directly, as shown in the illustration below where Janus is placed between the camera and the browser or on separate device.

Figure 39:
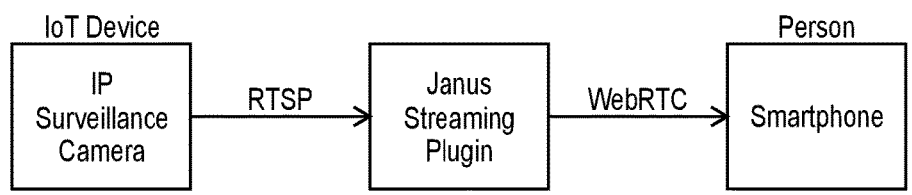
FIG. 39 is a flowchart illustrating a non-limiting preferred embodiment of the Case of Running a Media Server between Devices.

FIG. 39 is a flowchart illustrating a non-limiting preferred embodiment of the Case of Running a Media Server between Devices. FIG. 39 shows how the IoT Device, IP Surveillance Camera sends RTSP to Janus Streaming Plug-in, which then feeds, over WebRTC, the Person, Smartphone.

With this implementation, the Janus streaming plug-in would pickup the RTSP stream and stream it using WebRTC to a person using a smartphone or PC.

Case III. Running the Janus Server Directly on the IP Camera as a Client Download Using Axis or Ubiquiti Cameras.

In this scenario, the Janus server can be integrated directly on the IP camera (such as Axis) which has a built-in Axis camera application Platform (ACAP). This is depicted below, illustrating Janus running directly as a downloaded client on an IP camera.

FIG. 40 is a flowchart illustrating a non-limiting preferred embodiment of the Case of Running the Janus Server Directly on the IP Camera as a client download using Axis or Ubiquiti cameras. FIG. 40 shows the WebRTC, IPSurveillance Camera (IoT device) and Janus Client where the video is not streamed through an intermediary Janus Gateway Server but directly to a Janus client integrated on the IP surveillance camera.

Most IP cameras do not have any compiler installed off-the-shelf, but Janus plug-ins can be cross compiled with the IP camera. A full list of compiled features of Janus is shown below. The two most important compiled plug-ins are Streaming and transport.

FIG. 41 is a flowchart illustrating a non-limiting preferred embodiment of Janus running on the IP Camera. FIG. 41 shows Janus running on the IP camera with WebRTC.

TABLE

| Compiled features of Janus | |
| --- | --- |
| plugin.streaming | [X] |
| Plugin.echotest | [ ] |
| Plugin.videocall | [ ] |
| Plugin.videoroom | [ ] |
| Plugin.sip | [ ] |
| Plugin.nosip | [ ] |
| Plugin.textroom | [ ] |
| Plugin.voicemail | [ ] |
| Plugin.audiobidge | [ ] |
| Plugin.duktape | [ ] |
| transport.http | [X] |
| Transport.rabbitmq | [ ] |
| Transport.websockets | [ ] |
| Transport.unixsockets | [ ] |

The above three (3) implementations to integrate an IP camera with WebRTC illustrates that WebRTC streaming from embedded IoT devices is a relatively new, undiscovered area.

Using IP cameras as a template for additional use cases and future opportunities to integrate WebRTC with embedded IoT devices, the following additional proposals are postulated: (1) GStreamer—Instead of modifying an IP camera's built in RTSP server capability and relaying the output stream to WebRTC using a Janus-WebRTC gateway, a new solution is to modify or augment the GStreamer pipeline directly on the camera. By implementing a GStreamer pipe output directly to WebRTC instead of RTSP, the conversion process from RTSP-to-WebRTC would be eliminated and lead to enhanced video performance, improvements in latency and other video related performance metrics; (2) Camera application platforms—Today many IP cameras such as Axis have built-in open application platforms. The Axis Camera Application Platform (ACAP) is an example of an open application platform to develop specific applications like WebRTC that can be downloaded and installed on Axis network cameras or video encoders. This makes it possible to develop applications for a wide range of uses, including: Security applications to improve surveillance systems capabilities and facilitate investigation; Business intelligence applications that improve business efficiency; and Camera feature plug-ins that expand the cameras core functionality including easy platform integration with WebRTC.

Figure 42:
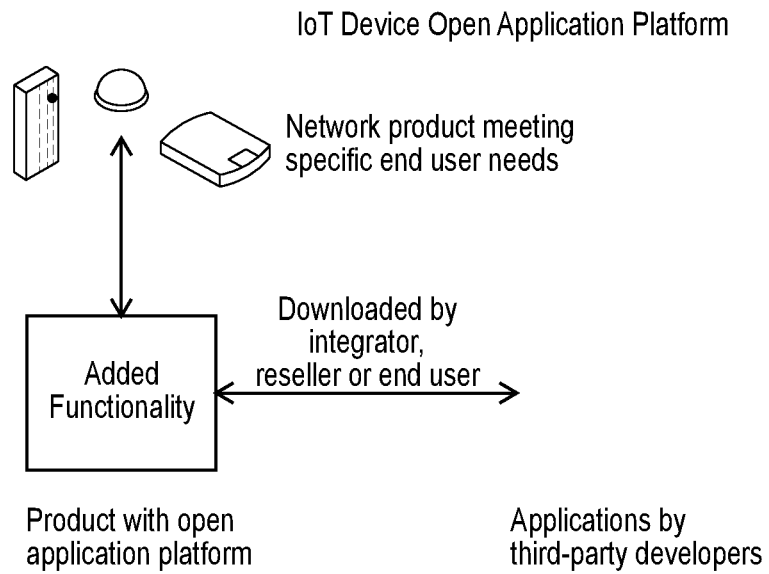
FIG. 42 is a flowchart illustrating a non-limiting preferred embodiment of the IoT Device Open Application Platform.

FIG. 42 is a flowchart illustrating a non-limiting preferred embodiment of the IoT Device Open Application Platform. FIG. 42 shows IoT Device Open Application Platform having Network product meeting specific end user needs, obtaining Added functionality, by Download by integrator, reseller or end user, where the Product with open application platform and Applications by third party developers.

The open application platform creates unique possibilities to meet specific end user needs, by enabling download of third-party applications to network cameras and encoders.

Distributed Ubuntu Linux Core host WebRTC browsers (Chrome, Firefox and Safari) for IoT video, voice and data communications with WebRTC smartphones and PC's
Ubuntu Ubuntu is a Linux distribution based on Debian and composed mostly of free and open-source software. Ubuntu is officially released in three editions: Desktop, Server, and Core for Internet of things devices and robots. All the editions can run on the computer alone, or in a virtual machine. Ubuntu is a popular operating system for cloud computing, with support for OpenStack. Ubuntu's default desktop has been GNOME, and is popular with Raspberry PI computers. Gnome has been the default GUI for Ubuntu Desktop. A default installation of Ubuntu contains a wide range of software that includes LibreOffice, Firefox, Thunderbird, Transmission.

Chrome Browser

Chrome is not an open-source browser, and it is not included in the standard Ubuntu repositories. Installing Chrome browser on Ubuntu however is a straightforward process. Install and run chrome as root in Ubuntu Linux Since Chrome is not available in Ubuntu's official repositories, it cannot be installed from Ubuntu Software Center. These are two ways to download and install Chrome: (1) Through the CLI prompt; (2) Through the CUI Interface.

Mozilla Firefox Browser

Mozilla Firefox is the official Internet browser for Ubuntu and most Ubuntu servers have installed it by default. If Firefox is not installed there are 4 ways to install it on Ubuntu. (1) From the Snap Store—through the Ubuntu Software Manager; (2) From the official Ubuntu Repository—through the command line; (3) From the Mozilla PPA repository—through command line; (4) From Mozilla.org website.

Ubuntu Core

Ubuntu Core is Ubuntu, engineered for IoT and embedded systems. It is easy to deploy, tamper-resistant and hardened against corruption. Ubuntu Core features: simple, consistent installation and deployment: Ubuntu Core is installed via an immutable image, which can be either installed or built specifically for your platform and application; a read-only filesystem: apps run in isolation from each other and access to system resources is only granted with explicit permissions; transactional updates: signed, autonomous and atomic, updates can withstand unpredictable hardware and network conditions, even to the operating system; snap-based, security first: snaps are secure, easy to build, and painless to distribute. Public/private key validation ensures what's running is exactly what's intended to run. From a single Raspberry Pi, to deployment of tens of thousands, it is the ideal platform for anything that needs to run securely, be ever-ready, autonomously updated, and tamper-proof. Ubuntu Core is ideal for IoT and embedded systems because it manages itself. Whether it is running on a Raspberry Pi hidden for media streaming, or a Qualcomm DragonBoard in a garage to handle automation, Ubuntu Core handles application and security updates autonomously. Ubuntu Core runs on a large range of hardware, and pre-built images are available for Raspberry Pi (4) reference platforms. Installation on a reference platform is easy and a great way to quickly get started with Ubuntu Core, or to explore Ubuntu Core's features and evaluate its potential.

Ubuntu Advantages for IoT

Ubuntu Core is engineered to meet the precise requirements of IoT devices. It runs on a large range of hardware including, but not limited to, Raspberry Pi, Intel NUC, Qualcomm Snapdragon 410c and even a KVM. Features include. Snap-based and composed of read-only filesystems: the root filesystems and apps are packaged as snaps, each shipping a read-only filesystem, while there is separate and dedicated writable space for system and user data. Snaps are easy to build, and painless to distribute. Validation is based on public-key signatures that ensure what's running is exactly what is intended to run. Transactional updates: signed, autonomous and atomic, updates can withstand unpredictable hardware and network conditions, even to the operating system. Security first, snaps are secure: apps run in isolation from each other and access to system resources is only granted with explicit permissions.

Figure 43:
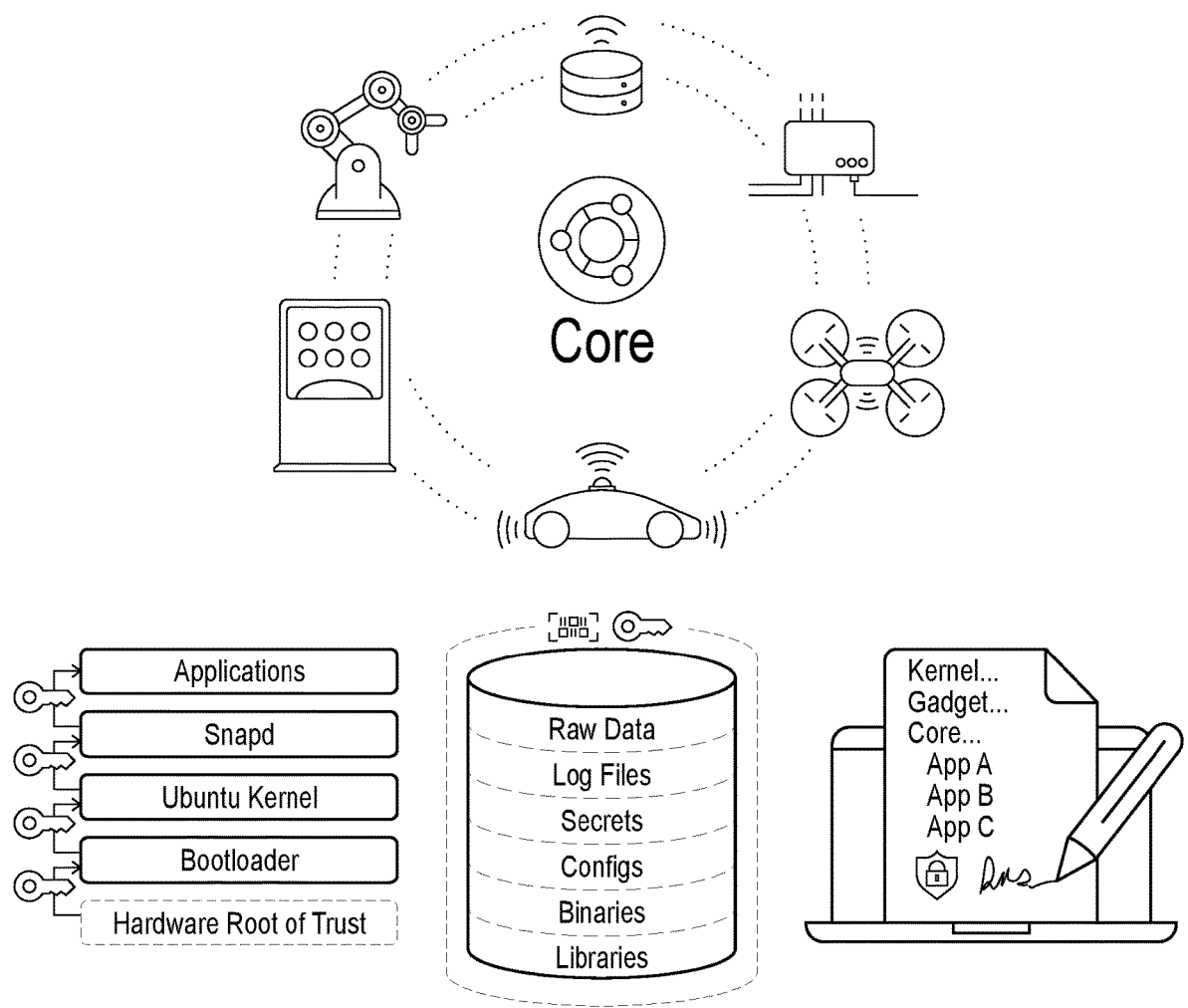
FIG. 43 is a flowchart illustrating a non-limiting preferred embodiment of the Ubuntu Core 20 Secure Linux IoT Devices and Embedded Systems.

FIG. 43 is an illustration of a non-limiting preferred embodiment of the Ubuntu Core 20 Secure Linux IoT Devices and Embedded Systems. FIG. 43 shows Ubuntu Core 20—Secure Linux IoT Devices and Embedded Systems, with the Core, connected Applications, Snapd, Ubuntu Kernel, Bootloader, and Hardware root of trust. A database contains Raw data, Log files, Secrets, Configs, Binaries, and Libraries.

Raspberry Pi

The Raspberry Pi is a single-board computer, which is easy to get started with computing and programming. The Raspberry Pi offers lots of opportunities to create many IoT based projects in branches like computer vision, gaming, IoT projects, and so much more. With a camera attachment, the raspberry pi can even be used for tasks like object detection, face recognition, and surveillance operations. The best part about programming with the Raspberry Pi and an operating system like the Raspbian OS is that you can use a variety of programming languages, including Python. The Thony Editor comes as a pre-installed program in the OS, and you can code your Python projects here. All the programs that are coded in the Raspberry Pi, including machine learning and deep learning programs, can be deployed easily. External attachments like cameras, audio devices, etc., can also be added to the Raspberry Pi an be controlled to perform real-time computer vision tasks such as Video Surveillance, face recognition, etc.

Integration of IoT Device with WebRTC Browsers, Assignment of IP Addresses, Domain Names This section describes the method and system to integrate IoT devices (eg, IP surveillance cameras, meters, switches, sensors, remote patient monitoring (RPM)) with WebRTC to establish an IoT device-to-person real-time video, audio and data communications: (1) Janus-WebRTC Gateway; (2) WebRTC Browser Farm—hosted on Ubuntu-Linux servers in the Cloud; (3) DHCP-DNS servers assign private IP addresses and domain names to IoT devices. (1) WebRTC Gateways—Janus WebRTC gateway deploys server-side plug-ins to enhance real time video and GStreamer provides video and data processing for creating streaming media. A detailed description of Janus and GStreamers is provided below. (2) WebRTC Browser Farm for IoT Devices—Since IoT devices do not natively support WebRTC, the SRTC platform assigns and integrates IoT video and data streams with native Chrome and Firefox browsers hosted in a cloud-based Ubuntu server farm running on Linux OS. (3) DHCP—is an application layer protocol to provide IP addresses, router addresses, and DNS address and class IDs.

DNS—assigns domain names and host names into IP addresses.

Figure 44:
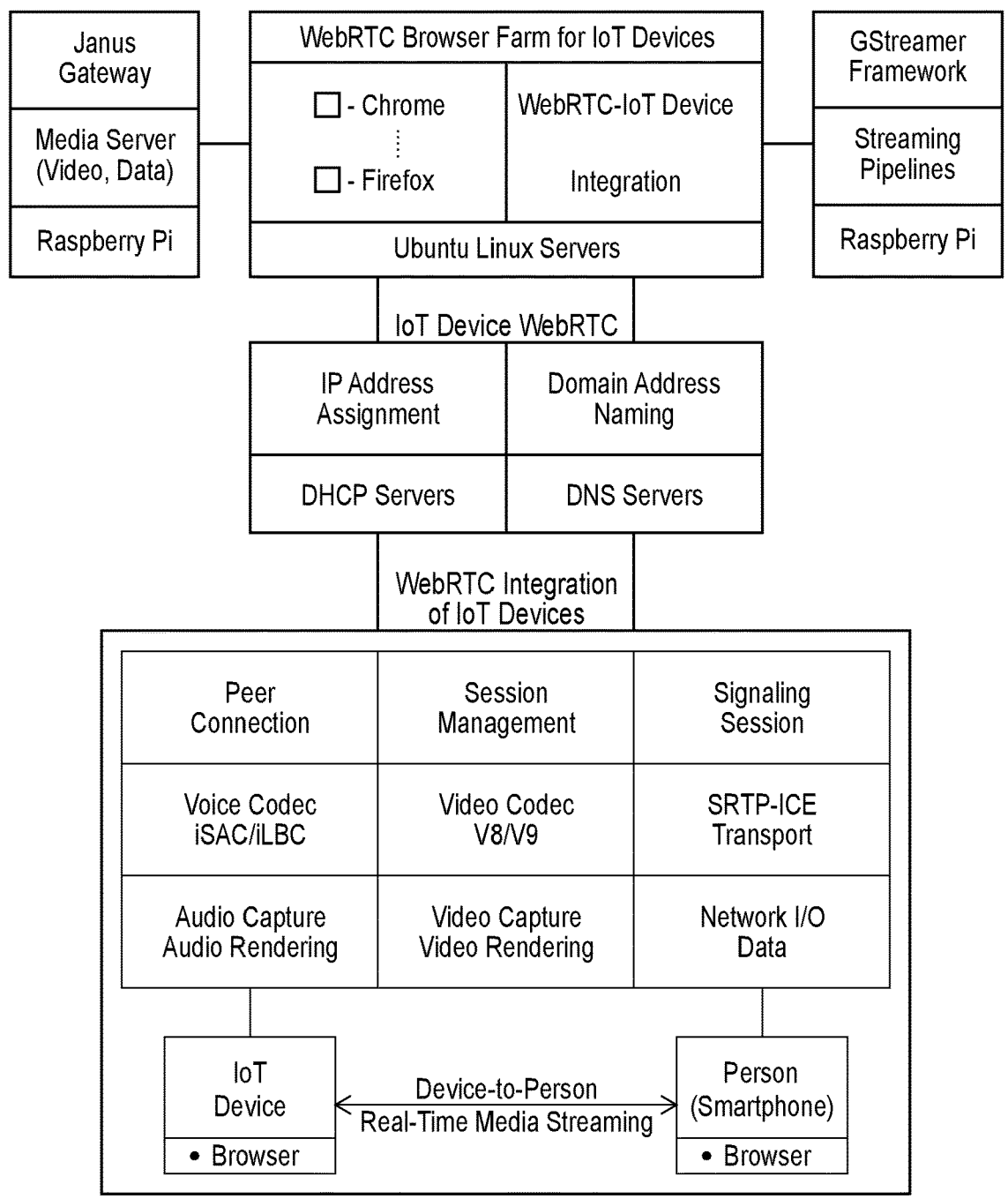
FIG. 44 is a flowchart illustrating a non-limiting preferred embodiment of the WebRTC INtegration with IoT Devices, Device to Person Communications.

FIG. 44 is a flowchart illustrating a non-limiting preferred embodiment of the WebRTC Integration with IoT Devices, Device to Person Communications. FIG. 44 shows WebRTC Integration with IoT Devices for Device-to-Person Communications using the Janus Gateway with a Media Server (Video, Data) and Raspberry Pi. This is connected to the WebRTC Browser Farm for IoT Devices, which has Chrome/Firefox, WebRTC-IoT Device Integration, and Ubuntu Linux Servers. The browser farm is connected to the module for the GStreamer Framework, with Streaming Pipelines and Raspberry Pi. The browser farm connects to the IoT Devices—WebRTC Server for IP Address Assignment, DHCP Servers, Domain Address Naming, and DNS Servers. The IoT-WebRTC Server is integrated into the IoT Devices to provide Peer Connection, Voice Codec iSac/ iLBC, Audio Capture/Audio Rendering, Session Mgmt, Video Codec V8/V9, Video captureNideo Rendering, Signaling Session, SRTP-ICE Transport, and Network I/O Data—to the IoT Device and the User Device.

Figure 45:
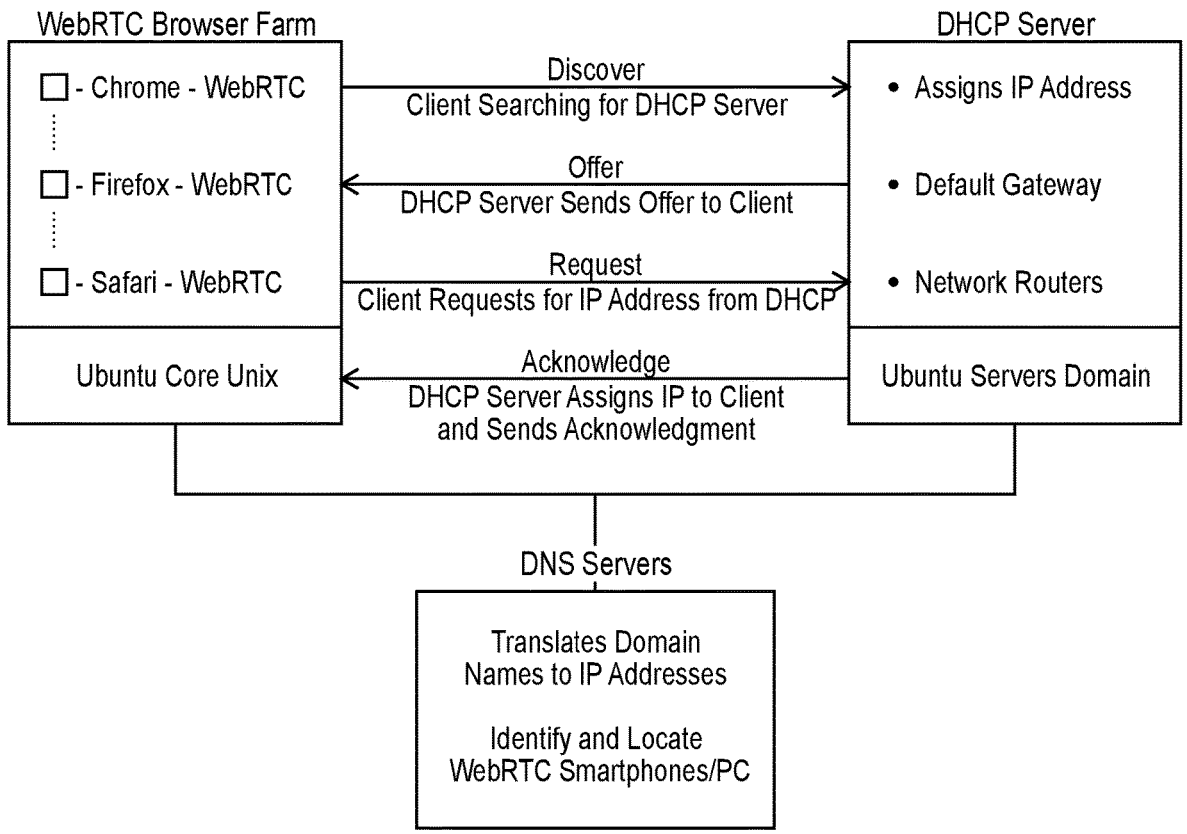
FIG. 45 is a flowchart illustrating a non-limiting preferred embodiment of the DHCP Server with WebRTC Server Farm IP Address and DNS Allocation for WebRTC Browsers.

FIG. 45 is a flowchart illustrating a non-limiting preferred embodiment of the DHCP Server with WebRTC Server Farm IP Address and DNS Allocation for WebRTC Browsers. FIG. 45 shows the DHCP Server with WebRTC Server Farm—IP Address and DNS Allocation for WebRTC Browsers. FIG. 45 shows the WebRTC Browser Farm connecting to the DHCP Server(s). The Server Farm, using Chrome—WebRTC, Firefox—WebRTC, Safari WebRTC and a Ubuntu Core Unix sends a Discover signal—Client searching for DHCP server, and receives from the DHCP Server the Offer—DHCP server sends offer to client. Then the browser farm sends the Request—Client Requests for IP Addresses from DHCP, which is acknowledged when the DHCP Server assigns IP to client and sends acknowledgement. This use of DNS Servers Translates Domain Names to Ip Addresses and Identify and locate WebRTC Smartphones/PC.

IoT Device Discovery

Unlike IoT assets that are generally multipurpose hardware, IoT devices are purpose-built systems. These devices are designed to perform a few tasks on a very repetitive basis. So a specially designed IoT device software app has been designed to provide visibility into normal and suspicious network behaviors.

Each IoT device exhibits unique characteristics on the network. When an unknown device joins the network, one or more network firewalls log its network traffic and then send the logs to the logging service. These logs include session logs, containing metadata about traffic flow, and enhanced application logs, containing data from packet payloads. The IoT Software App accesses the data from the logging service and uses advanced machine-learning algorithms and iOS profiling system to analyze network behaviors and form a baseline for the device. It then compares that baseline with the behaviors of other known devices. By doing so, it determines the unique personality of the device and creates a profile for it consisting of device type, category, vendor, model, operating system, and many more. Then the software app automatically builds a behavioral profile for the device, including a baseline of acceptable behaviors and communication patterns without other devices, and maintains a rolling baseline of device behaviors. The time required for building an initial profile depends on several factors: How active are the devices on the network? How many devices of the same type are there on the network? The more devices of the same type there are the faster the profiling works because it can aggregate knowledge learned from multiple devices simultaneously. How complicated is the behavior of an individual device? For example, the IoT software app learns the behavior of a network-connected thermostat much faster than that of a surgical robot in a hospital.

IoT Devices with Static IP Addresses

While most network-connected devices receive their IP addresses dynamically through DHCP, it is common to reserve part of the network address space for use as static IP addresses for devices such as routers, printers, FTP servers, and DHCP servers. Beyond this common practice, there are some industries and facilities that use static IP addresses predominantly; for example, manufacturing, utilities, oil and gas, warehouses, order fulfillment centers, and processing and distribution centers. Because most automation and control applications use the IP address directly in their programs, it is important that robotic devices and controllers in assembly lines and processing centers have static IP addresses, which is why static addressing is so prevalent in these areas.

IoT device apps can be deployed in networks where DHCP dynamically assigns IP addresses to devices, where network administrators manually configure devices with static IP addresses, and where there's a combination of both. They use multiple techniques for detecting and monitoring network activity and correlating it to individual devices. By examining the DHCP traffic logs that firewalls provide, it associates dynamically assigned IP addresses with device MAC addresses and adds these devices to its inventory. By looking at ARP logs, the IoT device app also learns IP address-to-MAC address mappings and adds devices with static IP addresses, which might not otherwise be discovered through DHCP, to its inventory as well. However, by the very nature of ARP broadcasts, this only works for devices within the same Layer 2 broadcast domains as the reporting firewalls. For devices with static IP addresses beyond Layer 2 boundaries, IoT device apps use machine learning to discover network activity patterns indicating the likely presence of such devices. You also have the option of manually providing to IoT device apps with static IP address assignments through static IP device and subnet configurations.

Deployment of DHCP Servers with Firewall

A WebRTC client app installed on the native WebRTC browsers uses machine learning to classify IoT devices based on the network traffic for which these devices are either a source or destination. To accomplish this, it relies on Enhanced Application logs (EALs) generated by most next-generation firewalls. DHCP traffic is of particular importance to the IoT security solution. DHCP provides a way to create an IP address-to-device mapping (that is, an IP address-to-MAC address mapping) that is required for classification to take place. However, a firewall typically only generates an EAL entry when it receives a unicast DHCP message; for example, when there is centralized Internet Protocol Address Management (IPAM) and either the firewall or another local device acts as a DHCP relay agent. Below is an example architecture that illustrates a common case where the firewall generates EALs for unicast DHCP traffic.

Figure 46:
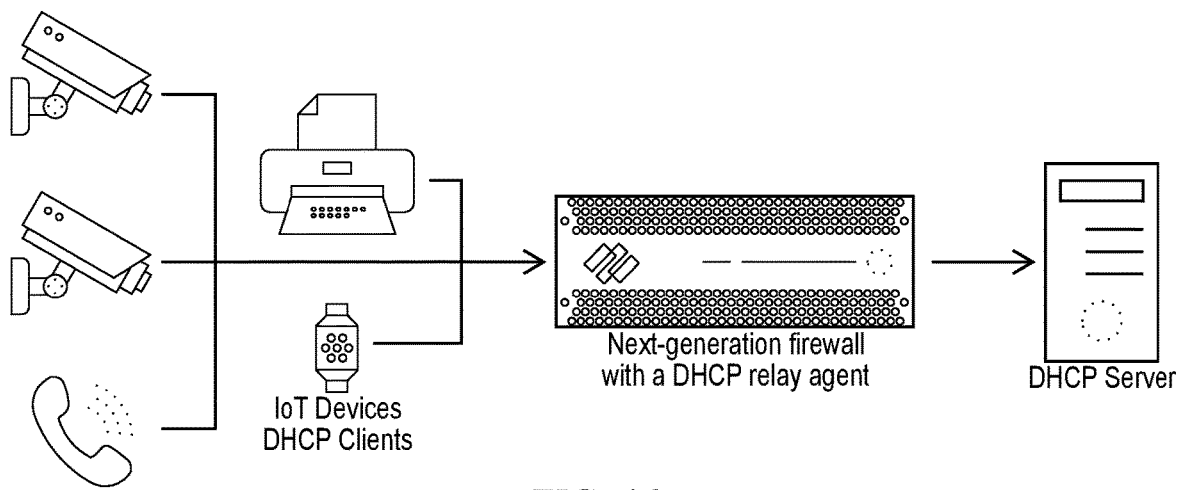
FIG. 46 is a flowchart illustrating a non-limiting preferred embodiment of the Deployment of DHCP Servers with Firewall.

FIG. 46 is a flowchart illustrating a non-limiting preferred embodiment of the Deployment of DHCP Servers with Firewall. FIG. 46 shows the Firewall with DHCP relay and an external DHCP server having IoT devices using DHCP clients to connect through a Next-generation firewall with a DHCP relay agent to a DHCP server.

Figure 47:
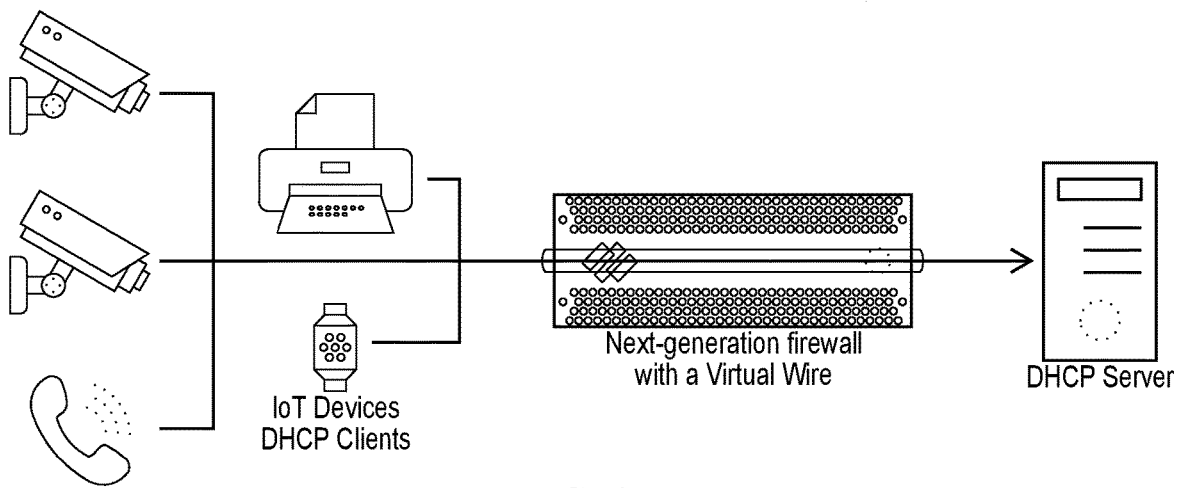
FIG. 47 is a flowchart illustrating a non-limiting preferred embodiment of the Firewall with a Virtual Wire and an external DHCP Server.

The firewall generates an EAL entry for broadcast DHCP traffic when the packet is seen on a virtual wire (vWire) interface with multicast firewalling enabled, as shown below:

FIG. 47 is a flowchart illustrating a non-limiting preferred embodiment of the Firewall with a Virtual Wire and an external DHCP Server. FIG. 47 shows the Firewall with a Virtual Wire and an external DHCP server having IoT devices using DHCP clients to connect through a Next-generation firewall with a Virtual Wire to a DHCP server.

WebRTC Discovery Process, Signaling Servers and ICE (STUN, TURN, NAT) Connectivity.

This section describes the WebRTC discovery and signaling method and system to connect IoT Devices to a personal device (smartphone, PC, Tablet) using WebRTC. Troubleshooting WebRTC connection issues is also discussed.

WebRTC API Components

There are three (3) primary components of the WebRTC API and each plays a unique role in WebRTC, namely MediaStream (Get User Media), RTC Peer Connection, and RTC DataChannel. The MediaStream API provides a way to access device cameras and microphones using JavaScript. It controls where multimedia stream data is consumed and provides some control over the devices that produce the media. It also exposes information about devices able to capture and render media. The RTC Peer Connection is the core of the WebRTC standard. It provides a way for participants to create direct connections with their peers without the need for an intermediary server (beyond signaling). Each participant takes the media acquired from the media stream API and plugs it into the peer connection to create an audio or video stream. It also handles SDP negotiation, codec implementations, NAT traversal, packet loss, bandwidth management and media transfer. The RTC Data Channel API allows bi-directional data transfer of any type of data—media or otherwise—directly between peers. It was designed to mimic the WebSocket API but rather than using a TCP connection, the data channel uses UDP-based streams with configurability of SCTP protocol. This design allows for both TCP reliability and UDP media congestion control on the network.

Figure 48:
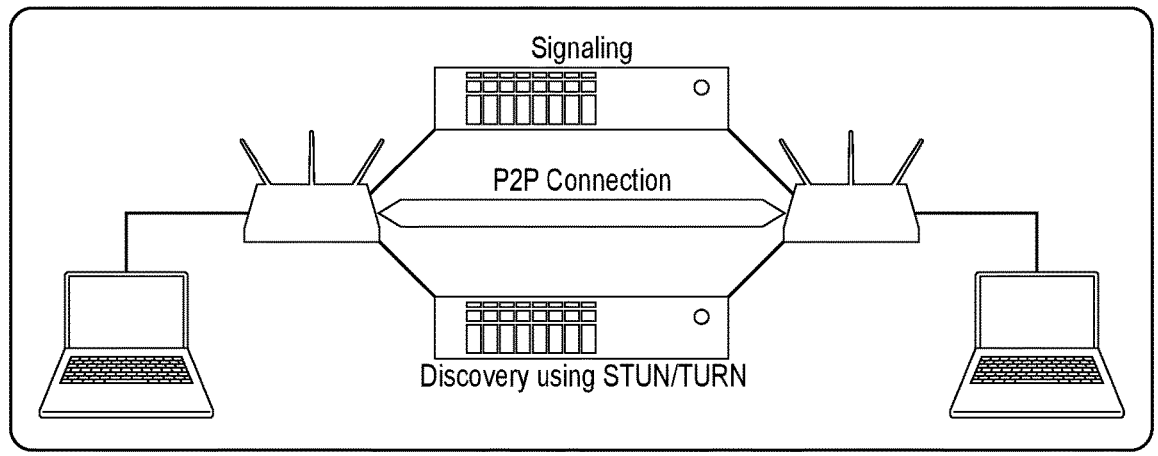
FIG. 48 is a flowchart illustrating a non-limiting preferred embodiment of Establishing WebRTC Connections with JSEP, Signaling and Discovery using ICE-STUN and TURN.

FIG. 48 is a flowchart illustrating a non-limiting preferred embodiment of Establishing WebRTC Connections with JSEP, Signaling and Discovery using ICE-STUN and TURN. FIG. 48 shows Signaling to establish the P2P Connection, with Discovery using STUN/TURN Servers.

JSEP—JavaScript Establishment Protocol

WebRTC call setup has been designed to focus on controlling the media plane, leaving signaling plane behavior up to the application as much as possible. The rationale is that different applications may prefer to use different protocols, such as the existing SIP call signaling protocol, or something custom to the particular application, perhaps for a novel use case. In this approach, the key information that needs to be exchanged is the multimedia session description, which specifies the necessary transport and media configuration information necessary to establish the media plane. With these considerations in mind, the JavaScript Session Establishment Protocol (JSEP) allows for full control of the signaling state machine from JavaScript. JSEP assumes a model in which a JavaScript application executes inside a runtime containing WebRTC APIs (the "JSEP implementation"). The JSEP implementation is almost entirely divorced from the core signaling flow, which is instead handled by the JavaScript making use of two interfaces: (1) passing in local and remote session descriptions and (2) interacting with the ICE state machine. JSEP's handling of session descriptions is simple and straightforward. Whenever an offer/answer exchange is needed, the initiating side creates an offer by calling a createOffer( ) API. The application then uses that offer to set up its local config via the setLocalDescription( ) API. The offer is finally sent off to the remote side over its preferred signaling mechanism (e.g., WebSockets); upon receipt of that offer, the remote party installs it using the setRemoteDescription( ) API. To complete the offer/answer exchange, the remote party uses the createAnswer( ) API to generate an appropriate answer, applies it using the setLocalDescription( ) API, and sends the answer back to the initiator over the signaling channel. When the initiator gets that answer, it installs it using the getRemoteDescription API and the initial setup is complete. This process can be used for additional offer answer exchanges. Before a peer-to-peer video call can begin, a connection between the two clients needs to be established. This is accomplished through signaling. Signaling falls outside of the realm of the WebRTC specification but is the vital first step in establishing an audio/video connection.

Signaling

Signaling allows two endpoints (senders, receivers, or both) to exchange metadata to coordinate communication in order to set up a call. For example, before two endpoints can start a video call, one side has to call the other, and the called side has to respond. This call-and-response message flow (also known as offer-answer message flow) contains critical details about the streaming that will take place—the number and types of streams, how the media will be encoded, etc.—and is often formatted using the Session Description Protocol (SDP), a standard format used by many real-world systems, including VoIP and WebRTC.

This is needed for two reasons. (1) Generally, the peers do not know each other's capabilities. (2) The peers do not know each other's network IP address. So Signaling is the process of coordinating communications. In order for a WebRTC app to setup a call, its clients need to exchange the following information: Session-control messages used to open or close communication; Error messages; Media metadata, such as codecs, codec settings, bandwidth, and media types; Key data used to establish secure connections; and Network data, such as a host's IP address and port as seen by the outside world. This signaling process needs a way for clients to pass messages back and forth. That mechanism is not implemented by the WebRTC APIs. The user is responsible for building it from scratch.

Signaling not Defined by WebRTC

To avoid redundancy and to maximize compatibility with established technologies, signaling methods and protocols are not specified by WebRTC standards. This approach is outlined by JSEP. JSEP's architecture also avoids a browser having to save state, that is, to function as a signaling state machine. This would be problematic if, for example, signaling data was lost each time a page was reloaded. Instead, signaling state can be saved on a server.

Figure 49:
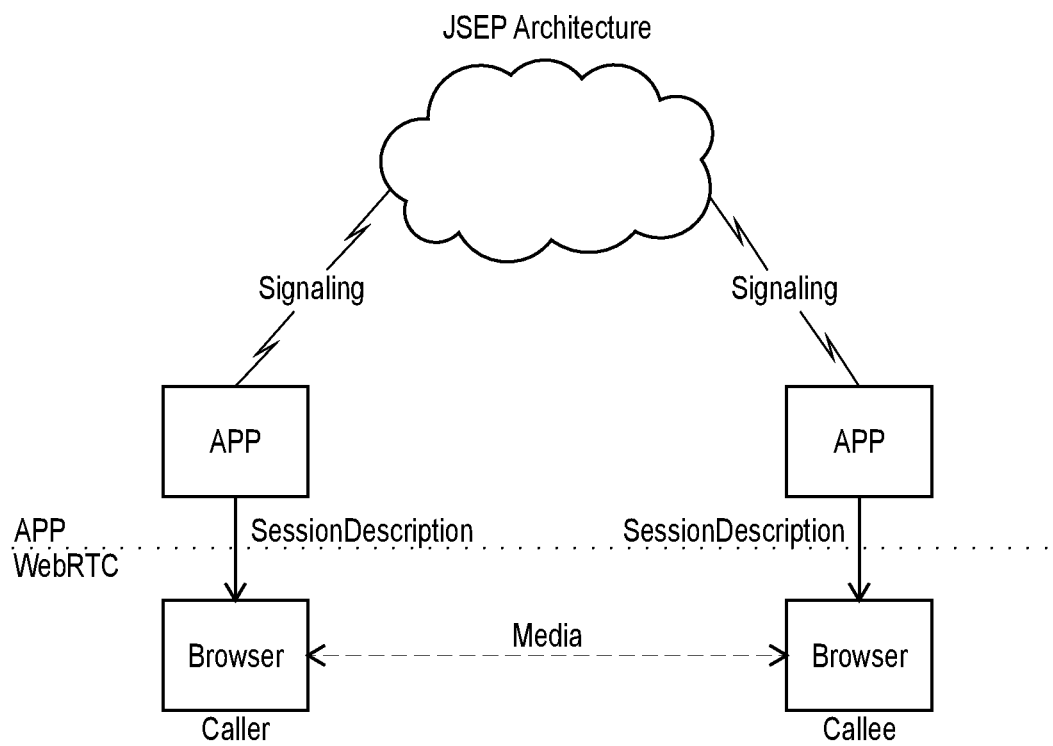
FIG. 49 is a flowchart illustrating a non-limiting preferred embodiment of the JSEP Architecture.

FIG. 49 is a flowchart illustrating a non-limiting preferred embodiment of the JSEP Architecture. FIG. 49 shows JSEP architecture that provides Signaling between the Caller and the Callee, from their Apps through the WebRTC Session. JSEP requires the exchange between peers of offer and answer, the media metadata mentioned above. Offers and answers are communicated in Session Description Protocol (SDP) format.

RTCPeerConnection API and Signaling: Offer, Answer, and Candidate

RTCPeerConnections is the API used by WebRTC apps to create a connection between peers, and communicate audio and video. To initialize this process, RTCPeerConnection has two tasks. Ascertain local media conditions, such as resolution and codec capabilities. This is the metadata used for the offer-and-answer mechanism. Get potential network addresses for the app's host, known as candidates. Once this local data has been ascertained, it must be exchanged through a signaling mechanism with the remote peer.

Imagine Alice is trying to call Eve. Here's the full offer/answer mechanism in all its gory detail. 1. Alice creates an RTCPeerConnection object. 2. Alice creates an offer (an SDP session description) with the RTCPeerConnection createOffer( ) method. 3. Alice calls setLocalDescription( ) with her offer. 4. Alice stringifies the offer and uses a signaling mechanism to send it to Eve. 5. Eve calls setRemoteDescription( ) with Alice's offer, so that her RTCPeerConnection knows about Alice's setup. 6. Eve calls createAnswer( ) and the success callback for this is passed a local session description—Eve's answer. 7. Eve sets her answer as the local description by calling setLocalDescription( ). 8. Eve then uses the signaling mechanism to send kher stringified answer to Alice. 9. Alice sets Eve's answer as the remote session description using setRemoteDescription( ).

Alice and Eve also need to exchange network information. The expression "finding candidates" refers to the process of finding network interfaces and ports using the ICE framework. 1. Alice creates an RTCPeerConnection object with an on-ice-candidate handler. 2. The handler is called when network candidates become available. 3. In the handler, Alice sends stringified candidate data to Eve through their signaling channel. 4. When Eve gets a candidate to the remote peer description. JSEP supports ICE Candidate Trickling, which allows the caller to incrementally provide candidates to the callee after the initial offer, and for the callee to begin acting on the call and set up a connection without waiting for all candidates to arrive.

Peer Discovery

This is a fancy way of asking, "How do I find someone to talk to?" This is the 64 million dollar question that has no defined answer. For telephone calls, you have telephone numbers and directories. For online video chat and messaging, you need identity and presence management systems, and a means for users to initiate sessions. WebRTC apps need a way for clients to signal to each other that they want to start or join a call. Peer discovery mechanisms are not defined by WebRTC and we don't go into the options here. The process can be as simple as emailing or messaging a URL. For video chat apps, you invite people to a call by sharing a custom link to exchange metadata by any messaging service such as IM, email, or homing pigeon. But when all is said and done, there really no easy way to spontaneously contact another person to initiate a video chat or phone call using each user's private IP addresses.

After Signaling: Use ICE to Cope with NATs and Firewalls

For metadata signaling, WebRTC apps use an intermediary server, but for actual media and data streaming once a session is established, RTCPeerConnection attempts to connect clients directly or peer-to-peer. In a simpler world, every WebRTC endpoint would have a unique address that it could exchange with other peers in order to communicate directly.

Figure 50:
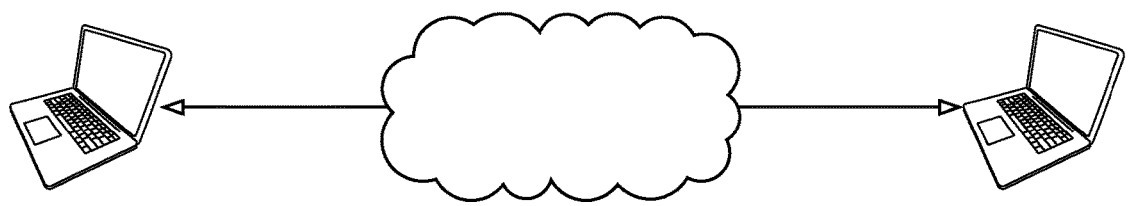
FIG. 50 is a flowchart illustrating a non-limiting preferred embodiment of Using ICE to Cope with NATs and Firewalls.

FIG. 50 is a flowchart illustrating a non-limiting preferred embodiment of Using ICE to Cope with NATs and Firewalls. FIG. 50 shows an example of a world without NSTs and firewalls.

In reality, most devices live behind one or more layers of NAT, some have antivirus software that blocks certain ports and protocols, and many are behind proxies and corporate firewalls. A firewall and NAT may in fact be implemented by the same device, such as a home WIFI router.

Figure 51:
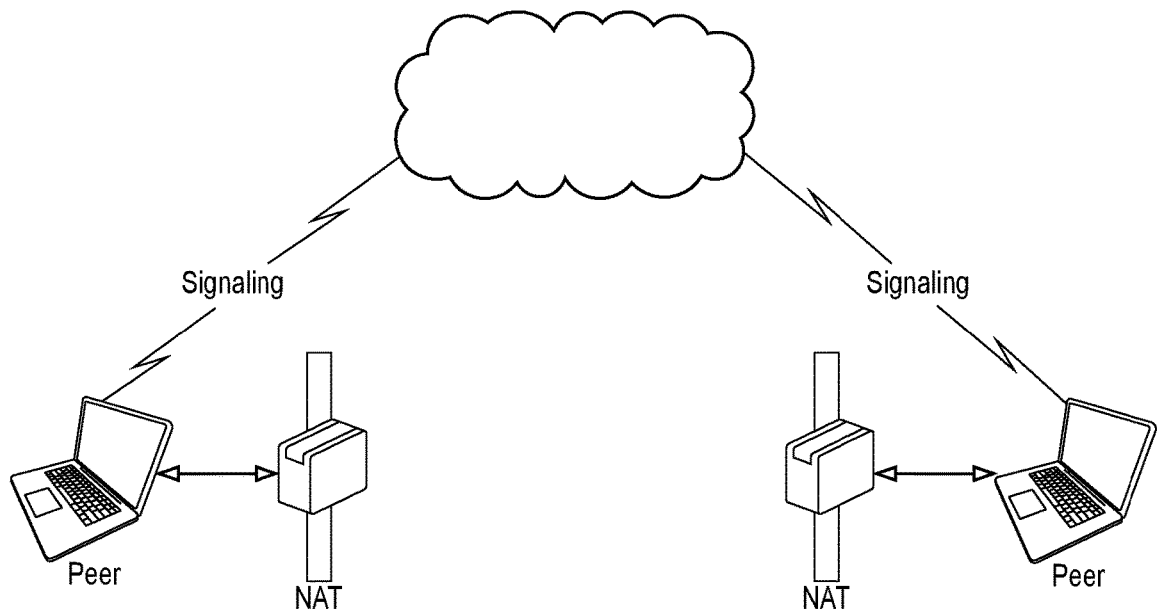
FIG. 51 is a flowchart illustrating a non-limiting preferred embodiment of NAT and Firewall issues.

FIG. 51 is a flowchart illustrating a non-limiting preferred embodiment of NAT and Firewall issues. FIG. 51 shows an example of the real world, which uses Signaling and NAT to establish Peer Connections. WebRTC apps can use the ICE framework to overcome the complexities of real-world networking. To enable this to happen, the app must pass ICE server URLs to RTCPeerConnection. ICE tries to find the best path to connect peers. It tries all possibilities in parallel and chooses the most efficient option that works. ICE first tries to make a connection using the host address obtained from a device's operating system and network card. If that fails (which it will for devices behind NATs), ICE obtains an external address using a STUN server and, if that fails, traffic is routed through a TURN relay server. In other works, a STUN server is used to get an external network address and TURN servers are used to relay traffic if direct (peer-to-peer) connection fails. Every TURN server supports STUN. A TURN server is a STUN server with additional built-in relaying functionality. ICE also copes with the complexities of NAT setups. In reality, NAT hole-punching may require more than just a public IP:port address.

STUN

NATs provide a device with an IP address for use within a private local network, but this address can't be used externally. Without a public address, there's no way for WebRTC peers to communicate. To get around this problem, WebRTC uses STUN. STUN servers live on the public internet and have one simple task—check the IP:port address of an incoming request (from an app running behind a NAT) and send that address back as a response. In other words, the app uses a STUN server to discover its IP:port from a public perspective. This process enables a WebRTC peer to get a publicly accessible address for itself and then pass it to another peer through a signaling mechanism in order to set up a direct link. (In practice, different NATs work in different ways and there may be multiple NAT layers, but the principle is still the same.) STUN servers don't have to do much or remember much, so relatively low-spec STUN servers can handle a large number of requests. Most WebRTC calls successfully make a connection using STUN—86% according to Webrtcstats.com, though this can be less for calls between peers behind firewalls and complex NAT configurations.

Figure 52:
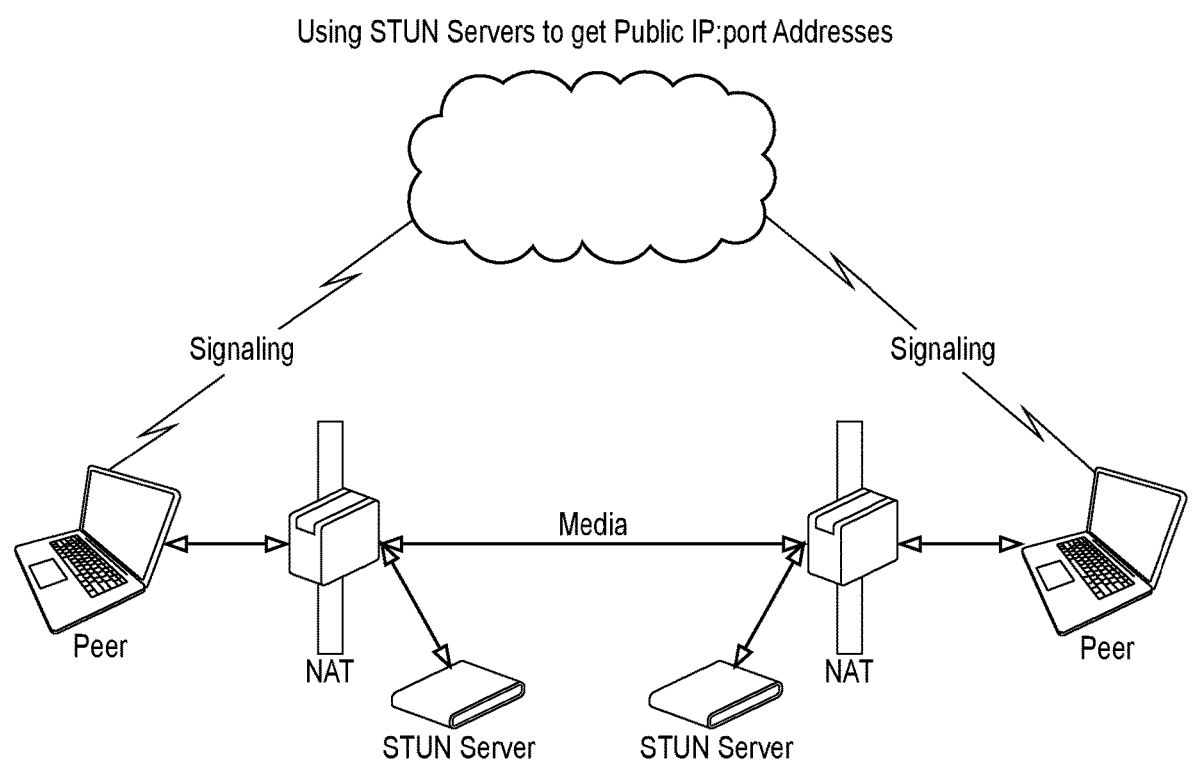
FIG. 52 is a flowchart illustrating a non-limiting preferred embodiment of Using STUN servers to get Public IP: Port Addresses.

FIG. 52 is a flowchart illustrating a non-limiting preferred embodiment of Using STUN servers to get Public IP: Port Addresses. FIG. 52 shows connection Using STUN servers to get public IP:port addresses. Signaling between the Peer devices and the Discovery Cloud, with use of NAT to facilitate Media sharing. A STUN server may be used to facilitate discovery.

TURN Servers

RTCPeerConnection tries to set up direct communication between peers over UDP. If that fails, RTCPeerConnection resorts to TCP. If that fails, TURN servers can be used as a fallback, relaying data between endpoints. Just to reiterate, TURN is used to relay audio, video, and data streaming between peers, not signaling data! TURN servers have public addresses, so they can be contacted by peers even if the peers are behind firewalls or proxies. TURN servers have a conceptually simple task—to relay a stream. However, unlike STUN servers, they inherently consume a lot of bandwidth. In other words, TURN servers need to be beefier.

Figure 53:
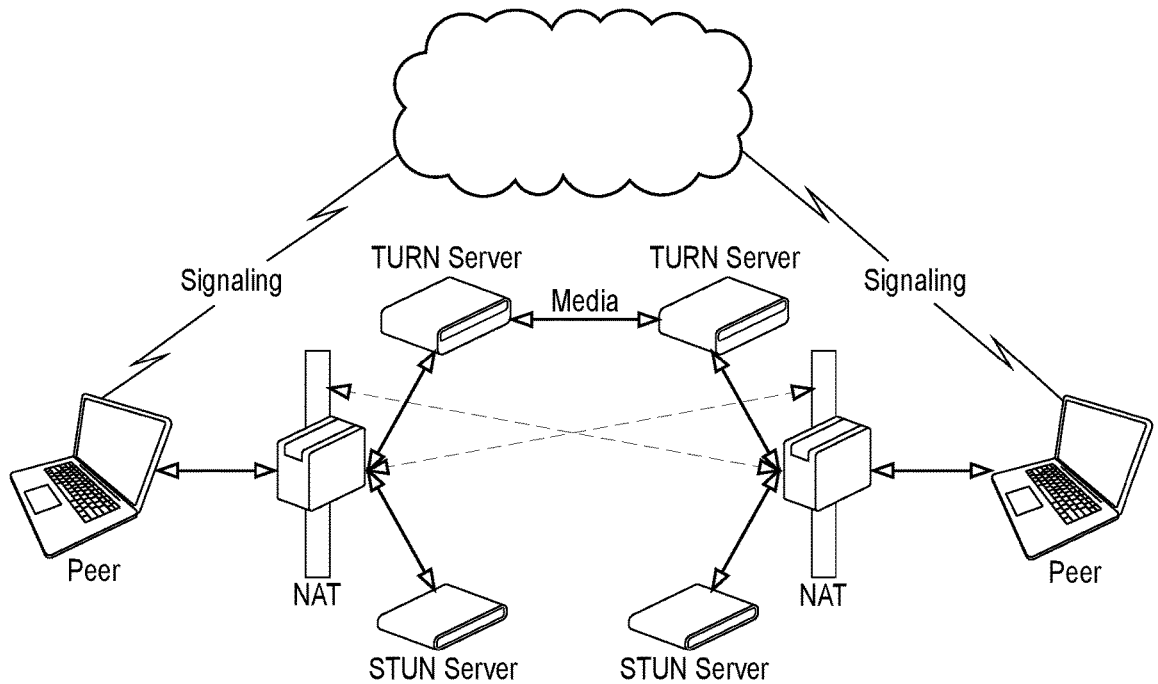
FIG. 53 is a flowchart illustrating a non-limiting preferred embodiment of the Full Monty: STUN, TURN, and Signaling.

FIG. 53 is a flowchart illustrating a non-limiting preferred embodiment of the Full Monty: STUN, TURN, and Signaling. This diagram shows TURN in action. Pure STUN didn't succeed, so each peer resorts to using a TURN server.

WebRTC Connection Issues and Proposed Resolutions

Failed WebRTC connections can be caused by restrictive networks behind symmetric NATs, port blocks and even protocol blocks at the application & transport layers. We will delve in the intricate process of establishing a peer 2 peer WebRTC connection and lay out the mechanisms that can lead to failed connections. Establishing a peer 2 peer WebRTC connection has 3 steps: 1. Signaling, 2. Discovery, 3. Establishing the connection. Problems can appear at any part of the process. Step One: Signaling—Signaling is the first step in establishing a peer to peer WebRTC connection. Signaling is the backchannel used to exchange initial information by the (2) parties wanting to establish a peer 2 peer WebRTC connection. The following information is exchanged. Each party's IP and port where they can be reached (ICE candidates), Media capabilities, and Session control messages. Websockets are widely used for signaling. Popular WebRTC media servers like Kurento use them. Secure websockets (wss) can be also used and are recommended if you wish to have secure data transport for signaling. Signaling is also one of the first points where the WebRTC connection process can fail. Running the signaling over port 80 or 443 is one of the 1st things to do to ensure high connection rates for WebRTC.

Figure 54:
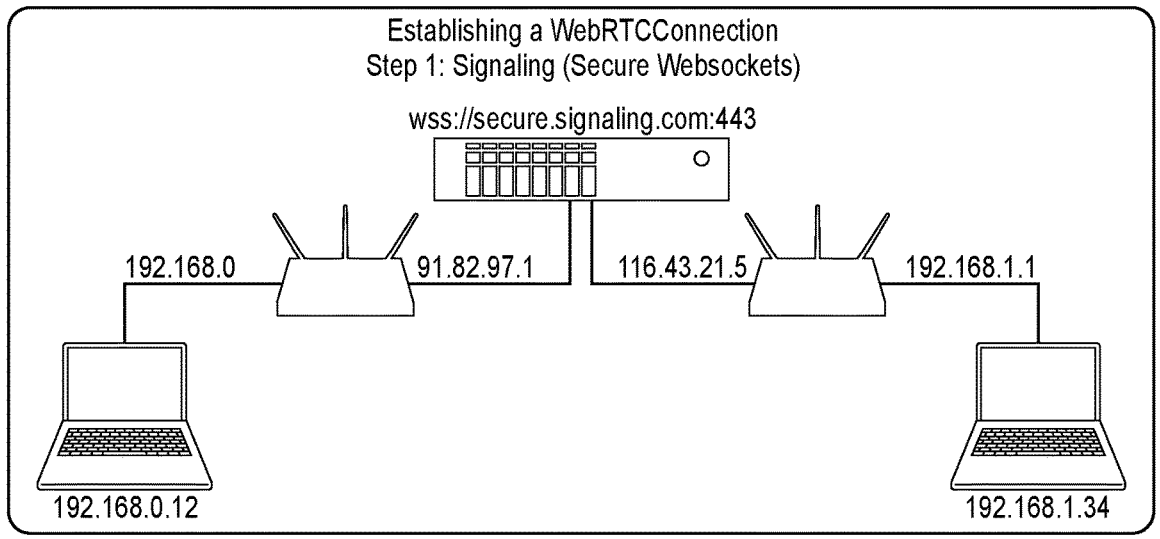
FIG. 54 is a flowchart illustrating a non-limiting preferred embodiment of Signaling Between 2 Local Network Computers through Secure Web Socket over Port 443.

FIG. 54 is a flowchart illustrating a non-limiting preferred embodiment of Signaling Between 2 Local Network Computers through Secure Web Socket over Port 443. FIG. 54 shows establishing a WebRTC Connection, Step 1: Signaling (Secure websockets), at wss://secure.signaling.com:443, using 192.168,0.1, 91.82.97.1, 192.168.0.12, 116.43.21.5, 192.168.1, 192.168.1.34' and Step Two: Discovery (STUN and TURN). Once a signaling connection is established between the (w) WebRTC endpoints and the signaling server, information can be exchanged. A very important piece of information is the public IP and port at which each endpoint can be reached. Finding the IP is not a problem for computers that are connected directly to the internet since it (the OS) knows its own public IP and can be easily queried by the browser (or other WebRTC clients), but it can be an issue for computers & devices that are part of a local network (behind a router) including mobile devices connected through 3G/4G where their IP is the local network assigned IP.

Such devices are only aware of their local network IP so they have to use the STUN protocol to: 1. communicate with a STUN server and find out the public IP of their network and port where they can be reached at; 2. punch a two way hole through the implicit NAT function of the network's router.

Furthermore devices behind a symmetric NAT can only communicate with peers with which they've communicated in the past thus a TURN server will be needed to relay the data from the other endpoint since the other endpoint can not open a direct connection through the symmetric NAT to our device. Each WebRTC endpoint will ask the STUN/TURN server for its own public IP and port where it can be reached. Once a response is received the WebRTC endpoint will send the pair to the other party through the signaling channel. These ip:port pairs are called ICE candidates.

Figure 55:
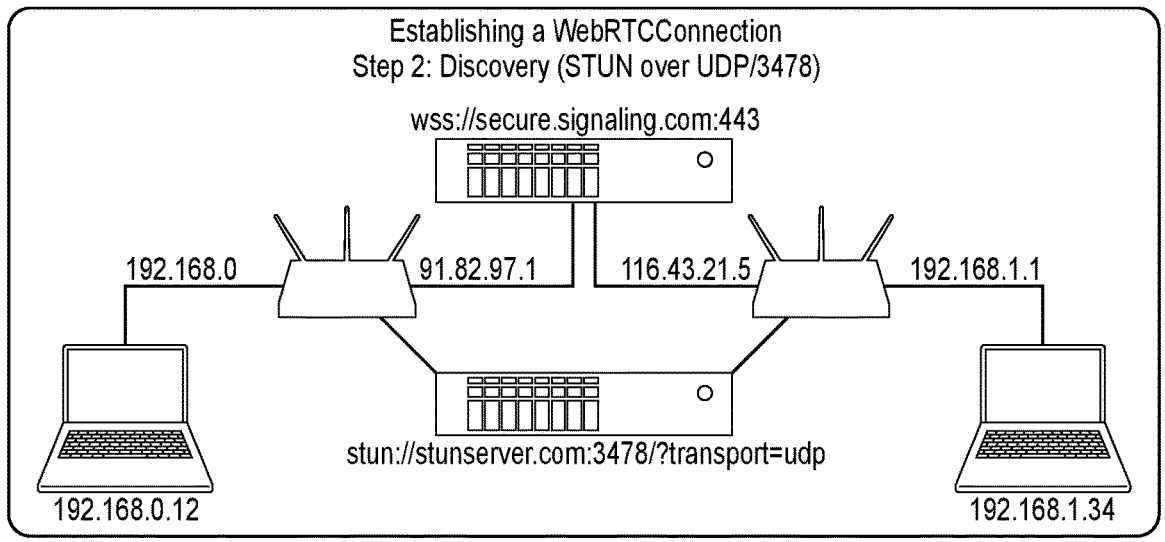
FIG. 55 is a flowchart illustrating a non-limiting preferred embodiment of Discovery with STUN and TURN.

FIG. 55 is a flowchart illustrating a non-limiting preferred embodiment of Discovery with STUN and TURN. FIG. 55 shows establishing a WebRTC Connection, Step 2: Discovery (STUN over UDP/3478), wss://secure.signaling.com: 443, using: 192.168.0.1, 91.82.97.1, 116.43.21.5, 192.168.1.1, 192.168.0.12, and 192.168.1.34, with stun:// stunserver.com:3478/?transport=udp.

WebRTC ICE candidates discovery using a STUN server over UDP port 3478.

Figure 56:
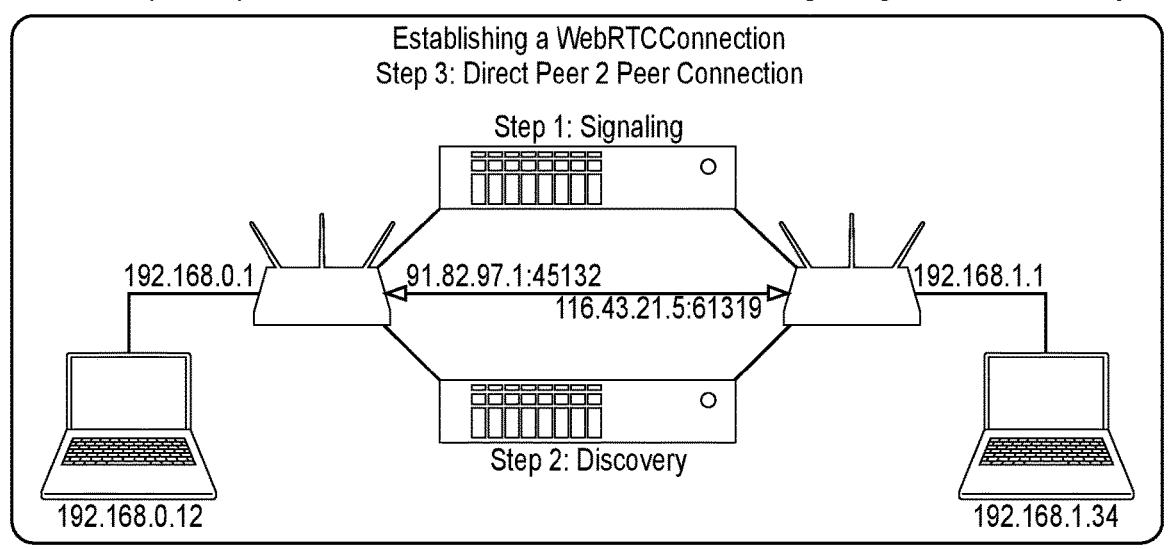
FIG. 56 is a flowchart illustrating a non-limiting preferred embodiment of the Three Types of ICE Candidates.

Referring now to FIG. 56, there are three types of ICE candidates. Host: This is the preferred type of candidate. It is represented by a random port and the device's local ip: —For computers which are directly connected to the Internet the host candidate will be their public Internet ip. For a computer connected to a local network the host candidate will be their local network ip (e.g. 192.168.1.12). For a mobile device connected to a 3G/4G network the host candidate will be their local 3G/4G network ip (e.g. 10.135.12.31). Server Reflexive (srflx): Computers that are connected to a local network do not know the public Internet facing ip of the network so they ask a STUN/TURN server (that's connected directly to the Internet) for their public Internet ip and port opened in the router. Relay: These are generated the same way as a Server Reflexive candidate. The query message is sent to the TURN server creating a NAT binding (local ip & ports+remote ip & port pair) in the router. Because the NAT is symmetric only the TURN server can communicate back with the initiating computer/device so the TURN server returns its own ip (and a port) back as an ICE candidate. Thus the other WebRTC endpoint will attempt to connect to the ip of the TURN server and not to the actual ip of the other endpoint which is why it is called a relay candidate. Communicating with the STUN/TURN servers is the 2nd point where the WebRTC connection process might fail. Here are three (3) additional reasons that a connection failure may occur: 1. The default STUN/TURN ports are blocked; 2. All UDP ports are blocked; 3. The STUN/TURN protocols are blocked.

Port Blocking

Remember it was recommended that signalling be done over port 80 or 443? Well, STUN and TURN have their own (different) default ports. The default port for sending (or listening to) STUN/TURN requests is 3478. The default port for sending (or listening to) STUN/TURN over TLS is 5349. Some servers like Google's generic STUN servers use other ports like 19305 and 19307. Any of the ports mentioned above could be blocked for either of the two peers trying to connect to each other. In such a case the STUN/TURN servers cannot be reached resulting in no srflx or relay candidates. To avoid this such issues, one could use common ports for them STUN/TURN servers (443/80) but UDP & protocol blocking still remain.

UDP Blocking

By default STUN/TURN messages travel over UDP which means a (corporate) firewall which barely allows for DNS queries using port 53 to function over UDP will not permit STUN/TURN messages to pass through. Luckily STUN/TURN servers can also be communicated with using TCP by specifying the transport parameter in the URL like so:

turn:myTurnServer.com?transport=tcp

The above basically tells the WebRTC client "for this TURN/STUN server, connect over TCP instead of UDP". You can also specify udp (the default value) or tls.

STUN/TURN Blocking

An even worse scenario that one could encounter is when the STUN/TURN protocol messages are blocked altogether. For example we've found that Tunnel Bear VPN blocks STUN/TURN packets because they can expose your real ip even if you're connecting through a VPN. In this case there is not much that you can do except correctly identifying the issue and instruct the user to disable such apps during WebRTC calls.

Step 3: Establishing the Connection

Once each WebRTC endpoint learns where the other party can be found at (ip:port ICE candidates) the peer 2 peer connection can be established.

FIG. 56 is a flowchart illustrating a non-limiting preferred embodiment of the Three Types of ICE Candidates. FIG. 56 shows establishing a WebRTC Connection, Step 3: Direct Peer 2 Peer Connection, Step 1: Signaling, with addressing: 192.168.0.1; 91.82.97.1:45132; 116.43.21.5:61319; 192.168.1.1; 192.168.0.12; 192.168.1.34; Step 2: Discovery, a direct peer 2 peer WebRTC connection established after signaling and ICE discovery.

Figure 57:
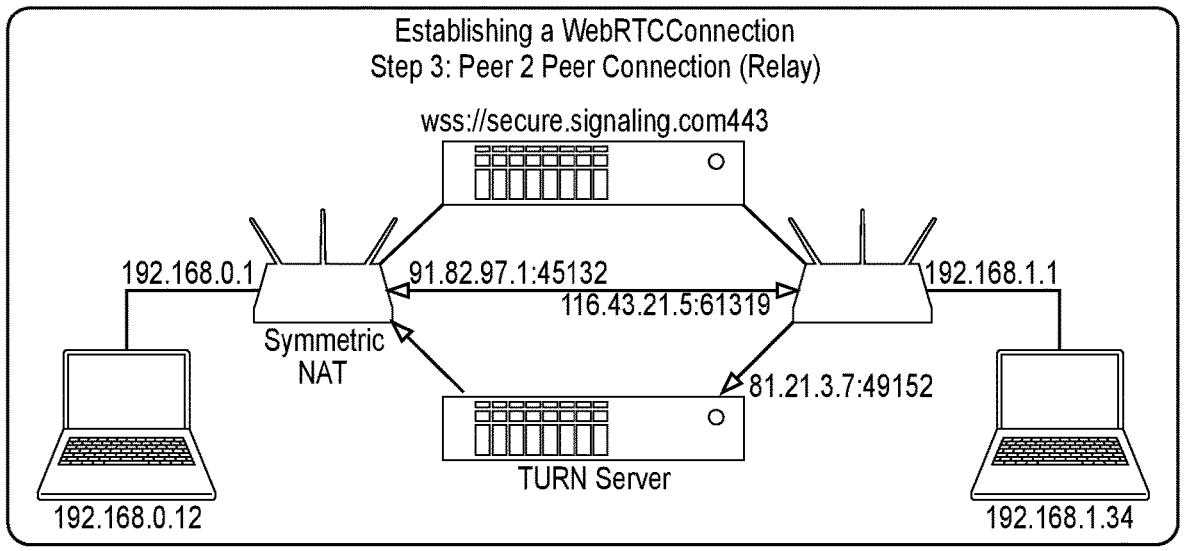
FIG. 57 is a flowchart illustrating a non-limiting preferred embodiment of the Peer Behind a Symmetric NAT Using a TURN relay server to communicate.

Referring now to FIG. 57, with some WebRTC use cases like video recording the endpoint will act as both a signaling server and as an WebRTC endpoint. This is the case for most media server gateways including Janus and Kurento.

Each client will send the data through UDP to the other endpoint: If it is sending directly to the other party (to a host of srflx candidate) it will send to any port in the 0-65535 range; If it is sending to a TURN server (to a relay candidate) it will send to a port between 49152-65535. There is no way to control these ports, they will be allocated during the discovery phase and are part of the ICE candidates.

FIG. 57 is a flowchart illustrating a non-limiting preferred embodiment of the Peer Behind a Symmetric NAT Using a TURN relay server to communicate. FIG. 57 shows establishing a WebRTC Connection, Step 3: P2P Connection (Relay), using addressing: wss://secure.signaling.com:443; 192.168.0.1; 91.82.97.1; 116.43.21.5:61319; 192.168.1.1; 192.168.0.12; 81.21.3.7:49152; 192.168.1.34

TURN Server

When one of the peers is behind a symmetric NAT a TURN relay server can be used to communicate with it. Important aspects include: 1. The port number used for signaling is not necessarily the same as the port number used to communicate with the STUN or TURN servers and is not the port number used to send data between WebRTC peers, once the connection is established. 2. To ensure signaling will always work make sure it takes place over common ports like 443/80. 3. Communication with STUN/TURN servers can be blocked using port blocking, UDP blocking and STUN/TURN protocol blocking. 4. The STUN & TURN protocols can more easily be blocked than websocket communications which are just upgraded HTTP calls. 5. The ultimate fallback method that can be used for very restrictive networks (e.g. UDP blocked and symmetric NAT) is to configure a Turn server to be accessible over TLS on port 443 or TCP over port 80.

Figure 58:
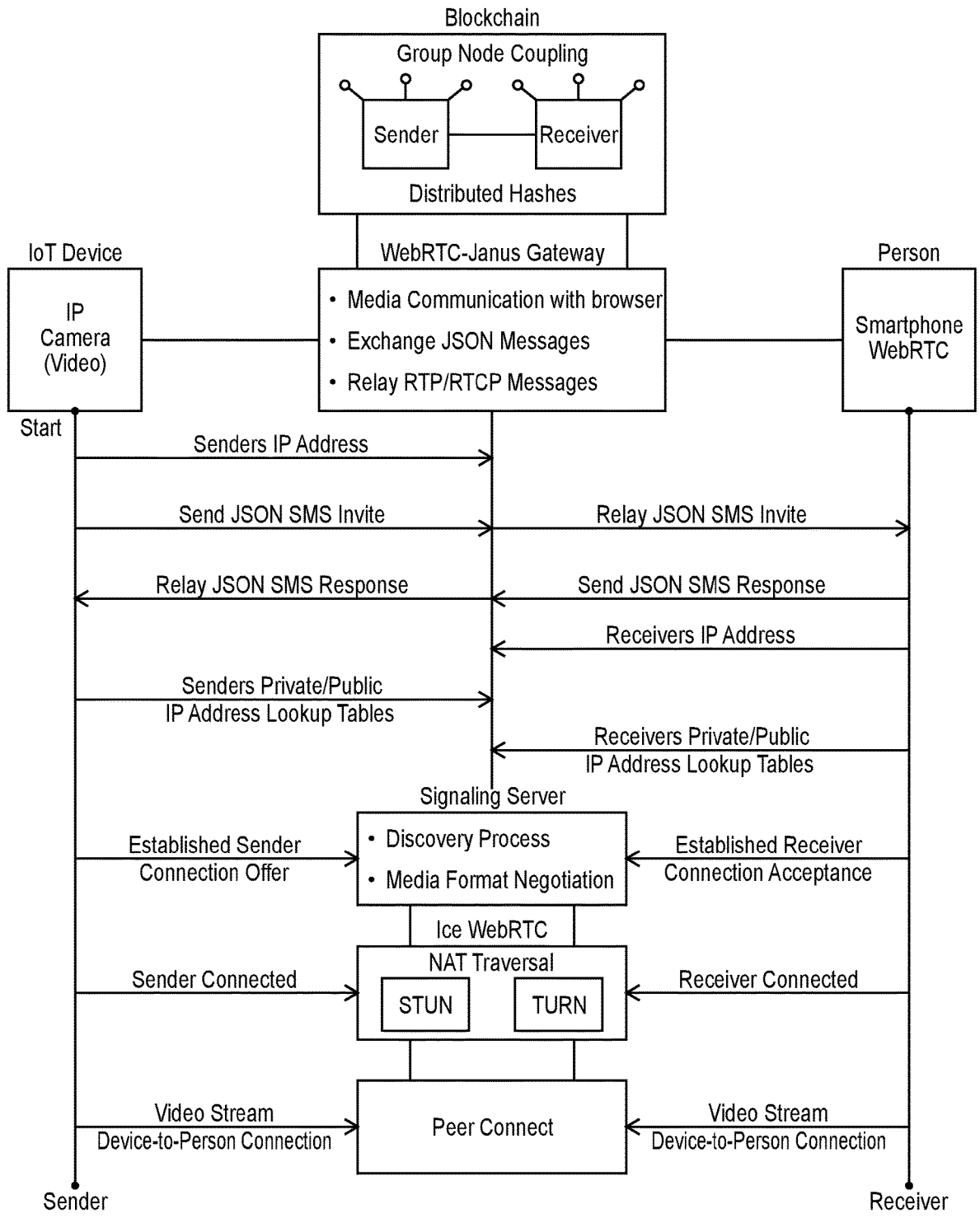
FIG. 58 is a flowchart illustrating a non-limiting preferred embodiment of the WebRTC Device-to-Person Discovery and Signaling Workflow Diagram.

Referring now to FIG. 58, (12) WebRTC Device—to Person Discovery, Signaling and ICE candidates. This section provides a method and system to connect IoT devices-to-person (smartphone) over WebRTC. The following Figures and Diagrams illustrate the workflow and network configurations to establish a P2P WebRTC real time connection between IoT devices and persons.

FIG. 58 is a flowchart illustrating a non-limiting preferred embodiment of the WebRTC Device-to-Person Discovery and Signaling Workflow Diagram. FIG. 58 shows WebRTC Device-To-Person Discovery and Signaling, having a Blockchain Module/Platform providing Group Node Coupling to connect between Sender and Receiver using Distributed Hashes.

FIG. 58 shows IoT Device, e.g. IP Camera (Video) connected to WebRTC—Janus Gateway, which provides Media Communication with the Browser, Exchange JSON Messages, and Relay RTP/RTCP Messages.

FIG. 58 shows a Person/Smartphone with WebRTC connecting using the following steps: Senders IP Address from IoT to WebRTC-Janus Gateway; Sen JSON SMS Invite from IoT to WebRTC-Janus Gateway; Relay JSON SMS Invite from WebRTC-Janus Gateway to Person; Send JSON SMS Response from the Person to the WebRTC-Janus Gateway; Relay JSON SMS Response from the WebRTC-Janus Gateway to the IoT, along with the Receivers IP Address; Senders Private/Public IP Address Lookup Tables in the WebRTC-Janus Gateway; Receivers Private/Public IP Address Lookup Tables in the WebRTC-Janus Gateway; Establish Sender Connection Offer from the IoT to the Signaling Server for the Discovery Process, and Media Format Negotiation; Establish Receiver Connection Acceptance from the Person to the Signaling Server; Sender and Receiver Connected to the ICE WebRTC Server, using NAT Traversal, and STUN TURN; Established Peer Connection for Video Stream Device-to-Person Connection—Sender IoT to Receiver.

Figure 59:
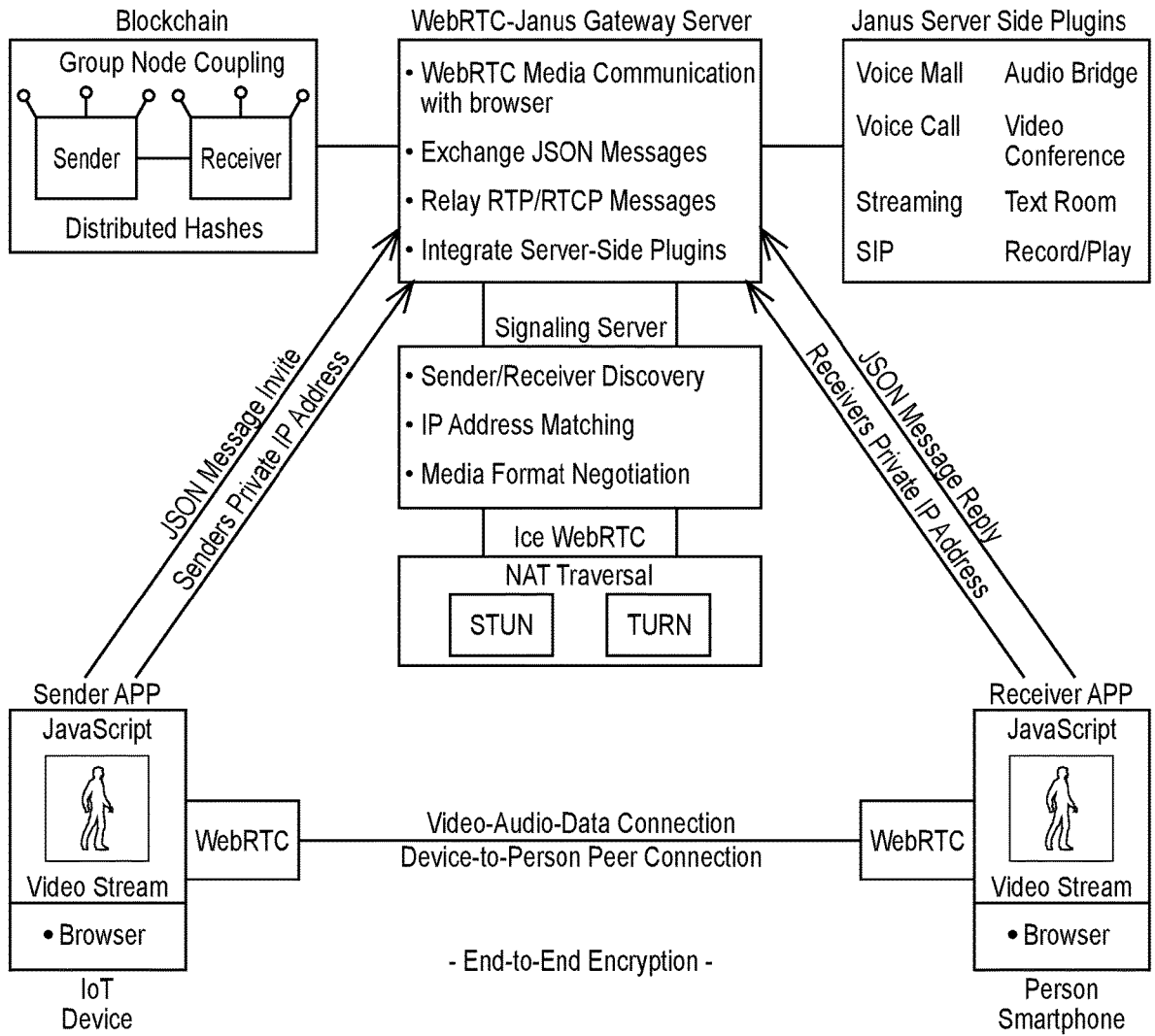
FIG. 59 is a flowchart illustrating a non-limiting preferred embodiment of the Network Diagram of WebRTC Apps, Janus Gateway, Blockchain, Janus Plugins, and End-to-End Encryption (E2EE).

FIG. 59 is a flowchart illustrating a non-limiting preferred embodiment of the Network Diagram of WebRTC Apps, Janus Gateway, Blockchain, Janus Plugins, and End-to-End Encryption (E2EE). FIG. 59 shows the Network Diagram—WebRTC Apps—Janus Gateway—Blockchain—Janus Plugins—E2EE.

FIG. 59 shows the Blockchain module/platform having Group Node Coupling and Sender/Receiver Distributed Hashes connected to WebRTC—Janus Gateway Server. The WebRTC-Janus Server providing WebRTC Media Communications with the Browser, the Exchange of JSON Messages, the Relay of RTP/RTCP Messages, and Integration of Server-side Plugins. The Janus Server Side Plugins provide: Voice mail; Avido Bridge; Video call; Video Conf.; Streaming; Text Room; SIP; Record/Play.

FIG. 59 shows the WebRTC—Janus Gateway Server connected to the Sender and Receiver Apps using the JSON Message Invite/Reply, and exchange of the Sender & receiver Private IP Address. The WebRTC—Janus Gateway Server is also connected to the Signaling Server for Sender/Receiver Discovery, IP Address Matching, Media Format Negotiation. The ICE WebRTC provides the NAT Traversal and any STUN/TURN needs.

Figure 60:
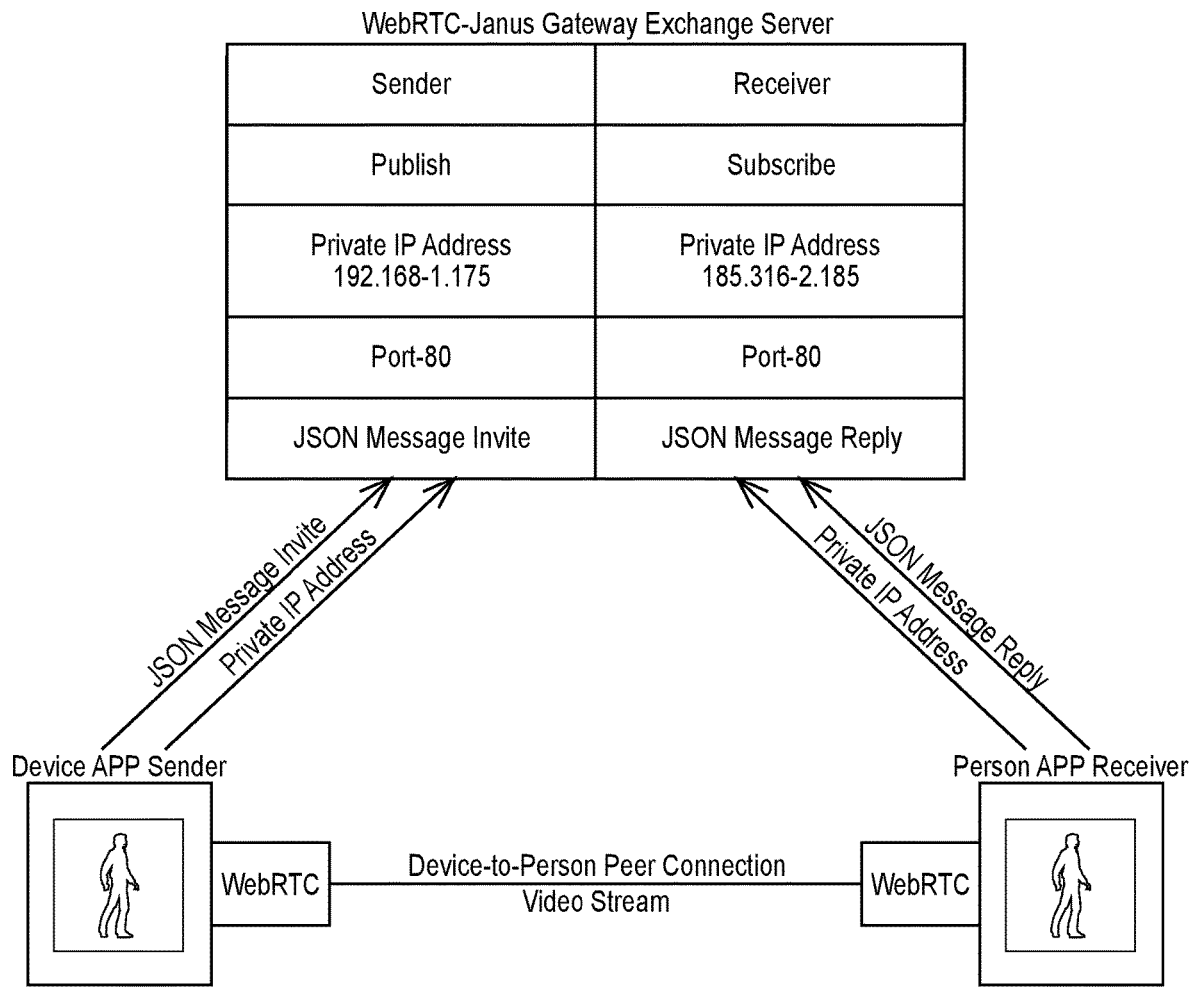
FIG. 60 is a flowchart illustrating a non-limiting preferred embodiment of the WebRTC Gateway Exchange Server to Establish Video with WebRTC Apps.

FIG. 60 is a flowchart illustrating a non-limiting preferred embodiment of the WebRTC Gateway Exchange Server to Establish Video with WebRTC Apps. FIG. 60 shows the WebRTC Gateway Exchange Server to Establish Video with WebRTC Apps where the WebRTC Janus Gateway Exchange Server connects the Sender and Receiver.

Figure 61:
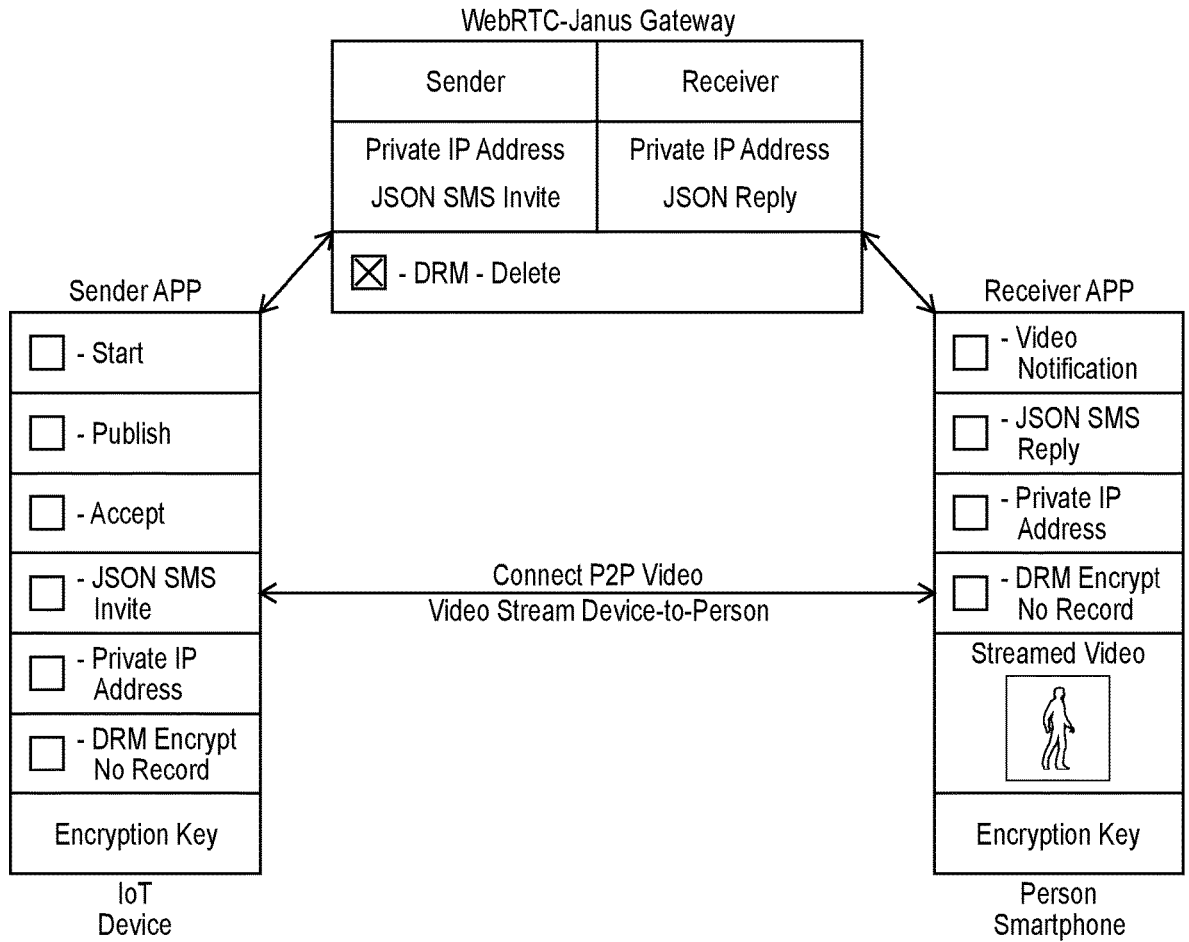
FIG. 61 is a flowchart illustrating a non-limiting preferred embodiment of the WebRTC Apps and Janus Gateway Server used to Establish a Secure Video Stream.

FIG. 61 is a flowchart illustrating a non-limiting preferred embodiment of the WebRTC Apps and Janus Gateway Server used to Establish a Secure Video Stream. FIG. 61 shows the WebRTC Apps—Janus Gateway Server to Establish a secure Video Stream where the WebRTC—Janus Gateway manages Sender/Receiver Private IP Address exchange and JSON SMS Invite and JSON Reply.

Figure 62:
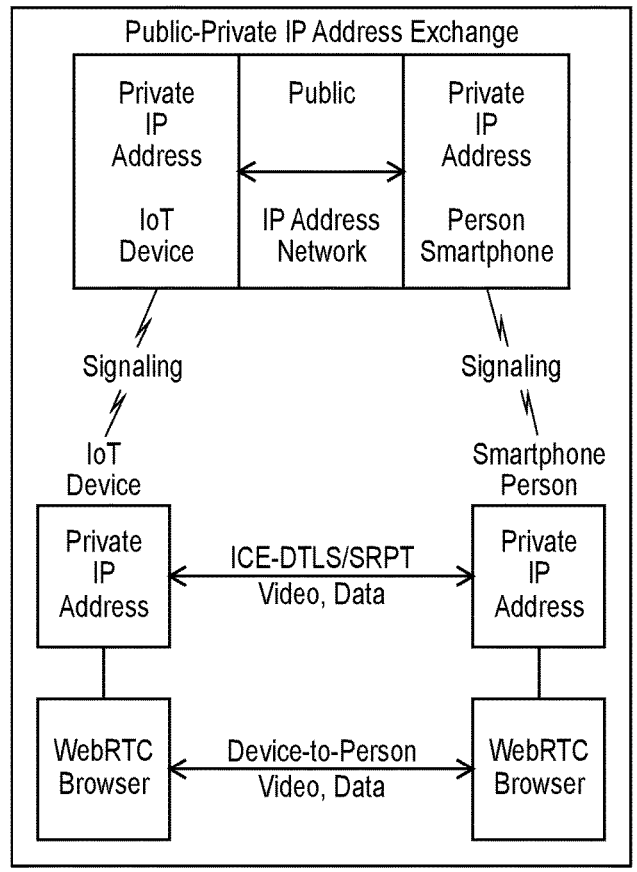
FIG. 62 is a flowchart illustrating a non-limiting preferred embodiment of the WebRTC Signaling and Network Address Translation.

FIG. 61 shows that a Connection for P2P Video, Video Stream Device-to-Person starts with the Sender App on the IoT Device using a Start function, a Publish function, an Accept function, a JSON SMS Invite, a Private IP Address send feature, a DRM Encrypt No Record, and an Encryption Key FIG. 61 shows a similar process for the Receiver App, including Video Notification, JSON SMS Reply, Private IP Address, DRM Encrypt No Record, receiving Streamed Video, using an Encryption Key, for a Receiver such as a Person—Smartphone FIG. 62 is a flowchart illustrating a non-limiting preferred embodiment of the WebRTC Signaling and Network Address Translation. FIG. 62 shows WebRTC Signaling and Network Address Translation where WebRTC Signaling Servers with Static (Map) Network Address Translation (NAT), and a Signaling Server Establishes a Websocket Connection between the IoT device and person using Static Network Address Translation (NAT).

FIG. 62 shows the Public-Private IP Address Exchange by sharing the Private IP Address of the IoT Device over the Public IP Address Network with the Smartphone and receiving the Private IP Address Person Smartphone. Once the Private IP Addresses are known and connected the WebRTC Browser provides Device-to-Person (Video, Data).

Figure 63:
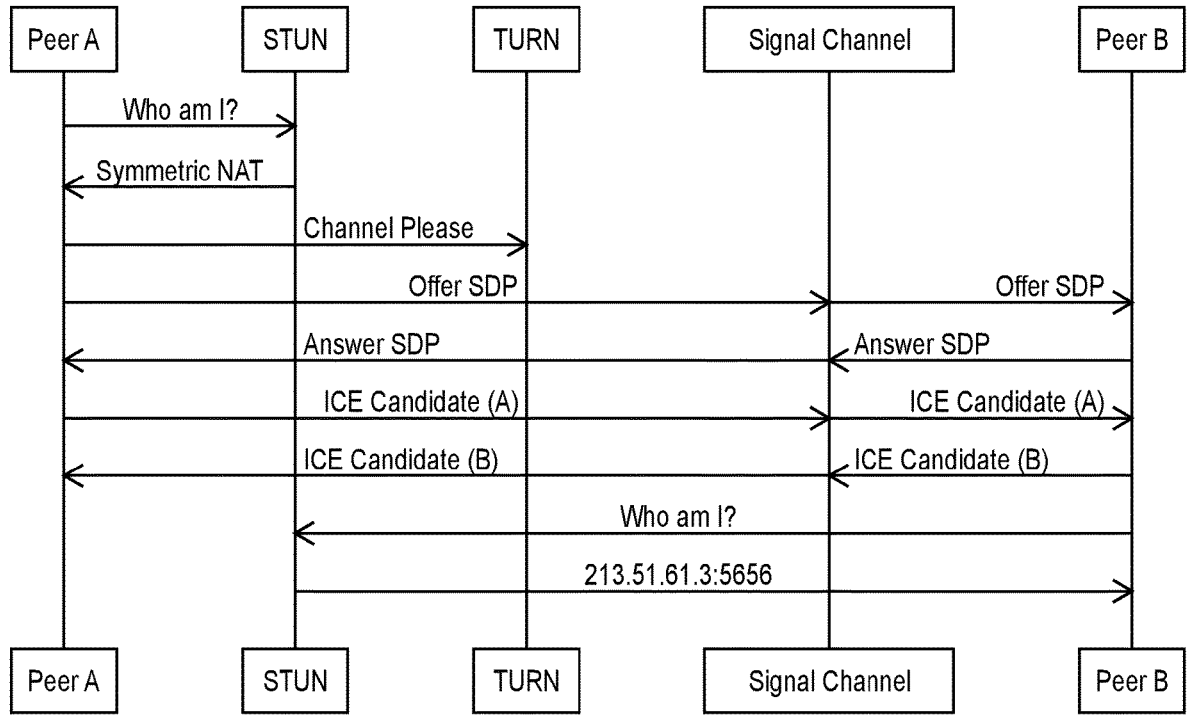
FIG. 63 is a flowchart illustrating a non-limiting preferred embodiment of the ICE Candidates Offer/Answer and SDP for Peer A and Peer B.

FIG. 63 is a flowchart illustrating a non-limiting preferred embodiment of the ICE Candidates Offer/Answer and SDP for Peer A and Peer B. FIG. 63 shows the following steps. 613.

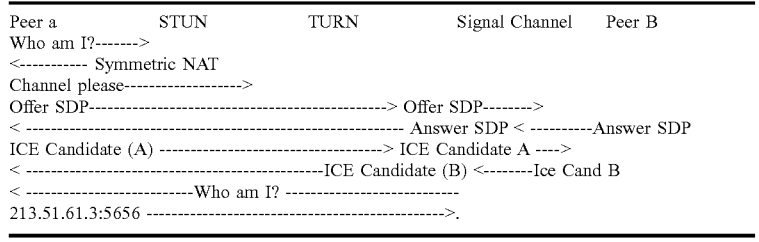

```
Peer a              STUN              TURN              Signal Channel    Peer B
Who am I?------->
<----------- Symmetric NAT
Channel please------------------>
Offer SDP----------------------------------------------> Offer SDP-------->
< ------------------------------------------------------ Answer SDP < ----------Answer SDP
ICE Candidate (A) ---------------------------------> ICE Candidate A ---->
< ----------------------------------------------ICE Candidate (B) <--------Ice Cand B
< -------------------------Who am I? -------------------------
213.51.61.3:5656 ----------------------------------------------->.
```

WebRTC Security Issues: Signaling Server

There are a number of ways that a browser based P2P communications application such as WebRTC may impose server security risks, especially the interception of unencrypted data or media streams during transmission or when decrypted out middlebox server points in a P2P configuration including signaling server, ICE servers (STUN server & TURN servers) and with Selective Forwarding Units (SFU's). The main security issue is with a man-in-the-middle (MiTM) cyber attack and theft of private IP addresses and unencrypted data and streamed video sessions while traversing middlebox network servers. This can occur between browser-to-browser or browser-to-server communications with eavesdropping third parties able to see all sent data including IP addresses, voice conversations, and video streams. TLS is the de-facto standard for Web encryption using HTTPS. But as discussed earlier, WebRTC uses DTLS with less than reliable Datagram transport such as UDP and with the implementation of DTLS to generate encryption keys for SRTP media sessions, where normal protections from TLS encryption are not available.

Man-in-the-Middle (MiTM) Middlebox Security Concerns

WebRTC is encrypted by design, using DTLS to exchange encryption keys (and encrypt data channel messages), and SRTP to exchange real-time audio and video streams. As such, each Peer Connection established between two peers is secure (the P2P one-to-one scenario) The moment you add a server to the mix, including a signaling server, ICE servers (STUN and TURN servers) and a Selective Forwarding Unit (SFU), media is not peer-to-peer anymore: you are sending media to a server, and the server sends the media on to other peers. So it's the peers in the media conversation that change—that is if a server is handling the media, WebRTC requires that Peer Connections connect directly to the server, not the other peer. This means that, in the simple 1-1 peer to peer video/audio call case, two separate and independent Peer Connections are established: Connection between the caller and server; Connection between the server and callee. As such, both connections are secure, but only up to or from the server since the server terminates the DTLS connectivity and as a result the server has access to the unencrypted media and any other PII information, including private IP addresses.

Signaling Server

WebRTC uses a signaling server network to establish a websocket connection between peer-to-peer users. A form of discovery and media format negotiation must take place in order for the two devices (i.e. 2 Android or iOS devices) on different networks to locate one another. This process is called signaling and involves both devices connecting to the mutually agreed-upon signaling server. A signaling server's function is to serve as an intermediary to allow the two peers to find and establish a connection while minimizing exposure of potentially private information. However, in order to complete a secure connection between 2 peers, the signaling server decrypts the sender's private IP address and exchanges it with a public IP address to route the audio or video call to the receiver. As a result, both the sender and receiver's private IP address is exposed (unencrypted) and is subject to a Man-in the Middle (MiTM) attack whereby the private IP information and other PII information of both users is now compromised.

Figure 64:
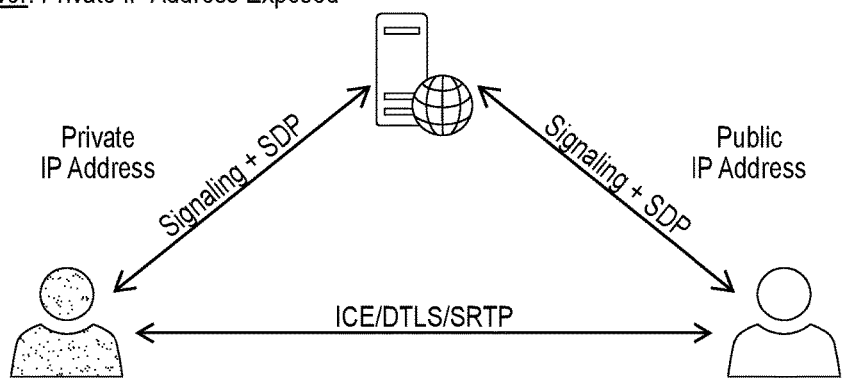
FIG. 64 is a flowchart illustrating a non-limiting preferred embodiment of the WEBRTC MIddlebox Server Exposing a Private IP Address.

FIG. 64 is a flowchart illustrating a non-limiting preferred embodiment of the WEBRTC Middlebox Server Exposing a Private IP Address. FIG. 64 shows how a WebRTC Middlebox Server may Expose Private IP Addresses.

Figure 65:
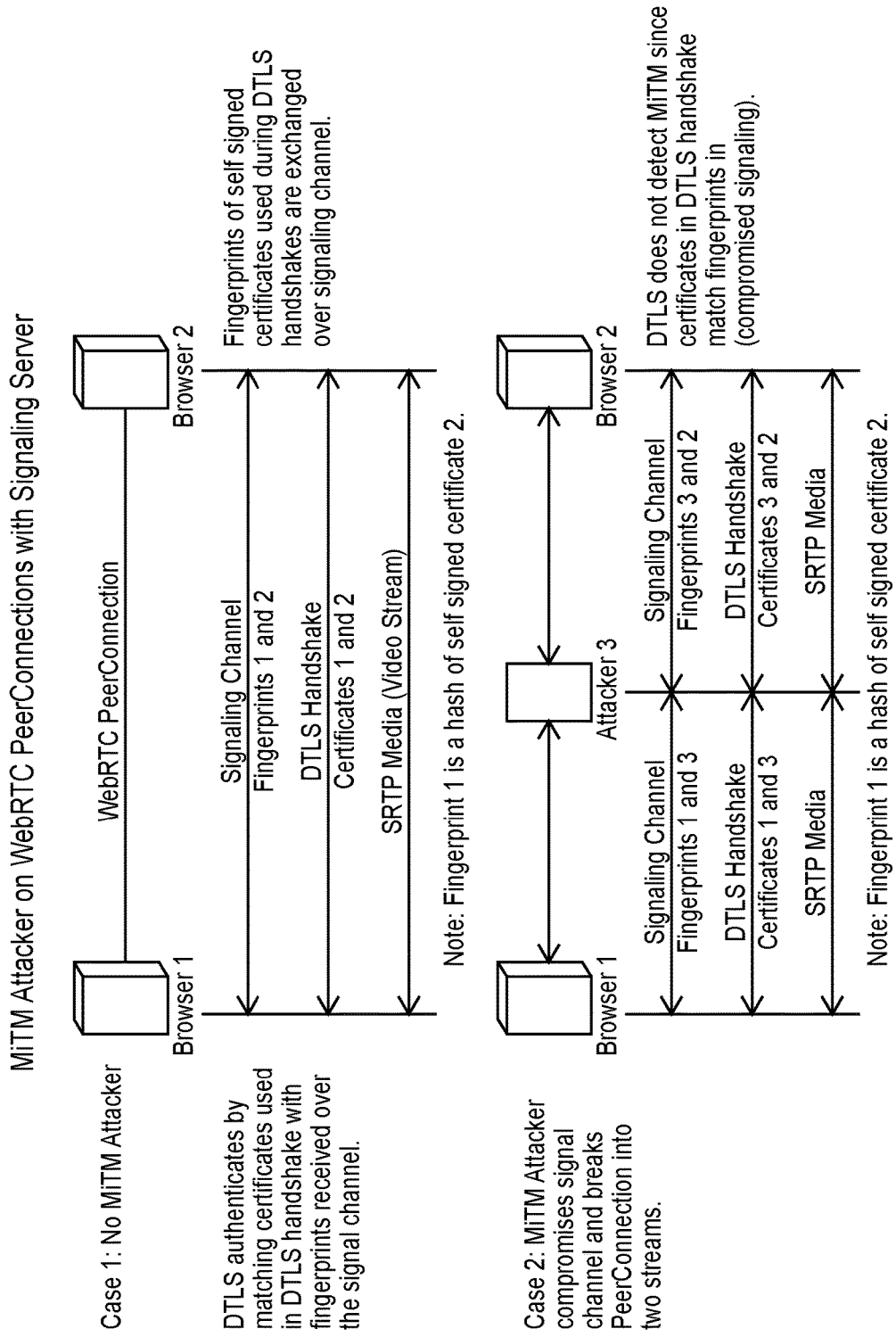
FIG. 65 is a flowchart illustrating a non-limiting preferred embodiment of the Man-in-the-Middle (MITM) Attacker on WebRTC Peer Communications with a Signaling Server.

FIG. 65 is a flowchart illustrating a non-limiting preferred embodiment of the Man-in-the-Middle (MITM) Attacker on WebRTC Peer Communications with a Signaling Server. FIG. 65 shows how an MiTM attack on WebRTC Peer Connections with Signaling Server can be made.

Case 1: No MiTM Attacker
  Browser 1—WebRTC Peer Connection
  Browser 2—DTLS Authenticates by matching certificates used in DTLS handshake with fingerprints received over the signal channel
  Signaling Channel—(Fingerprints 1 and 2)
  DTLS Handshake—Certificates 1 and 2
  SRTP Media (Video Stream)
  Note: Fingerprint 1 is a hash of self signed certificate 2.
  Fingerprints of self-signed certificates used during DTLS handshake are exchanged over the signaling channel.
Case 2: MiTM Attacker Compromises Signal Channel and Breaks Peer Connection into Two Streams
  Browser 1—Attacker 3—Browser 2
  Signaling Channel: (Fingerprints 1 and 3)—(Fingerprints 3 and 2)
  DTLS Handshake: (Certificates 1 and 3)—(Certificates 3 and 2)
SRTP Media
  DTLS does not detect MiTM since certificates in DTLS Handshake match fingerprints in (compromised signaling).
Peer Connections Using ICE Protocol—STUN and TURN Servers ICE (Interactive Connectivity Establishment) is used to discover which IP addresses can connect to each other and the method used to make that connection through a typical NAT (Network Address Translation) which is a method of remapping an IP address space into another by modifying network address information in the IP header of packets while they are in transit across a traffic routing device. ICE uses both STUN and TURN servers to resolve the public IP address of a device running behind a NAT and to solve problems such as one-way audio during a phone call or streamed video between 2 or more peers. STUN messages are usually sent in User Datagram Protocol (UDP) packets. Since UDP does not provide reliable transport guarantees, reliability is achieved by application-controlled retransmissions of the STUN request. Since WebRTC users DTLS versus TLS, the connection with a STUN server may or may not be always encrypted. Once a session between peer A and peer B, for P2P communications, Session Initiation Protocol (SIP) and Session Description Protocol (SDP) are used. Since the STUN isn't always encrypted, it is easy for a MiTM attack to be executed thus obtaining the users private IP addresses and other personal identifiable info. The sessions between both peers will be end-to-end encrypted regardless of your secured/unsecured connection with STUN. This P2P ICE/STUN/TURN—Audio and streamed video connection process is widely used.

FIG. 66 is a flowchart illustrating a non-limiting preferred embodiment of the ICE Servers exposing unencrypted video/audio/data streams. FIG. 66 shows how the WebRTC Middlebox Server may Expose Video Streams, which is usually accepted as a major security risk with WebRTC browser based P2P communications.

Selective Forwarding Unit (SFU)

WebRTC has settled on the SFU as the preferred method of extending WebRTC to multiparty conferencing including simulcast and multicast. SFU's enable the deployment of P2P streamed video in efficient and scalable hub and spoke technologies with low latency and high quality videos. In the SFU architecture, every participant (peer) sends their media stream to a centralized server (SFU) and receives streams for all other participants via the SFU. The SFU does not need to decode and re-encode received streams, but simply acts as a forwarder of streams between call participants. The main advantage of the SFU architecture is the ability to work with Asymmetric Bandwidth or (higher down Ii k bandwidth than uplink bandwidth), which makes it suitable for mobile communications. The problem with SFU is that they do not support E2D media encryption, as the media server terminates the encryption once it receives the media stream and has direct access to it. This represents a serious blocker for the usage of off-the-shelf SFU's for WebRTC applications.

FIG. 67 is a flowchart illustrating a non-limiting preferred embodiment of the Selective Forwarding Unit for Multiparty conferences, simulcast, and multicast videos. FIG. 67 shows how Selective Forwarding Unit (SFU): Multiparty Conferences, Simulcast and Multicast videos—Little to no security Insertable Media Streams for SFU Video Conferencing WebRTC mandates encryption using DTLS-SRTP for encrypting the media. DTLS-SRTP works by using a DTLS handshake to derive keys for encrypting the media payload of the RTP packets. It is authenticated by comparing fingerprints in the SDP (Session Description Protocol) that are exchanged via the Signaling server with the fingerprints of the self-signed certificates used in the handshake. This is often called E2E encryption since the negotiated keys do not leave the local device (Signaling Server) and the browser does not have access to them. However, without authentication it is still vulnerable to MiTM attacks focusing on Private IP address theft.

Another unsecure part of media servers are the SFU's. FSU's are packet routers that forward a single or small set of media streams from one user to many other users (typically up to 50 users). In terms of encryption, DTLS-SRTP negotiation happens between each peer endpoint and the SFU. This means that the SFU has access to the unencrypted payload and can listen in. This is necessary for features like server-side recording. On the security side, it means you need to trust the entity running the SFU and/or the client code (vodo App) to keep the stream private. Zero trust is always the best policy.

Unlike a VoIP Multipoint Control Unit (MCU) which decodes and mixes media, a SFU only routes packets. It ignores the media content (except header information and whether a frame is a key frame). So a SFU is not required to decode and decrypt the media stream data.

So what is required and proposed here is to implement a "frame encryption" approach built on a JavaScript API to solve this problem—which is referred to here as Insertable Media Streams. This approach works as follows:
1. Opens two connections;
2. Applies the encryption on both connections based on a simple XOR cipher, an additive cipher (an encryption algorithm) that operates as follows:

$$A \oplus O = A$$

$$A \oplus A = A$$

$$(A \oplus B) \oplus C = A \oplus (B \oplus C)$$

$$(B \oplus A) \oplus A = B \oplus O = B$$

Where $\oplus$ denotes the exclusive disjunction (XOR) operation and is applied to the content which contains the encryption key;
3. Only decryption on one of them.

The transform function is then called for every video frame. This includes an encoder frame object and a controller object. The controller object provides a way to pass the modified frame to the next step. The frame header is not required to be encrypted.

The insertable media stream API operates between the encoder/decoder and the packetizer that splits the frames into RTP packets. In summary, this is a sophisticated API for inserting frame encryption which in the case of insertable streams needs to be asynchronous.

Figure 68:
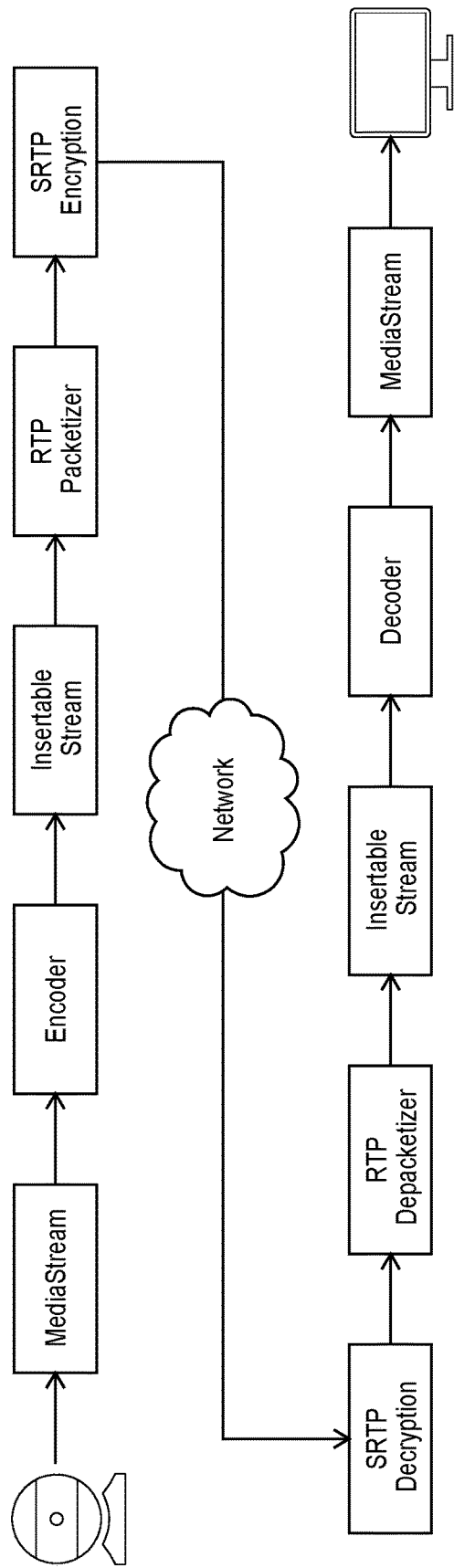
FIG. 68 is a flowchart illustrating a non-limiting preferred embodiment of the Insertable Media Streams for Media Conferencing with an SFU.

FIG. 68 is a flowchart illustrating a non-limiting preferred embodiment of the Insertable Media Streams for Media Conferencing with an SFU. FIG. 68 shows the Insertable Media Streams for Media Conferencing with an SFU. FIG. 68 shows the MediaStream going to the Encoder to create the Insertable Stream, which is then sent to the RTP packetizer, and the SRTP encryption, before transmission over the Network, and then reverse processing of the SRTP decryption, RTP depacketizer, Insertable Stream, Decoder, to output the MediaStream.

Figure 69:
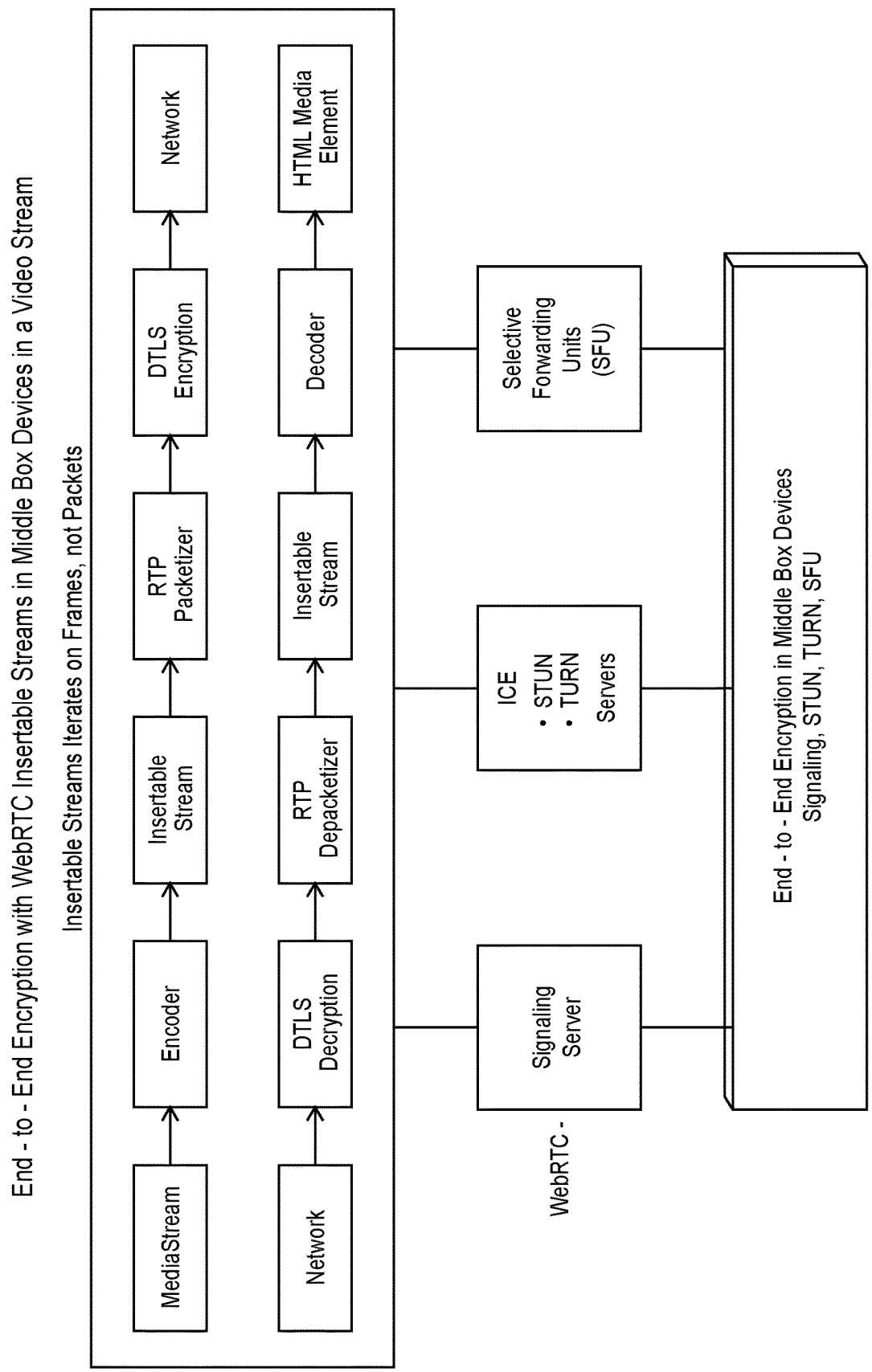
FIG. 69 is a flowchart illustrating a non-limiting preferred embodiment of the End-to-End Encryption with WebRTC Insertable Streams in Middle Box Devices in a Video Stream.

FIG. 69 is a flowchart illustrating a non-limiting preferred embodiment of the End-to-End Encryption with WebRTC Insertable Streams in Middle Box Devices in a Video Stream. FIG. 69 shows End-to-End Encryption with WebRTC Insertable Streams in Middle Box devices in a video stream where Insertable Streams Iterates on Frames, not Packets, and comprising the components for MediaStream, Encoder, Insertable Stream, RTP packetizer, DTLS encryption, Network, DTLS decryption, RTP depacketizer, Insertable Stream, Decoder, and HTML Media Element.

FIG. 69 shows the WebRTC Signaling Server, the ICE server(s), e.g. STUN, TURN and the Selective Forwarding Units (SFU) managing to provide End-to-End Encryption in Middle Box Devices (signaling, STUN, TURN, SFU).

Distributed Trust Platform—Cryptography

For video streaming, video conferencing and audio communication over a browser based (WebRTCP P2P network, it is imperative to augment certain deficiencies with Datagram Transport Layer Security (DTLS) and Real-Time Transport Protocol (Secure RTP) to provide strong end-to-end security guarantees. This section defines and explains a Distributed Trust Platform that consists of: AES 256 Galois/ Counter Mode (GCM) encryption, Elliptical-Curve Diffie Hellman (ECDH) encryption, Homomorphic encryption, Key Management System for Encryption, Hardware Security Module (HSM), and Cryptographic Data Splitting.

Figure 70:
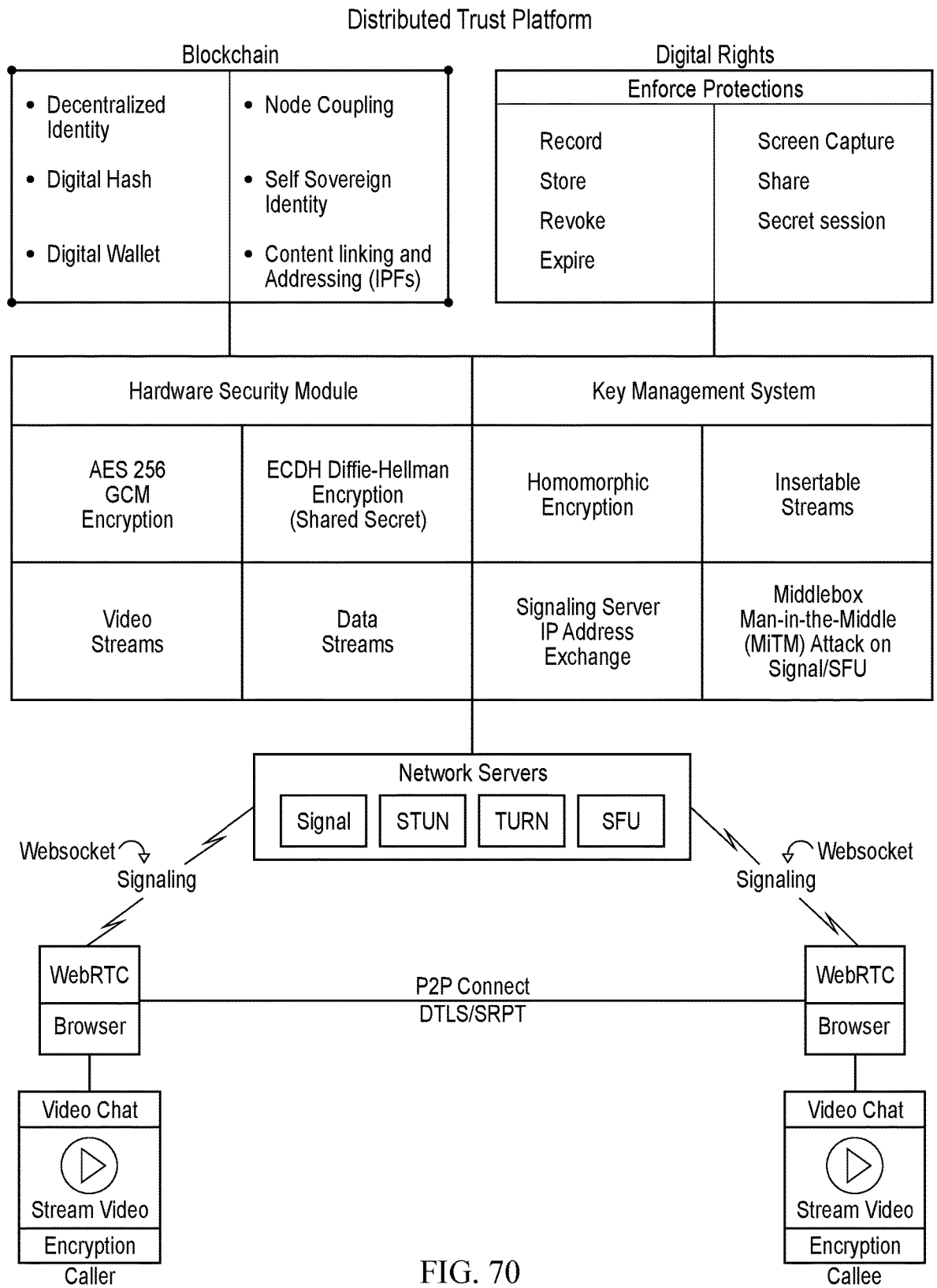
FIG. 70 is a flowchart illustrating a non-limiting preferred embodiment of the Distributed Trust Platform.

FIG. 70 is a flowchart illustrating a non-limiting preferred embodiment of the Distributed Trust Platform. FIG. 70 shows the Distributed Trust Platform having the Blockchain and the Digitals Rights modules. The Blockchain comprises Decentralized Identity, Digital Hash, Digital Wallet, Node Coupling, Self Sovereign Identity, and Content Linking and Addressing (IPFS). The Digital Rights module provides Enforcement of Protections, e.g. Record, Store, Revoke, Expire, Screen capture, Share, Secret Session.

FIG. 70 shows the Hardware Security Module and the Key Management System. The HSM comprises AES 256 GCM Encryption, ECDH Diffie-Hellman Encryption (shared secret), Video Streams, and Data Streams. The Key Mgmt System provides Homomorphic Encryption, Insertable Streams, Signaling Server IP Address Exchange, and Middlebox Man-in-the-Middle (MiTM) A Hack on Signal/ SFU.

FIG. 70 also shows the Network Servers for Signaling, and Discovery STUN TURN, and SFU. FIG. 70 shows the Caller and Callee Apps connecting through their browsers using WebRTC to obtain a Websocket connection to the Cloud Servers to establish the P2P connection, and to perform user lookup and exchange of IP, to provide encrypted content, and so forth.

AES 25E GCM

AES with Galois/counter mode (AES-GCM)—is a mode of operation for symmetric key cryptography block ciphers—provides both authenticated encryption and the ability to check the integrity and authentication of additional authenticated data (AAD) that is sent to the clear. These are four inputs for authenticated encryption: the secret key, initialization vector (called nonce), the plaintext and optional additional authentication data (AAD). The nonce and AAD are passed in the clear. These are two outputs; the ciphertext, which is exactly the same length as the plaintext, are an authentication tag (the "tag"). The tag is sometimes called the message authentication code (MAC) or integrity check value (ICV).

ECDH—Elliptical Curve Diffie Hellman

Elliptical Curve Diffie Hellman (ECDH) is a key agreement protocol that allows two parties, each having an elliptic-curve public-private key pair, to establish a shared secret over an insecure channel. This shared secret may be directly used as a key, or to derive another key. The key or the derived key, can then be used to encrypt subsequent communications using a symmetric-key cipher. It is a variant of the standard Diffie-Hellman protocol using elliptic-curve cryptography (ECC). ECC is a public-key cryptography based on the algebraic structure of elliptical curves over finite fields. Elliptical curves can be used for encryption by combining the key agreement (key exchange system) with a symmetric encryption scheme.

Homomorphic Encryption

Homomorphic encryption solves a vulnerability inherent in all other approaches to data protection. Homomorphic encryption (HE) is a form of encryption allowing one to perform calculations on encrypted data without decrypting it first. The result of the computation is in an encrypted form, when decrypted the output is the same as if the operations had been performed on the unencrypted data.

In a nutshell, homomorphic encryption is a method of encryption that allows any data to remain encrypted while it is being processed and manipulated. It enables a third party (such as a video streaming service) to apply functions on encrypted data without needing to reveal the values of the data. A homomorphic cryptosystem is like other forms of public encryption in that it uses a public key to encrypt data and allows only the individual with the matching private key to access its unencrypted data (though there are also examples of symmetric key homomorphic encryption as well). However, what sets it apart from other forms of encryption is that it uses an algebraic system to allow you or others to perform a variety of computations (or operations) on the encrypted data.

Homomorphic encryption is a form of encryption with an additional evaluation capability for computing over encrypted data without access to the secret key to decrypt the encrypted data. The result of such a computation remains encrypted.

Applying HE to WebRTC signaling which requires both the caller and callee to upload their private IP address to the signaling server so that a media session (video streaming) can be routed and traversed over the public IP network using a public IP address. In this way both the caller's and callee's private IP addresses are never decrypted or exposed to MiTM attack.

There are two main types of homomorphic encryption. The primary difference between them boils down to the types and frequency of mathematical operations that can be performed on their ciphertext. The two types of homomorphic encryption include: Partially Homomorphic Encryption, and Fully Homomorphic Encryption.

Partially homomorphic encryption (PHE) helps sensitive data remain confidential by only allowing select mathematical functions to be performed on encrypted values. This means that one operation can be performed an unlimited number of times on the ciphertext. Partially homomorphic encryption (with regard to multiplicative operations) is the foundation for RSA encryption, which is commonly used in establishing secure connections through SSL/TLS. A partial HE scheme can also support limited operations such as addition and multiplication up to a certain complexity because most complex functions typically require significant computing capability and computation time.

Key Management System (KMS)

Encryption key management is administering the full lifecycle of cryptographic keys. This includes: generating, using, storing, archiving, and deleting of keys. Protection of the encryption keys includes limiting access to the keys physically, logically, and through user/role access.

There is an entire physical and digital cryptosystem that must be accounted for as well as each key's full lifecycle. Therefore, a robust encryption key management system and policies includes: Key lifecycle: key generation, pre-activation, activation, expiration, post-activation, escrow, and destruction; Physical access to the key server(s); Logical access to the key server(s); and User/Role access to the encryption keys.

Asymmetric Keys: Data-In-Motion

Asymmetric keys are a pair of keys for the encryption and decryption of the data. Both keys are related to each other and created at the same time. They are referred to as a public and a private key. Public Key: this key is primarily used to encrypt the data and can be freely given as it will be used to encrypt data, not decrypt it. Private Key: this key is used to decrypt the data that its counterpart, the public key, has encrypted. This key must be safeguarded as it is the only key that can decrypt the encrypted data.

Asymmetric keys are primarily used to secure data-in-motion. An example might be a streamed video where an AES symmetric session key is used to encrypt the data and a public key is used to encrypt the session key. Once the encrypted data is received, the private key is used to decrypt the session key so that it can be used to decrypt the data.

Asymmetric Key System Flow Process

The Sender and Recipient verify each other's certificates: The sender sends a certificate to the recipient for verification; The recipient then checks the certificate against their Certificate Authority (CA) or an external Validation Authority (VA) for authentication; Once the sender's certificate has been verified, the recipient then sends their certificate to the sender for authentication and acceptance. Once the sender and recipient have mutual acceptance: The sender requests the recipient's public key; The recipient sends their public key to the sender; The sender creates an ephemeral symmetric key and encrypts the file to be sent. (an ephemeral symmetric key is a symmetric encryption key used only for one session); The sender encrypts the symmetric key with the public key; The sender then sends the encrypted data with the encrypted symmetric key; The recipient receives the packet and decrypts the symmetric key with the private key; and The recipient decrypts the data with the symmetric key.

Figure 71:
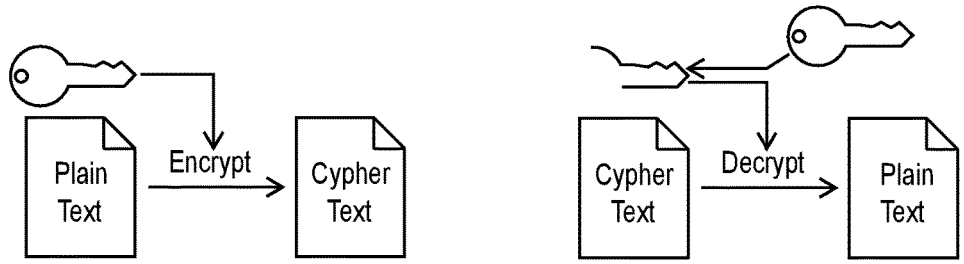
FIG. 71 is a flowchart illustrating a non-limiting preferred embodiment of the Hardware Security Module.

FIG. 71 is a flowchart illustrating a non-limiting preferred embodiment of the Hardware Security Module. FIG. 71 shows an Asymmetric Key Flowchart having Plain text, Encrypt, Decrypt, Cypher text.

Hardware security module (HSM) is a physical computing device that safeguards and manages digital keys, performs encryption and decryption functions for digital signatures, strong authentication and other cryptographic functions. These modules traditionally come in the form of a plug-in card or an external device that attaches directly to a computer or network server. A hardware security module contains one or more secure cryptoprocessor chips Cryptographic splitting, also known as cryptographic bit splitting or cryptographic data splitting, is a technique for securing data over a computer network. The technique involves encrypting data, splitting the encrypted data into smaller data units, distributing those smaller units to different storage locations, and then further encrypting the data at its new location. With this process, the data is protected from security breaches, because even if an intruder is able to retrieve and decrypt one data unit, the information would be useless unless it can be combined with decrypted data units from the other locations.

Figure 72:
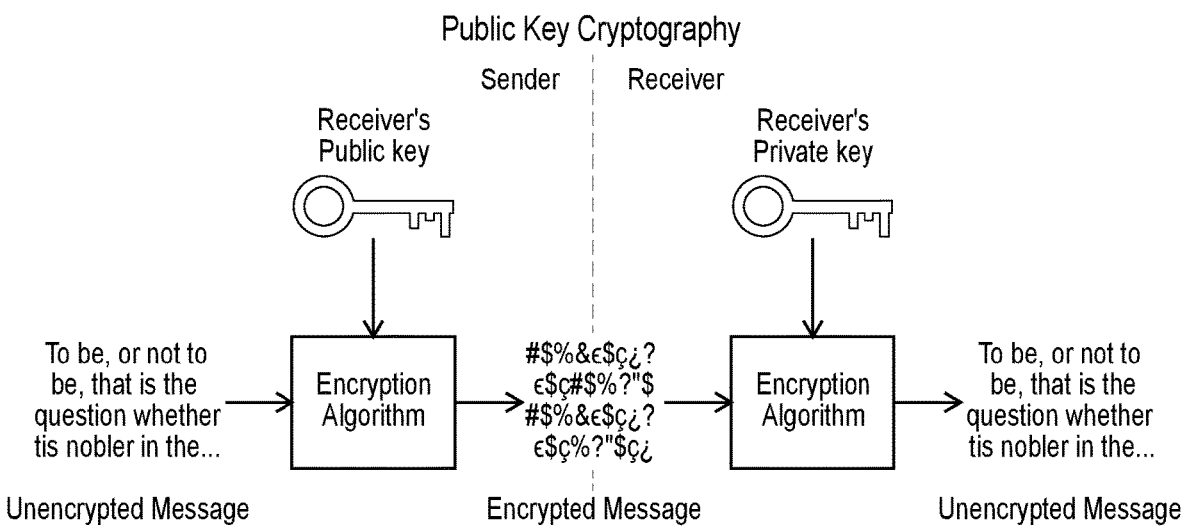
FIG. 72 is a flowchart illustrating a non-limiting preferred embodiment of the Public Key Cryptography.

FIG. 72 is a flowchart illustrating a non-limiting preferred embodiment of the Public Key Cryptography. FIG. 72 illustrates Public Key Cryptography having a Sender, Receiver, Receiver's Public Key, Receiver's Private Key, Unencrypted message, and Encryption Algorithm. FIG. 72 shows unencrypted message sent to the encryption algorithm to create an encrypted message using the receiver's public key, and which message is decrypted using the receiver's private key.

Figure 73:
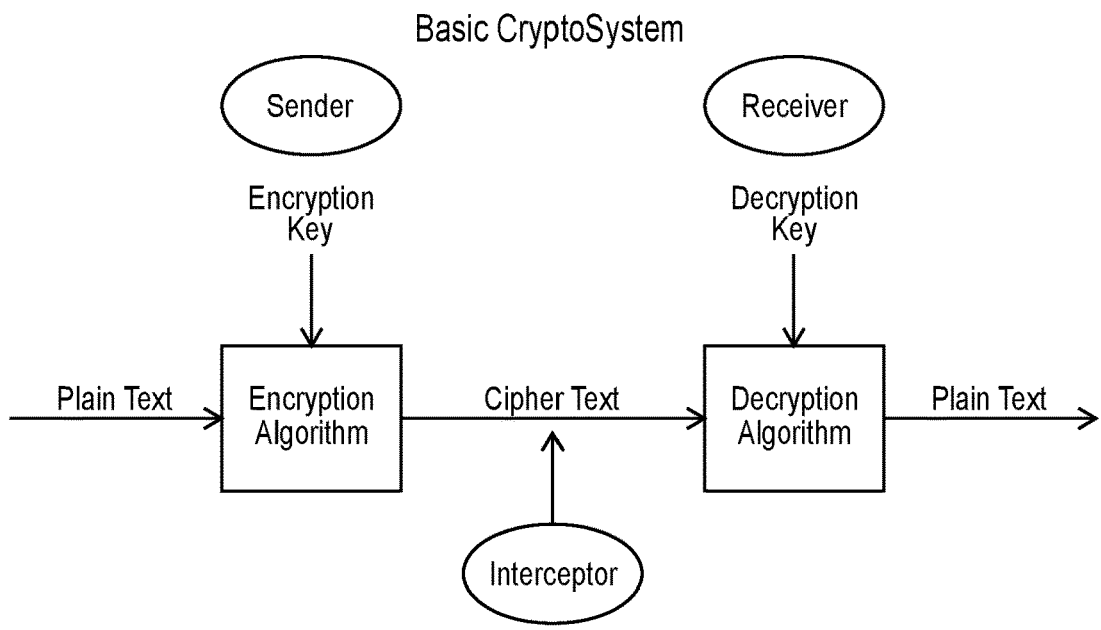
FIG. 73 is a flowchart illustrating a non-limiting preferred embodiment of the Basic Crypto System.

FIG. 73 is a flowchart illustrating a non-limiting preferred embodiment of the Basic Crypto System. FIG. 73 shows the Basic CryptoSystem having a Sender, Receiver, Encryption Key, Decryption Key, ciphertext, plaintext, Encryption Algorithm, Decryption Algorithm, and possible Interceptor.

Figure 74:
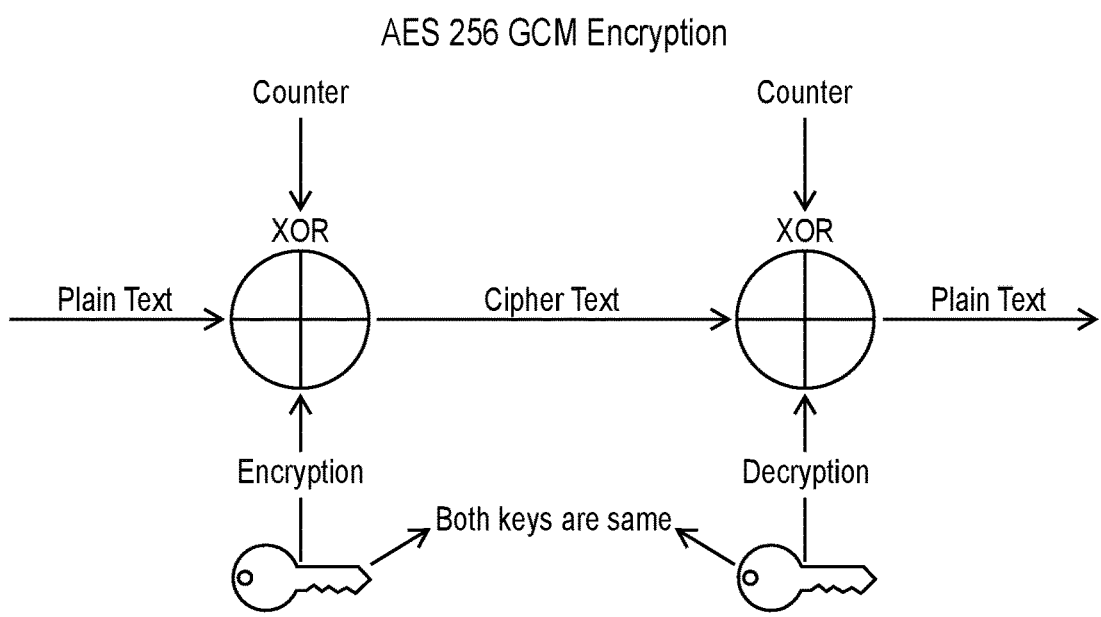
FIG. 74 is a flowchart illustrating a non-limiting preferred embodiment of the AES 256 GCm Encryption.

FIG. 74 is a flowchart illustrating a non-limiting preferred embodiment of the AES 256 GCM Encryption.

Figure 75:
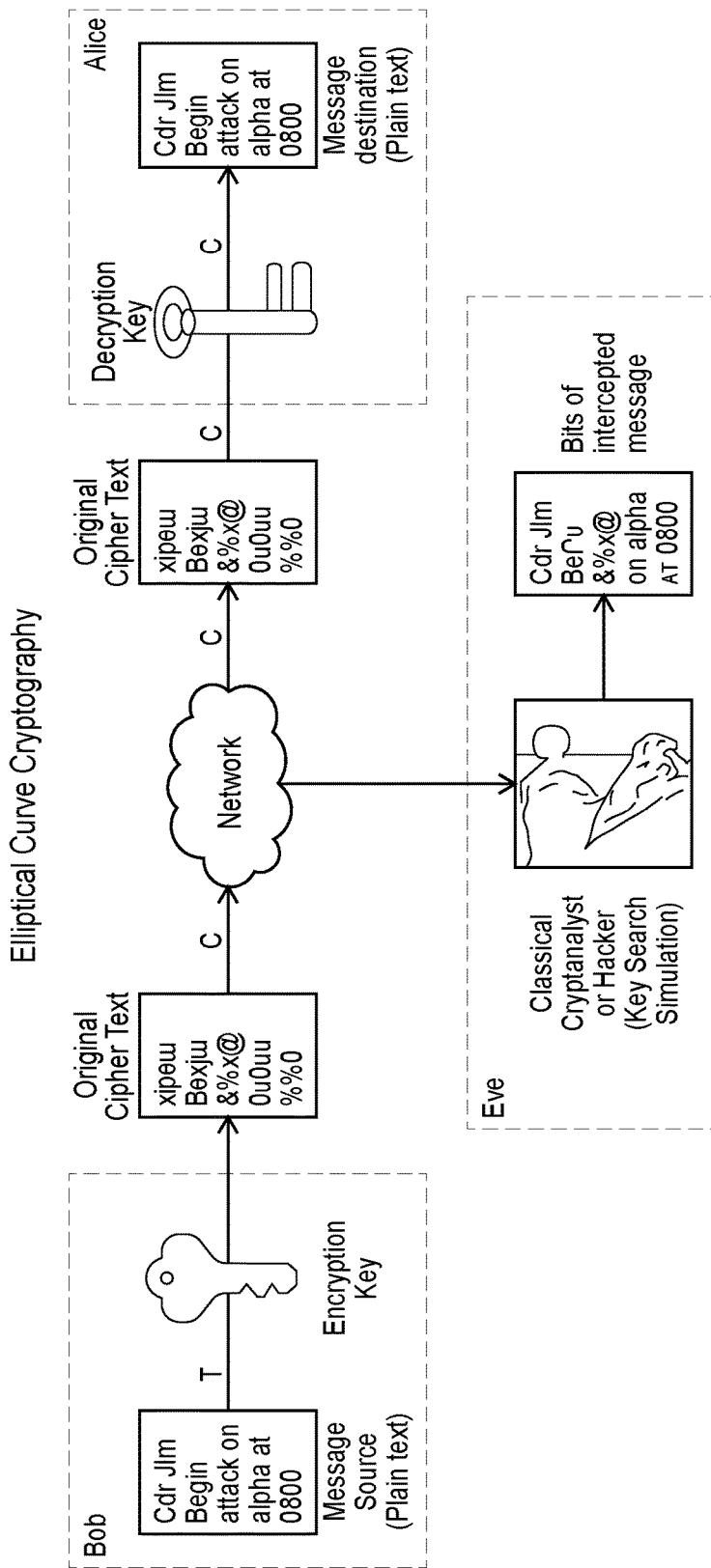
FIG. 75 is a flowchart illustrating a non-limiting preferred embodiment of the Insertable Media Streams for media Conferencing with an SFU.

FIG. 75 is a flowchart illustrating a non-limiting preferred embodiment of the Insertable Media Streams for media Conferencing with an SFU. FIG. 75 illustrates Elliptical Curve Cryptography.

Private Blockchain with Distributed Hash Tables, Group Node Coupling and Permissions Based Security (DRM)

A private blockchain is an invitation-only network governed and controlled by a single (or group) entity. Entrants to the blockchain network require permission to join, read, write and participate in the blockchain. There are different levels of access, and the information is encrypted to protect the commercial services confidentiality. The SRTC system described in this patent has implemented a permissioned based blockchain (private blockchain) that deploys an access control layer to govern who has access to the network and users (subscribers) on the private blockchain network are vetted and controlled by the network rules.

The SRTC blockchain contains a growing list of records (transactions) referred to as blocks that are linked using cryptography (encryption). Each block contains a cryptography (encryption). Each block contains a cryptographic hash of the previous blocks (a time stamp) and transaction data (metadata), represented as a Merkle tree.

Figure 76:
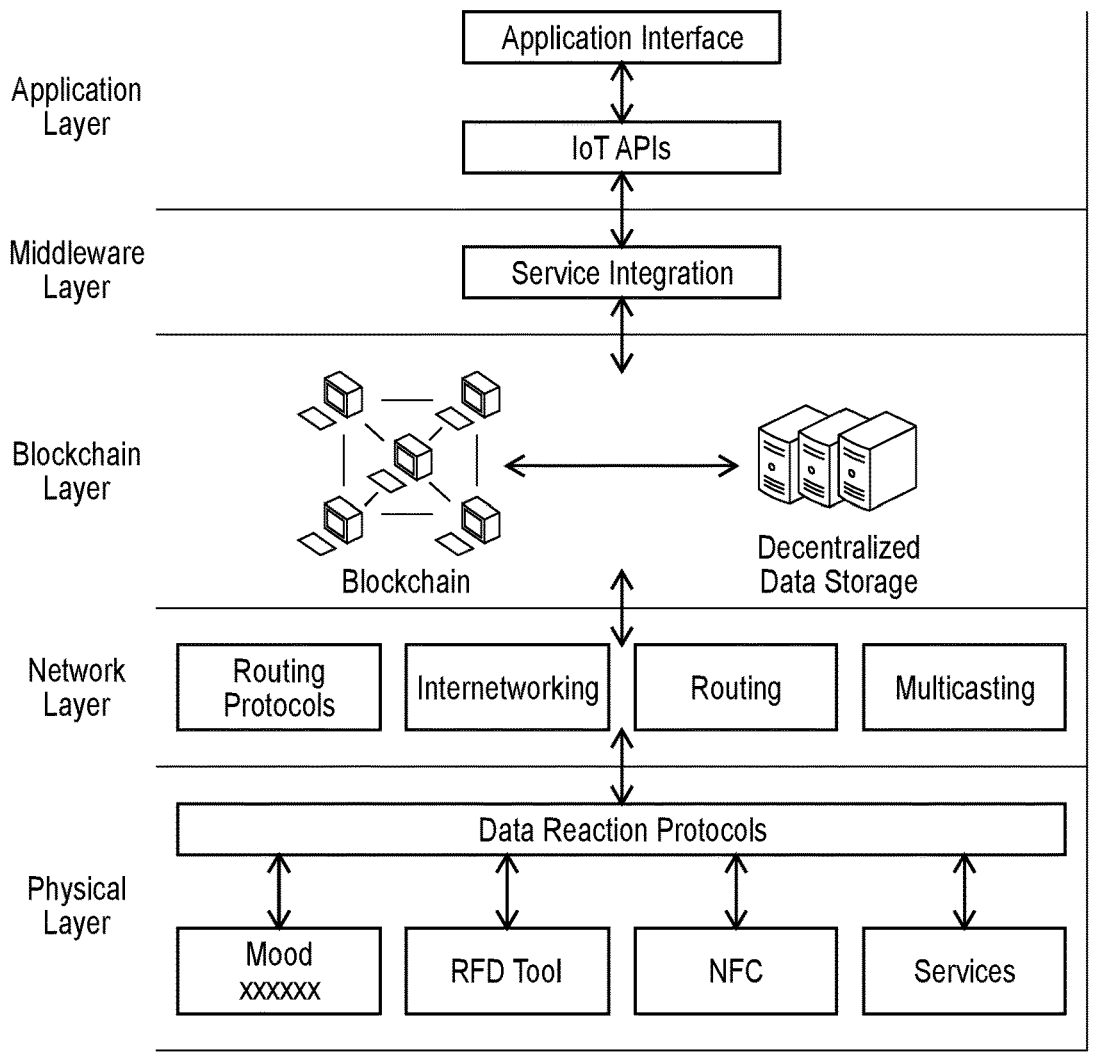
FIG. 76 is a flowchart illustrating a non-limiting preferred embodiment of the IoT Applications in a Blockchain System.

FIG. 76 is a flowchart illustrating a non-limiting preferred embodiment of the IoT Applications in a Blockchain System. FIG. 76 shows IoT Applications in Blockchain System. At the Application Layer, there is the Application interface and IoT APIs. At the Middleware Layer, there is Service Integration. At the Blockchain Layer, there is Blockchain and Decentralized data storage. At the Network Layer, there are Routing protocols, Inter-networking, Routing, and Multicasting. At the Physical Layer, there are Data Collection Protocols.

Distributed Ledger Technology (DLT)

SRTC deploys Distributed Ledger Technology (DLT) for recording "transactions" or video and audio chats in which the transactions and their details are recorded in multiple places (multiple nodes) at the same time. Distributed Ledgers have no central data store or administrative functionality which is contrasted with widely used cloud databases such as SQL server. Ledgers are essentially a permanent record of transactions and data. Blockchain, which bundles transactions into blocks that are chained together ("connected"). DLT also has the potential to speed transactions since they remove the road for a central authority. Blockchain technology makes use of cryptography for transactions, security and privacy-preserving protocols. Blockchain cryptography includes public-key cryptography, distributed hashing and Merkle trees.

Group Node Coupling

SRTC deploys blockchain to provide a record of each user's PII (Personal Identifiable Information) including a private IP address and to provide directory searching capability to find and connect 2 or more persons and/or IoT devices to a video/audio/telemetry WebRTC session. This process also includes node addressing, node discovery and group node coupling. A record of each subscriber is created in the blockchain that contains all PII and historical metadata of video/audio/telemetry sessions made with other subscribers (called "buds") in SRTC. A node coupling profile of "Buds" is created which streamlines the blockchain discovery (searching) algorithms to quietly identify and retrieve addressing and linking information to achieve rapid connections between subscribers in the system. WebRTC signaling server is used to connect 2 or more subscribers over the P2P network. As discussed earlier, the signaling server translates each users private IP address to a public IP address to effectuate a connection over the ICE (STUN, TURN) server network. An encrypted websocket connection is made between the user's WebRTC based browser and the signaling server in an encrypted hop-to-hop scenario. SRTCS uniquely deploys homomorphic encryption to extract the private IP addresses of each subscriber without decrypting the private IP address payload in the signaling server. This protects the users from any potential MiTM private IP address impersonation and theft and also provides a true end-to-end encryption implementation without the need to decrypt the users private IP address at the signaling server.

Public-Key Cryptography

An important feature of the SRTCS system is the implementation of public key cryptography with Blockchain. Public-key cryptography (also called asymmetric cryptography) is a cryptographic system that uses a pair of keys—a public key and a private key. The public key may be widely distributed, but the private key is meant to be known only by its owner. Keys are always created in a pair—every public key must have a corresponding private key. Public-key cryptography is most often used for encrypting messages between two people or two computers in a secure way. Anyone can use someone's public key to encrypt a message, but once encrypted, the only way to decrypt that message is by using the corresponding private key.

Let's say Alice wants to send an encrypted message to Bob. It would work like this:

Alice sends the encrypted message to Bob—if a third party intercepted it, all they would see is random numbers and letters.

Bob uses his private key to decrypt and read the message.

Figure 77:
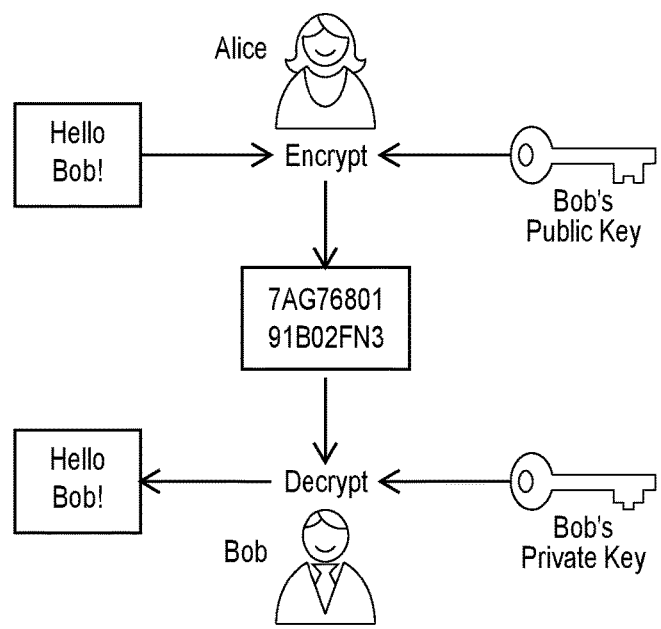
FIG. 77 is a flowchart illustrating a non-limiting preferred embodiment of a non-limiting example of the Public-Key Cryptography.

A diagram illustrating this process is shown below:

FIG. 77 is a flowchart illustrating a non-limiting preferred embodiment of a non-limiting example of the Public-Key Cryptography.

Public-key cryptography is a fundamental element of blockchain technology—it is the underlying technology for transactions. When a user creates a transaction on a blockchain, they are generating a public-private key pair. The address of that transaction, or how it is represented on the blockchain, is a string of numbers and letters generated from the public key. Due to the nature of blockchain technology, this address is public to everyone. The private key associated with a transaction is how to prove ownership and control the transaction. A transaction on the blockchain is nothing more than a broadcasted message of the transaction. Once confirmed, the transaction is immutably written into the ledger, and the metadata is updated. This transaction message also requires a signature from the private key of the sender to be valid. After broadcasting, anyone can use the public key to ensure the digital signature coming from the private key is authentic.

Cryptographic Hashing—Distributed Hash Tables (DHT)

Cryptographic hashing is another fundamental piece of blockchain technology and is directly responsible for producing immutability—one of blockchain's most important features.

Hashing is a computer science term that means taking an input string of any length and producing a fixed length output. It doesn't matter if the input to a certain hash function is 3 or 100 characters, the output will always be the same length. Cryptographic hashing is another fundamental piece of blockchain technology and is directly responsible for producing immutability—one of blockchain's most important features. Cryptographic hash functions are hash functions that have these crucial properties. Deterministic: No matter how many times you give the function a specific input, it will always have the same output. Irreversible: it is impossible to determine an input from the output of the function. Collision resistance: No two inputs can ever have the same output.

Figure 78:
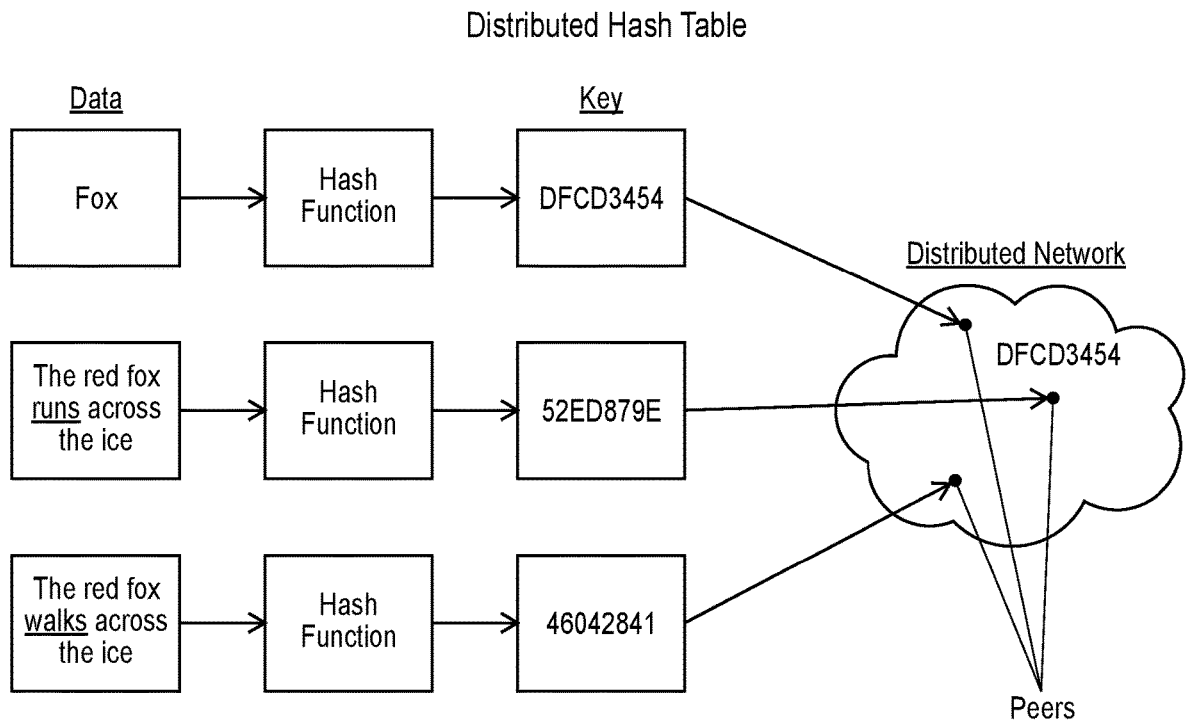
FIG. 78 is a flowchart illustrating a non-limiting preferred embodiment of the Distributed Hash Table.

FIG. 78 is a flowchart illustrating a non-limiting preferred embodiment of the Distributed Hash Table.

Figure 79:
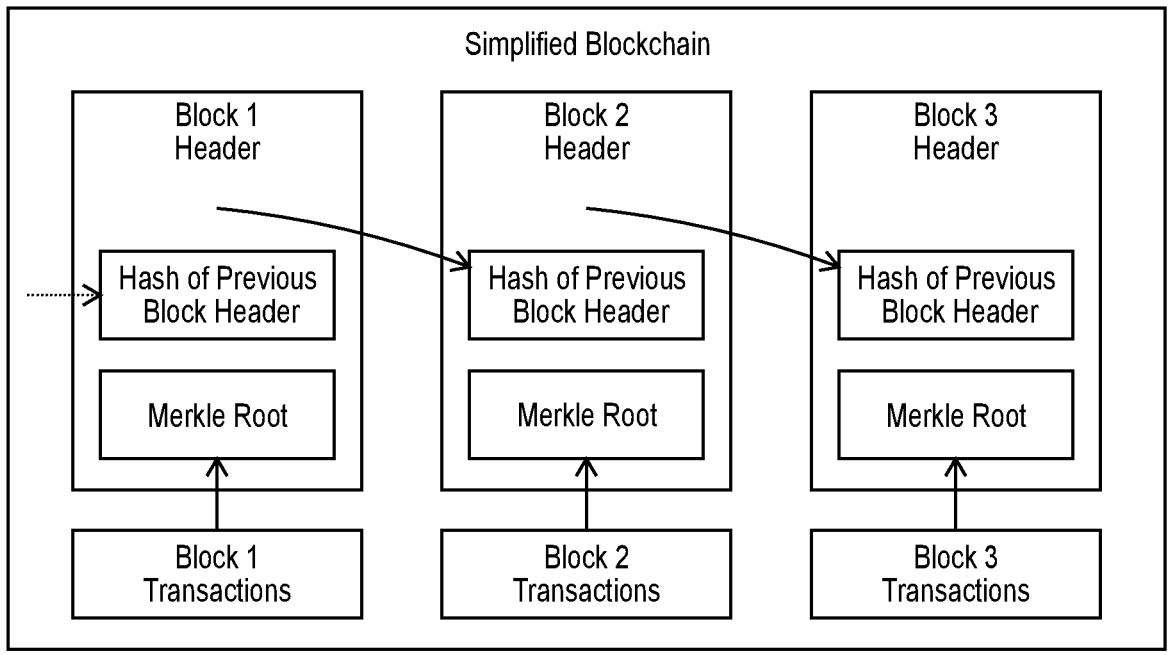
FIG. 79 is a flowchart illustrating a non-limiting preferred embodiment of a Simplified Blockchain.

Another important feature of cryptographic hash functions is that changing any bit of data in the input will drastically alter the output. For example, the hash outputs of 111111 and 111112 would be completely unique and have no relation to each other. So, how does cryptographic hashing enable immutability for blockchain technology? The answer is that every new block of data contains a hash output of all the data in the previous block. Imagine a blockchain that just added its 1000th block. The data from block 999 exists in block 1000 as a hash function output. However, included in block 999's data is a hash of block 998's data, which contains a hash of block 997's data. By traversing the hashes backwards, every block from 1000 to 1 is linked by cryptographic hashing. A diagram of this architecture is shown below:

FIG. 79 is a flowchart illustrating a non-limiting preferred embodiment of a Simplified Blockchain.

This is ultimately what makes the data in a blockchain immutable. If someone tried to change just 1 bit of data in any past block, it would not only alter the hash output of that blocks data, but every block after it.

Merkle Trees

Figure 80:
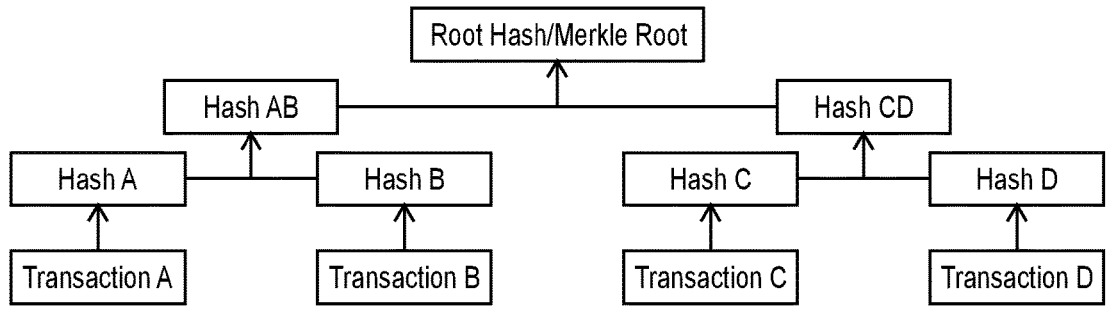
FIG. 80 is a flowchart illustrating a non-limiting preferred embodiment of a Merkle Tree (Root Hash Tree).

The above diagram is a simplified version of a blockchain that leaves out some important information. It has an arrow to show that each block's transactions are stored in a Merkle root, which is the root node of a Merkle tree. A Merkle tree (or hash tree) is a tree that utilizes cryptographic hash functions to store hash outputs instead of raw data in each node. Each leaf node consists of a cryptographic hash of its original data, and every parent node is a hash of the combination of its child node hashes. The Merkle root is simply the root (top) node of a Merkle tree, meaning it represents a hash output of the combined hashes of the left and right sub-trees. A diagram of a Merkle tree with 4 leaf nodes is shown below:

FIG. 80 is a flowchart illustrating a non-limiting preferred embodiment of a Merkle Tree (Root Hash Tree).

Figure 81:
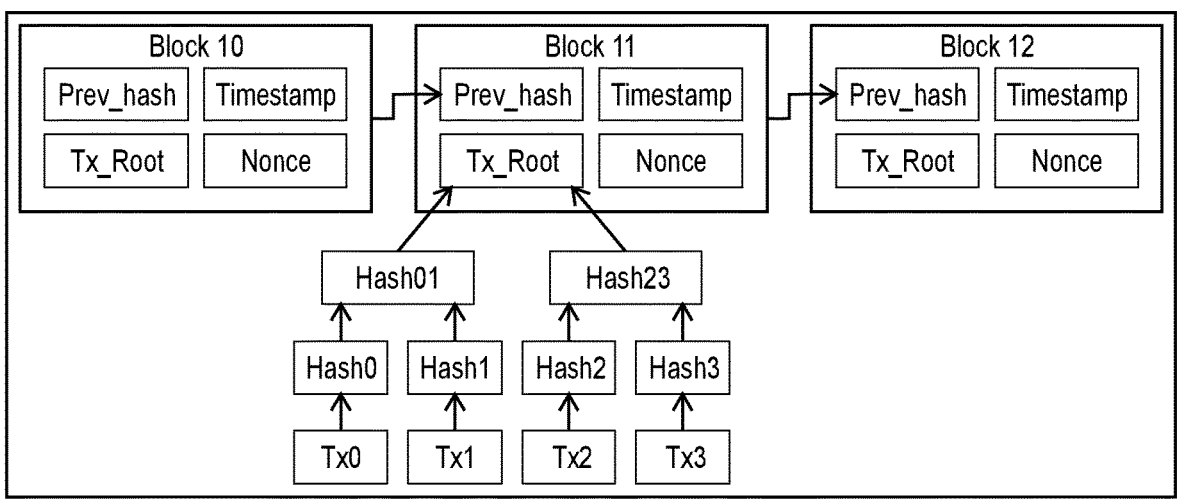
FIG. 81 is a flowchart illustrating a non-limiting preferred embodiment of a non-limiting example of a Merkle tree with 4 transactions.

Each leaf node represents a hash of the data for transactions A, B, C, and D. Then hash A and hash B are combined and hashed to produce hash AB, and hash CD is produced in the same way. Finally, hash AB and hash CD are combined and hashed to form the Merkle root of the tree. So why are Merkle trees important for blockchain technology? Using the Merkle root and applying the properties of cryptographic hash functions, one can quickly tell if transactions in a given block have been tampered with and the specific transaction that is being tampered with. Merkle trees also allow users to verify that their transaction has been included in a block without downloading the entire blockchain. Processes such as Simplified Payment Verification are able to traverse branches in the Merkle tree and check if a certain transaction has been hashed into that tree. This level of efficiency for blockchain technology would be impossible without including a Merkle root in each block. An example Merkle tree of 4 transactions in a blockchain is shown below (in this diagram, Tx_Root is the Merkle root):

FIG. 81 is a flowchart illustrating a non-limiting preferred embodiment of a non-limiting example of a Merkle tree with 4 transactions.

Digital Rights Management (DRM)

DRM provides a permission based security protection system for audio and video which is seamlessly integrated with WebRTC browsers through JavaScript API's. This facilitates Vodeo users to share confidential video streaming content from a browser and to securely capture, record store and share streamed video files for online playback from the cloud based video storage vault. DRM controls user permissions and actions related to content including restrictions on content access and sharing such as: record, forward, save, expire, revoke, erase, watermarks, content disappear, and screenshot disablement. It also provides detailed auditing, tracking and analytics from Blockchain. The DRM implementation also provides security to block screen capture (screen capture disablement) and enforces application blacklisting, a technique used to prevent certain malicious applications and executables from running over browsers. DRM also facilitates the creation of a secret video streaming which allows 2 or more users to initiate a secret session which restricts each participant from recording, copying or playback the streamed video. It also blocks screen capture and allows revocation, expiration with list and blacklist options.

Figure 82:
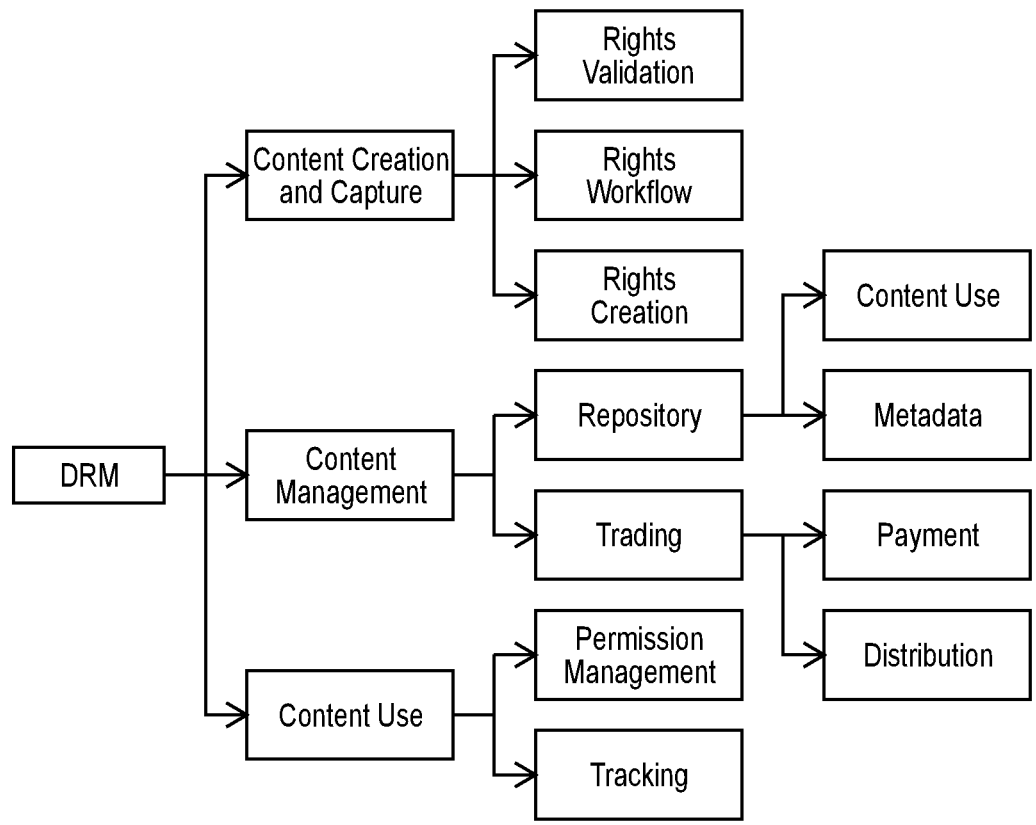
FIG. 82 is a flowchart illustrating a non-limiting preferred embodiment of the DRm Functional Architecture.

FIG. 82 is a flowchart illustrating a non-limiting preferred embodiment of the DRm Functional Architecture. FIG. 82 shows the DRM Functional Architecture to govern DRM over Content Creation and Capture (Rights Validation, Rights workflow, Rights Creation), Content Management (Repository for Content and Metadata, Trading for Payment, Distribution) and Content Use for Permission Management and Tracking.

Digital Rights Management with WebRTC and SRTC

The DRM workflow is a multi-step system process.

(1) Encryption—DRM relies on encrypting to protect the streamed videos and audios and authentication systems to ensure that only authorized users can unlock the video/audio streams from the WebRTC video and audio codecs. The DRM solution scrambles the data in a stream and renders it unviewable to anyone without the appropriate encryption/decryption keys.

(2) Authentication—Authentication is used between the users and the decryption keys to ensure that only people with proper permissions can obtain/execute a decryption key. (See section IV—Self-Sovereign Identity (SSI) for IoT Devices and Systems)

(3) OTT Platform Based Rights Management—Platform-based DRM solutions enable an OTT secure messaging and Real Time Communications Service (SRTC) to playback or restrict playback via streaming or downloading and guard against video/audio/telemetry copying or listening via HDMI outputs and similar other media outputs.

(4) Content Encryption—Encryption based DRM will encrypt the content driving streamed video sessions and on audio calls.

(5) DRM-enabled software embedded in WebRTC—DRM-embedded software that communicates with the license server and enforces all software and hardware related playback restrictions.

Figure 83:
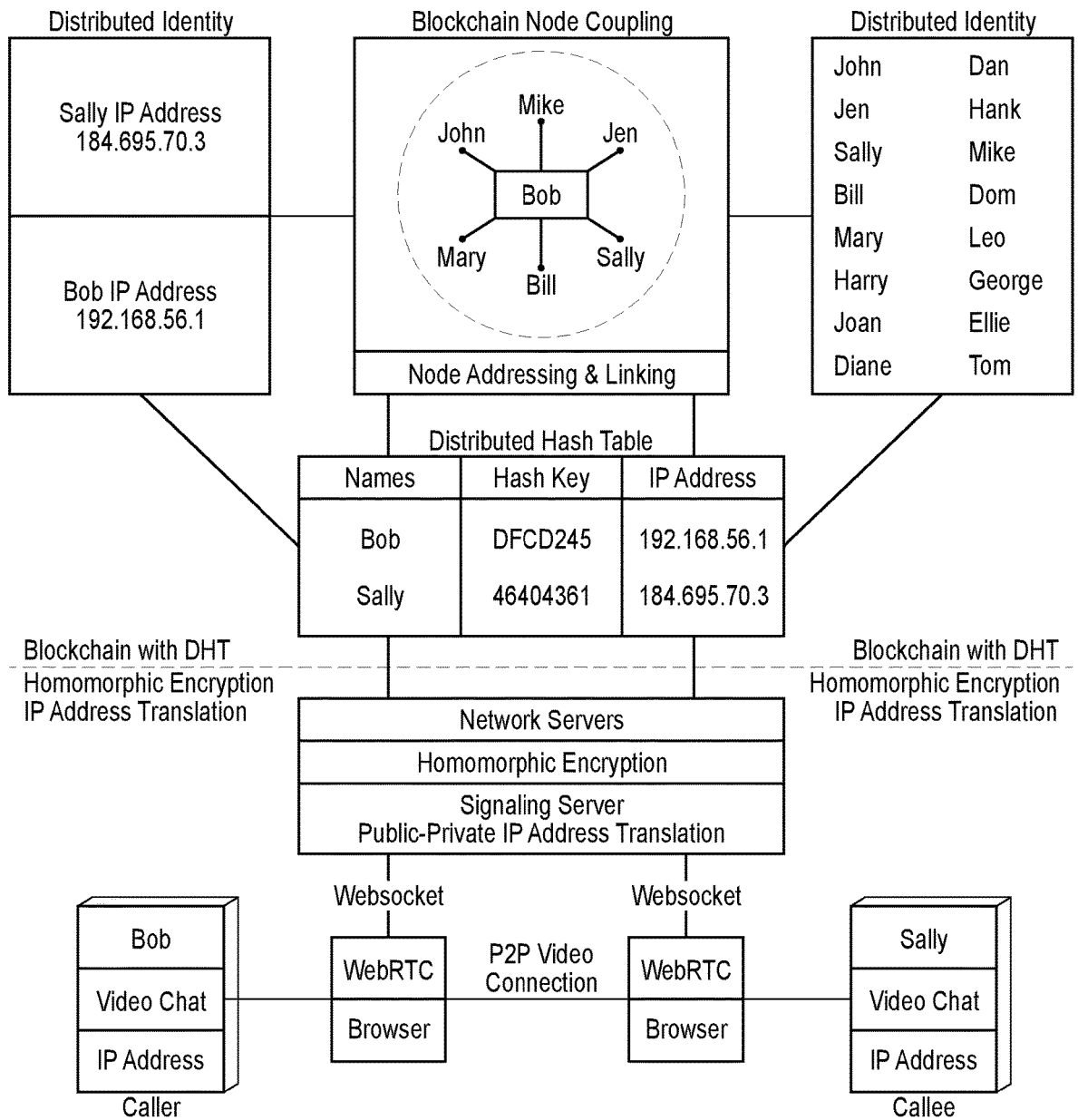
FIG. 83 is a flowchart illustrating a non-limiting preferred embodiment of the Private Blockchain with Distributed Hash Tables and Group Node Coupling.

FIG. 83 is a flowchart illustrating a non-limiting preferred embodiment of the Private Blockchain with Distributed Hash Tables and Group Node Coupling. FIG. 83 shows the Private Blockchain with Distributed Hash Tables & Group Node Coupling. FIG. 83 shows the Distributed Identity module, the Blockchain Node Couling module, and the Distributed Identity module working with the Distributed Hash Table to provide the Blockchain with DHT function.

FIG. 83 also shows the Network Servers providing the Homomorphic Encryption IP Address Translation, and Websocket Server connections between the Device Browsers and the Servers.

Figure 84:
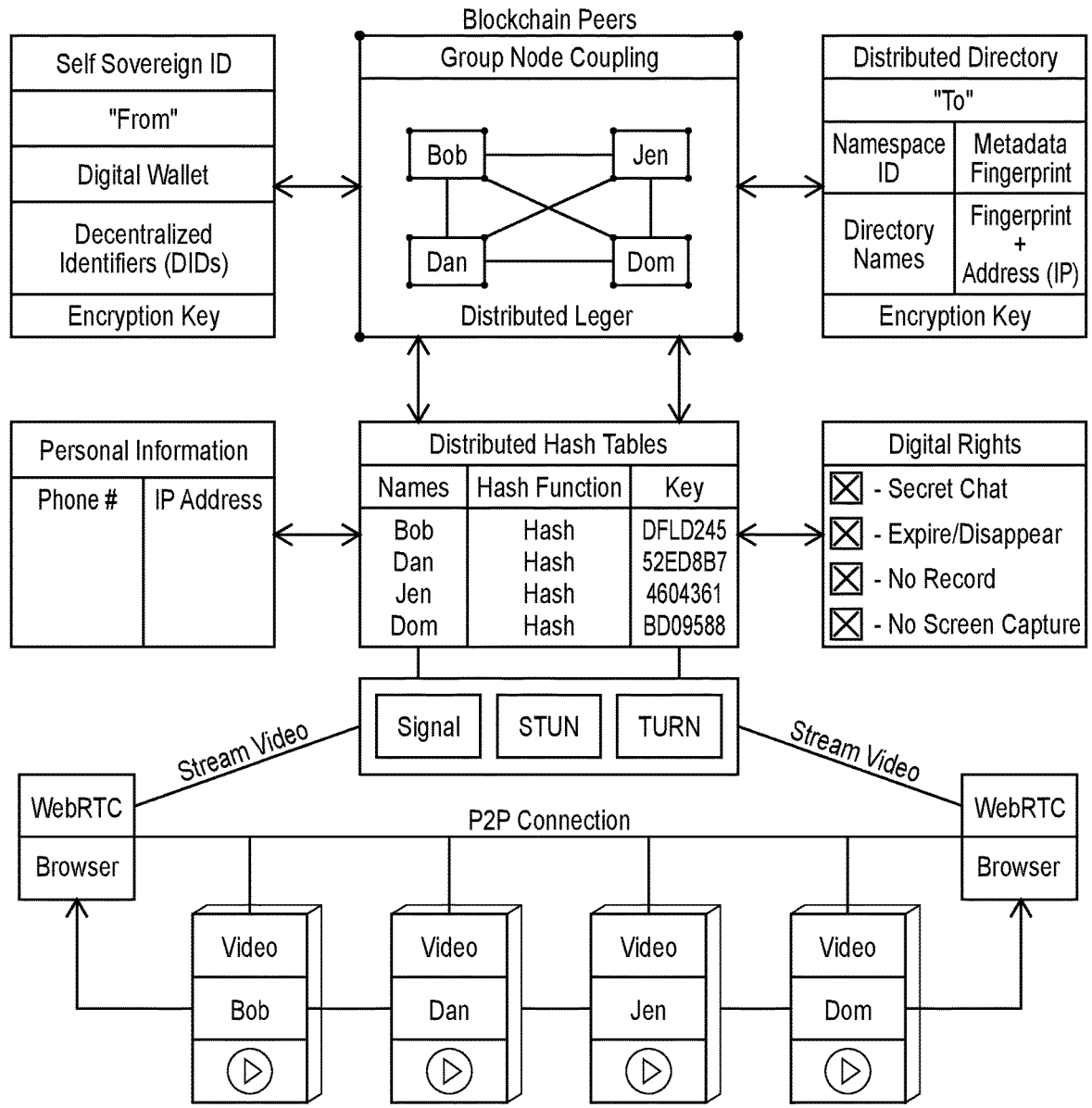
FIG. 84 is a flowchart illustrating a non-limiting preferred embodiment of the Blockchain with Distributed Identity and Directory, Distributed hash tables with Group Node Coupling.

FIG. 84 is a flowchart illustrating a non-limiting preferred embodiment of the Blockchain with Distributed Identity and Directory, Distributed hash tables with Group Node Coupling. FIG. 84 shows the Blockchain with Distributed Identity & Directory, Distributed Hash tables with Group Node Coupling. FIG. 84 shows the Self Sovereign ID module, the Blockchain module, and the Distributed Directory module inter-communicating, and interacting with the Distributed Hash Tables to lookup and provide PPI and Digital Rights.

Figure 85:
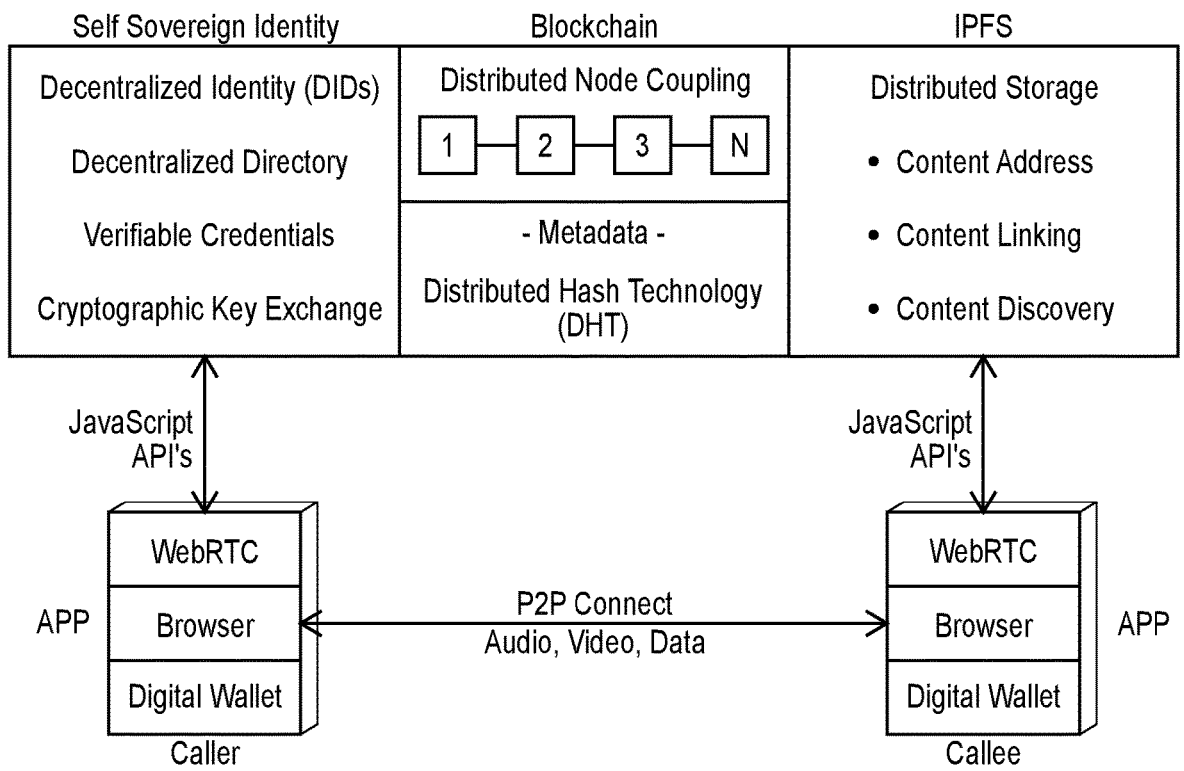
FIG. 85 is a flowchart illustrating a non-limiting preferred embodiment of the Private Blockchain with Decentralized Computing Platform providing Distributed Security for Authentication, Identity, Directory Searching and Distributed Storage.

FIG. 85 is a flowchart illustrating a non-limiting preferred embodiment of the Private Blockchain with Decentralized Computing Platform providing Distributed Security for Authentication, Identity, Directory Searching and Distributed Storage. FIG. 85 shows the Private Blockchain—Decentralized Computing Platform Providing Distributed Security for Authentication, Identity, Directory Searching, Distributed Video Storage.

FIG. 85 shows the components of SSI, Blockchain, and IPFS. SSI (Self Sovereign Identity) provides Decentralized Identity (DIDs), Decentralized Directory, Verifiable Credentials, and Cryptographic Key Exchange.

Blockchain provides Distributed Node Coupling 1-2—3—N, -Metadata-, and Distributed Hash Technology (DHT). IPFS provides Distributed Storage, Content Address, Content Linking, and Content Discovery. JavaScript API's connect the WebRTC to the Browser of the Apps. The App also provides a Digital Wallet.

Figure 86:
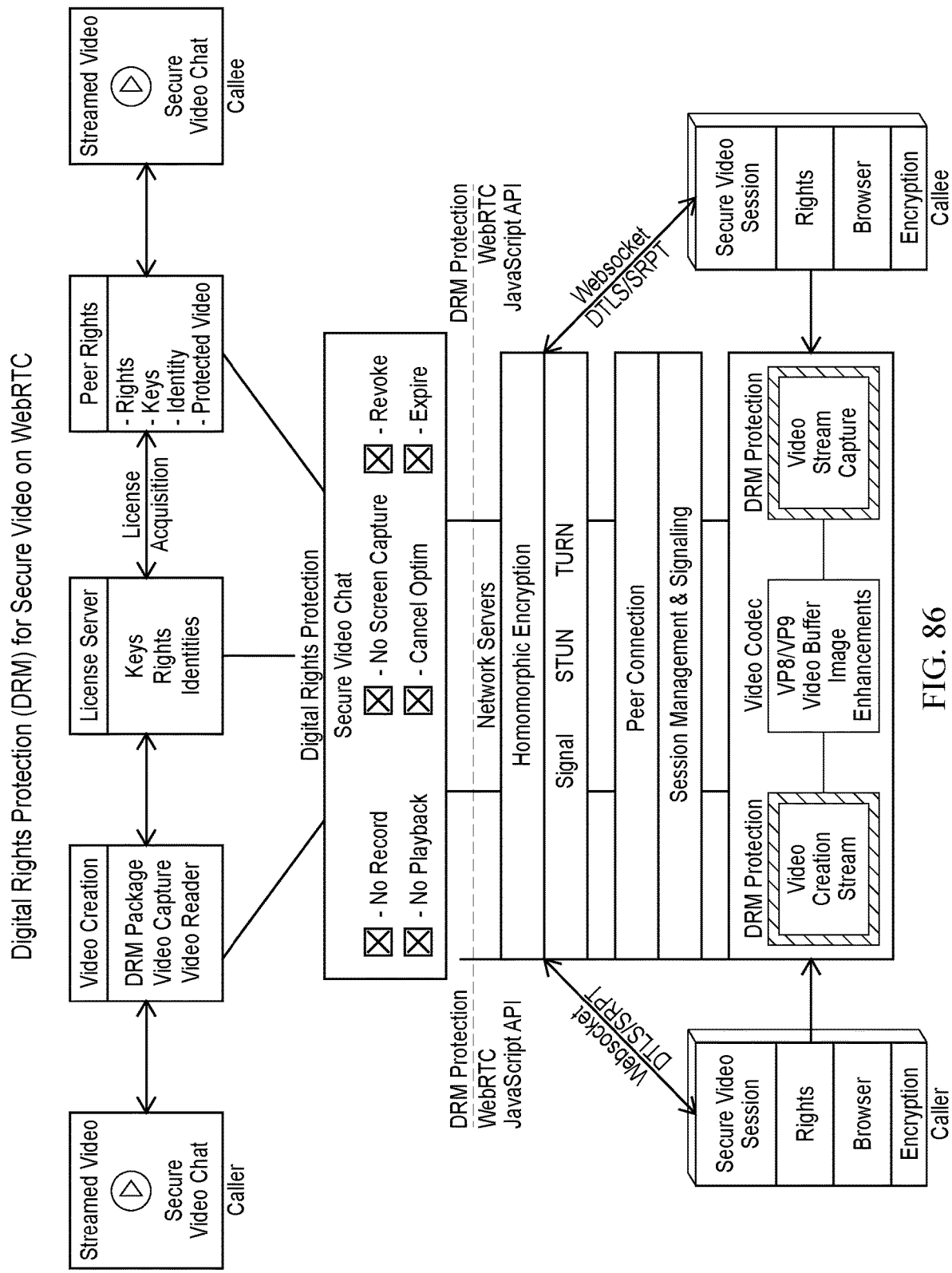
FIG. 86 is a flowchart illustrating a non-limiting preferred embodiment of the Digital Rights Protection (DRM) for Secure Video on WebRTC.

FIG. 86 is a flowchart illustrating a non-limiting preferred embodiment of the Digital Rights Protection (DRM) for Secure Video on WebRTC. FIG. 86 shows Digital Rights Protection (DRM) for Secure Video on WebRTC comprising Streamed Video such as Secure Video Chat from a Caller to a Callee, going through steps of Video Creation, License Server, Peer Rights to offer Streamed Video. Video Creation comprises DRM Package Video Capture and Video Render. Licensing the Server comprises exchange of Keys, Rights, Identities, and License Acquisition. Processing the Peer Rights includes implementing the Rights, checking the Keys, verifying the Identity, to provide Protected Video.

FIG. 86 shows Digital Rights Protection for Secure Video Chat having selections of No Record, No Playback, No Screencapture, Cancel Option, Revoke, and Expire. The WebRTC JavaScript API domain provides the Network Servers, the Homomorphic Encryption, the Signaling e.g. STUN, TURN, the Peer Connection, and the Session Management & Signaling.

FIG. 86 shows the Caller and Callee using WebSocket and DTLS/SRPT to communicate between the App and the Cloud Server(s). The App then provides the Secure Video Session along with the Rights, using a browser, and Encryption.

Within the processing, the App and Cloud cooperate to provide DRM Protection of the Video Creation Stream, provide Video Codec such as VP8/VP9, Video Buffer, Image Enhancements, and DRM Protection of the Video Stream Capture.

Figure 87:
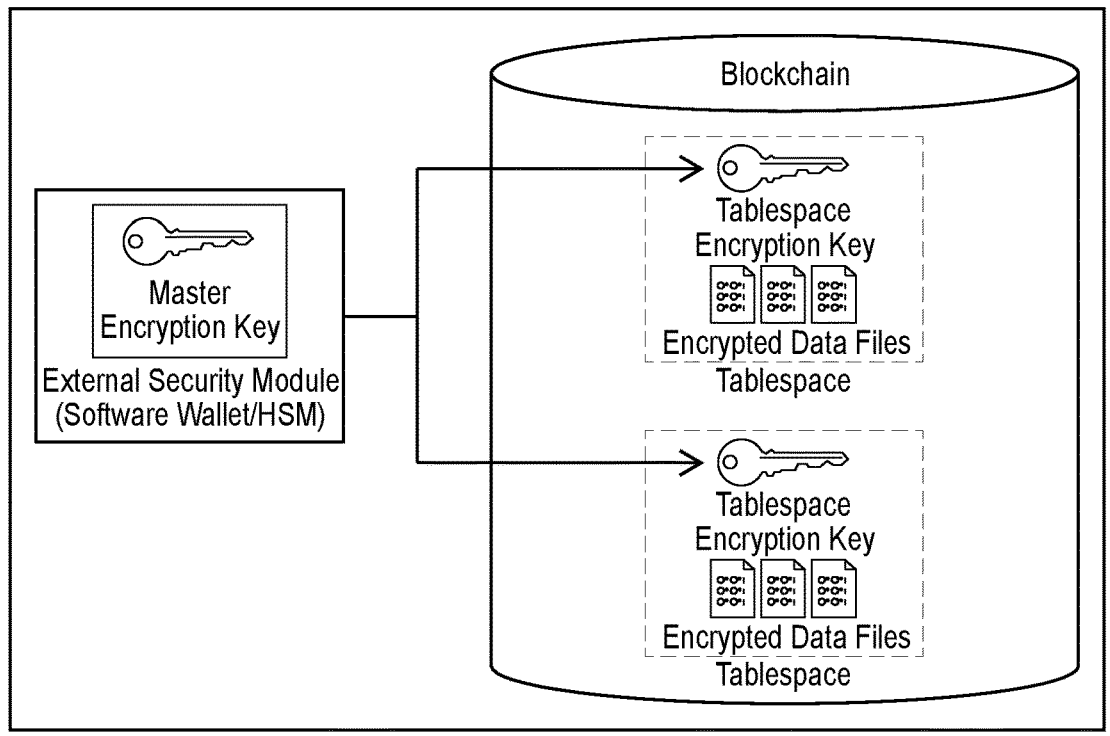
FIG. 87 is a flowchart illustrating a non-limiting preferred embodiment of the Cryptographic Key Splitting Encryption with Blockchain.

FIG. 87 is a flowchart illustrating a non-limiting preferred embodiment of the Cryptographic Key Splitting Encryption with Blockchain. FIG. 87 shows Cryptographic Key Splitting Encryption with Blockchain having a Master Encryption Key to provide External Security Module (Software Wallet/HSM) connecting with the Blockchain to Encrypt/Decrypt Tablespace Encryption Key and Encrypted Data Files.

(IV) Self Sovereign Identity (SSI) for IoT Devices and Systems

This section analyses SSI as the preferred approach for establishing digital identity for IoT devices and systems. Internet Protocols like TCP/IP were developed as open standards to allow computers to interconnect on a global scale, but it has no pervasive, privacy-preserving and easy to use mechanism to manage digital identities. Where human activity is involved, the typical security mechanism is to use accounts, ie. Digital records and personally identifiable information (PII) that are protected by a password and saved on a web server.

For IoT, the manual approach of password-protected accounts and identities makes it unsuitable for machine-to-machine and machine-to-person interactions, a common scenario in IoT. More automated solutions can be implemented using Public Key Certificates (PKC) that cryptographically binds names to public keys. However, widespread use of PKC has been limited to businesses and organizations due to the complexity of managing such implementations that include: (1) X.509 public key certificates which is the basis for HTTPS, the secure protocol for browsing the web and (2) PGP (Pretty Good Privacy), an encryption system used for sending encrypted emails and sensitive files. These popular standards were never designed for privacy (identity management) and both standards require centralized architectures, which is inadequate for distributed IoT applications.

The basic premise of SSI is that subjects should own and control their own identity, instead of having it stored and managed by a third party. SSI approach brings several new benefits, including enhanced privacy, control and decentralization with the use of cryptographic keys, decentralized identifiers (DIDs) and verifiable credentials (VCs). While DIDs focus on cryptographic identification, VCs provide a means for privacy aware and authenticated attribute disclosure.

Figure 88:
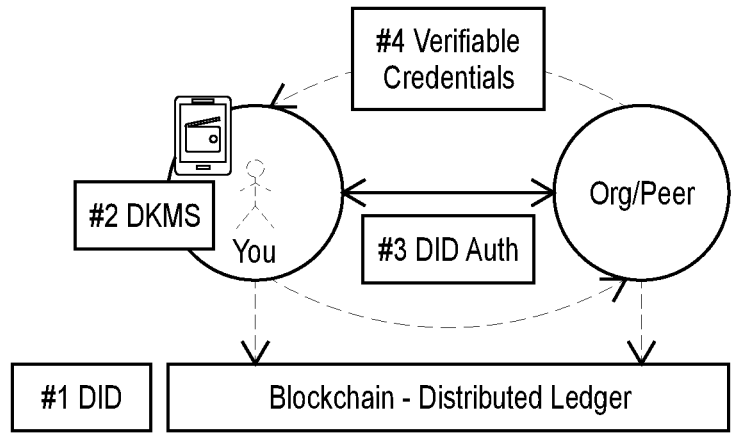
FIG. 88 is a flowchart illustrating a non-limiting preferred embodiment of the Decentralized Identifiers (DIDs), Verifiable Credentials, Blockchain and Cryptographic Operatives.

Decentralized Identifiers (DIDs), Verifiable Credentials, Blockchain and Cryptographic Operations FIG. 88 is a flowchart illustrating a non-limiting preferred embodiment of the Decentralized Identifiers (DIDs), Verifiable Credentials, Blockchain and Cryptographic Operatives. FIG. 88 shows the SSI Stack and Building Blocks of SSI in a layered Diagram, with #1 DID and the Blockchain—Distributed Ledger receiving #2 DKMS from You, and sharing #3 DID Auth to an Org/Peer to establish #4 Verifiable Credentials.

A description of each building block of SSI is discussed further below.

Decentralized Digital Identifier (DIDs)

A Decentralized Identifier (DID) is a new type of identifier that is globally unique, resolvable with high availability, and cryptographically verifiable. The DID are addresses on the DLT of those public keys of users. DID is associated with cryptographic materials such as public key and service endpoints and are used to establish secure communication channels. Also note that one user can have more than one DIDs. In short it fulfils 4 requirements of SSI system: Permanent—It never need to change; Resolvable—You can look it up and get metadata; Cryptographically Verifiable—You can prove the ownership using cryptography; and Decentralization—No centralized registration authority is required. A DID can be registered with any type of decentralized network or even exchanged peer-to-peer (P2P) as is the case with WebRTC. Blockchain is the preferred decentralized distributed Ledger (DLT) versus traditional distributed databases that use other types of electronic identifiers and addresses including: telephone numbers, domain names and email addresses.

Figure 89:
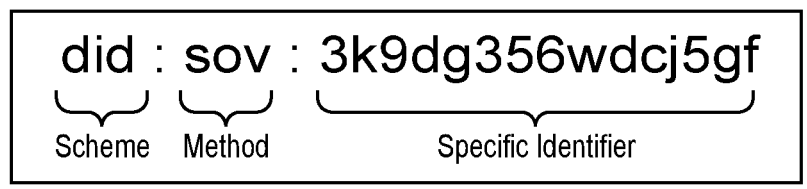
FIG. 89 is a flowchart illustrating a non-limiting preferred embodiment of a non-limiting example of the Decentralized Identifiers (DID) with SSI.

FIG. 89 is a flowchart illustrating a non-limiting preferred embodiment of a non-limiting example of the Decentralized Identifiers (DID) with SSI. FIG. 89 shows an example of DID-SSI:

Did: sov: 3K9dg356wdcj5gf.

Scheme Method Specific Identifier.

DID infrastructure can be thought of as a global key-value database in which the database is all DID-compatible blockchains, distributed ledgers, or decentralized networks. In this virtual database, the key is a DID, and the value is a DID document.

Figure 90:
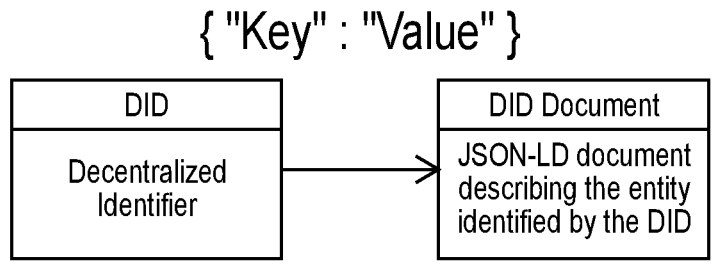
FIG. 90 is a flowchart illustrating a non-limiting preferred embodiment of the DID infrastructure.

FIG. 90 is a flowchart illustrating a non-limiting preferred embodiment of the DID infrastructure. FIG. 90 shows how the {"Key": "Value" } is used for a DID Decentralized Identifier for the DID Document, with JSON-LD document describing the entity identified by the DID.

Blockchain—Distributed Ledger

Blockchains are highly tamper-resistant transactional distributed databases that no single party controls. This means they can provide an authoritative source of data that many different peers can trust without any single peer being in control. Blockchains intentionally trade off many other standard features of distributed transactional databases—performance, efficiency, scalability, searchability, ease of administration—to solve one really hard problem—trusted data that does not need to rely on a central trusted authority. From the standpoint of SSI—and specifically for registering and resolving the DIDs and public keys that enable digital wallets and digital agents to various types of blockchains (permissionless, permissioned, hybrid, etc.) do not matter much. A DID method can be written to support pretty much any modern blockchain or other decentralized network. It solves a problem that has never had a solution in the history of cryptography: they are globally distributed databases that can serve as a source of truth for public keys without being subject to single points of failure or attack. This is what provides the strong foundation needed for the ubiquitous adoption of the verifiable digital credentials at the heart of SSI.

DID Document

The purpose of the DID document is to describe the public keys, authentication protocols, and service endpoints necessary to implement cryptographically-verifiable interactions with the identified entity. It includes six components: DID (for self description), Set of public keys (for verification), Set of auth methods (for authentication protocol), Set of service endpoint (for interaction), Timestamp (for audit history), Signature (for integrity).

Decentralized Key Management System (DKMS)

DKMS provides a decentralized key management system so users can easily manage a large number of DIDs and private cryptographic keys. DKMS is an emerging open standard for managing user's DIDs and private keys. The foundation for DKMS is laid by the DID specification. It applies to wallets where the user stores his DIDs and private keys. The concept is to have a standard for developing wallets so that the user does not worry about security, privacy or vendor lock-in.

DID Auth (Authority)

DID Auth is a ceremony where an identity owner, with the help of various components such as web browsers, mobile devices, and other agents, proves to a relying party that they are in control of a DID. Essentially DID Auth is the protocol for authentication and authorisation in SSI systems. DID Auth includes the ability to establish mutually authenticated communication channels and to authenticate to web sites and applications. Authorisation, Verifiable Credentials, and Capabilities are built on top of DID Auth. A successful DID Auth interaction may create the required conditions to allow the parties to exchange further data in a trustworthy way. DID Auth may be a one-way interaction where party A proves control of a DID-A to party B, or a two-way interaction where mutual proof of control of DIDs is achieved. In the latter case, party A proves control of DID-A to party B and party B proves control of DID-B to party A. Similar to other authentication methods, DID Auth relies on a challenge-response cycle in which a relying party authenticates the DID of an identity owner. During this cycle, an identity owner demonstrates control of their authentication material that was generated and distributed during DID Record Creation through execution of the authentication-proof mechanism.

Verifiable Credentials

Most credentials are physical. They are easy to forge, impersonate the true owner, can be lost or damaged, expensive to create and issue, can not scale, can not be easily verified and disclose more information than needed. Normally, every credential (be it voter id, driver's license etc) can be verified and hence be called verified credential but this term is specifically used to represent digital credentials which represent all of the same information that a physical credential represents but with the addition of technology such as digital signatures, makes verifiable credentials more tamper-evident and more trustworthy than their physical counterparts. Formally, it can be defined as, tamper-evident credential that has authorship that can be cryptographically verified. The verifiable credential ecosystem can be understood from FIG. 91 as follows.

Figure 91:
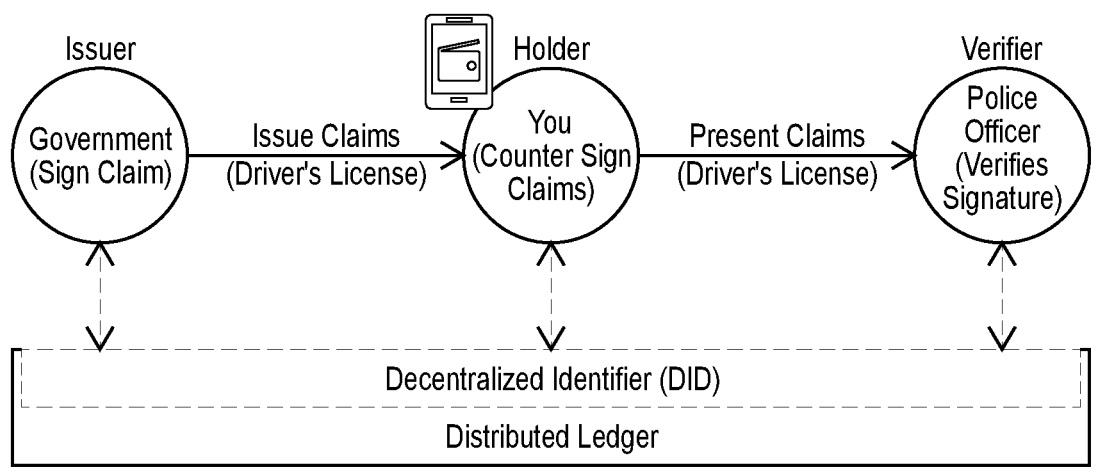
FIG. 91 is a flowchart illustrating a non-limiting preferred embodiment of the Verifiable Credentials.

FIG. 91 is a flowchart illustrating a non-limiting preferred embodiment of the Verifiable Credentials. FIG. 91 shows an example of Verifiable Credentials where the Issuer, e.g. Gov't (sign claim), and Issue claims (Driver's license) to a Holder, who then, You (countersign claims), making them available to Present claims (Driver's license) to a Verifier, e.g. Police Officer (verifies sig). Similar activities now are processed using Decentralised Identifier (DID) and the Distributed Ledger.

Overview of SSI Stack

A brief overview of the SSI stack comprises four layers: Ledger Layer, Agent Layer, Credential Exchange Layer, Governance Layer.

Figure 92:
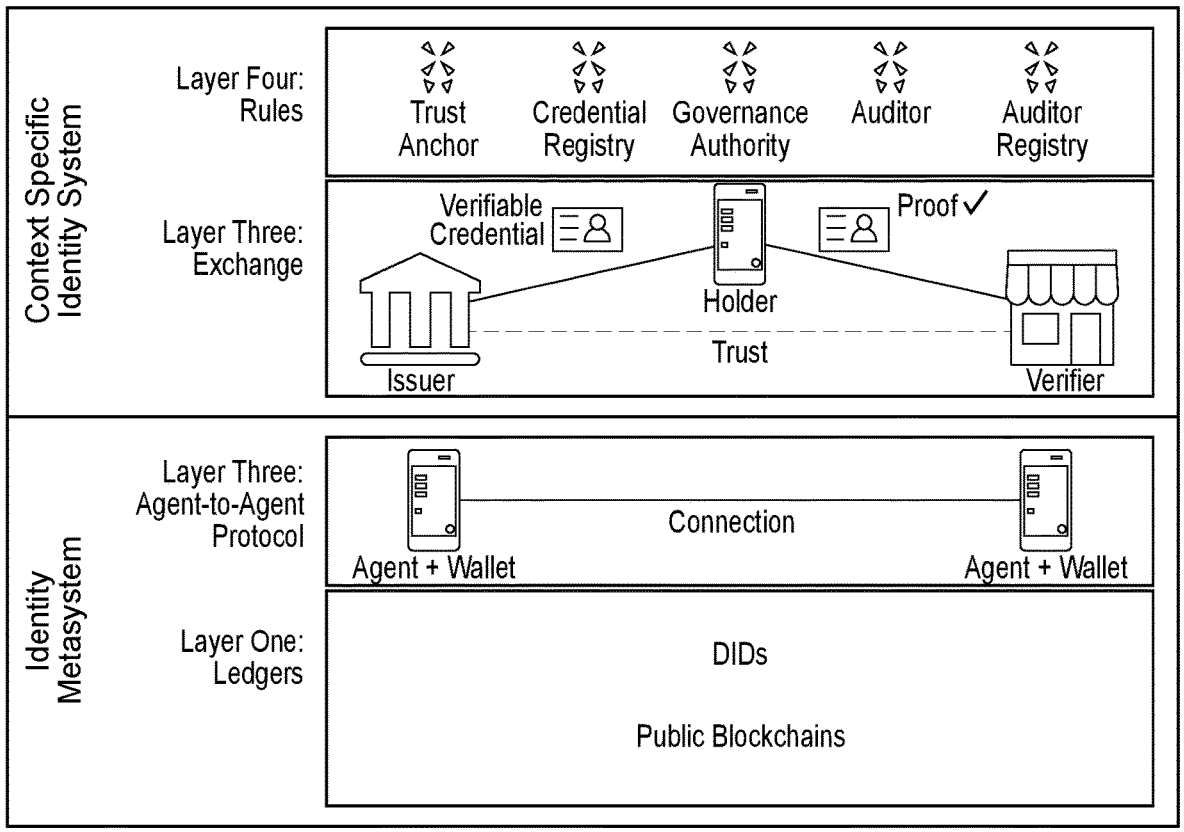
FIG. 92 is a flowchart illustrating a non-limiting preferred embodiment of the Overview of an SSI Stack.

FIG. 92 is a flowchart illustrating a non-limiting preferred embodiment of the Overview of an SSI Stack. FIG. 92 shows a Context Specific Identity System having Layer Four: Rules comprising a Trust Anchor, a Credential Registry, a Governance Authority, an Auditor, and an Auditor Accreditor. The Layer Three: Exchange shows the Issuer sending a Verifiable Credential to a Holder to establish Trust, and Proof to the Verifier.

FIG. 92 shows the Identity Metasystem, comprising the Layer Two: Agent-to-Agent Protocol having the Agent+Wallet connections, and the Layer One: Ledgers having the DIDs and Public Blockchains.

Layer One—Blockchain and DIDs—is the foundational layer consisting of DIDs registered and resolved via Blockchain using distributed Ledger technology (DLT). Layer Two—Cloud Layer (Agent-to-Agent Protocol)—consists of server-side agents and digital wallets that provide a means of communicating and mediating between the DID layer and the edge or exchange layer. The cloud layer enables encrypted peer-to-peer communications exchange and verification of DIDs, public keys and verifiable credentials. The SSI stack technology shall be integrated with WebRTC—video, audio and data communication using peer-to-peer communications. Layer Three—Edge-Exchange Layer—consists of the local devices, agents and digital wallets used directly by identity owners (on WebRTC clients) to generate and store most private keys and perform most key management operators. Layer Four—consists of a Trust Anchor, the Credential Registry, the Governance Authority and the Auditor/Accreditor.

Self-Sovereign Identity for IoT Environments (IoT Systems and Devices)

As IoT devices exist in multiple copies, it is important to uniquely identify each IoT device or system both for managing and deploying them. In some use cases, unique identities of IoT devices can be based on the device's IP address (if one exists) or a hardware identifier as in the case of RFID, but in cases when it is required to authenticate and verify that it is required to authenticate and verify that it is truly a particular IoT device, a more effective solution is SSI where cryptography-based identifiers can be used. If only the owner of the devices is using them, then permanent unique identifiers for the devices can be used to protect privacy, provided that the communications between the devices and the owners cannot be monitored by outside parties. If, however, the device has to operate with third parties, or traverse a network with multiple hops then a permanent unique identifier is a security risk because the device can be tracked and the information about the device and device owner and device users can be discovered. One way to mitigate any security issues with IoT devices, the device identifiers must be changeable and verifiable by deploying DIDs without any central controlling party and the DIDs must support the principles of self-sovereignty, that is, they allow the identity owner to create, manage and discard identifiers when required, and support the practice of using multiple identifiers (DIDs) on a system basis. For more capable IoT devices with sufficient memory, computing assets, energy and storage capabilities there should be no issues with implementing SSI-DIDs. However, certain lightweight embedded devices may lack the necessary computing and memory capability to utilize DIDs which require storing and computing for cryptographic calculations and they exchange methods between devices and Blockchain.

Decentralized Identifiers (DIDs), Verification and Cryptographic Key Exchange for IoT Devices and Systems Currently there are several DID technologies in development but most have adopted the approach and format of the W3C DID specification developed by the Decentralized Identity Foundation. The specification defines a DID as a random string (prefixed by "did" and a string indicating the particular DID technology) derived from the public key cryptography used with the identifiers as illustrated below:

TABLE

| Typical DID |
| --- |
| Did:sov:3k9FQB569dcgf |
| -Decentralized ID- |

A key aspect of DIDs is that they are designed not to be dependent on a central issuing party. (identity provider (IdP) that creates and controls the identifier. For IoT devices/systems DIDs are typically created and managed by the identity owner which yields a self-sovereign identity (SSI). Most DID solutions rely on a distributed Ledger (DLT) or Blockchain for public DIDs (used by entities that are known) or for private DIDs (used by individuals), an application-specific communications channel like DIDComm is used to distribute and communicate information between and among parties. Some DID platforms such as Sovrin have developed proprietary DLTs based on the Byzantine fault tolerance (BFT) consensus, while others rely on existing Blockchains like Ethereum. Recently, the emergence of GDPR in the EU has made storing personally identifiable information (PII) on Blockchain problematic and several private Blockchains like Sovrin have excluded individual DIDs from the Ledger. As such, DIDs of IoT devices may also be required to exclude individual (or owner) PII from Blockchain. The same issue applies to verifiable credentials (VCs) that associate machine verifiable properties of IoT devices to the identifier of an entity. The relationship between individuals, DIDs, VCs for IoT is summarized.

Figure 93:
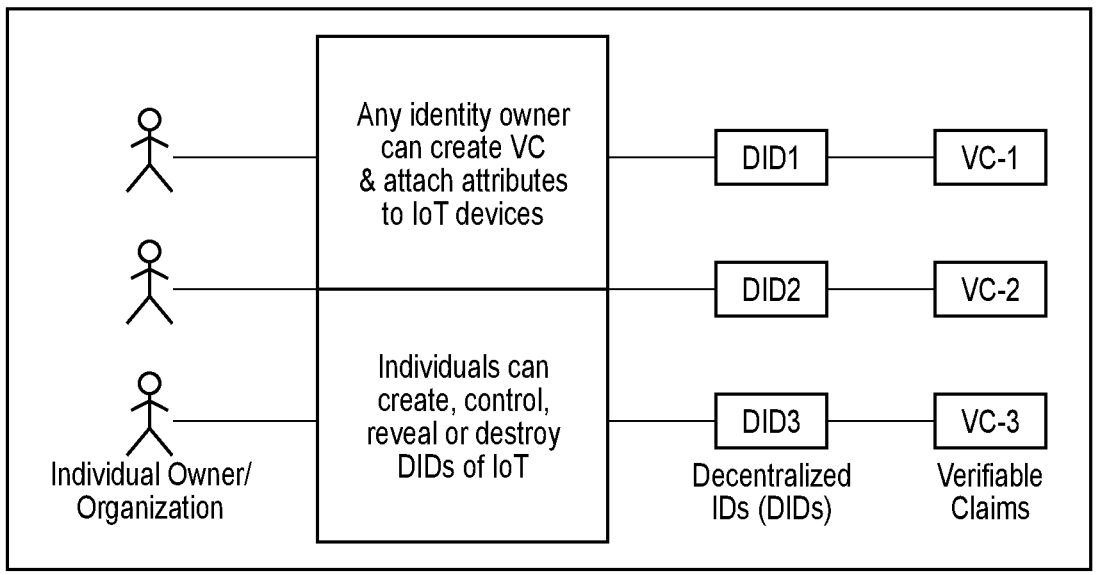
FIG. 93 is a flowchart illustrating a non-limiting preferred embodiment of the Relationship between Owners, DIDs and VCs.

FIG. 93 is a flowchart illustrating a non-limiting preferred embodiment of the Relationship between Owners, DIDs and VCs. FIG. 93 shows the Relationship Between Owners, DIDs and VCs. Individual Owner/Organization provide Any Identity owner can create VC and attach attributes to IoT devices, and Individuals can create, control, reveal or destroy DIDs of IoT. Decentralized IDs (DIDs), DID-1, DID-2, DID-3 establish Verifiable Claims VC-1, VC-2, VC-3 to deploy DID on IoT devices.

Deploying DIDs on IoT Devices

For most IoT devices, DIDs can be deployed directly on the IoT device and can be used without any deployment or execution issues, including computing resources, storage capabilities, key storage and cryptographic calculations. For devices that are extremely constrained or not trusted to store important secrets such as private keys, a proxy-server based approach, where the proxy performs the above aforementioned complex operations (eg. Public-private key cryptography) on behalf of the IoT device. In order to utilize distributed identifiers and verifiable credentials, the IoT device should have (1) sufficient performance for cryptographic operations, (2) a sufficient amount of energy to perform the required operations, (3) nonvolatile storage space to store the code and cryptographic keys, and (4) sufficient entropy source to generate random cryptographic keys. From the performance point of view, the most limiting factor is the performance of public-key cryptographic operations, namely, key generation, signature generation, and the signature verification. Presently, most DID solutions utilize elliptic curve cryptography (ECC) (as opposed to, e.g., RSA) due to its significantly smaller key size and the fact that all three operations are relatively fast and take roughly a similar amount of time (with RSA, key generation can take orders of magnitude longer than signature generation or verification operations). Lately, there has been much research about the performance of ECC on constrained devices. Based on performance analysis using Cortex-MO devices designed for smart and connected embedded IoT applications, the device can perform up to 15 ECC cryptographic operations per second which demonstrates that even such extremely constrained devices are able to perform all the necessary cryptographic operations for DID usage within a few seconds, which is acceptable performance for most IoT use cases. In a case where the device is even more constrained, a hardware accelerator for cryptographic functions could be used. Also, the number of cryptographic operations required can be managed with system design. If the IoT device only infrequently sends traffic (e.g., updates) to the network, each of these updates can be signed or encrypted with a public key. However, if an IoT device needs to send a significant amount of traffic to the network, it can rely on more lightweight symmetric encryption and hash-based message authentication code after the initial authentication and key exchange have been performed using DIDs. Therefore, it is usually not necessary for the IoT device to perform public-key operations at a high rate (tens or even hundreds of operations per second). Finally, while the DID itself is just a simple string and easy to process as such, the related technology verifiable credentials (VC) are usually expressed in JSON format. There might be cases where the device includes a cryptographic accelerator, but is otherwise extremely constrained and, therefore, unable to parse JSON. In that case, VCs can be encoded in a more machine-friendly binary format such as BSON, as the VC specifications do not mandate usage of any specific encoding format. And since DIDs only utilize the ledgers for few operations, the network performance is normally not an issue even with constrained devices.

IoT devices often have only limited energy available, which has to be taken into account when designing security and privacy solutions. While there are some cases, where an extremely constrained, e.g., sensing device that only sends data very infrequently is not able to utilize public-key cryptography due to energy consumption concerns; in most IoT applications, energy consumption does not prevent usage of public-key cryptography and therefore DIDs, and in many IoT applications, such as vending machines and devices, may even be constrained in terms of, e.g., processing power while having plenty of energy available. The storage of cryptographic keys should also not in most cases be an issue space wise as long as a nonvolatile storage is available. ECC offers compact keys and signatures, with sizes of 256 bits and 512 bit, respectively, for the security level equivalent to 128-bit symmetric encryption. Hence, a public/private key pair would use only 64 bytes of space, and even a few kilobytes of storage space is sufficient to store multiple keys or credentials.

The Real-Time Communication (RTC) platform consisting of numerous protocol and network gateways all utilize Raspberry Pi 4 computers with a Debian-based OS and Ubuntu Core servers with a Linux distribution based on Debian. A proof of concept was performed to show that even quite constrained IoT devices have sufficient performance to deploy DIDs with Raspberry Pi 4, Javascript and Node.js and running Rasbian GNU/Linux distribution. The performance was acceptable at 200 milliseconds and the whole process of verifying credentials was well below 1 second. The overall conclusion is that most IoT devices with 32-bit CPU can utilize and process DIDs with currently available software. However, for extremely constrained IoT devices, DIDs can be used and deployed with a proxy-based approach which is described in the section IV.

Deploying Constrained IoT Devices Using a Proxy-Based Approach

As discussed in Section III, deploying DIDs directly on constrained IoT devices may not be possible or desirable because of public-private key cryptography limitations, lack of storage or limited investment to upgrade device profile and capabilities. Additionally, in many cases, certain IoT devices and networks are not trusted to connect to the Internet directly.

The core principle of a proxy-based solution is that computationally intensive key-exchange tasks and security-sensitive operations are delegated and routed to a trusted proxy server. The most popular delegation protocol is OAuth2 which: (1) enables delegation of authentication and authorization to a trusted authorization proxy server and then, (2) communicates the outcome of authentication and user authorization to a Resource Server (IoT device) through different types of tokens that OAuth2 supports including the Proof of Possession (PoP) token.

The PoP token is leveraged by the Authentication and Authorization for Constrained Environments (ACE). The ACE framework is designed as an extension to the OAuth2 authorization framework, which defines protocols on how clients access protected resources on remote servers on behalf of a resource owner. The ACE framework adapts the protocols and prematures for use in IoT devices where networking nodes can be limited in terms of processing power, and memory capacity. PoP tokens include an encryption key (PoP key) generated by the proxy and transmitted to both the user and the IoT device. The encryption key can then be used for securing all subsequent transmissions between the use and the IoT device. It also supports IoT devices that are not connected to the Internet, in cases where the communication between the proxy and the IoT device can be relayed through the user and it is subsequently encrypted using a secret key preshared during implementation (a PSK implementation).

Figure 94:
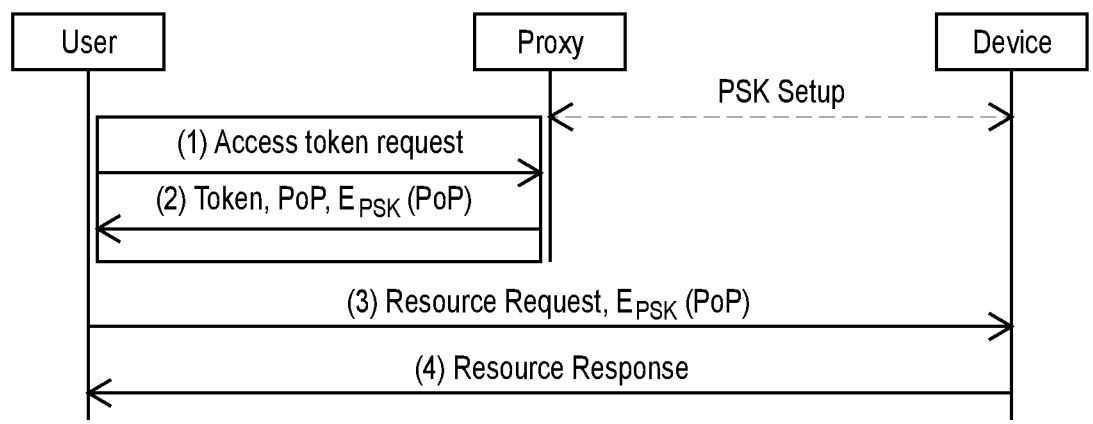
FIG. 94 is a flowchart illustrating a non-limiting preferred embodiment of Depicting the OAuth2 Delegation for a Constrained Device.

FIG. 94 is a flowchart illustrating a non-limiting preferred embodiment of Depicting the OAuth2 Delegation for a Constrained Device. FIG. 94 shows the OAuth2 delegation for constrained device, and the signaling between the User, the Proxy, and the Device. Signaling starts with PSK setup and the User and Proxy processing (1) Access token request, and (2) Token, PoP, EPSK (PoP). The User then sends (3) Resource request, EPSK (PoP) to the Device and receives the (4) Resource response from the Device. Specifically: (1) Access Token Request. User requests an Access Token from the proxy. (2) Access Token Response. If the proxy accepts the request, it returns the Access Token (which includes the PoP key) and the PoP key encrypted with the psk. The acceptance process is left application specific and it may involve, e.g., authenticating the user and evaluating an access control policy. (3) Resource Request. The authorized user requests access to a protected resource on the IoT device. The user and the IoT device mutually authenticate using the PoP key. (4) Protected Resource. If the request from the user is authorized, the IoT device fulfills the request and returns a response.

It should be noted that the messages of the first two protocols are exchanged over a secure communication channel as illustrated in FIG. 94. Furthermore, it is assumed that a setup phase has taken place during which the psk has been generated by the proxy and installed to the device, denoted with a dotted line in FIG. 94. The setup phase usually takes place only once during the lifetime of the IoT device-proxy relationship (provided that the psk is not compromised).

Based on the above, OAuth2 delegation forms a practical base for a proxy-based solution that enables DIDs for constrained devices. This also introduces two interesting use cases: (i) user to device authentication using DIDs and (ii) device to user authentication using DIDs.

User to Device Authentication. With OAuth2 delegation, the user authentication can be viewed as a two-step process: (1) initially, the user is authenticated to the proxy (using the Access Token Request protocol), and if this process is successful, the user obtains a token with a PoP key; (2) the user proves to the IoT device that they have been authenticated (and authorized) using the obtained token and PoP key. Now, the OAuth standard does not specify how the first step is implemented, instead it is left as a design choice for the application developers. Since the proxy is a powerful and trusted node, DID-based authentication and authorisation can be used to implement this step with the Access Token Request protocol and the rest of the protocols do not have to be modified in any way.

Device to User Authentication. As already discussed, the proxy and the IoT device are configured with a preshared secret key. This key is used for encrypting keying material (the PoP key) transferred from the proxy to the IoT device via the user. The same PoP key is also provided to the user in cleartext: the fact that the IoT device and the user end up using the same key is a proof that the user communicates with a legitimate IoT device. Of course, this conclusion is based on the assumptions that (i) the user can verify the identity of the proxy and (ii) the user can verify that the IoT device has indeed delegated the authorisation and authentication processes to that proxy. Unfortunately, the implementation of those verification processes is again left to application providers. Here, DIDs can be used for verifying that both these conditions hold. In particular, an IoT device can be associated with a DIDs managed by the proxy (i.e., in DID terminology, the proxy act as a guardian) or the proxy can be authorised to speak on behalf of the device's DID (the proxy can prove this, e.g., with a verifiable credential issued by the device owner). During the Access Token Request protocol, a user can then challenge the proxy and request the appropriate verifiable credentials: a successful completion of this process means that the user is interacting with a proxy that acts on behalf of the desired IoT device.

SSI for IoT Devices

Decentralized Identifiers (DIDs) are a suitable solution for privacy enhancing identifiers of IoT devices. With many devices, the DIDs can be implemented on the devices themselves, while a proxy approach (e.g., based on OAuth-ACE) can be used for the more constrained devices or when, e.g., the security risks of storing cryptographic keys on the device are too high. The privacy evaluation shows that, in many cases, having privacy enhancing identifiers for the IoT devices is necessary for protecting the privacy of the users and owners of the devices, but similar care has to be taken with all other elements of the system to truly protect the privacy of the individuals.

Decentralized identifiers provide significant privacy benefits in cases where IoT devices communicate directly with the outside world, especially when the device operates with multiple parties in different contexts. The analysis shows that DIDs can be deployed directly even on fairly constrained IoT devices (e.g., 8-bit MCUs), so they are a feasible identifier solution for many use cases. And, when the device is more constrained, a proxy-based approach described in Section 5 can be used: with it, IoT devices only have to perform symmetric encryption operations, which are computationally much easier to implement. Furthermore, IoT devices learn nothing about a user's DID, hence even if an IoT device is compromised, users' privacy is protected. Finally, it is important to highlight that no modification to OAuth2 is required for this approach: the OAuth standard does not specify how a user and a proxy mutually authenticate; instead, it leaves it as design choice for the application develop0ers, so DI"Ds can be used for achieving this goal.

Using DIDs for devices is beneficial also because the same technology can be used for the identifiers of individuals, organisations, and devices, thus simplifying the system implementation and further hiding what type of entity is behind the identifier. Using privacy enhancing solutions such as DIDs in all systems even when not strictly required helps spread the privacy enhancing solutions and avoids costly system redesigns if the privacy requirements later become stricter.

Proxy-Based Approach

In the proxy-based approach, introducing a new component (the proxy) into the system does affect the security and privacy properties of the solution, as the new component may contain faults or be susceptible to compromising. At the same time, it may be easier to protect the proxy with firewalls and other security systems than all the IoT devices which may be left to fend for themselves. Now, for the device owner to trust the proxy, they have to be able to rely on the proxy to be well implemented and not to have malicious intentions. However, the owner is also free to choose the most suitable proxy they want to trust, so they are in the position to take the necessary steps to assure themselves of the trustworthiness of the proxy.

The risks introduced by the proxy also depend on what the system is used for in the first place and how much the proxy is trusted. For instance, is the proxy acting as the guardian for the IoT device (and does it, therefore, have access to the related key) or is the guardian some other entity, e.g., the device owner? If, for instance, the proxy is only acting on behalf of the device, e.g., issuing access tokens, it does this with its own identifier and, therefore, has no need to have access to the device's private key, thus limiting the amount of trust to the level of standard OAuth.

InterPlanetary File System (IPFS) for IoT Video and Data Storage—is a protocol and peer-to-peer network for storing and sharing data in a distributed file system. IPFS uses content-addressing to uniquely identify each file in a global namespace connecting all computing devices. As opposed to a centrally located server, IPFS is built around a decentralized system of user-operators who hold a portion of the overall data, creating a resilient system of file storage and sharing. Any user in the network can serve a file by its content address, and other peers in the network can find and request that content from any node who has it using a distributed hash table (DHT).

IPFS allows users to not only receive, but to host content as well. As opposed to a centrally located server, IPFS is built around a decentralized system of user-operators who hold a portion of the overall data, creating a resilient system of file storage and sharing. Any user in the network can serve a file by its content address, and other peers in the network can find and request that content from any node who has it using a distributed hash table (DHT). IPFS aims to create a single global network. IPFS aims to replace protocols used for static webpage delivery by using gateways which are accessible with HTTP. Users may choose not to install an IPFS client on their device and instead use a public gateway.

Figure 95:
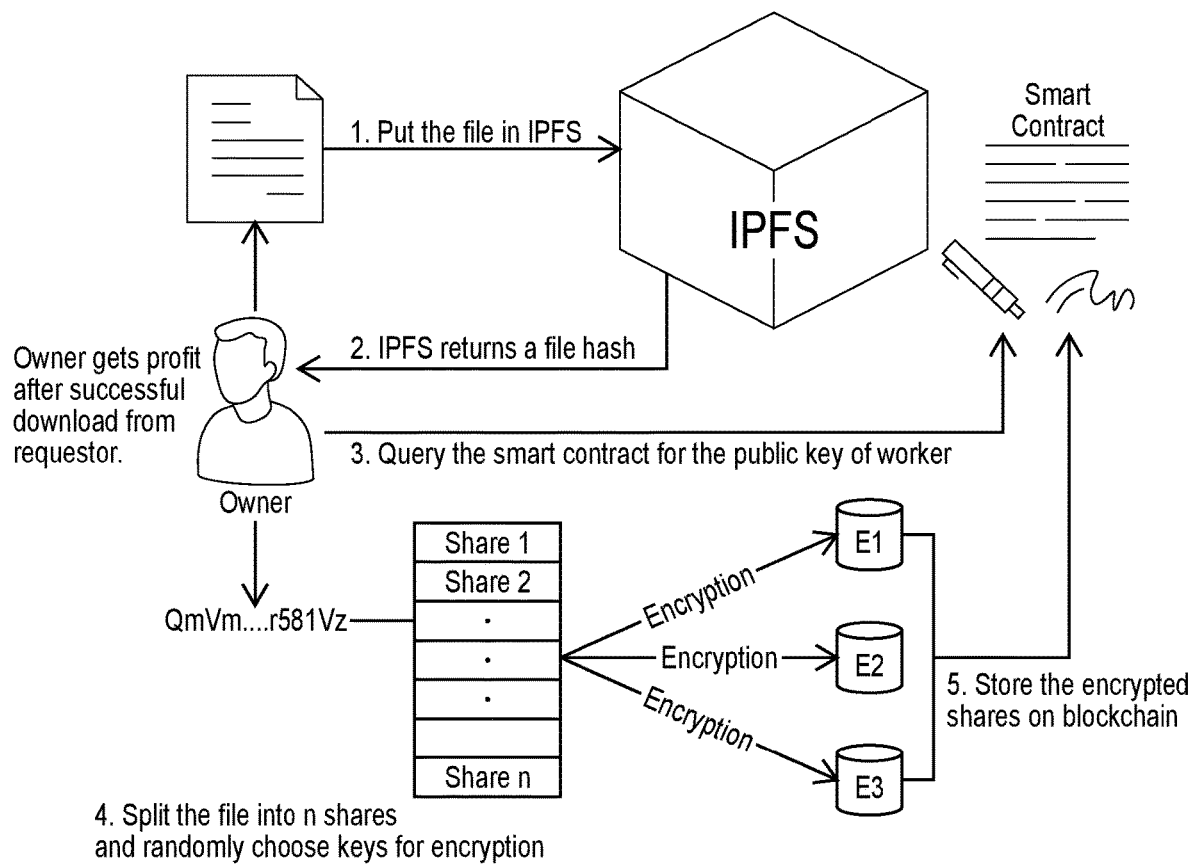
FIG. 95 is a flowchart illustrating a non-limiting preferred embodiment of the Interplanetary File System (IPFS) for IoT Video and Data Storage.

FIG. 95 is a flowchart illustrating a non-limiting preferred embodiment of the Interplanetary File System (IPFS) for IoT Video and Data Storage. FIG. 95 shows an example of how an Owner gets profit after successful download from the requestor. FIG. 95 illustrates a process: 1. Put the file in IPFS; 2. IPFS returns a file hash; 3. Query the smart contract for the public key of the worker; 4. The owner splits the file into n shares and randomly chooses keys for encryption; and 5. Stores the encrypted shares on blockchain.

IPFS—Distributed Video Storage Platform

IPFS is a peer-to-peer (p2p) storage network. Content is accessible through peers located anywhere in the world, that might relay information, store it, or do both. IPFS knows how to find what you ask for using its content address rather than its location. There are three fundamental principles to understanding IPFS: 1. Unique identification via content addressing; 2. Content linking via directed acyclic graphs (DAGs); 3. Content discovery via distributed hash tables (DHTs). These three principles build upon each other to enable the IPFS ecosystem.

Content Addressing

IPFS uses content addressing to identify content by what's in it rather than by where it's located. Every piece of content that uses the IPFS protocol has a content identifier, or CID, that is its hash. The hash is unique to the content that it came from, even though it may look short compared to the original content. Many distributed systems make use of content addressing through hashes as a means for not just identifying content but also linking it together—everything from the commits that back your code to the blockchains that run cryptocurrencies leverage this strategy. However, the underlying data structures in these systems are not necessarily interoperable. This is where the Interplanetary Linked Data (IPLD) project comes in. IPLD translates between hash-linked data structures allowing for the unification of the data across distributed systems. IPLD provides libraries for combining pluggable modules (parser for each possible type of IPLD node) to resolve a path, selector, or query across many linked nodes, allowing you to explore data regardless of the underlying protocol. IPLD provides a way to translate between content-addressable data structures. IPFS follows particular data-structure preferences and conventions. The IPFS protocol uses those conventions and IPLD to get from raw content to an IPFS address that uniquely identifies content on the IPFS network.

Directed Acyclic Graphs (DAGs)

IPFS and many other distributed systems take advantage of data structures called directed acyclic graphs, or DAGs. Specifically, they use Merkle DAGs, which are DAGs where each node has a unique identifier that is a hash of the node's contents. Put another way: identifying a data object (like a Merkle DAG node) by the value of its hash is content addressing. IPFS uses a Merkle DAG that is optimized for representing directories and files. To build a Merkle DAG representation of content, IPFS often first splits it into blocks. Splitting it into blocks means that different parts of the file can come from different sources and be authenticated quickly. Merkle DAGs are a bit of a "turtles all the way down" scenario; that is, everything has a CID. Let's say you have a file, and its CID identifies it. What if that file is in a folder with several other files?Those files will have CIDs too. What about that folder's CID? It would be a hash of the CIDs from the files underneath (i.e., the folder's content). In turn, those files are made up of blocks, and each of those blocks has a CID. So a file system on your computer could be represented as a DAG. And this is how Merkle DAG graphs start to form.

Another useful feature of Merkle DAGs and breaking content into blocks is that if you have two similar files, they can share parts of the Merkle DAG, I.E., parts of different Merkle DAGs can reference the same subset of data. For example, if you update a website, only updated files receive new content addresses. Your old version and your new version can refer to the same blocks for everything else. This can make transferring versions of large datasets (such as genomics research or weather data) more efficient because you only need to transfer the parts that are new or have changed instead of creating entirely new files each time.

So, in summary, IPFS lets you give CIDs to content and link that content together in a Merkle DAG. An example of a directed acyclic graph is shown below.

Figure 96:
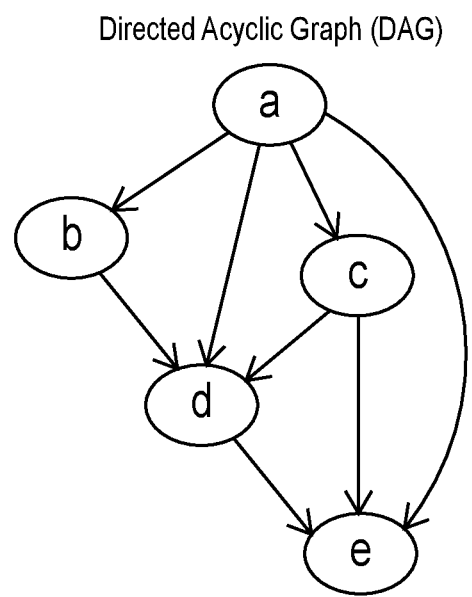
FIG. 96 is a flowchart illustrating a non-limiting preferred embodiment of the Merkle Directed Acyclic Graph (DAG).

FIG. 96 is a flowchart illustrating a non-limiting preferred embodiment of the Merkle Directed Acyclic Graph (DAG). FIG. 96 shows the Directed Acyclic Graph (DAG) having Blocks a b c d e, each with their own CID.

Distributed Hash Tables (DHTs)

To find which peers are hosting the content you're after (discovery), IPFS uses a distributed hash table, or DHT. A hash table is a database of keys to values. A distributed hash table is one where the table is split across all the peers in a distributed network. To find content, you ask these peers. The libp2p project is the part of the IPFS ecosystem that provides the DHT and handles peers connecting and talking to each other. (Note that, as with IPLD, libp2p can also be used as a tool for other distributed systems, not just IPFS.) Once you know where your content is (or, more precisely, which peers are storing each of the blocks that make up the content you're after), you use the DHT again to find the current location of those peers (routing). So, in order to get to the content, you use libp2p to query the DHT twice. You've discovered your content, and you've found the current location(s) of that content. Now, you need to connect to that content and get it (exchange). To request blocks from and send blocks to other peers, IPFS currently uses a module called Bitswap. Bitswap allows you to connect to the peer or peers that have the content you want, send them your wantlist (a list of all the blocks you're interested in), and have them send you the blocks you requested. Once those blocks arrive, you can verify them by hashing their content to get CIDs and compare them to the CIDs that you requested. These CIDs also allow you to deduplicate blocks if needed.

Libp2p

What makes libp2p especially useful for peer to peer connections is connection multiplexing. Traditionally, every service in a system opens a different connection to communicate with other services of the same kind remotely. Using IPFS, you open just one connection, and you multiplex everything on that. For everything your peers need to talk to each other about, you send a little bit of each thing, and the other end knows how to sort those chunks where they belong. This is useful because establishing connections is usually hard to set up and expensive to maintain. With multiplexing, once you have that connection, you can do whatever you need on it.

A Modular Paradigm—IPFS

The IPFS ecosystem is made up of many modular libraries that support specific parts of any distributed system. You can certainly use any part of the stack independently or combine them in novel ways. The IPFS ecosystem gives CIDs to content and links that content together by generating IPLD Merkle DAGs. You can discover content using a DHT that's provided by libp2p, open a connection to any provider of that content, and download it using a multiplexed connection. All of this is held together by the middle of the stack, which is linked, unique identifiers; that's the essential part that IPFS is built on. Smart Contract is a computer program or a transaction protocol which is intended to automatically execute, control or document legally relevant events and actions according to the terms of a contract or an agreement. The objectives of smart contracts are the reduction of need in trusted intermediators, arbitrations and enforcement costs, fraud losses, as well as the reduction of malicious and accidental exceptions. Like a transfer of value on a blockchain, deployment of a smart contract on a blockchain occurs by sending a transaction from a wallet for the blockchain. The transaction includes the compiled code for the smart contract as well as a special receiver address. That transaction must then be included in a block that is added to the blockchain, at which point the smart contract's code will execute to establish the initial state of the smart contract. Byzantine fault-tolerant algorithms secure the smart contract in a decentralized way from attempts to tamper with it. Once a smart contract is deployed, it cannot be updated. Smart contracts on a blockchain can store arbitrary state and execute arbitrary computations. End clients interacts with a smart contract through transactions. Such transactions with a smart contract can invoke other smart contracts. These transactions might result in changing the state and sending coins from one smart contract to another or from one account to another.

Figure 97:
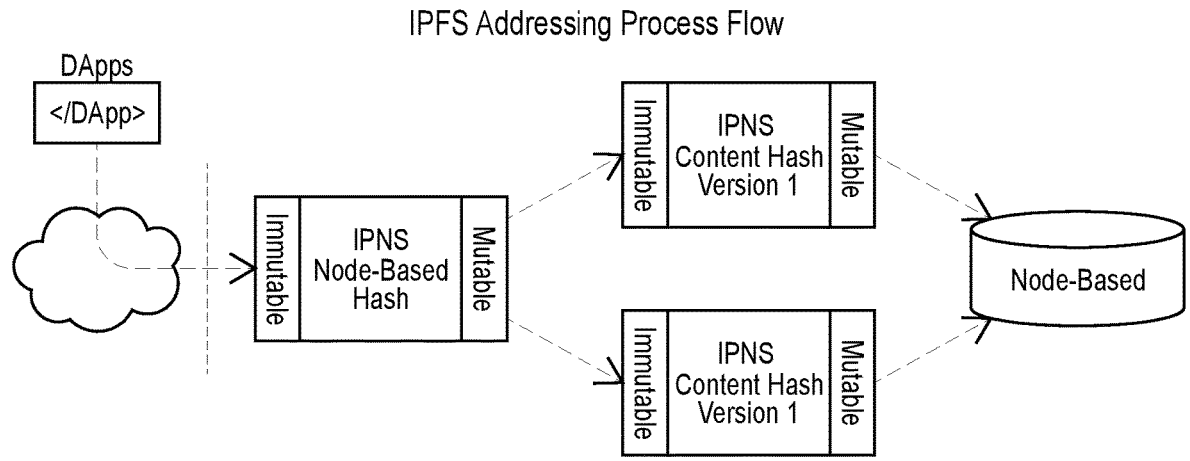
FIG. 97 is a flowchart illustrating a non-limiting preferred embodiment of the IPFS Addressing Process Flow.

FIG. 97 is a flowchart illustrating a non-limiting preferred embodiment of the IPFS Addressing Process Flow. FIG. 97 shows the IPFS Addressing Process Flow having Dapps </DA pp> connected to an Immutable IPNS node-based hash, having a mutable connection to IPFS content hash Version 1, 2, n, and connected to Node-based storage.

Figure 98:
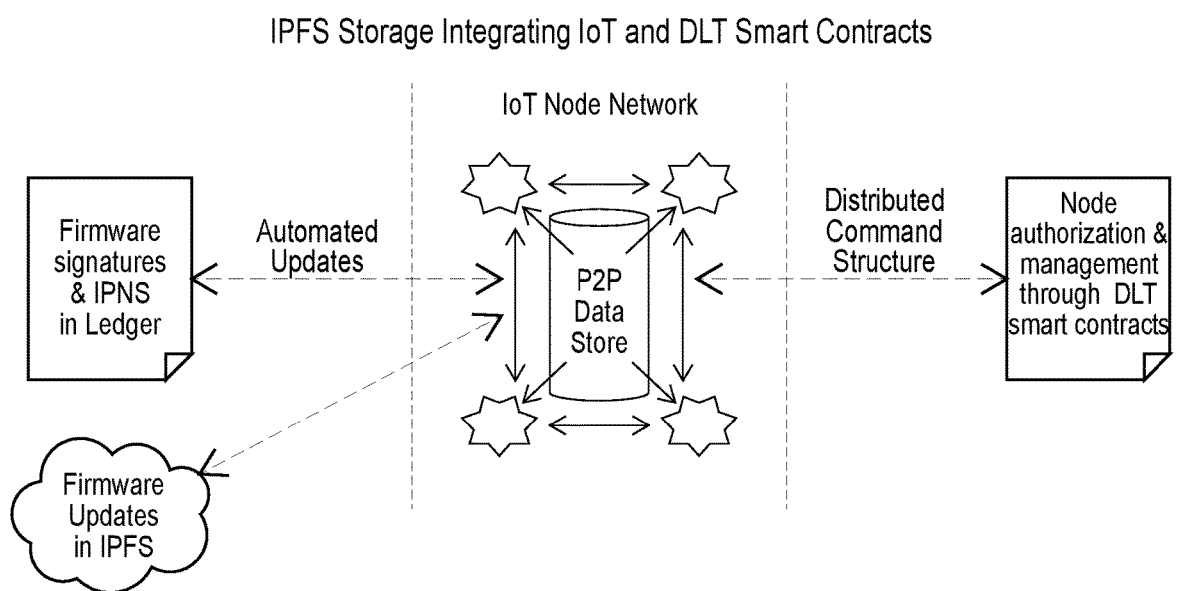
FIG. 98 is a flowchart illustrating a non-limiting preferred embodiment of the IPFS Storage integrating IoT and Decentralized Distributed Ledger (DLT) Smart Contracts.

FIG. 98 is a flowchart illustrating a non-limiting preferred embodiment of the IPFS Storage integrating IoT and Decentralized Distributed Ledger (DLT) Smart Contracts. FIG. 98 shows the IPFS Storage Integrating IoT and DLT Smart Contracts using the IoT node network. The IoT Node Network comprises the P2P data store connecting the Firmware signatures & IPNS in Ledger and Firmware updates in IPFS with Automate updates and the Node authorization & management through DLT smart contracts connected using the Distributed command structure.

Figure 99:
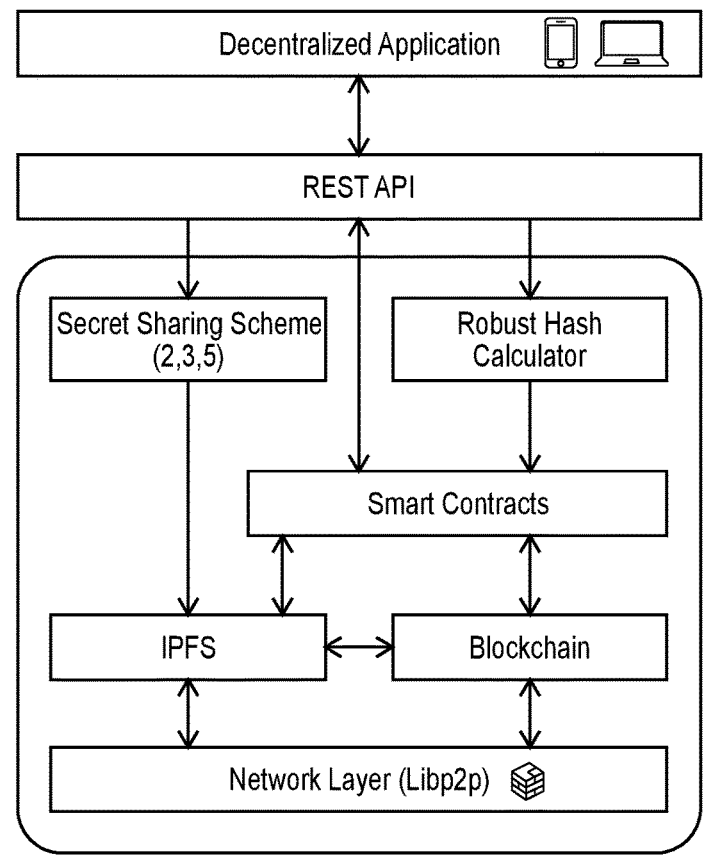
FIG. 99 is a flowchart illustrating a non-limiting preferred embodiment of the Blockchain Framework for IPFS Storage Based on Secret Sharing Key Encryption, IPFS, Smart Contracts and Blockchain.

FIG. 99 is a flowchart illustrating a non-limiting preferred embodiment of the Blockchain Framework for IPFS Storage Based on Secret Sharing Key Encryption, IPFS, Smart Contracts and Blockchain. FIG. 99 shows the Blockchain Framework for IPFS Storage Based on Secret Sharing Key Encryption, IPFS, Smart Contracts and Blockchain. The framework starts with the Decentralized Application, connected to the REST API, and connected to a group of modules for Secret Sharing Scheme (2,3,5), Robust Hash Calculator, Smart Contracts, IPFS, Blockchain, and Network Layer (Libp2p).

Secure Distributed IoT Storage Platform

The RTC System proposes a distributed IoT storage platform for WebRTC video and data content collected from edge IoT systems and devices. The RTC storage platform allows commercial customers to upload, view and shape stored streamed videos and data content collected from remote IoT-WebRTC sessions. The main features of the distributed IoT storage platform include: Security—deploys encryption, authentication and DRM protection with Blockchain; Video Management—supports video file versioning, video recovery and remote upload capability; Zero knowledge privacy—neither RTC nor any other entity or service provider or data center shall have access to the stored video or data files.

Distributed IoT-WebRTC Storage Platform

This section shall explain how the IoT-WebRTC storage platform works.

Step 1—A user has detected a problem with a distributed edge IoT system and need to establish a connection with the device(s) to analyze and repair the problem. The user shall establish a WebRTC P2P connection with the remote device to access the device error data and to establish visual inspection via a mounted camera using WebRTC streamed video capability. The video connection can be established between the user from a smartphone or PC and specifies that the user desires to record the video session and store the video in the user's IoT-WebRTC storage platform. All video streams have the option of using file based encryption using AES 256 GCM encryption.

Step 2—Upload the encrypted streamed video to the storage and sharing platform in the user's account. This upload process includes: user based authentication and the selection of DRM protections to be applied to the stored streamed video.

Figure 100:
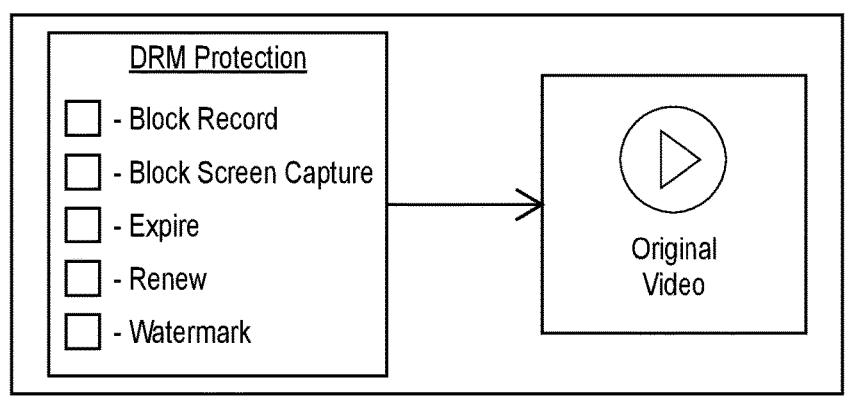
FIG. 100 is a flowchart illustrating a non-limiting preferred embodiment of Uploading Encrypted Streamed Video to Storage and selecting DRM to be applied.

FIG. 100 is a flowchart illustrating a non-limiting preferred embodiment of Uploading Encrypted Streamed Video to Storage and selecting DRM to be applied. FIG. 100 shows how DRM Protection is selected from Block Record, Block Screen Capture, Expire, Renew, and Watermark, for Original Video.

Step 3—Distributed Storage—The video is broken down into segments and processed in parallel.

Figure 101:
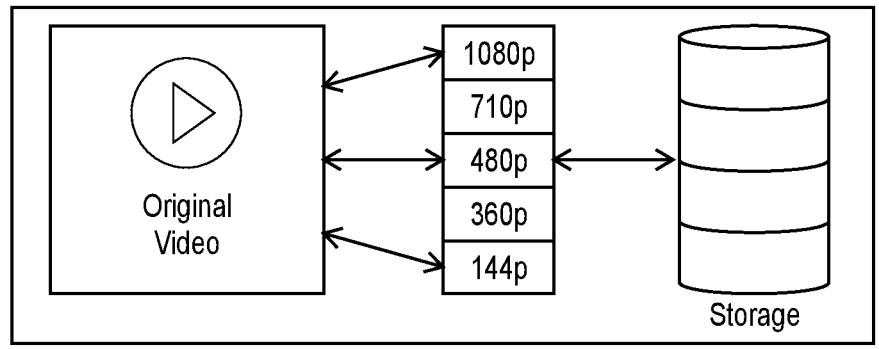
FIG. 101 is a flowchart illustrating a non-limiting preferred embodiment of Distributed Storage.

FIG. 101 is a flowchart illustrating a non-limiting preferred embodiment of Distributed Storage. FIG. 101 shows how Original Video at 1080p, 720p, 450p, 360p, 144p may be broken down into segments and processed in parallel.

Step 4—CDN—A content delivery network (CDN) is a global network of servers that optimize web performance by using the node closest to the user's location for faster delivery of videos.

Figure 102:
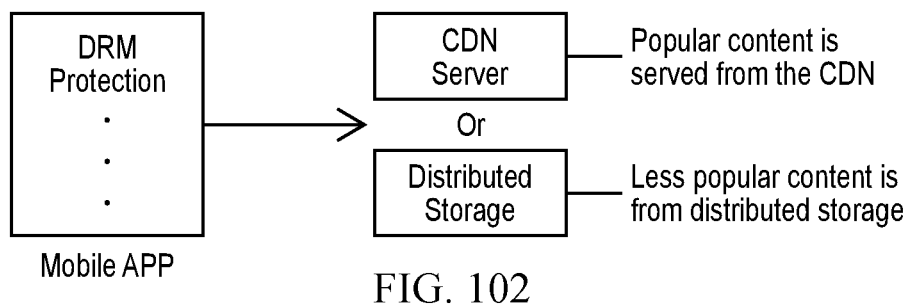
FIG. 102 is a flowchart illustrating a non-limiting preferred embodiment of the Content Delivery Network.

FIG. 102 is a flowchart illustrating a non-limiting preferred embodiment of the Content Delivery Network. FIG. 102 shows how DRM Protection selected within the Mobile App and sent to the CDN Server or Distributed Storage, can be used to differentiate between Popular content served from the CDN, and Less popular content is from Distributed Storage.

Figure 103:
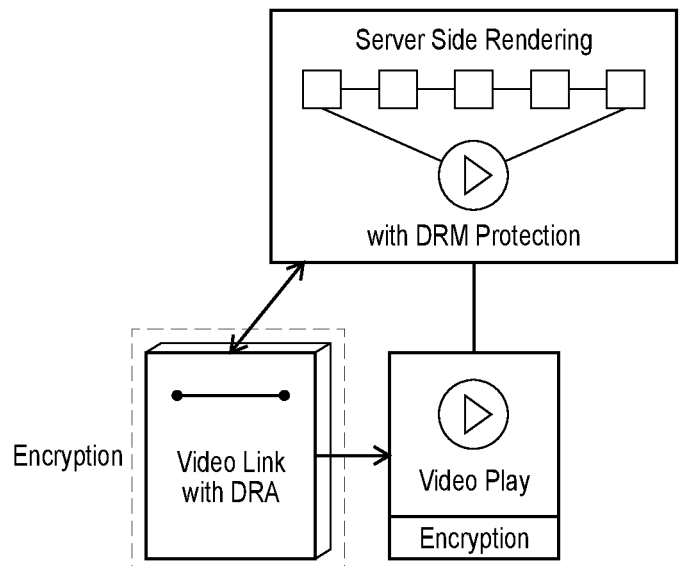
FIG. 103 is a flowchart illustrating a non-limiting preferred embodiment of the Server Side Video Rendering.

Step 5—Server Side Video Rendering—The video is retrieved from either the CDN server or Distributed storage and rendered in the cloud using server side video rendering with DRM Protection FIG. 103 is a flowchart illustrating a non-limiting preferred embodiment of the Server Side Video Rendering. FIG. 103 shows Server Side Rendering with DRM Protection providing Encryption and a Video Link with DRM and a Video Play Encryption.

Figure 104:
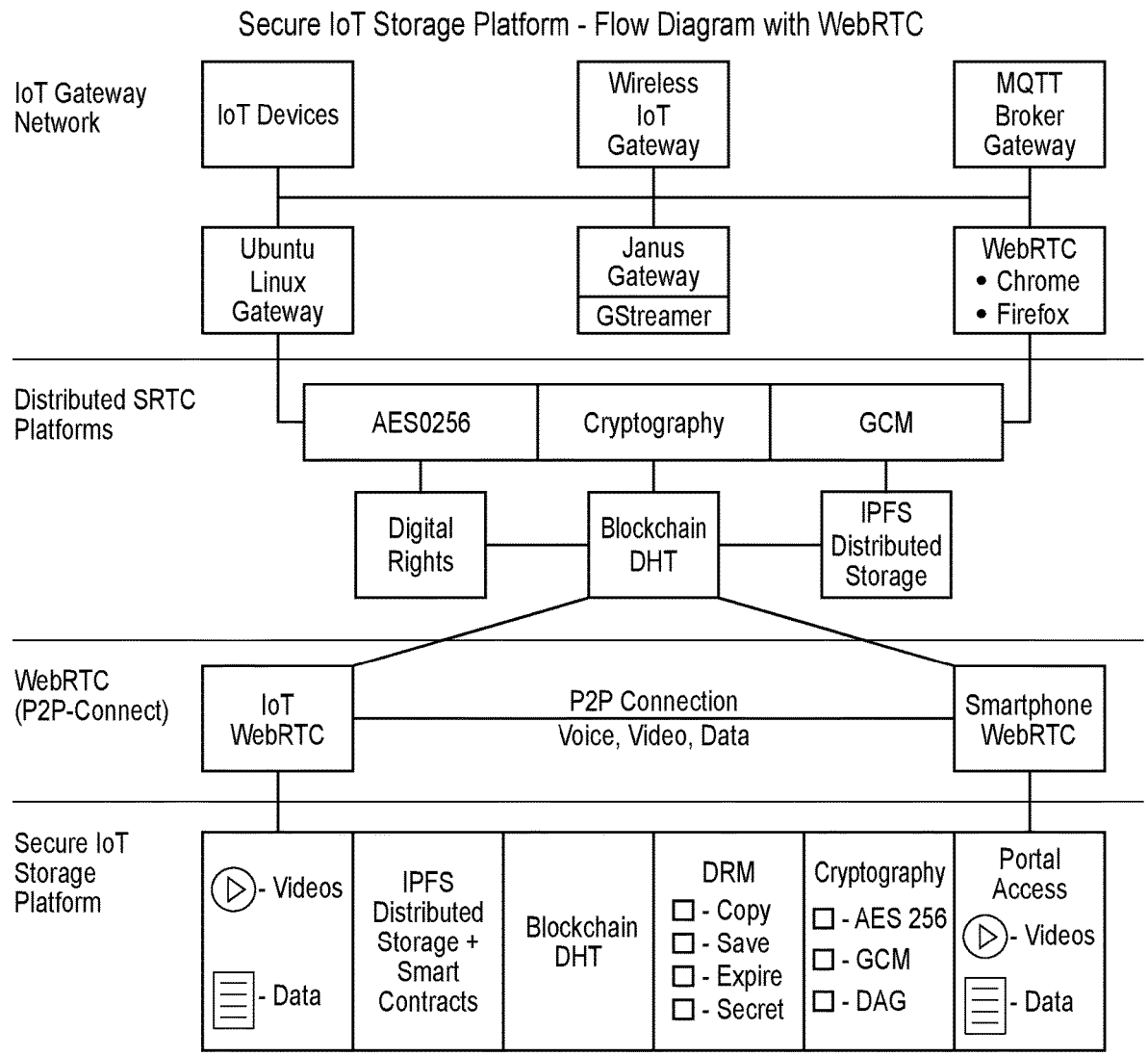
FIG. 104 is a flowchart illustrating a non-limiting preferred embodiment of the Secure IoT Storage Platform, Flow Diagram with WebRTC.

FIG. 104 is a flowchart illustrating a non-limiting preferred embodiment of the Secure IoT Storage Platform, Flow Diagram with WebRTC. FIG. 104 shows the Secure IoT Storage Platform—Flow Diagram with WebRTC having the IoT Gateway Network, the Distributed SRTC Platforms, the WebRTC, and the Secure IoT Storage platform. The IoT Gateway Network comprises IoT Devices connected to the Ubuntu Linux Gateway, a Wireless IoT Gateway connected to the Janus Gateway with GStreamer, and the MQTT Brokers Gateway connected to the WebRTC with Chrome, Firefox, etc. The Distributed SRTC Platforms comprise modules for AES-256, Cryptography, and GCM, and are connected to modules for providing Digital Rights, Blockchain DHT, and IPFS Distributed Storage. The WebRTC (P2P-Connect) module comprises an IoT WebRTC module connecting via the P2P Connection (voice, video, data) to the Smartphone WebRTC module. The Secure IoT Storage Platform comprises Storage for Videos, Audio, and Data using IPFS Distributed Storage & Smart Contracts, available using Blockchain DHT, protected with DRM for e.g. Copy, Save, Expire, Secret, etc. and Cryptography for implementing AES 256, GCM, DAG, and Portal Access for the Videos, Audio, and Data.

Real Time Messaging App for Android and iOS Mobile Platforms and on PC's

This section describes the roles and workflow of the Android/iOS mobile apps to access the SRTC network for data, audio, and video streaming communications and the video storage and sharing platform for users and businesses.

Figure 105:
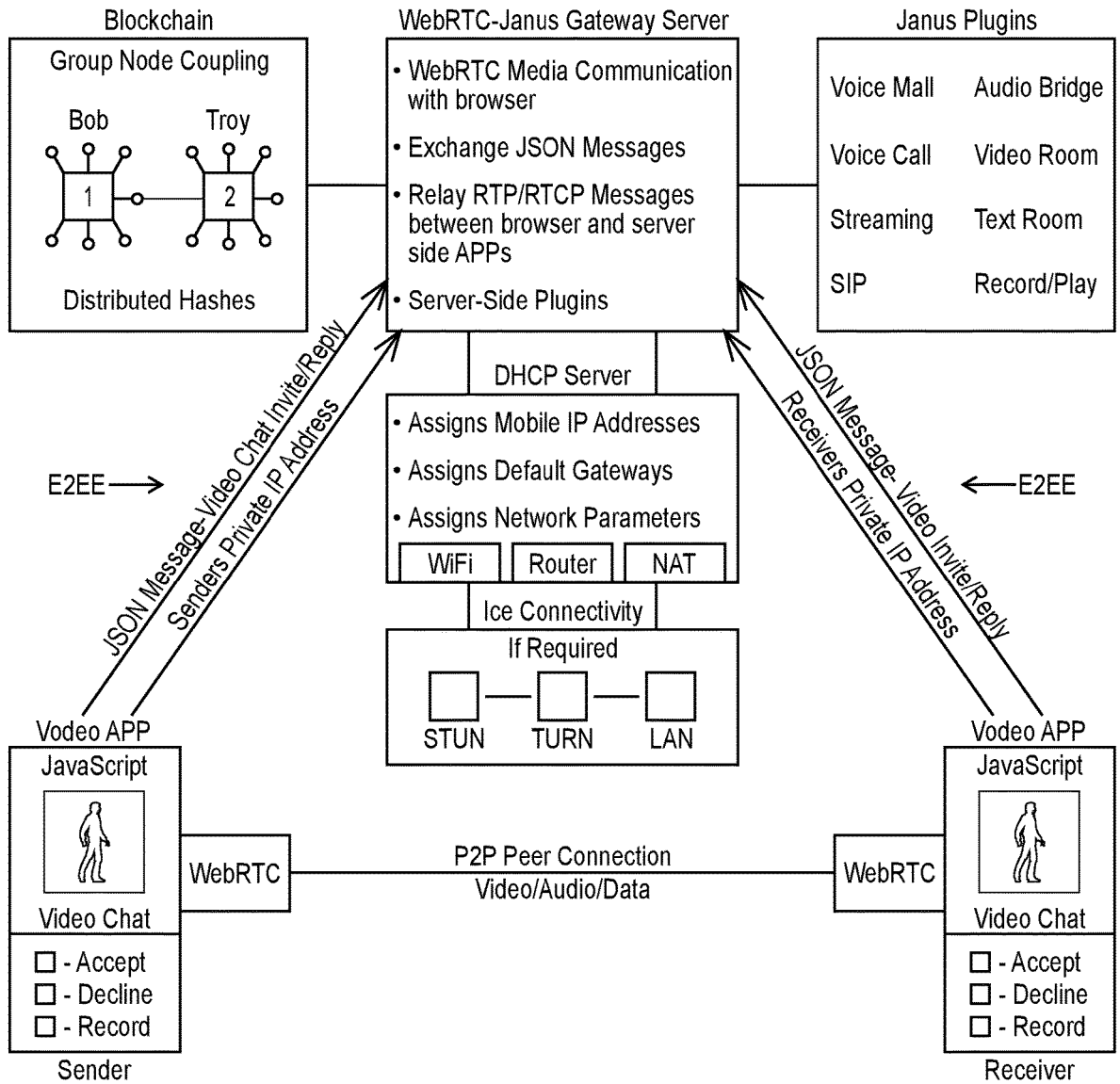
FIG. 105 is a flowchart illustrating a non-limiting preferred embodiment of the Video Workflow—"Vodeo" (™) App, WebRTC, Janus Gateway, Blockchain.

Referring to FIG. 105, there is illustrated an SRTC Systems Architecture, where the subscriber Android/iOS mobile app allows users to access and control all user based operations of SRTC using JavaScript API's, including: WebRTC; Network Servers; Blockchain; Distributed Trust Platform (E2E Encryption); Digital Rights Protection (DRM); and Streamed Video Storage and Sharing Platform.

FIG. 105 shows the features and processes of the IoT device and smartphone video apps.

FIG. 105 is a flowchart illustrating a non-limiting preferred embodiment of the Video Workflow—"Vodeo" (™) App, WebRTC, Janus Gateway, Blockchain. FIG. 105 shows Video Workflow—Vodeo App, WebRTC—Janus Gateway, Blockchain Platform, comprised of the Blockchain component providing Group Node Coupling for Bob and Troy using Distributed Hashes. The WebRTC—Janus Gateway Server provides the WebRTC Media Communication with the Browser(s), Exchanges JSON Messages, Relays RTP/RTCP Messages between browser and server side apps, and interacts with Server side plugins. The Janus Plug-ins module manages Janus plugins for Voice mail, Video Call, Streaming, SIP, Audio Bridge, Video Room, Text Room, and Record & Play. The WebRTC Janus Gateway Server uses E2EE in communications with the Vodeo Apps and uses JSON Message for Video chat invite/reply, and also sends Senders/receivers Private IP Address. The DHCP Server connected to the WebRTC-Janus Gateway server Assigns Mobile IP Addresses, Assigns Default Gateways, Assigns Network Parameters, and manages ICE connectivity with WiFi, Router(s), and NAT. If required, the ICE connectivity module also provides STUN TURN LAN services.

FIG. 105 shows how the Vodeo App running JavaScript establishes the Video Chat, protected with selected rights Accept Decline Record, and uses WebRTC between Sender and Receiver to establish the P2P Peer Connection for Video/Audio/Data.

Figure 106:
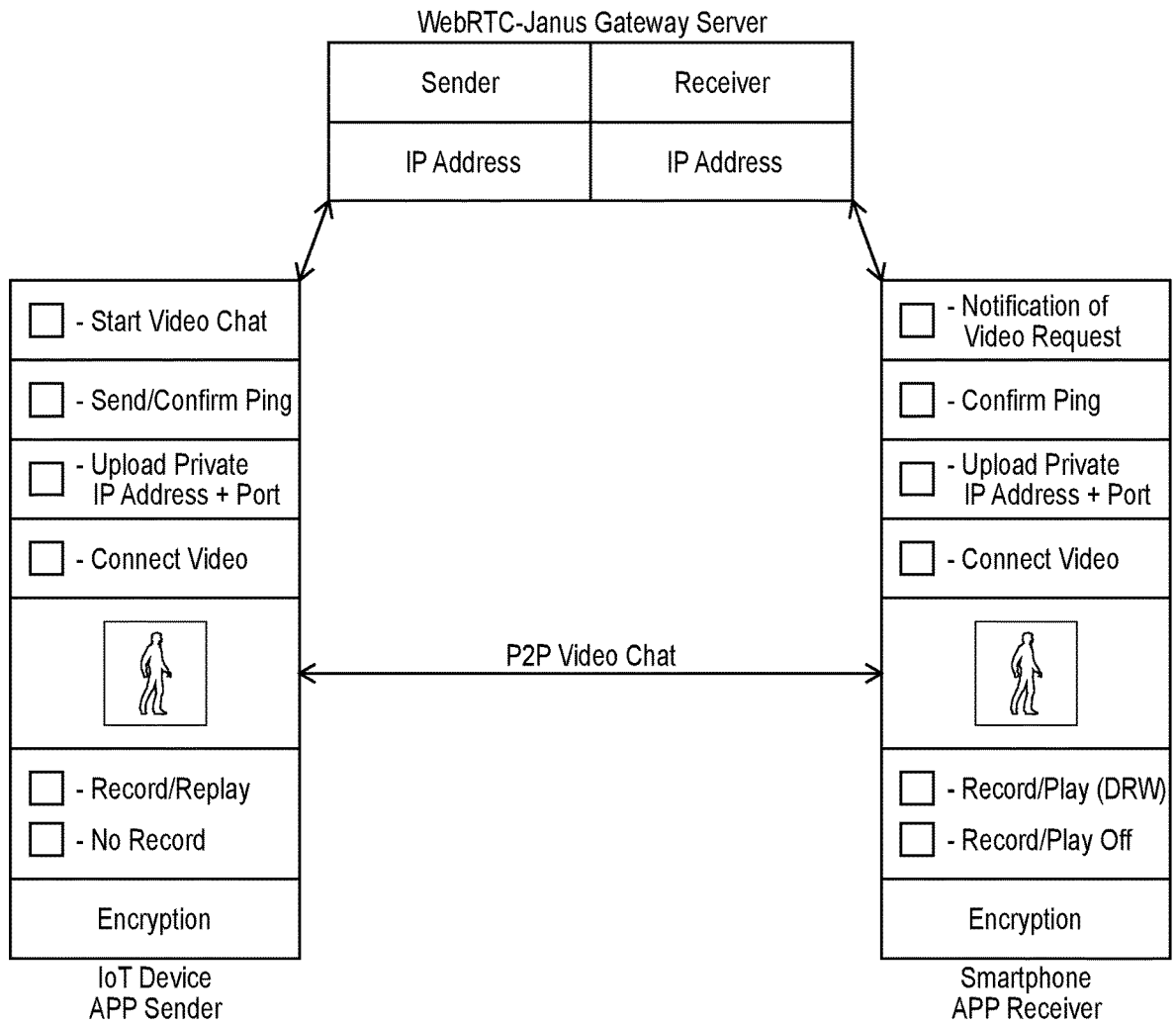
FIG. 106 is a flowchart illustrating a non-limiting preferred embodiment of the App and WebRTC Janus Gateway Server Video Connection.

FIG. 106 is a flowchart illustrating a non-limiting preferred embodiment of the App and WebRTC Janus Gateway Server Video Connection. FIG. 106 shows the App and WebRTC Janus Gateway Server—Video Connection, comprising the WebRTC Janus Gateway Server connecting the Sender and Receiver using their IP Address. The IoT Device App Sender Starts Video Chat, Send/Confirms Ping, Uploads Private IP Address & Port, Connects to Video, Processes DRM for Record/Replay/No Record, and provides encryption. On the Smartphone App Receiver side, respectively, the Smartphone App receiver sends Notification of Video Request, Confirms Ping, Uploads Private IP Address & Port, Connects to Video, Processes Record/Play (DRM)/Record Play off, and provides Encryption.

Figure 107:
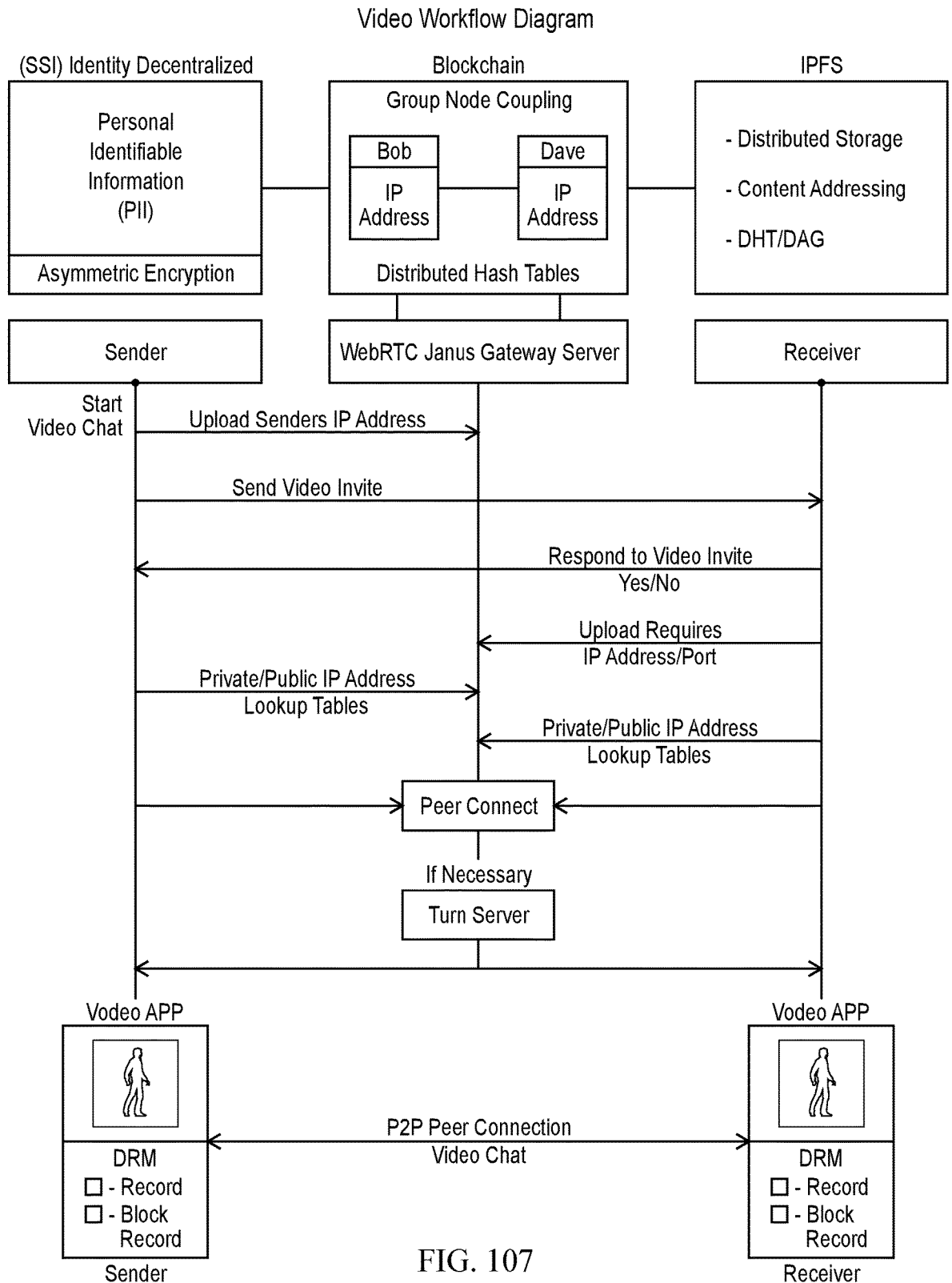
FIG. 107 is a flowchart illustrating a non-limiting preferred embodiment of the Video Workflow Diagram.

FIG. 107 is a flowchart illustrating a non-limiting preferred embodiment of the Video Workflow Diagram. FIG. 107 shows the Video Workflow Diagram comprised of the (SSI) Identity Decentralized, the Blockchain, and the IPFS. The SSI module/platform provides Personally Identifiable Information (PII), and Asymmetric Encryption. The Blockchain module/platform provides Group Node Coupling to connect Bob IP Address to Dave IP Address using Distributed Hash Tables, and managed by the WebRTC Janus Gateway Server. The IPFS module/platform provides Distributed Storage, Content Addressing, and DHT/DAG.

FIG. 107 shows Sender starting Video Chat by Upload Senders IP Address to the WebRTC Janus gateway Server, and then sending the Video Invite to the receiver. The receiver sends the Respond to Vid Invite Yes/No and also sends the Upload Requires IP Address/Port information. The Sender accesses the Private/Public IP Address Look Up Tables through the WebRTC Janus Gateway Server, and the Peer-2-Peer connection is established. The P2P Peer Connection enables the Video Chat using the Vodeo App, and the system enforces the DRM to restrict rights to Record/Block Record between the Sender and Receiver.

Figure 108:
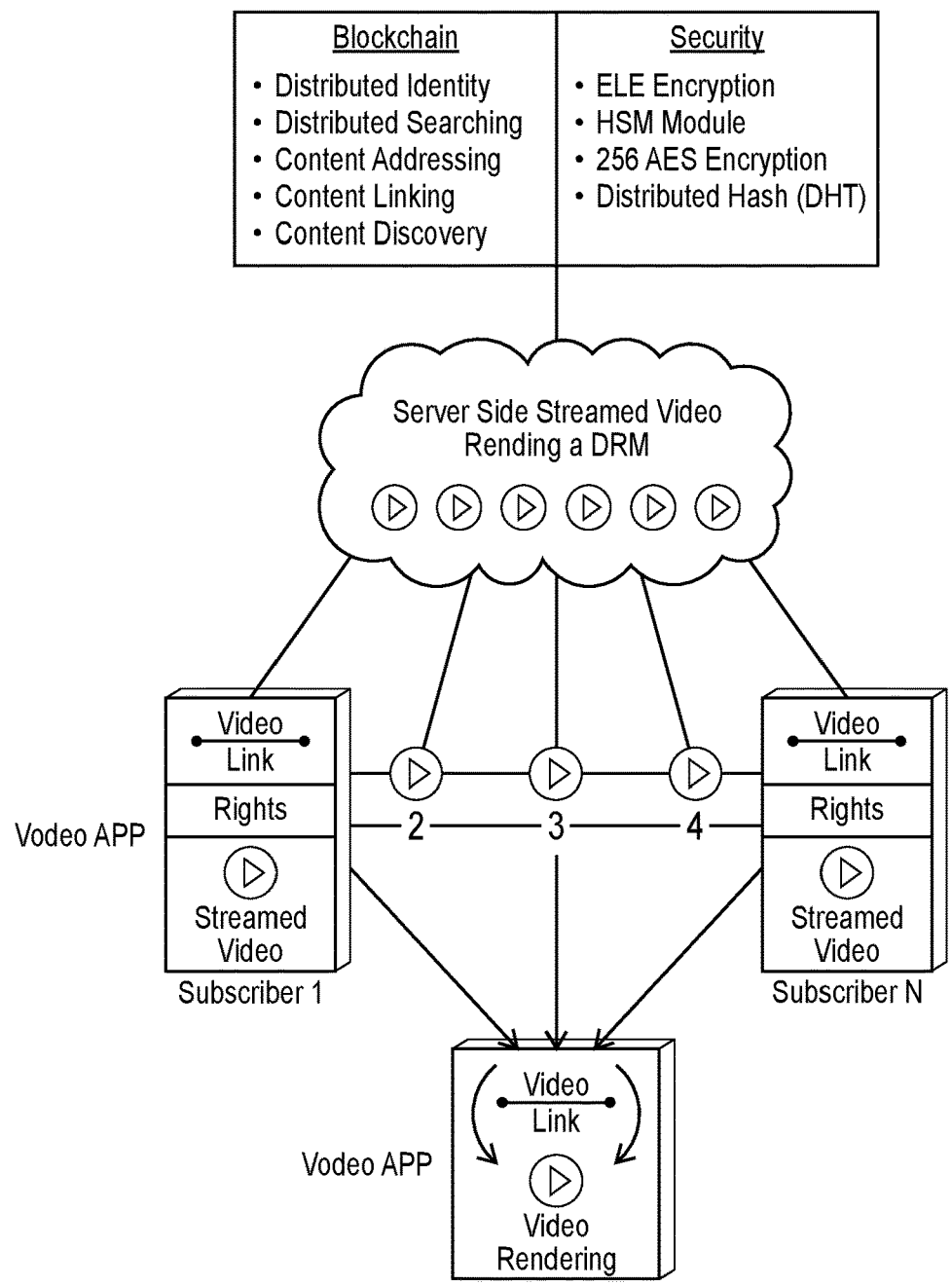
FIG. 108 is a flowchart illustrating a non-limiting preferred embodiment of the Streame Video Sharing.

FIG. 108 is a flowchart illustrating a non-limiting preferred embodiment of the Streamed Video Sharing. FIG. 108 shows how Streamed Video Sharing comprises the Blockchain module/platform providing Distributed Identity, Distributed Searching, Content Addressing, Content Linking, and Content Discovery, and comprises the Security platform/module for E2E Encryption, HSM Module, 256 AES Encryption, and Distributed Hash (DHT). These are connected to the Server side Streamed Video Rendering with DRM cloud, which serves content to through the Vodeo App to provide the Video Link, with Rights to view Streamed Video from Subscriber 1 to Subscriber N. FIG. 108 also shows Video Rendering of the Video Link as received from Subscribers.

Figure 109:
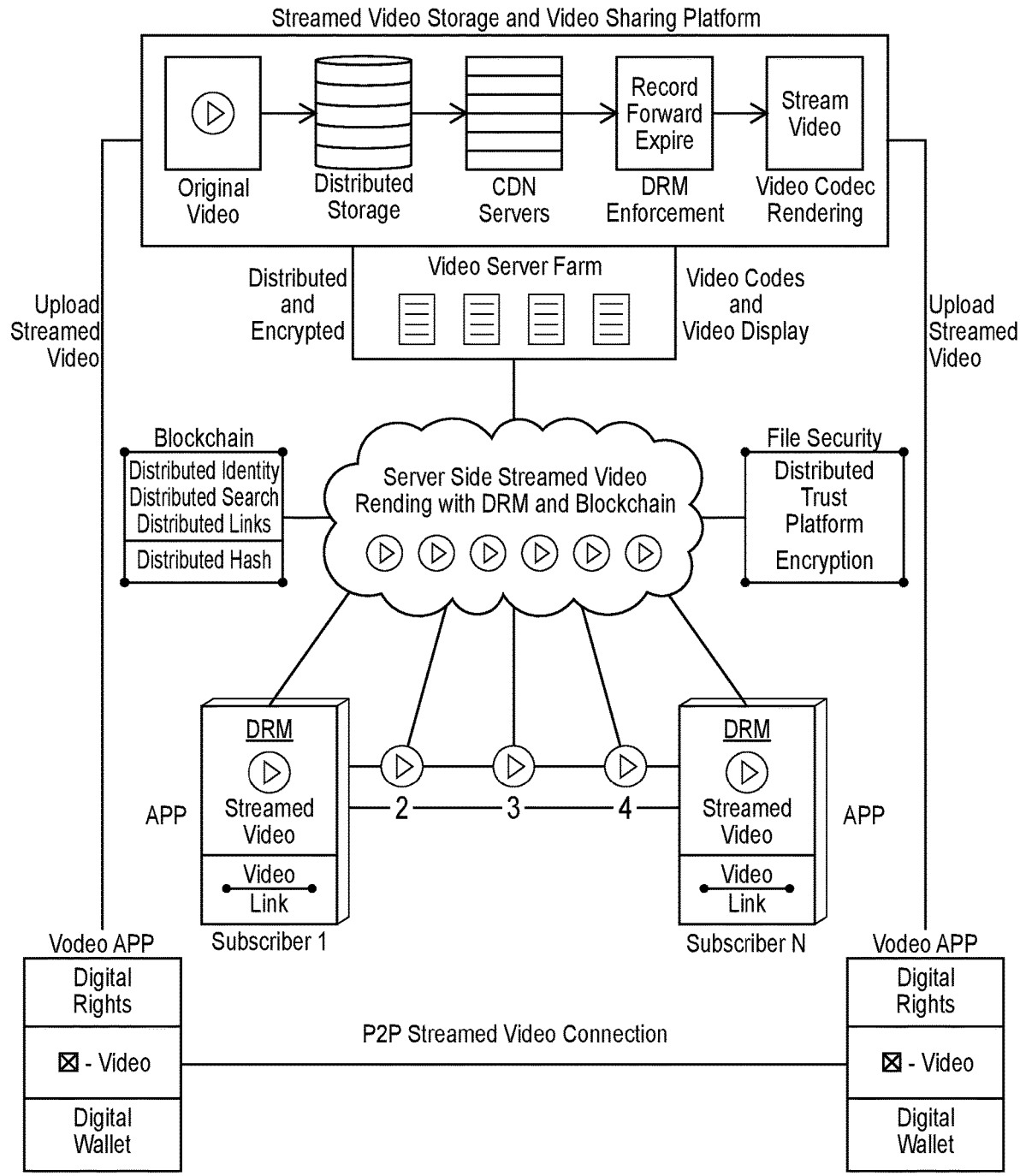
FIG. 109 is a flowchart illustrating a non-limiting preferred embodiment of the Streamed Video Storage and Sharing Vault Accessed by the "Vodeo" chat Apps over a P2P Network.

FIG. 109 is a flowchart illustrating a non-limiting preferred embodiment of the Streamed Video Storage and Sharing Vault Accessed by the "Vodeo" chat Apps over a P2P Network. FIG. 109 shows the Streamed Video Storage and Sharing Vault Accessed by Vodeo Chat Apps over a P2P Network comprising Original Video uploaded to Distributed Storage using CDN Servers restricted with DRM Enforcement (Record Forward Expire) to provide Streaming Video with Video Codec Rendering.

FIG. 109 shows the Video Server Farm, which is Distributed & Encrypted, and providing Video Codecs & Video Display function modules connecting to the Server-side Streamed Video Rendering with DRM Blockchain cloud. The Server-side Streamed Video Rendering with DRM Blockchain cloud connected to the Block Chain module with Dist Identity, Dist Search, Dist Links using Distributed Hash. The Server-side Streamed Video Rendering with DRM Blockchain cloud also connected to the File Security module with the Distributed Trust Platform and Encryption modules.

FIG. 109 shows how the App allows Subscriber 1 to connect to Subscriber N and share DRM Streamed Video over the P2P Streamed Video Connection using Video Links provided through the "Vodeo" App. The Vodeo App allows setting the Digital Rights, selection of Video, and storage within the Digital wallet.

Figure 110:
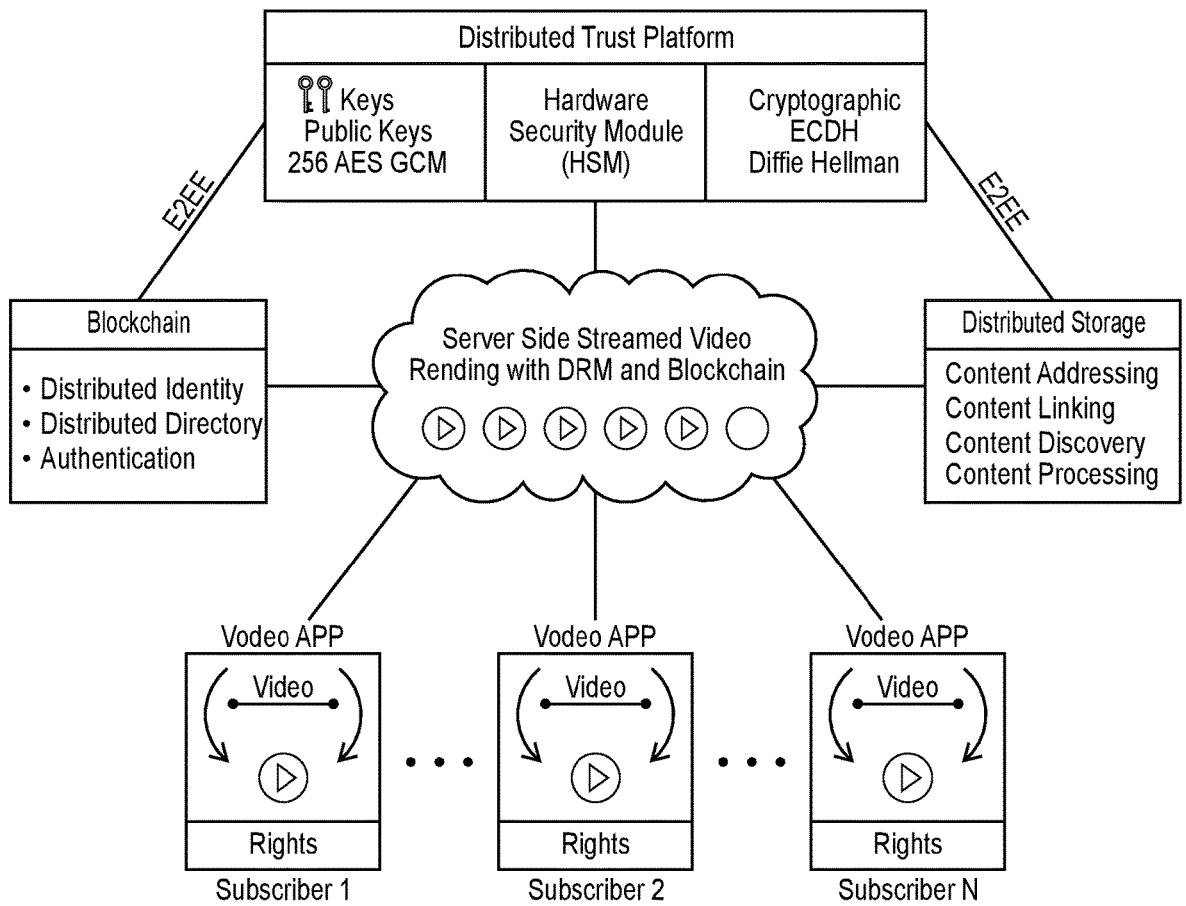
FIG. 110 is a flowchart illustrating a non-limiting preferred embodiment of the Video Sharing Platform with Server Side Streamed Video Rendering with DRM and Blockchain.

FIG. 110 is a flowchart illustrating a non-limiting preferred embodiment of the Video Sharing Platform with Server Side Streamed Video Rendering with DRM and Blockchain. FIG. 110 shows Server-side streamed Video Rendering with DRM & Blockchain comprising a Distributed Trust Platform having a Module for Keys, Public Key, 256 AES GCM, Hardware Security Module (HSM), and Cryptographic ECDH Diffie Hellman Module. This is connected using E2EE to a Blockchain having Dist. Identity, Dist. Directory, and Authentication. This is also connected to Server-side Streamed Video Rendering with DRM & Blockchain Cloud, and is also connected using E2EE to the Distributed Storage module having Content Addressing, Content Linking, Content Discovery, and Content Processing. The Server-side Streamed Video Rendering with DRM & Blockchain Cloud then provides through the Vodeo App, the Video/Link with Subscriber Rights. All stored videos and user identities are protected from security breaches including MiTM and Ransomware.

Zero Trust Security for IoT Applications and Connected Devices

The zero-trust security model (also, zero trust architecture, zero trust network architecture, ZTA, ZTNA), sometimes known as perimeterless security, describes an approach to the design and implementation of IT systems. The main concept behind zero trust is that devices should not be trusted by default, even if they are connected to a managed corporate network such as the corporate LAN and even if they were previously verified. In most modern enterprise environments, corporate networks consist of many interconnected segments, cloud-based services and infrastructure, connections to remote and mobile environments, and increasingly connections to non-conventional IT, such as IoT devices. The once traditional approach of trusting devices within a notional corporate perimeter, or devices connected to it via a VPN, makes less sense in such highly diverse and distributed environments. Instead, the zero trust approach advocates mutual authentication, including checking the identity and integrity of devices irrespective of location, and providing access to applications and services based on the confidence of device identity and device health in combination with user authentication.

Zero Trust Architecture

Zero Trust security is an architectural model for network IoT security which adopts the guiding concept that an IoT network is always assumed to be hostile and both external and internal threats exist at all times. Zero Trust mandates a "never trust, always verify" approach granting least privilege access based on dynamic evaluation of the trustworthiness of users and their IoT devices, and any transaction risk, before they are allowed to connect to the network resources. This is the Trust-Centric model and the foundation of Zero Trust security. In August 2020, NIST issued a Special Publication 800-207 which describes the Zero Trust architecture (ZTA) and suggests approaches to IT and IoT security for organizations switching to pursue zero trust principles. These figures describe the elements of the architecture and briefly outline products and functionality in the RTC system for IoT.

Figures 111, 112:
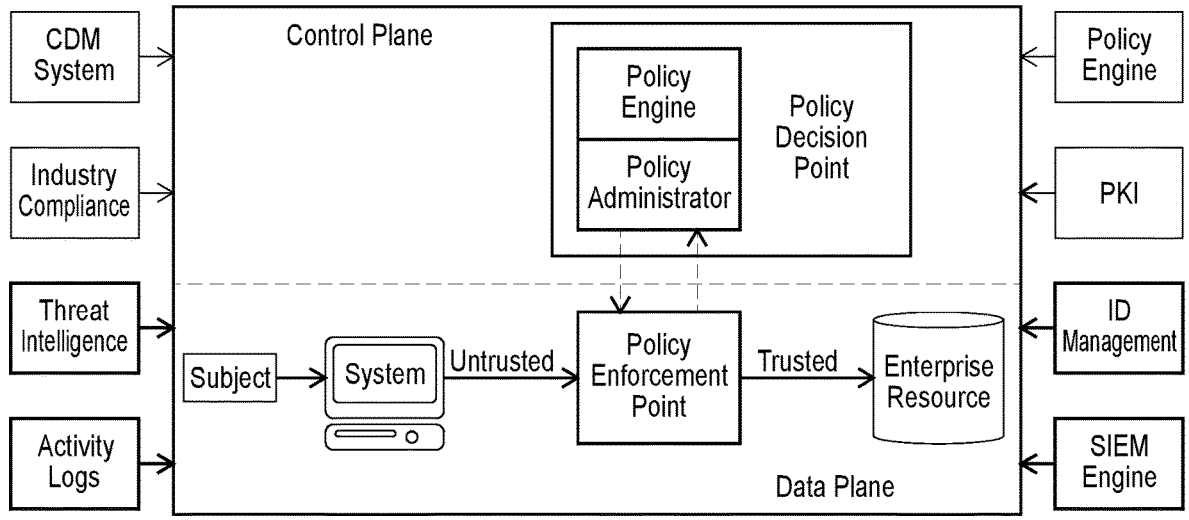
FIG. 111 is a flowchart illustrating a non-limiting preferred embodiment of the Core Zero Trust Logical Components and the Relationship between Owners, DIDs, and VCs.
FIG. 112 is a flowchart illustrating a non-limiting preferred embodiment of the Zero Trust diagram.

FIG. 111 is a flowchart illustrating a non-limiting preferred embodiment of the Core Zero Trust Logical Components and the Relationship between Owners, DIDs, and VCs. FIG. 111 shows Zero Trust Logical Components for the RTC System for IoT, comprising inputs from CDM System, and Industry Compliance connecting to the Control Plane which has Policy Engine, Policy Admin, and Policy Decision Point. Inputs from Threat Intelligence, and Activity Logs, connect to the Subject, and System creating an Untrusted Policy Enforcement Point to a Trusted Enterprise Resource in the Data Plane. Additional inputs from Policy Engine, PKI, ID Management, and SIEM System complete the Core Zero Trust Logical Components, and RSA Security Business Unit Applicable Overlay.

FIG. 112 is a flowchart illustrating a non-limiting preferred embodiment of the Zero Trust diagram. FIG. 112 shows: 1 Know your ARCHITECTURE; 2 Create a single strong USER ID; 3 Create a strong DEVICE ID; 4 AUTHENTICATE everywhere; 5 Know the HEALTH of devices; 6 Focus MONITORING on devices; 7 Set POLICIES according to value; 8 Control ACCESS to your device; 9 Don't trust your NETWORK; 10 Choose ZERO TRUST services.

Zero Trust

Following are descriptions of the logical components of the Zero Trust implementation RTC system for IoT.

Policy Engine

This component is responsible for the ultimate decision to grant access to a resource for a given subject. The policy engine uses enterprise policy as well as input from external sources (e.g., CDM systems, threat intelligence services described below) as input to a trust algorithm to grant, deny, or revoke access to the resource. The policy engine is paired with the policy administrator component. The policy engine makes and logs the decision, and the policy administrator executes the decision. RTC ZTA's role and attribute-based access, conditional access, and risk-based analytics are all fundamental components to the establishment of both a policy decision point and policy engine.

Policy Administrator

This component is responsible for establishing and/or shutting down the communication path between a subject and a resource. It would generate any authentication and authentication token or credential used by a client to access an enterprise resource. It is closely tied to the policy engine and relies on its decision to ultimately allow or deny a session. Some implementations may treat the policy engine and policy administrator as a single service. The policy administrator communicates with the policy enforcement point when creating the communication path. This communication is done via the control plane. RTC ZTA has based its authentication method and user experiences on Self-Sovereign Identity (SSI) to manage and administer authentication and to determine access when requested by a user and by the policy enforcement point.

Policy Enforcement Point

This system is responsible for enabling, monitoring, and eventually terminating connections between a subject and an enterprise resource. This is a single logical component in zero trust architecture but may be broken into two different components: the client (e.g., agent on user's laptop) and resource side (e.g., gateway component in front of resource that controls access) or a single portal component that acts as a gatekeeper for communication paths. Beyond the policy enforcement point is the implicit trust zone hosting the enterprise resource. RTC ZTNA can both determine policy decisions enforced by partner policy enforcement points (VPNs, websites, applications, etc.) and directly enforce policy at endpoint devices. RTC ZTA, acting in a policy decision capacity, works with a myriad of partner devices (desktops, servers, virtual machines, web servers, portals, network devices, applications etc.) to authenticate users and determine access privileges. RTC ZTA Endpoint can isolate and quarantine endpoints. It can block specific processes on endpoint devices, either manually or through risk- or rule-based enforcement. As new threats are uncovered, RTC ZTA Endpoint agents can blacklist files to ensure rapid defense from attacks such as ransomware. Importantly, it extends (fully to device both on corporate networks and 'roaming' or off-network devices.

Data Access Policies

Figure 113:
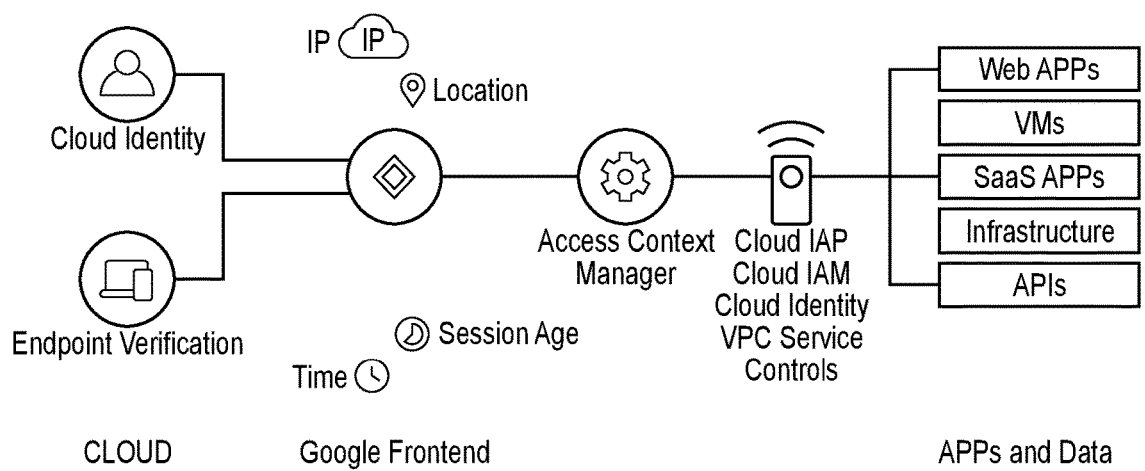
FIG. 113 is a flowchart illustrating a non-limiting preferred embodiment of the Content Aware Access.

FIG. 113 illustrates that RTC Identity Governance and Lifecycle is an ideal starting point for authorizing access to a resource with a clear focus on governance, visibility across structured and unstructured data, and analytics and intelligence to ensure principles of least privilege can be applied, including Identity Management System: Self Sovereign Identity (SSI) and RTC ZTA.

Security Information and Event Management (SIEM) System collects security-centric information for later analysis. This data is then used to refine policies and warn of possible attacks against enterprise assets. RTC ZTA Platform is an evolved SIEM encompassing capabilities beyond that of a traditional log-based SIEM. It retains both log and network information in the form of native logs, full packets or as metadata. Pre-populated compliance reports help to determine alignment with specific security frameworks. Extensive data analytics engines (including UEBA) provide sophisticated capabilities to improve security operations beyond those of traditional SIEM workflows. Data visualization enables security analysts to quickly identify risks, take action to remediate issues, and collaborate across the security organization.

Threat Intelligence

This provides information from internal or external sources that help the policy engine make access decisions.

These could be multiple services that take data from internal and/or multiple external sources and provide information about newly discovered attacks or vulnerabilities. This also includes blacklists, newly-identified malware, and reported attacks to other assets that the policy engine will want to deny access to from enterprise assets. RTC ZTA Platform offers and incorporates threat intelligence through RSA Live. RTC incorporates subscription-based threat feeds, open source threat feeds, crowdsourced threat intelligence and maintains a library of historical information derived from investigating previous risks. Open source, external and crowdsourced threat intelligence give organizations visibility into new and emerging threats. Threat intelligence can trigger automated actions, which can include access decisions.

RTC 2TA leverages signals—internal and external—to increase assurance (positive signals) and identify threats (negative signals). For example, internal signals like user history, behavioral analytics, IP address, network, and location can be factors to determine risk-based authentication and access decisions. And external signals like threat analytics from the RTC 2TA Platform and other extended detection and response (XDR) and enterprise mobility management (EMM) systems can also be incorporated.

Network and System Activity Logs

This enterprise system aggregates asset logs, network traffic, resource access actions, and other events that provide real-time (or near-real-time) feedback on the security posture of enterprise information systems. RTC ZTA Platform is designed and developed to leverage the intelligence found in logs, NetFlow, network packets and endpoint data to provide information to security organizations to identify, investigate, and resolve risky conditions and threats. It uses patented technology to collect data and process it as metadata faster than other SIEMs on the market, while also retaining raw data as needed in parallel. This process makes information readily available when investigating incidents instead of waiting for the solution to process data from a large data store.

Content Aware Access

FIG. 113 is a flowchart illustrating a non-limiting preferred embodiment of the Content Aware Access. FIG. 113 shows Enabling with context-aware access by using Cloud Identity, Endpoint Verification, IP, Location, Session Age, Time, Google Frontend, Access Context Manager, Cloud IAP, Cloud IAM, Cloud Identity, VPC Service Controls, Web apps, VMs, SaaS apps, Infrastructure, APIs, and Apps and data.

The following diagrams illustrate the current "AS IS" trusted perimeter and the new Zero Trust "TO BE" perimeter-less concept where the trust boundary now extends from the network edge and the cloud edge.

FIG. 114 is a flowchart illustrating a non-limiting preferred embodiment of the Zero Trust Network Comparison with Real-Time Communications (RTC) Zero Trust Network Architecture (ZTNA) Approach. FIG. 114 shows Employees Partners, Things, Devices connecting to Campus connected to WAN connected to DC connected to CAP connected to Commercial Cloud, AWS, MS Network and CAP connected to IT, SaaS. WAN also connected to Security Stack connected to Network connected to Web/Internet. FIG. 114 describes a Trusted Perimeter "AS IS". Network is Trusted, Threat-Centric, IP Based ACL Control, Static Policy & Limited Segmentation, and Hardened Perimeter Security.

Figure 115:
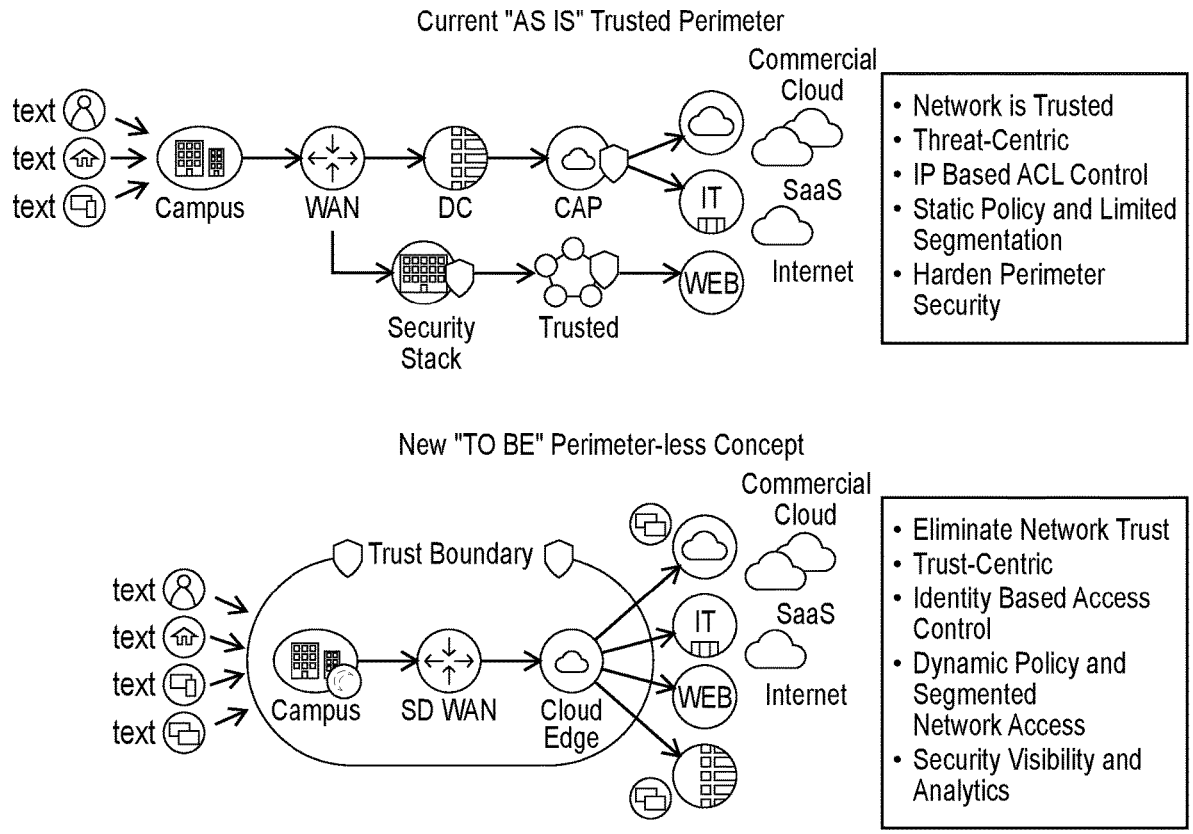
FIG. 115 is a flowchart illustrating a non-limiting preferred embodiment of the new Zero Trust Perimeter-less Approach.

FIG. 115 is a flowchart illustrating a non-limiting preferred embodiment of the new Zero Trust Perimeter-less Approach. FIG. 115 shows Employees Partners, Things, Devices connecting to Campus connected to WAN connected to DC connected to CAP connected to Commercial Cloud, AWS, MS Network and CAP connected to IT, SaaS. WAN also connected to Security Stack connected to Network connected to Web/Internet. FIG. 115 shows campus, SD WAN, and cloud edge within a trust boundary. FIG. 115 describes a Zero Trust Perimeter, including Eliminate Network Trust, Trust-Centric, Identity Based Access Control, Dynamic Policy & Segmented Network Access, Software-Defined Security Perimeter, and Security Visibility and Analytics.

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited, unless so stated, to particular methods, order of processing steps, components, materials, systems, partial aspects of processes, components or systems, uses, compounds, compositions, standards, routines, modes, computers, hardware, firmware, and software programming which can, of course, vary. It is also to be understood that the terminology used herein is for the purpose of describing particular embodiments only, and is not intended to be limiting unless specifically stated.

While various embodiments have been described above, it should be understood that they have been presented by way of example only, and not limitation. Where methods described above indicate events occurring in specific order, the ordering of events is sequential, but the invention contemplated herein may also include modifications that do not depart from the scope and spirit of the invention. Additionally, certain of the events may be performed concurrently in a parallel process when possible, as well as performed sequentially as described above.

Where schematics and/or embodiments described above indicate certain components arranged in certain orientations or positions, the arrangement of components is specified, but the invention contemplated herein may also include modifications that do not depart from the scope and spirit of the invention.

While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described that do not depart from the scope and spirit of the invention. Various of the above-disclosed and other features and functions, or alternatives thereof, may be combined into many other different systems or applications that do not depart from the scope and spirit of the invention.

Various presently unforeseen or unanticipated alternatives, modifications, variations, or improvements therein may be subsequently made by those skilled in the art, each of which is also intended to be encompassed by the disclosed embodiments. It is therefore to be understood that within the novel, unobvious, enabled, and described scope of the broadest reasonable interpretation of the appended claims, the invention may be practiced otherwise than as narrowly described. Accordingly, all such modifications are intended to be included within the novel, unobvious, enabled, and described scope of this invention as defined in the broadest reasonable interpretation of the following claims-.ABSTRACT The invention relates to processes and systems for using Web Real-Time Communications (RTC) to connect and communicate with devices used in an Internet of Things (IoT) framework, and devices made for the same.

The invention claimed is:

1. A communication and sharing system for assigning an internet protocol (IP) address to a data or video fee from a wireless internet of things (IoT) device to establish a Web Real-Time Communication (WebRTC) peer-to-peer connection to a user communication device, comprising:
   a WebRTC application of a user communication device having program instructions saved to memory and executable on a processor to establish an encrypted peer-to-peer communication with the wireless IoT device,
   said WebRTC application having a discovery module with program instructions to send a discovery request to obtain an IoT Device IP address from a WebRTC Cloud Server,
   said WebRTC Cloud Server assigning the IoT Device IP Address to the IoT data or video feed from the wireless IoT device selected from an IoT sensor, IoT switch, IoT camera, IoT meter, IoT receiver, and IoT wireless antenna,
   an IoT Protocol Cloud Gateway having an Message Queue Telemetry Transport protocol (MQTT) broker connected to the wireless IoT device and programmed to transport the IoT data or video feed over TCP/IP to an IoT Software Cloud Platform,
   the IoT Software Cloud Platform having a data and video module to receive the IoT data or video feed and perform data and video processing, storage/collection, analytics, visualization, and IoT device management,
   a Janus Media and GStreamer Streaming Media (JM-GSM) Cloud Server connected to the IoT Software Cloud Platform to receive the processed IoT data or video feed, said Janus Media and GStreamer Streaming Media (JM-GSM) Cloud Server having a Janus-server-side plugin to enhance real-time video and having a GStreamer video and data processing module for creating streaming media,
   the WebRTC Cloud Server connected to the Janus Media and GStreamer Streaming Media (JM-GSM) Cloud Server, said WebRTC Cloud Server connected to a WebRTC cloud server farm having a WebRTC browser to provide WebRTC peer-to-peer connection between the IoT device and the first communication device, said WebRTC Cloud Server connected to a Cloud Dynamic Host Configuration Protocol (DHCP) Server to assign the IoT Device IP Address, and
   a WebRTC Signaling Server connected to the WebRTC Cloud Server, said WebRTC Signaling Server in communication with the WebRTC application on the first communication device using a Session Management Javascript Application Programming Interface (API) and using a Peer Connection Javascript API.

2. The system according to claim 1,
   wherein the WebRTC browser is hosted on a cloud-accessed virtual machine that is part of a browser farm comprising a plurality of cloud-accessed virtual machines each having a WebRTC browser installed thereon, and wherein each WebRTC browser is configured to handle from 1-4 individual processed IoT data or video feeds;
   wherein the IoT device is a wireless IoT device selected from an IoT sensor, IoT switch, IoT camera, IoT meter, IoT receiver, and IoT wireless antenna.

3. The system according to claim 1, a user communication device having a processor and configured to send a discovery request from a WebRTC application installed on the user communication device to a WebRTC Signaling Server connected to the WebRTC Cloud Server, to establish an encrypted peer-to-peer communication between the user communication device and the IoT device, the discovery request obtaining the IoT Device IP address from the WebRTC Cloud Server and sending it to the user communication device, wherein said WebRTC Signaling Server is in communication with the WebRTC application on the user communication device using a Session Management Javascript API and using a Peer Connection Javascript API.

4. The system according to claim 3, wherein
   said WebRTC application has a blockchain module to connect the user communication device as a first node to the IoT device as a second node in a Private Blockchain network,
   the WebRTC application having an invite module to send an invite message to a communication session from the user communication device to the IP address of the IoT device through a WebRTC browser extension to a WebRTC signaling server operatively connected to the Private Blockchain network; and
   the WebRTC application having an accept-connection module to establish encrypted WebRTC peer-to-peer connection between the WebRTC browser of the user communication device and the WebRTC browser connected with the wireless IoT device in response to an acceptance by the wireless IoT device of the invite sent by the user communication device.

5. The system according to claim 4, comprising a Saving Module in the WebRTC application to transmit the communication session, in an encrypted communication between the user communication device and a Cloud Storage Server, using a distributed hash table, wherein the IP address of the user communication device is a key mapped to a second value that is a saved communication session.

6. The system according to claim 4, comprising a DRM Module in the WebRTC application to assign, using a menu of the WebRTC application on the user communication device, a DRM permission to the communication session saved to the Cloud Storage Server network, wherein the DRM permission is selected from the group consisting of: record, not record, store, screen share, revoke, expire, offline view, blacklist, copy, forward, screen capture, rights violation, and cancel/disappear.

7. The system according to claim 5, comprising a Rendering Module in the WebRTC application to render in the Cloud Storage Server, an HTML file of the saved communication session, the HTML file stored in the Cloud Storage Server and having a URL link associated therewith.

8. The system according to claim 7, comprising a DRM Enforcement Module in the WebRTC application to enforce the DRM permission of the communication session, and having programming instructions wherein said Cloud Storage Server is in encrypted communication with the wireless IoT device, said wireless IoT device having the WebRTC application operatively connected to the WebRTC browser of the wireless IoT device to access, using the URL link, the HTML file of the saved communication session and rendering the saved communication session on the Cloud Storage Server, and said WebRTC application enforces the DRM permission of the saved communication session using the DRM enforcement module in the WebRTC application, and said DRM enforcement module configured to send an enforcement command when a DRM permission violation is detected to revoke an encryption key that encrypts an electronic signal between the WebRTC application and the WebRTC browser, wherein the electronic signal is between a CODEC in the WebRTC browser and a playback component or module for a speaker or display of the wireless IoT device.

9. The system according to claim 8, comprising a Private Blockchain Module in the WebRTC application to communicate with the Cloud Storage Server and provide user identity, authentication, a digital hash, Group Node Coupling, personally-identifiable information (PII) security, content linking, content searching, and content addressing.

10. The system according to claim 9, comprising a Hardware Security Module in the WebRTC application to communicate with the Cloud Storage Server to provide AES 256 GCM encryption, and ECDH Diffie-Hellman encryption for audio and video streams.

11. The system according to claim 10, comprising a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message.

12. The system according to claim 11, wherein the user communication device is selected from a mobile communication device, a desktop computer communication device, and a tablet communication device.

13. A process for assigning an internet protocol (IP) address to a data or video fee from a wireless internet of things (IoT) device to establish a Web Real-Time Communication (WebRTC) peer-to-peer connection to a user communication device in a communication system and sharing platform, comprising:
  Sending data or video from an internet-of-things (IoT) device over transmission control protocol/internet protocol (TCP/IP) to an IoT Protocol Gateway comprising an Message Queue Telemetry Transport protocol (MQTT) Broker in communication with the IoT device;
  Sending the IoT device data or video from the IoT Protocol Gateway to an IoT Software & Artificial Intelligence (A.I.) Platform Cloud Server having a data and video module to perform data and video processing, storage/collection, analytics, visualization, and IoT device management and generating a processed IoT data or video feed;
  Sending the processed IoT data or video feed to a Janus Media and GStreamer Streaming Media (JM-GSM) Cloud Server connected to the IoT Software Cloud Platform, said Janus Media and GStreamer Streaming Media (JM-GSM) Cloud Server having a Janus-server-side plugin to enhance real-time video and having a GStreamer video and data processing module for creating streaming media;
  Sending the processed IoT data or video feed to a WebRTC Cloud Server having a WebRTC browser, said WebRTC Cloud Server connected to a Cloud Dynamic Host Configuration Protocol (DHCP) Server and assigning an origin IP address to the IoT Device connected to the processed IoT data or video feed;
  wherein the WebRTC browser is hosted on a cloud-accessed virtual machine that is part of a browser farm comprising a plurality of cloud-accessed virtual machines each having a WebRTC browser installed thereon, and wherein each WebRTC browser is configured to handle from 1-4 individual processed IoT data or video feeds,
  wherein the IoT device is a wireless IoT device selected from an IoT sensor, IoT switch, IoT camera, IoT meter, IoT receiver, and IoT wireless antenna, and
  Sending a discovery request from a WebRTC application of a user communication device to a WebRTC Signaling Server connected to the WebRTC Cloud Server to establish an encrypted peer-to-peer communication between the user communication device and the IoT device, the discovery request obtaining the IoT Device IP address from the WebRTC Cloud Server and sending it to the user communication device, wherein said WebRTC Signaling Server is in communication with the WebRTC application on the user communication device using a Session Management Javascript Application Programming Interface (API) and using a Peer Connection Javascript API.

14. The process according to claim 13, wherein said WebRTC application having a blockchain module to connect the user communication device as a first node to the IoT device as a second node in a Private Blockchain network,
  the WebRTC application having an invite module to send an invite message to a communication session from the user communication device to the IP address of the IoT device through a WebRTC browser extension to a WebRTC signaling server operatively connected to the Private Blockchain network; and
  the WebRTC application having an accept-connection module to establish encrypted WebRTC peer-to-peer connection between the WebRTC browser of the user communication device and the WebRTC browser connected with the wireless IoT device in response to an acceptance by the wireless IoT device of the invite sent by the user communication device.

15. The process according to claim 14, comprising saving a communication session using a Saving Module in the WebRTC application to transmit the communication session, in an encrypted communication between the user communication device and a Cloud Storage Server, using a distributed hash table, wherein the IP address of the user communication device is a key mapped to a second value that is the saved communication session.

16. The process according to of claim 15, comprising assigning a Digital Rights Management (DRM) permission using a DRM Module in the WebRTC application to assign, using a menu of the WebRTC application on the user communication device, the DRM permission to the communication session saved to the Cloud Storage Server network, wherein the DRM permission is selected from the group consisting of: record, not record, store, screen share, revoke, expire, offline view, blacklist, copy, forward, screen capture, rights violation, and cancel/disappear.

17. The process according to claim 16, comprising rendering an Hyper Text Markup Language (HTML) file of the saved communication session using a Rendering Module in the WebRTC application to render in the Cloud Storage Server, an HTML file of the saved communication session, the HTML file stored in the Cloud Storage Server and having a Uniform Resource Locator (URL) link associated therewith.

18. The process according to claim 17, comprising enforcing the DRM permission of the communication session using a DRM Enforcement Module in the WebRTC application, and having programming instructions wherein said Cloud Storage Server is in encrypted communication with the wireless IoT device, said wireless IoT device having the WebRTC application operatively connected to the WebRTC browser of the wireless IoT device to access, using the URL link, the HTML file of the saved communication session and rendering the saved communication session on the Cloud Storage Server, and said WebRTC application enforces the DRM permission of the saved communication session using the DRM enforcement module in the WebRTC application, and said DRM enforcement module configured to send an enforcement command when a DRM permission violation is detected to revoke an encryption key that encrypts an electronic signal between the WebRTC application and the WebRTC browser, wherein the electronic signal is between a Compression-Decompression device (CODEC) in the WebRTC browser and a playback component or module for a speaker or display of the wireless IoT device.

19. The process according to claim 18, comprising using a Private Blockchain Module in the WebRTC application to communicate with the Cloud Storage Server and provide user identity, authentication, a digital hash, Group Node Coupling, personally-identifiable information (PII) security, content linking, content searching, and content addressing.

20. The process according to claim 2, comprising using a Hardware Security Module in the WebRTC application to communicate with the Cloud Storage Server to provide Advanced Encryption Standard 256 Galois/Counter Mode (AES 256 GCM) encryption, and Elliptic-curve Diffie-Hellman (ECDH) encryption for audio and video streams.

21. The process according to claim 20, comprising using a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting a Java Script Object Notation (JSON) Short Messaging Service (SMS) message.

22. The process according to claim 21, comprising wherein the user communication device is selected from a mobile communication device, a desktop computer communication device, and a tablet communication device.

* * * * *